US012579209B2

(12) United States Patent
Weskamp et al.

(10) Patent No.: US 12,579,209 B2
(45) Date of Patent: Mar. 17, 2026

(54) DEVICES, METHODS, AND GRAPHICAL USER INTERFACES FOR INTERACTING WITH A WEB-BROWSER

(71) Applicant: Apple Inc., Cupertino, CA (US)

(72) Inventors: Marcos A. Weskamp, Palo Alto, CA (US); Stephen O. Lemay, Palo Alto, CA (US); Raymond S. Sepulveda, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/832,544

(22) Filed: Jun. 3, 2022

(65) Prior Publication Data

US 2022/0391456 A1 Dec. 8, 2022

Related U.S. Application Data

(60) Provisional application No. 63/263,014, filed on Oct. 25, 2021, provisional application No. 63/197,495, filed on Jun. 6, 2021.

(51) Int. Cl.
*G06F 16/954* (2019.01)
*G06F 3/0483* (2013.01)
(Continued)

(52) U.S. Cl.
CPC .......... *G06F 16/954* (2019.01); *G06F 3/0483* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 6,993,531 B1 * | 1/2006 | Naas | ................... | G06F 16/9562 707/999.102 |
| 7,444,597 B2 * | 10/2008 | Perantatos | ............ | G06F 3/0486 715/205 |

(Continued)

FOREIGN PATENT DOCUMENTS

| | | |
|---|---|---|
| AU | 2016100652 A4 | 6/2016 |
| CN | 101390081 A | 3/2009 |

(Continued)

OTHER PUBLICATIONS

"Swipe between webpages for a webapp", html—Swipe between webpages for a webapp—Stack Overflow, May 2, 2012, 3 pages (Year: 2012).*

(Continued)

*Primary Examiner* — Haimei Jiang
(74) *Attorney, Agent, or Firm* — BAKERHOSTETLER; Kyle B. Morse

(57) ABSTRACT

The method for web browsing on a portable device displays a web-browser user interface that includes a currently displayed webpage and an associated tab in a tab row. The currently displayed webpage forms part of a group of webpages. In response to receiving a swipe gesture, it is then determined that the swipe gesture occurs at a location corresponding to the associated tab in the tab row. In response to the swipe gesture occurs at a location corresponding to the associated tab, the currently displayed webpage is no longer displayed, and the tab row is scrolled to display an additional webpage and its associated additional tab. If, however, the swipe gesture occurs at a location on the currently displayed webpage, a webpage navigation function is performed.

45 Claims, 69 Drawing Sheets

(51) Int. Cl.
  *G06F 3/0485*     (2022.01)
  *G06F 3/04883*    (2022.01)

(56) References Cited

U.S. PATENT DOCUMENTS

| | | | |
|---|---|---|---|
| 8,065,627 B2 | 11/2011 | Atkins | |
| 8,564,544 B2 | 10/2013 | Jobs et al. | |
| 8,661,369 B2 | 2/2014 | Heo et al. | |
| 8,762,878 B1 | 6/2014 | Weber et al. | |
| 8,866,748 B2 | 10/2014 | Sirpal et al. | |
| 8,881,032 B1* | 11/2014 | Weber | G06F 3/0483 |
| | | | 715/764 |
| 9,182,948 B1 | 11/2015 | O'Riordan | |
| 9,191,618 B2 | 11/2015 | Fluhr et al. | |
| 9,547,525 B1* | 1/2017 | Trainor | G06F 3/04842 |
| 9,648,062 B2* | 5/2017 | Chaudhri | G06F 3/04886 |
| 9,658,740 B2* | 5/2017 | Chaudhri | G06F 3/04886 |
| 9,891,811 B2* | 2/2018 | Federighi | G06F 3/04842 |
| 10,067,643 B2 | 9/2018 | Chen et al. | |
| 10,088,999 B2* | 10/2018 | Kuscher | G06F 3/0481 |
| 10,102,567 B2* | 10/2018 | Tam | G06Q 30/0643 |
| 10,102,824 B2 | 10/2018 | Khoury et al. | |
| 10,387,025 B2 | 8/2019 | Hunt et al. | |
| 10,387,546 B1* | 8/2019 | Duran | G06F 40/14 |
| 10,419,725 B2* | 9/2019 | Champagne | G08B 13/1968 |
| 10,551,997 B2 | 2/2020 | Heo et al. | |
| 10,732,790 B2 | 8/2020 | Wagner et al. | |
| 10,795,490 B2 | 10/2020 | Chaudhri et al. | |
| 11,169,685 B2 | 11/2021 | Louch et al. | |
| 11,366,868 B1* | 6/2022 | Birch | H04L 67/02 |
| 2003/0020671 A1 | 1/2003 | Santoro et al. | |
| 2004/0261035 A1 | 12/2004 | Emerson et al. | |
| 2005/0086612 A1 | 4/2005 | Gettman et al. | |
| 2005/0282603 A1 | 12/2005 | Parrot et al. | |
| 2006/0230356 A1 | 10/2006 | Sauve et al. | |
| 2006/0238520 A1 | 10/2006 | Westerman et al. | |
| 2006/0265417 A1 | 11/2006 | Amato et al. | |
| 2007/0152984 A1 | 7/2007 | Ording et al. | |
| 2007/0198947 A1 | 8/2007 | Cox et al. | |
| 2007/0204232 A1 | 8/2007 | Ray et al. | |
| 2008/0165255 A1 | 7/2008 | Christie et al. | |
| 2008/0174570 A1 | 7/2008 | Jobs et al. | |
| 2009/0225038 A1 | 9/2009 | Bolsinga et al. | |
| 2009/0293007 A1* | 11/2009 | Duarte | G06F 3/0481 |
| | | | 715/767 |
| 2010/0095219 A1 | 4/2010 | Stachowiak et al. | |
| 2010/0115450 A1* | 5/2010 | Scott | G06F 3/0483 |
| | | | 715/777 |
| 2010/0180225 A1 | 7/2010 | Chiba et al. | |
| 2010/0248788 A1* | 9/2010 | Yook | G06F 3/04886 |
| | | | 455/566 |
| 2010/0283743 A1 | 11/2010 | Coddington | |
| 2011/0013049 A1 | 1/2011 | Thorn | |
| 2011/0090255 A1 | 4/2011 | Wilson et al. | |
| 2011/0138313 A1 | 6/2011 | Decker et al. | |
| 2011/0163968 A1 | 7/2011 | Hogan | |
| 2011/0163969 A1 | 7/2011 | Anzures et al. | |
| 2011/0163971 A1 | 7/2011 | Wagner et al. | |
| 2011/0214084 A1 | 9/2011 | Kim | |
| 2011/0252350 A1 | 10/2011 | Chaudhri | |
| 2011/0252375 A1* | 10/2011 | Chaudhri | H04N 7/147 |
| | | | 715/835 |
| 2012/0032877 A1 | 2/2012 | Watkins, Jr. et al. | |
| 2012/0060111 A1* | 3/2012 | Kim | G06F 3/0483 |
| | | | 715/777 |
| 2012/0176322 A1 | 7/2012 | Karmi et al. | |
| 2013/0061159 A1* | 3/2013 | Tseng | G06F 16/954 |
| | | | 715/760 |
| 2013/0061160 A1* | 3/2013 | Tseng | G06F 3/0483 |
| | | | 715/760 |
| 2013/0067420 A1 | 3/2013 | Pittappilly et al. | |
| 2013/0120444 A1 | 5/2013 | Allyn et al. | |
| 2013/0145290 A1* | 6/2013 | Weber | G06F 3/0483 |
| | | | 715/760 |

| | | | |
|---|---|---|---|
| 2013/0152010 A1* | 6/2013 | Weber | G06F 16/954 |
| | | | 715/783 |
| 2013/0159941 A1 | 6/2013 | Langlois et al. | |
| 2013/0204194 A1 | 8/2013 | Ratjen | |
| 2013/0205194 A1 | 8/2013 | Decker et al. | |
| 2013/0205244 A1* | 8/2013 | Decker | G06F 3/04845 |
| | | | 715/777 |
| 2013/0268837 A1* | 10/2013 | Braithwaite | G06F 16/958 |
| | | | 715/234 |
| 2013/0321340 A1 | 12/2013 | Seo et al. | |
| 2014/0068475 A1* | 3/2014 | Li | G06F 3/04855 |
| | | | 715/765 |
| 2014/0195952 A1 | 7/2014 | Champagne et al. | |
| 2014/0232671 A1 | 8/2014 | Chaudhri | |
| 2014/0282208 A1* | 9/2014 | Chaudhri | G06F 3/04817 |
| | | | 715/779 |
| 2014/0298155 A1* | 10/2014 | Rider | G06F 40/117 |
| | | | 715/234 |
| 2014/0298240 A1 | 10/2014 | Jitkoff et al. | |
| 2014/0298272 A1 | 10/2014 | Doan et al. | |
| 2015/0046871 A1 | 2/2015 | Lewis | |
| 2015/0058318 A1* | 2/2015 | Blackwell | G06F 16/955 |
| | | | 707/722 |
| 2015/0058787 A1* | 2/2015 | Trainor | G06F 3/017 |
| | | | 715/777 |
| 2015/0095817 A1* | 4/2015 | Mamadgi | G06F 3/0482 |
| | | | 715/765 |
| 2015/0193117 A1* | 7/2015 | Nicolaou | G06F 3/04817 |
| | | | 715/208 |
| 2015/0324095 A1 | 11/2015 | Brown et al. | |
| 2015/0346929 A1* | 12/2015 | Karunamuni | G06F 3/0483 |
| | | | 715/777 |
| 2015/0363066 A1 | 12/2015 | Lemay et al. | |
| 2015/0365306 A1 | 12/2015 | Chaudhri et al. | |
| 2016/0062552 A1 | 3/2016 | Jeong et al. | |
| 2016/0065522 A1* | 3/2016 | Vasudev | H04L 67/141 |
| | | | 709/206 |
| 2016/0103793 A1* | 4/2016 | Fang | G06F 3/0483 |
| | | | 715/234 |
| 2016/0224123 A1 | 8/2016 | Antoniac et al. | |
| 2016/0224213 A1 | 8/2016 | Chen et al. | |
| 2016/0259413 A1 | 9/2016 | Ansures et al. | |
| 2016/0343350 A1 | 11/2016 | Khoury et al. | |
| 2016/0350977 A1 | 12/2016 | Doronichev et al. | |
| 2016/0357357 A1 | 12/2016 | Lemay et al. | |
| 2016/0357358 A1* | 12/2016 | Forster | G06F 3/04845 |
| 2017/0046024 A1 | 2/2017 | Dascola et al. | |
| 2017/0046025 A1* | 2/2017 | Dascola | G06F 3/0416 |
| 2017/0075526 A1 | 3/2017 | Day | |
| 2017/0199638 A1* | 7/2017 | Bhupatiraju | G06F 16/9577 |
| 2017/0285843 A1* | 10/2017 | Roberts-Hoffman | |
| | | | G06F 3/0485 |
| 2017/0315694 A1 | 11/2017 | Alonso Ruiz et al. | |
| 2017/0322709 A1 | 11/2017 | Chen et al. | |
| 2017/0324837 A1* | 11/2017 | Quintero | H04L 67/535 |
| 2017/0329472 A1 | 11/2017 | Kim et al. | |
| 2017/0357434 A1* | 12/2017 | Coffman | G06F 3/04847 |
| 2017/0357437 A1 | 12/2017 | Peterson et al. | |
| 2017/0357439 A1* | 12/2017 | Lemay | G06F 1/3265 |
| 2018/0032203 A1* | 2/2018 | Sepulveda | G06F 1/1647 |
| 2018/0081517 A1* | 3/2018 | Luo | G06F 3/0488 |
| 2018/0203596 A1 | 7/2018 | Dhaliwal et al. | |
| 2018/0329550 A1* | 11/2018 | Dellinger | G06F 3/0416 |
| 2018/0335921 A1 | 11/2018 | Karunamuni et al. | |
| 2018/0335937 A1* | 11/2018 | Hauenstein | G06F 3/0482 |
| 2020/0077483 A1* | 3/2020 | Agarwal | H05B 47/196 |
| 2020/0320794 A1 | 10/2020 | Huang et al. | |
| 2020/0326820 A1 | 10/2020 | Walkin et al. | |
| 2020/0326839 A1 | 10/2020 | Walkin et al. | |
| 2021/0141991 A1* | 5/2021 | Pinnamaneni | G06F 16/94 |
| 2021/0201580 A1 | 7/2021 | Sztuk et al. | |
| 2021/0216176 A1 | 7/2021 | Walkin et al. | |
| 2022/0092133 A1* | 3/2022 | Devereux | G06F 3/0482 |
| 2022/0276752 A1 | 9/2022 | Walkin et al. | |
| 2022/0326816 A1 | 10/2022 | Walkin et al. | |
| 2023/0273707 A1 | 8/2023 | Walkin et al. | |
| 2023/0393710 A1 | 12/2023 | Deets et al. | |

(56) References Cited

U.S. PATENT DOCUMENTS

| 2024/0152256 | A1* | 5/2024 | Dascola | G06F 3/0483 |
|---|---|---|---|---|
| 2024/0370140 | A1 | 11/2024 | Triverio | |
| 2025/0103181 | A1 | 3/2025 | Walkin et al. | |

FOREIGN PATENT DOCUMENTS

| CN | 103324435 | A | 9/2013 |
|---|---|---|---|
| CN | 104777983 | A | 7/2015 |
| CN | 108415752 | A | 8/2015 |
| CN | 105308634 | A | 2/2016 |
| CN | 106020592 | A | 10/2016 |
| CN | 107102806 | A | 8/2017 |
| CN | 107656672 | A | 2/2018 |
| CN | 108549519 | A | 9/2018 |
| CN | 109313530 | A | 2/2019 |
| EP | 1 491 990 | A2 | 12/2004 |
| EP | 3 108 354 | A2 | 12/2016 |
| EP | 3380918 | A2 | 10/2018 |
| JP | 2006146824 | A | 6/2006 |
| JP | 2007233797 | A | 9/2007 |
| JP | 2008536217 | A | 9/2008 |
| JP | 2011018098 | A | 2/2011 |
| KR | 10-0733962 | | 6/2007 |
| KR | 10-2009-0053851 | | 5/2009 |
| KR | 20170106822 | A | 9/2017 |
| TW | 200406687 | | 5/2004 |
| TW | 200743971 | | 12/2007 |
| WO | WO 2014/071779 | A1 | 5/2014 |
| WO | WO 2014/200729 | A2 | 12/2014 |
| WO | WO 2016/109463 | A1 | 7/2016 |
| WO | WO 2017/052849 | A1 | 3/2017 |
| WO | WO 2018/144339 | A1 | 8/2018 |
| WO | WO 2018/213241 | A1 | 11/2018 |
| WO | WO 2018/213451 | A1 | 11/2018 |
| WO | WO 2019/014859 | A1 | 1/2019 |
| WO | WO 2019/037359 | A1 | 2/2019 |

OTHER PUBLICATIONS

Office Action, dated Nov. 21, 2022, received in Chinese Patent Application No. 201910247859.5, which corresponds with U.S. Appl. No. 13/750,572, 3 pages.
Office Action, dated Dec. 23, 2022, received in Japanese Patent Application No. 2021-560737, which corresponds with U.S. Appl. No. 16/581,674, 2 pages.
Notice of Allowance, dated Feb. 23, 2023, received in U.S. Appl. No. 17/750,119, 33 pages.
Invitation to Pay Additional Fees, dated Sep. 21, 2022, received in International Patent Application No. PCT/2022/032363, which corresponds with U.S. Appl. No. 17/832,544, 14 pages.
International Search Report and Written Opinion, dated Jan. 27, 2023, received in International Patent Application No. PCT/2022/032363, which corresponds with U.S. Appl. No. 17/832,544, 25 pages.
Office Action, dated Sep. 7, 2022, received in Australian Patent Application No. 2020259249, which corresponds with U.S. Appl. No. 16/581,665, 3 pages.
Decision to Grant, dated Jul. 7, 2022, received in European Patent Application No. 20721988.2, which corresponds with U.S. Appl. No. 16/581,674, 2 pages.
Patent, dated Aug. 3, 2022, received in European Patent Application No. 20721988.2, which corresponds with U.S. Appl. No. 16/581,674, 4 pages.
Invitation to Pay Additional Fees, dated Aug. 8, 2022, received in European Application No. 20187231.4, which corresponds with U.S. Appl. No. 16/581,674, 16 pages.
International Search Report and Written Opinion, dated Oct. 4, 2022, received in International Patent Application No. PCT/US2022/023932, which corresponds with U.S. Appl. No. 17/714,950, 42 pages.

Invitation to Pay Additional Fees, dated Sep. 21, 2022, received in International Patent Application No. PCT/US2020/025800, which corresponds with U.S. Appl. No. 16/581,665, 14 pages.
Bott, "Windows 7 Official Manual," vol. 1, Nikkei Business Publications, Inc., First Edition, Apr. 26, 2010, 4 pages.
Dellinger et al., U.S. Appl. No. 62/506,549, "Systems and Methods for Interacting with Multiple Applications that are Simultaneously Displayed on an Electronic Device with Touch-Sensitive Display", filed May 15, 2017, 203 pages.
Huculak, "Xmarks Bookmark Sync, an Awesome Bookmark Chrome Extension", https://pureinfotech.com/xmarks-bookmark-sync-an-awesome-bookmark-chrome-extension, Feb. 24, 2011, 6 pages.
Lemay et al., U.S. Appl. No. 62/171,987, "Systems and Methods for Efficiently Navigating Between Applications with Linked Content on an Electronic Device with a Touch-Sensitive Display", filed Jun. 5, 2015, 163 pages.
Matsuyama, "Weekly Ascii", Ascii Media Works http://weekly.ascii.jp/elem/000/000/022/22454/ Jul. 12, 2010, 9 pages.
Purewal, "How to Use Multiple Desktops in Windows 10", https://www.cnet.com/how-to/how-to-use-multiple-desktops-in-windows-10, Jul. 4, 2015, 5 pages.
Tidwell, "Designing Interfaces," Second Edition, O'Reilly Japan, Inc., Dec. 26, 2011, 6 pages.
YouTube, "Expose for Windows—Switcher", https://www.youtube.com/watch?v=XQWLy7DVDUA, Sep. 27, 2009, 3 pages.
YouTube, "How to Enable Freeform Window Mode on Android Nougat without Rooting Freeform Multi Window Mode", https://www.youtube.com/watch?v=MRHyH9anr4c, Jan. 14, 2017, 3 pages.
YouTube, "How to: Group Mission Control Windows Together in OS X", https://www.youtube.com/watch?v=cuiWiDgHyWw, May 10, 2016, 2 pages.
YouTube, "Inside IOS 11: How to Use Split-View on an iPad", https://www.youtube.com/watch?v=pqFYf bCbNpc, Jul. 25, 2017, 4 pages.
YouTube, "Switcher—A Windows Software Review", https://www.youtube.com/watch?v=9mYq-iZBWyE, Jul. 7, 2010, 2 pages.
YouTube, "Task Switcher in Windows 10—YouTube", https://www.youtube.com/watch?v=HIVPgghvKVs, Mar. 2, 2016, 2 pages.
Walkin et al., U.S. Appl. No. 62/752,336, "Devices, Methods, and Graphical User Interfaces for Navigating Between User Interfaces, Displaying a Dock, and Displaying System User Interface Elements", filed Oct. 29, 2018, 553 pages.
Office Action, dated Feb. 11, 2015, received in U.S. Appl. No. 13/750,572, 30 pages.
Final Office Action, dated Oct. 21, 2015, received in U.S. Appl. No. 13/750,572, 17 pages.
Notice of Allowance, dated Jun. 13, 2016, received in U.S. Appl. No. 13/750,572, 8 pages.
Office Action, dated Jul. 16, 2015, received in Australian Patent Application No. 2013215357, which corresponds with U.S. Appl. No. 13/750,572, 3 pages.
Notice of Acceptance, dated May 24, 2016, received in Australian Patent Application No. 2013215357, which corresponds with U.S. Appl. No. 13/750,572, 3 pages.
Notice of Acceptance, dated May 16, 2017, received in Australian Patent Application No. 2016225811. Which corresponds with U.S. Appl. No. 13/750,572, 3 pages.
Certificate of Grant, dated Sep. 21, 2017, received in Australian Patent Application No. 2016225811, which corresponds with U.S. Appl. No. 13/750,572, 1 page.
Office Action, dated Nov. 30, 2016, received in Chinese Patent Application No. 201380017048.7, which corresponds with U.S. Appl. No. 13/750,572, 2 pages.
Office Action, dated Aug. 30, 2017, received in Chinese Patent Application No. 20138001748.7, which corresponds with U.S. Appl. No. 13/750,572, 3 pages.
Office Action, dated Sep. 25, 2018, received in Chinese Patent Application No. 2013800017048.7, which corresponds with U.S. Appl. No. 13/750,572, 6 pages.
Notice of Allowance, dated Jan. 14, 2019, received in Chinese Patent Application No. 201380017048.7, which corresponds with U.S. Appl. No. 13/750,572, 4 pages.

(56) References Cited

OTHER PUBLICATIONS

Patent, dated Apr. 2, 2019, received in Chinese Patent Application No. 20138017048.7, which corresponds with U.S. Appl. No. 13/750,572, 4 pages.

Office Action, dated Apr. 17, 2019, received in European Patent Application No. 13704854.2, which corresponds with U.S. Appl. No. 13/750,572, 4 pages.

Office Action, dated Nov. 24, 2015, received in Japanese Patent Application No. 2014-555623, which corresponds with U.S. Appl. No. 13/750,572, 5 pages.

Office Action, dated Oct. 3, 2016, received in Japanese Patent Application No. 2014-555623, which corresponds with U.S. Appl. No. 13/750,572, 5 pages.

Notice of Allowance, dated Apr. 14, 2017, received in Japanese Patent Application No. 2014-555623, which corresponds with U.S. Appl. No. 13/750,572, 5 pages.

Patent, dated May 19, 2017, received in Japanese Patent Application No. 2014-555623, which corresponds with U.S. Appl. No. 13/750,572, 3 pages.

Office Action, dated Apr. 1, 2016, received in Korean Patent Application No. 10-2014-7025056, which corresponds with U.S. Appl. No. 13/750,572, 6 pages.

Notice of Allowance, dated Sep. 1, 2016, received in Korean Patent Application No. 10-2014-7025056, which corresponds with U.S. Appl. No. 13/750,572, 4 pages.

Patent, dated Nov. 30, 2016, received in Korean Patent Application No. 10-2014-7025056, which corresponds with U.S. Appl. No. 13/750,572, 2 pages.

Office Action, dated Apr. 21, 2015, received in Taiwanese Patent Application No. 102104256, which corresponds with U.S. Appl. No. 13/750,572, 6 pages.

Notice of Allowance, dated Sep. 2, 2015, received in Taiwanese Patent Application No. 102104256, which corresponds with U.S. Appl. No. 13/750,572, 6 pages.

Patent, dated Jan. 11, 2016, received in Taiwanese Patent Application No. 102104256, which corresponds with U.S. Appl. No. 13/750,586, 4 pages.

Office Action, dated May 26, 2016, received in Taiwanese Patent Application No. 104132596, which corresponds with U.S. Appl. No. 13/750,572, 3 pages.

Patent, dated Feb. 11, 2017, received in Taiwanese Patent Application No. 104132596, which corresponds with U.S. Appl. No. 13/750,572, 4 pages.

Office Action, dated Mar. 27, 2015, received in U.S. Appl. No. 13/750,586, 14 pages.

Final Office Action, dated Dec. 18, 2015, received in U.S. Appl. No. 13/750,586, 10 pages.

Notice of Allowance, dated Aug. 12, 2016, received in U.S. Appl. No. 13/750,586, 10 pages.

Office Action, dated Feb. 13, 2020, received in U.S. Appl. No. 16/581,665, 21 pages.

Final Office Action, dated Jun. 4, 2020, received in U.S. Appl. No. 16/581,665, 22 pages.

Notice of Allowance, dated Jan. 29, 2021, received in U.S. Appl. No. 16/581,665, 9 pages.

Office Action, dated Mar. 30, 2020, received in Danish Patent Application No. 2019-70528, which corresponds with U.S. Appl. No. 16/581,674, 3 pages.

Office Action, dated Nov. 7, 2019, received in Danish Patent Application No. 2019-70528, which corresponds with U.S. Appl. No. 16/581,674, 8 pages.

Notice of Allowance, dated Aug. 18, 2020, received in Danish Patent Application No. 2019-70528, which corresponds with U.S. Appl. No. 16/581,674, 2 pages.

Patent, dated Nov. 9, 2020, received in Danish Patent Application No. 2019-70528, which corresponds with U.S. Appl. No. 16/581,674, 5 pages.

Office Action, dated Jul. 22, 2021, received in European Patent Application No. 20721988.2, which corresponds with U.S. Appl. No. 16/581,674, 5 pages.

Intention to Grant, dated Mar. 16, 2022, received in European Patent Application No. 20721988.2, which corresponds with U.S. Appl. No. 16/581,674, 7 pages.

Office Action, dated Apr. 19, 2022, received in Indian Patent Application No. 202117045314, which corresponds with U.S. Appl. No. 16/581,674, 10 pages.

Office Action, dated Feb. 13, 2020, received in U.S. Appl. No. 16/581,674, 22 pages.

Final Office Action, dated Jun. 4, 2020, received in U.S. Appl. No. 16/581,674, 20 pages.

Office Action, dated Oct. 21, 2019, received in Danish Patent Application No. 201970529, which corresponds with U.S. Appl. No. 16/581,674, 9 pages.

Office Action, dated Mar. 3, 2020, received in Danish Patent Application No. 201970529, which corresponds with U.S. Appl. No. 16/581,674, 3 pages.

Notice of Allowance, dated Aug. 14, 2020, received in Danish Patent Application No. 201970529, which corresponds with U.S. Appl. No. 16/581,674, 2 pages.

Patent, dated Nov. 9, 2020, received in Danish Patent Application No. 201970529, which corresponds with U.S. Appl. No. 16/581,674, 5 pages.

Notice of Allowance, dated Mar. 3, 2022, received in U.S. Appl. No. 17/219,232, 9 pages.

International Preliminary Report on Patentability, dated Aug. 5, 2014, received in International Patent Application No. PCT/US2013/023634, 6 pages.

International Search Report and Written Opinion, dated Jul. 12, 2013, received in International Patent Application No. PCT/US2013/023634, 9 pages.

Invitation to Pay Additional Fees, dated Jul. 24, 2020, received in International Patent Application No. PCT/US2020/025800, which corresponds with U.S. Appl. No. 16/581,665, 12 pages.

International Search Report and Written Opinion, dated Sep. 15, 2020, received in International Patent Application No. PCT/US2020/025800, which corresponds with U.S. Appl. No. 16/581,665, 18 pages.

Extended European Search Report, dated Apr. 7, 2021, received in European Application No. 20187231.4, which corresponds with U.S. Appl. No. 16/581,674, 7 pages.

Extended European Search Report, dated Mar. 23, 2022, received in European Patent Application No. 21215849.9, 9 pages.

McGrenere et al., "Affordances: Clarifying and Evolving a Concept", University of Toronto, Ontario, Canada, publicated in the Proceedings of Graphics Interface 2000, Montreal, May 2000, 8 pages.

Norman, "The Design of Everyday Things 11", Basic Books, Nov. 5, 2015, 5 pages.

Final Office Action, dated Jun. 19, 2023, received in Japanese Patent Application No. 2021-560737, which corresponds with U.S. Appl. No. 16/581,674, 2 pages.

Office Action, dated Jun. 29, 2023, received in U.S. Appl. No. 17/714,950, 39 pages.

Notice of Allowance, dated Nov. 17, 2023, received in Japanese Patent Application No. 2021-560737, which corresponds with U.S. Appl. No. 16/581,674, 12 pages.

Patent, dated Dec. 5, 2023, received in Japanese Patent Application No. 2021-560737, which corresponds with U.S. Appl. No. 16/581,674, 4 pages.

Notice of Allowance, dated Mar. 1, 2021, received in U.S. Appl. No. 16/581,674, 6 pages.

Office Action, dated Oct. 24, 2023, received in Australian Patent Application No. 2023202745, which corresponds with U.S. Appl. No. 16/581,674, 2 pages.

Intent to Grant, dated Nov. 20, 2023, received in European Patent Application No. 20187231.4, which corresponds with U.S. Appl. No. 16/581,674, 8 pages.

Decision to Grant, dated Jan. 5, 2024, received in European Patent Application No. 20187231.4, which corresponds with U.S. Appl. No. 16/581,674, 4 pages.

Patent, dated Jan. 24, 2024, received in European Patent Application No. 20187231.4, which corresponds with U.S. Appl. No. 16/581,674, 3 pages.

(56) References Cited

OTHER PUBLICATIONS

Office Action, dated Apr. 26, 2024, received in Chinese Patent Application No. 202011108005.8, which corresponds with U.S. Appl. No. 16/581,665, 4 pages.

Office Action, dated Apr. 27, 2024, received in Chinese Patent Application No. 202011108072, which corresponds with U.S. Appl. No. 16/581,674, 2 pages.

Final Office Action, dated Apr. 30, 2024, received in U.S. Appl. No. 17/714,950, 36 pages.

Intention to grant, dated Jul. 11, 2024, received in European Patent Application No. 23215523.4, which corresponds with U.S. Appl. No. 17/219,232, 9 pages.

Notice of Allowance, dated Mar. 27, 2024, received in U.S. Appl. No. 18/143,564, 13 pages.

International Search Report and Written Opinion, dated Jan. 30, 2024, received in International Patent Application No. PCT/2023/033284, which corresponds with U.S. Appl. No. 18/369,635, 26 pages.

Notice of Allowance, dated Mar. 31, 2023, received in Australian Patent Application No. 2020259249, which corresponds with U.S. Appl. No. 16/581,665, 3 pages.

Grant Certificate, dated Aug. 3, 2023, received in Australian Patent Application No. 2020259249, which corresponds with U.S. Appl. No. 16/581,665, 1 page.

Patent, dated Dec. 31, 2024, received in Chinese Patent Application No. 202011108005.8, which corresponds with U.S. Appl. No. 16/581,665, 4 pages.

Patent, dated Dec. 24, 2024, received in Korean Patent Application No. 2021-7037248, which corresponds with U.S. Appl. No. 16/581,674, 4 pages.

Notice of Allowance, dated Aug. 22, 2024, received in Australian Patent Application No. 2023202745, which corresponds with U.S. Appl. No. 16/581,674, 3 pages.

Grant Certificate, dated Dec. 24, 2024, received in Australian Patent Application No. 2023202745, which corresponds with U.S. Appl. No. 16/581,674, 3 pages.

Notice of Allowance, dated Sep. 14, 2024, received in Chinese Patent Application No. 202011108072, which corresponds with U.S. Appl. No. 16/581,674, 5 pages.

Notice of Allowance, dated Nov. 22, 2024, received in Japanese Patent Application No. 2023-180489, which corresponds with U.S. Appl. No. 16/581,674, 2 pages.

Office Action, dated Dec. 27, 2024, received in U.S. Appl. No. 17/714,950, 55 pages.

Grant Decision, dated Nov. 21, 2024, received in European Patent Application No. 23215523.4, which corresponds with U.S. Appl. No. 17/219,232, 4 pages.

Office Action, dated Sep. 2, 2024, received in European Patent Application No. 212115749.9, 10 pages.

Extended European Search Report, dated Feb. 26, 2025, received in European Patent Application No. 24213830.3, 7 pages.

Final Office Action, dated May 22, 2025, received in U.S. Appl. No. 17/714,950, 44 pages.

Office Action, dated Oct. 22, 2025, received in U.S. Appl. No. 18/369,635, 6 pages.

* cited by examiner

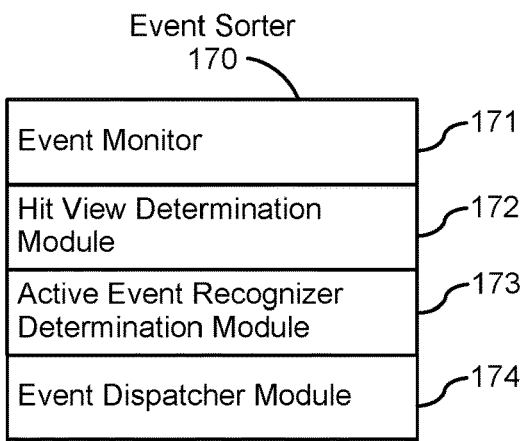
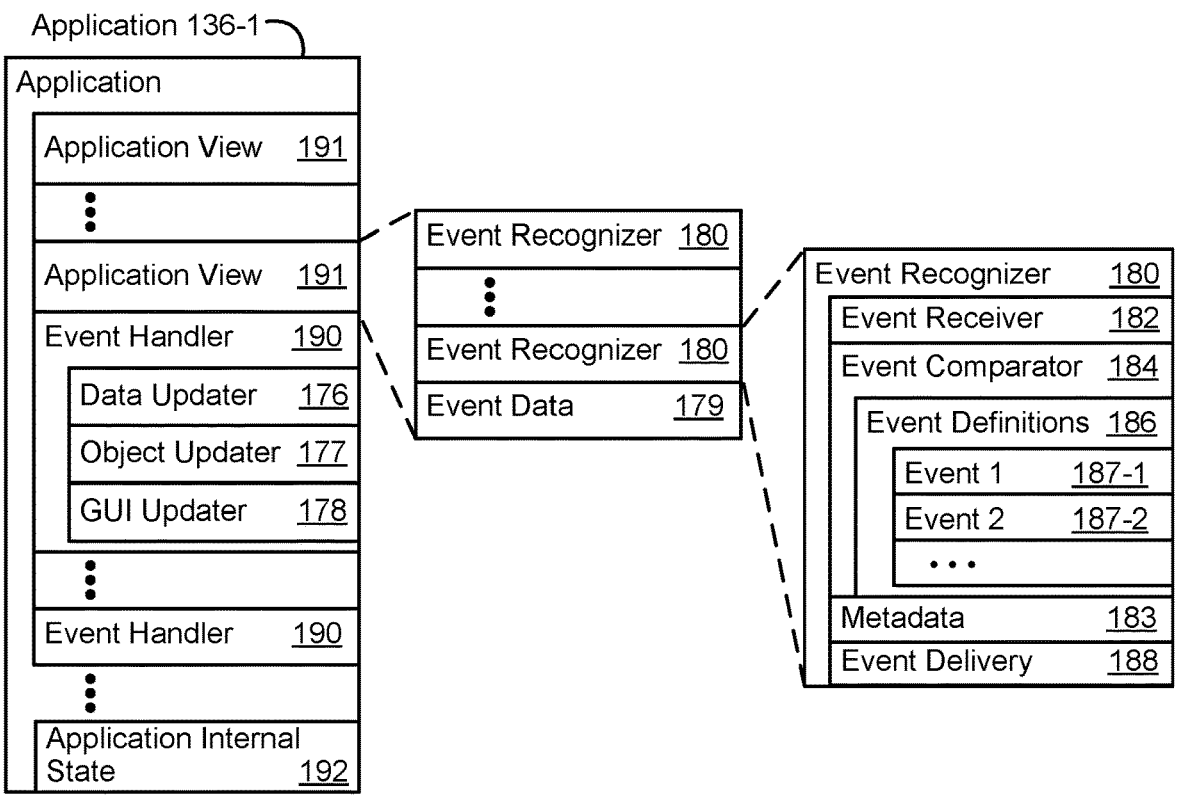
Figure 1B

Portable Multifunction Device 100

206    210    212

208

208

200

Speaker 111    Optical Sensor 164    Proximity Sensor 166

210 is SIM card slot
212 is headphone jack

202

Touch Screen 112

Contact Intensity Sensor(s) 165

Tactile Output Generator(s) 167

203

Microphone 113    Home 204    Accelerometer(s) 168

External Port 124

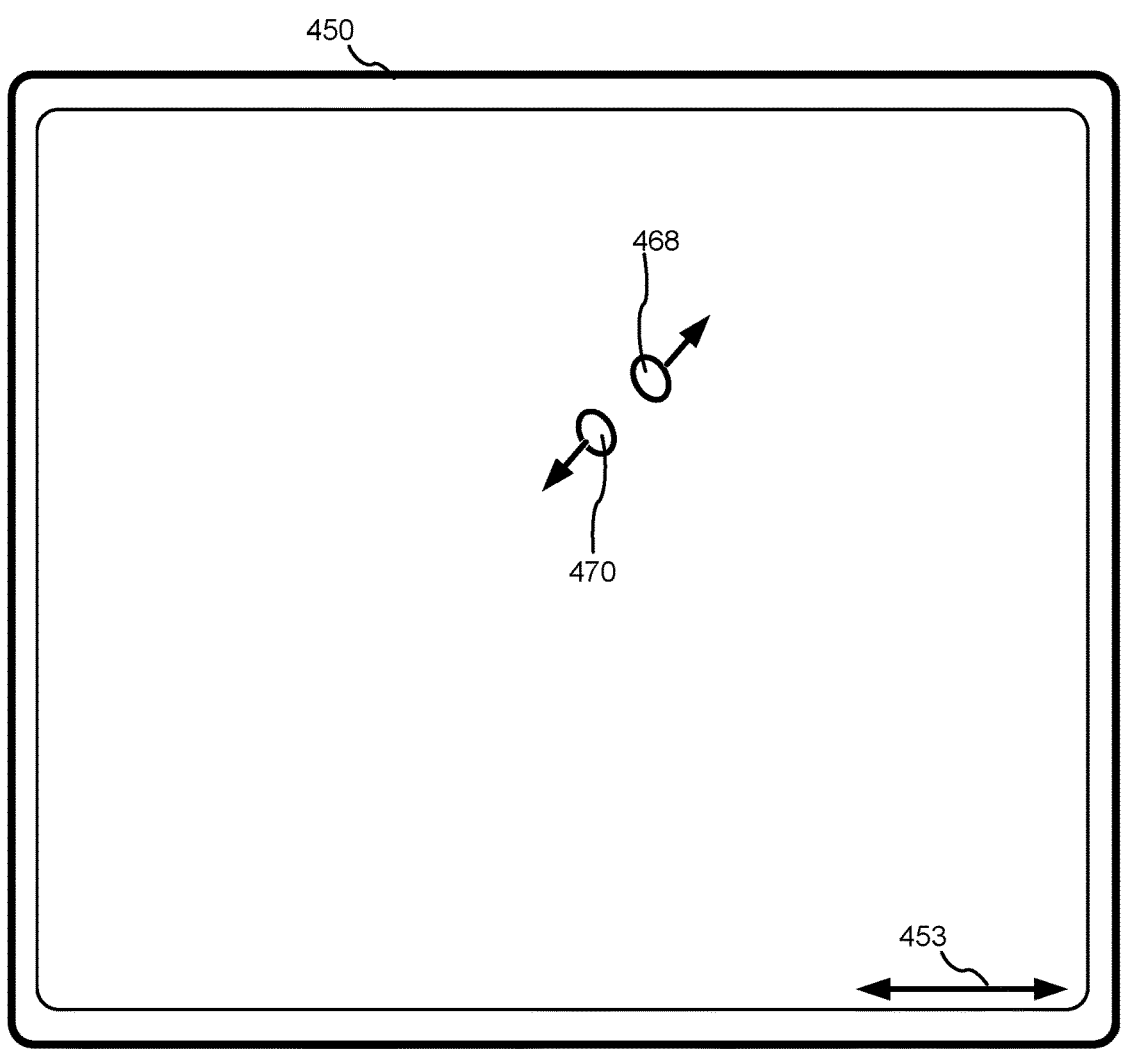
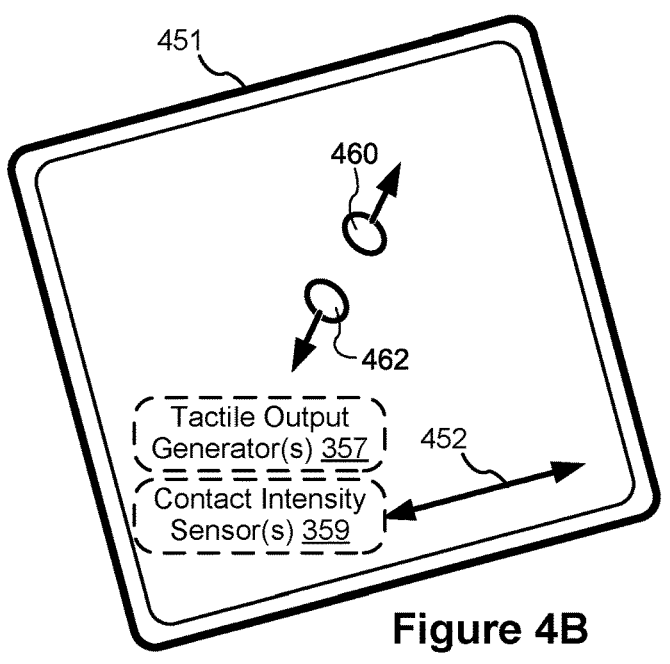
Figure 4B

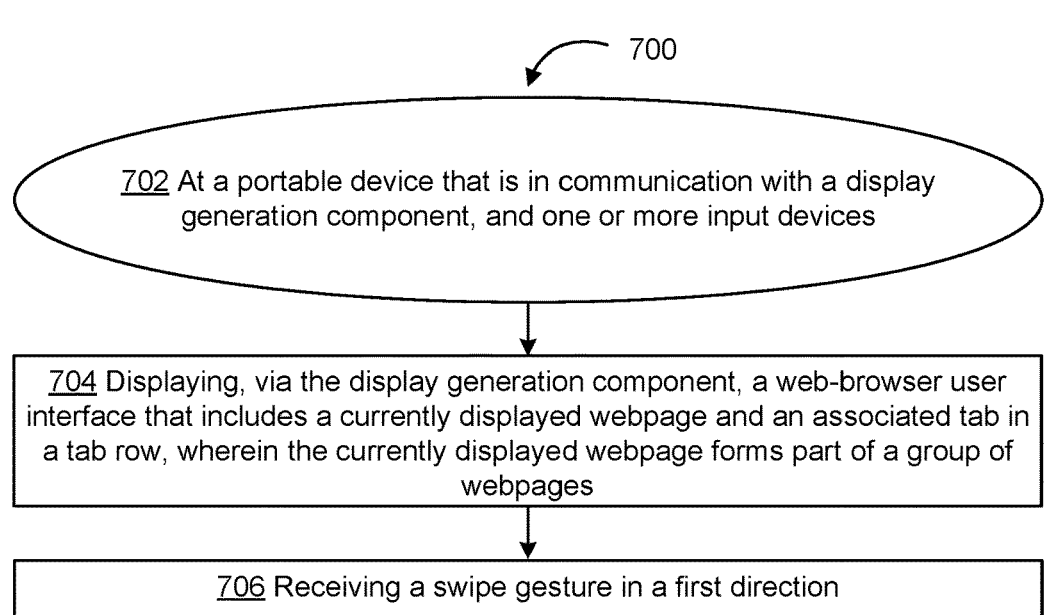

700

702 At a portable device that is in communication with a display generation component, and one or more input devices 704 Displaying, via the display generation component, a web-browser user interface that includes a currently displayed webpage and an associated tab in a tab row, wherein the currently displayed webpage forms part of a group of webpages 706 Receiving a swipe gesture in a first direction 708 In response to receiving the swipe gesture in the first direction:

710 In accordance with a determination that the swipe gesture in the first direction occurs at a location corresponding to the associated tab in the tab row, concurrently: ceasing to display the currently displayed webpage, and scrolling the tab row to cause display of an additional webpage and its associated additional tab 712 In accordance with a determination that the swipe gesture in the first direction occurs at a location corresponding to the currently displayed webpage, performing a webpage navigation function

700

714 The swipe gesture in the first direction is a swipe gesture moving from left to right 716 Receiving the swipe gesture in a second direction;

in response to receiving the swipe gesture in the second direction:

in accordance with a determination that the swipe gesture occurs at a location corresponding to the associated tab in the tab row, displaying a plurality of representations of webpages, including a representation of the currently displayed webpage, the plurality of representations corresponding to at least some of the group of webpages;

in accordance with a determination that the swipe gesture occurs at a location corresponding to the currently displayed webpage, scrolling the currently displayed webpage 718 The swipe gesture in the second direction is a swipe gesture moving from a downward location to an upward location 720 The plurality of representations of webpages each include a respective affordance for removing the tab associated with the respective webpage from the group of webpages 722 In response to scrolling the currently displayed webpage, concurrently:

ceasing to display the associated tab; and displaying reduced size website information at a different location than the associated tab 724 The group of webpages is not a user defined group, including:

in response to receiving the swipe gesture in the second gesture, and in accordance with a determination that the swipe gesture occurs at a location corresponding to the associated tab in the tab row, displaying an affordance for creating a new user defined group of webpages

Figure 7B

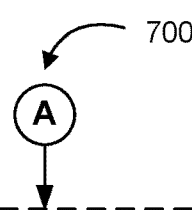

700

(A)

726 The plurality of representations of webpages do not all fit within the
web-browser user interface, the method including:
          receiving a gesture via the one or more input device; and
          in response to receiving the gesture, scrolling the plurality of
representations of webpages to reveal previously non-displayed
representation of webpages 728 In response to receiving the swipe gesture in the second direction, and
in accordance with a determination that the swipe gesture occurs at a
location corresponding to the associated tab in the tab row, displaying an
identifier for the group of webpages 730 In response to receiving the swipe gesture in the second direction, and
in accordance with a determination that the swipe gesture occurs at a
location corresponding to the associated tab in the tab row, displaying a
user interface element for displaying one or more other groups of
webpages;
          receiving an input at the user interface element; and
          in response to receiving the input, displaying one or more identifiers
each associated with the one or more other groups of webpages.

732 Receiving an input at an identifier of the one or more identifiers;
in response to receiving the input:
          closing the group of webpages; and
          displaying another group of webpages associated with the identifier 734 The group of webpages is defined by a user of the portable device 736 The associated tab in the tab row partially overlays a side of the
currently displayed webpage

Figure 7C

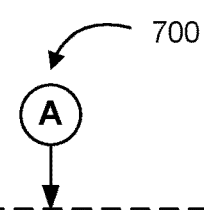

700

738 The portable device is a smartphone with a limited screen area

740 The swipe gesture in the first direction occurs along an axis of the tab row 742 In accordance with a determination that one or more tabs are scrollable from the tab row in a first direction, displaying a user interface element that indicates whether additional tabs are available for selection from the tab row, in accordance with a determination that no more tabs are scrollable in the first direction, forgoing display of the user interface element that indicates whether additional tabs are available for selection from the tab row 744 No additional associated tabs are left to scroll in the tab row, including:
in response to receiving an additional swipe gesture in the first direction:
in accordance with a determination that the additional swipe gesture in the first direction occurs at a location corresponding to the associated tab in the tab row, concurrently:
ceasing to display the currently displayed webpage, and
displaying a new user interface that includes one or more user interface elements for selecting a new webpage to display 746 The group of webpages is defined by a user of the portable device 748 The new user interface is a start page of the web browser user interface, and the one or more user interface elements are favorited webpages, shared webpages, and frequently visited webpages

Figure 7D

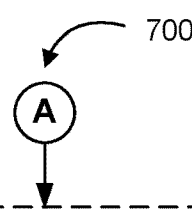

700

A

750 The associated tab in the tab row includes webpage navigation controls in accordance with a determination that those controls are applicable 752 The associated tab includes a multifunction user interface element that when selected displays control options related to the webpage, the method including:
    receiving a request to download a file associated with the webpage; and
in response to receiving the request, modifying the multifunction user interface element to show a download progress of the file 754 A webpage navigation function includes either moving forward or backwards a webpage in a webpage navigation history corresponding to the associated tab

Figure 7E

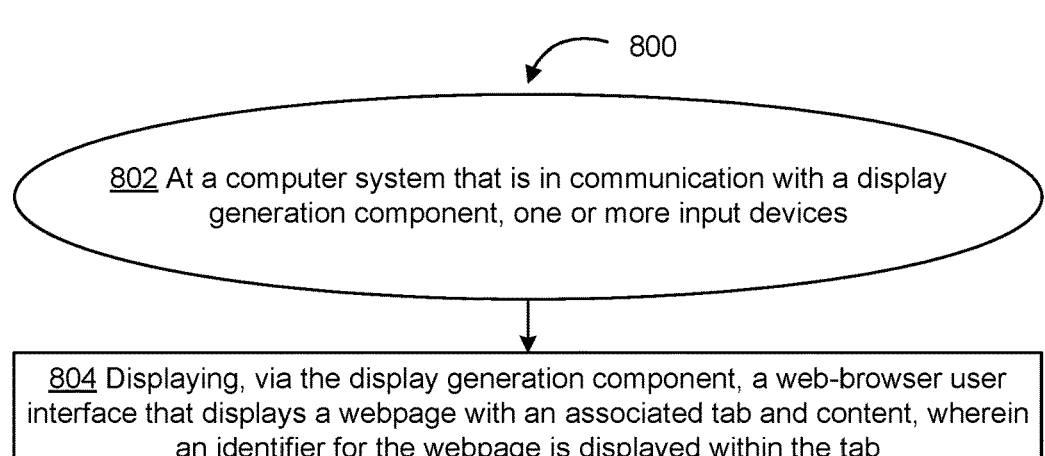

800

802 At a computer system that is in communication with a display generation component, one or more input devices 804 Displaying, via the display generation component, a web-browser user interface that displays a webpage with an associated tab and content, wherein an identifier for the webpage is displayed within the tab 806 Receiving an input at the tab 808 In response to receiving the input at the tab, ceasing to display the identifier and displaying a text entry field within the tab 810 Receiving a user input of text into the text entry field 812 In response to receiving the user input of text into the text entry field:

814 In accordance with a determination that the text is a website address, fetching and displaying a webpage associated with the website address 816 In accordance with a determination that the request is not a website address, performing an internet search using the text as a search input and displaying search results

Figure 8A

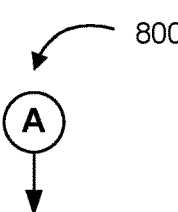

800

A

818 The associated tab has a first tab size and the tab is displayed in a tab row, and the web-browser user interface further includes one or more other tabs each associated with a respective webpage, wherein the one or more other tabs have one or more sizes that are different to the first tab size and are also displayed in the tab row, including:

in accordance with a determination that a combination of the tab and the one or more other tabs meet a threshold number of tabs for displaying in the tab row, displaying less than all of the combination of tabs in the tab row and making the tab row scrollable 820 Receiving another request to switch from the associated tab to a tab of the one or more tabs, and in response to receiving the request, resizing the one or more other tabs to the first tab size 822 Receiving a request to switch from the associated tab to another tab of the one or more tabs, and in response to receiving the request, resizing the associated tab to a tab size that is different to the first tab size 824 The associated tab and one or more other tabs form together a user-defined group of tabs 826 The first tab size is larger than the other tabs having one or more sizes 830 The associated tab has a first appearance and the one or more other tabs have a second appearance, distinct from the first appearance 832 The identifier is an icon provided by the webpage for identifying the webpage

Figure 8B

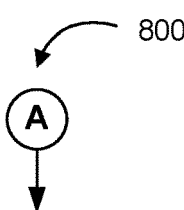

800

834 The webpage has a visual characteristic, the method including:
　　　in response to receiving at the web-browser user interface, the webpage:
　　　　　displaying the content in a first region of the web-browser user interface; and
　　　　　displaying information identifying the webpage in a second region of the web-browser, wherein the second region has a visual characteristic that is matched to the visual characteristic of the webpage having content with a visual characteristic 836 The web-browser user interface further includes one or more other tabs each associated with a respective webpage, and the method including:
　　　receiving a selection of another tab of the one or more other tabs; and
　　in response to switching to the other tab:
　　　　　displaying other webpage content associated with the other tab in the first region of the web-browser user interface; and
　　　　　displaying information identifying the other webpage in the second region of the web-browser user interface, wherein the second region has a visual characteristic that is matched to the visual characteristic of the other webpage 838 The visual characteristic of the webpage is identified upon receipt of the webpage 840 The visual characteristic of the webpage is determined based on one or more of a background color of the webpage, predominant graphic of the webpage, and luminance of the webpage 842 The visual characteristic of the webpage is determined based on a top portion of the webpage 844 The visual characteristic of the webpage is determined based upon a supplied predefined style from the webpage 846 The first region and the second region are visually continuous

Figure 8C

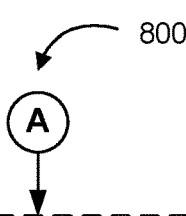

800

848 Receiving a request to scroll the webpage;

in response to receiving the request:

scrolling the webpage; and maintaining a visual characteristic of the second region, wherein the visual characteristic is matched to the visual characteristic of the webpage in an non-scrolled state 850 The second region overlays the first region 852 The associated tab, the one or more other tabs, and one or more user interface elements of the web-browser user interface overlay the second region 854 The web-browser user interface further includes one or more other tabs each associated with a respective webpage, and associated tab, the one or more other tabs, and the one or more user interface elements of the web-browser user interface are opaque and allows for the visual characteristic of the of the second region to partially appear

Figure 8D

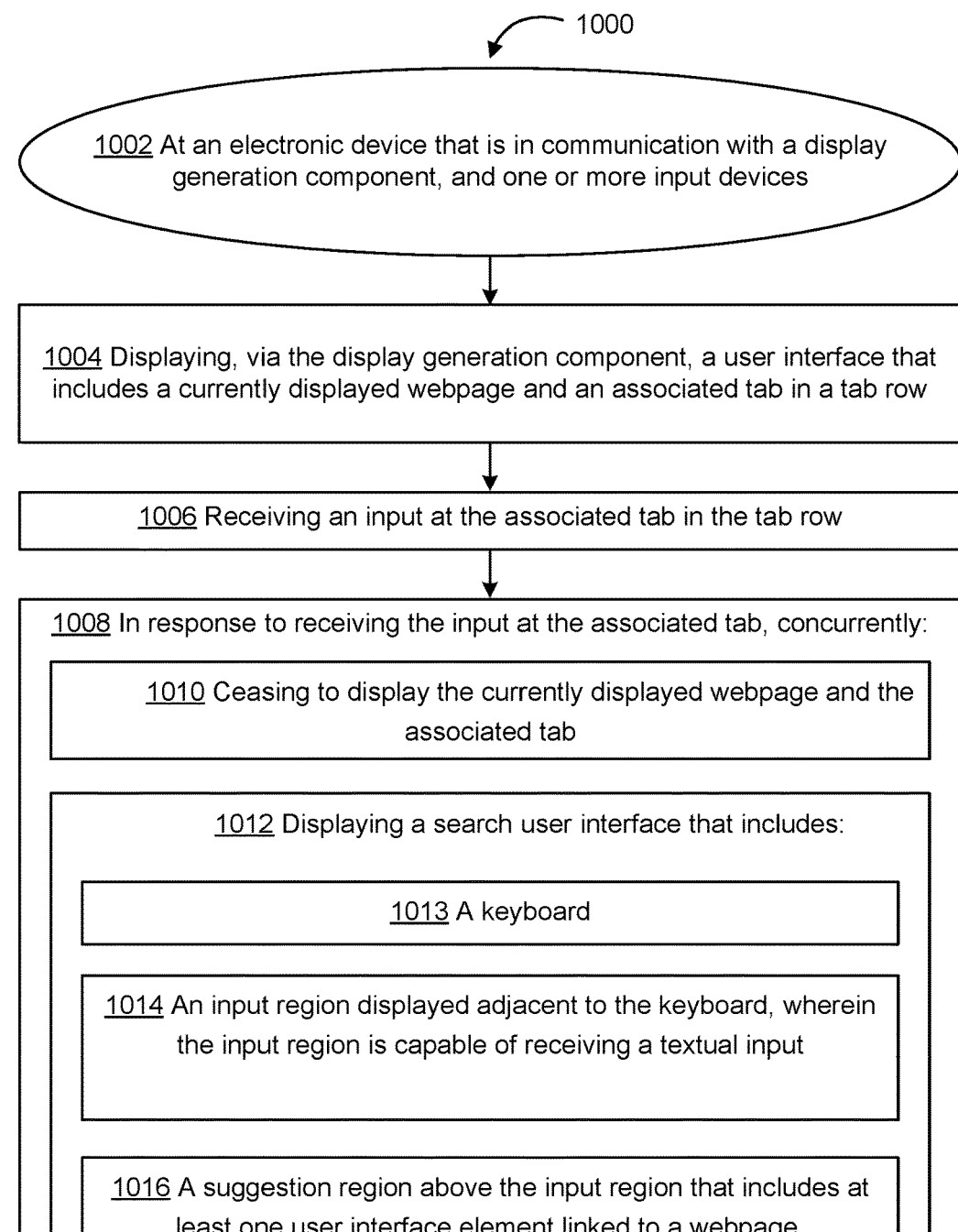

1000

1002 At an electronic device that is in communication with a display generation component, and one or more input devices 1004 Displaying, via the display generation component, a user interface that includes a currently displayed webpage and an associated tab in a tab row 1006 Receiving an input at the associated tab in the tab row 1008 In response to receiving the input at the associated tab, concurrently:

1010 Ceasing to display the currently displayed webpage and the associated tab

1012 Displaying a search user interface that includes:

1013 A keyboard

1014 An input region displayed adjacent to the keyboard, wherein the input region is capable of receiving a textual input 1016 A suggestion region above the input region that includes at least one user interface element linked to a webpage.

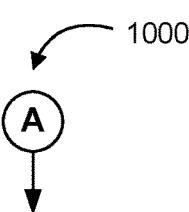

1000

A

1018 Receiving a textual input in the input region; and in response to receiving the textual input, in accordance with a determination that the textual input is not a webpage address, displaying search results corresponding to the textual input; and in accordance with a determination that the textual input is a webpage address, retrieving and displaying a webpage associated with the webpage address 1020 Receiving a textual input in the input region, and in response to receiving textual input in the input region, displaying one or more tailored suggested links that are displayed based on the textual input 1022 In response to receiving textual input in the input region, displaying, a list of suggested internet search strings 1024 Receiving an additional textual input;
    in response to receiving an additional textual input, updating the list of suggested internet search strings in accordance with the additional textual input 1026 The textual input is received via a speech-to-text input 1030 The one or more tailored suggested links comprise: one or more websites not previously visited, one or more websites previously visited, one or more bookmarked websites, and one or more websites that are already open in the web browser 1032 Each of the one or more websites not previously visited is associated with a first icon, each of the one or more websites previously visited is associated with a second icon, each of the one or more bookmarked websites is associated with a third icon, and each of the one or more websites that are already open in the web browser is associated with a fourth icon, wherein the first icon, second icon, third icon, and fourth icon each have different appearances

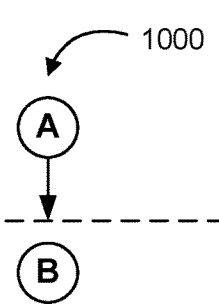

B

1034 One or more tailored suggested links comprise one or more websites not previously visited 1036 The one or more tailored suggested links comprise one or more bookmarked websites 1038 One or more tailored suggested links comprise one or more websites that are already open in the web browser 1040 One or more tailored suggested links comprise one or more websites previously visited 1042 In response to receiving textual input in the input region, ceasing to display the at least one user interface element linked to a webpage 1044 Receiving an additional input selecting a particular tailored suggested link of the one or more tailored suggested links, in response to the other input, concurrently:

ceasing to display the search user interface; and displaying a webpage and tab associated with the particular tailored suggest link.

1046 The webpage suggestion region is displayed above the keyboard

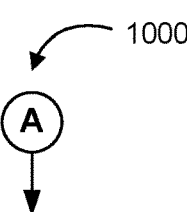

1048 The at least one user interface element linked to a webpage includes one or more bookmarked webpages, frequently visited webpages, and webpages shared with the user of the electronic device 1050 The input is a tap input 1052 The keyboard is predominately in a bottom portion of a display region generated by the display generation component, the input region is predominately in a middle portion of the display region, and the webpage suggestion region is predominately in an upper portion of the display region

Figure 10D

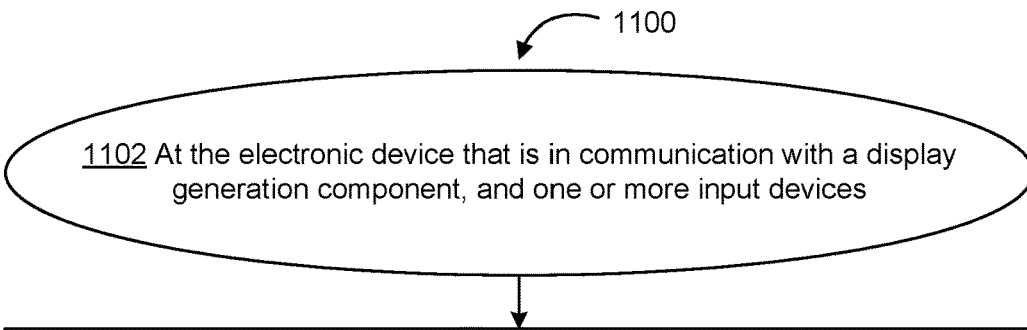

1100

1102 At the electronic device that is in communication with a display generation component, and one or more input devices 1104 Displaying, via the display generation component, a web-browser user interface that includes a first displayed webpage and a control region, wherein the control region includes, a first tab in a tab row that is associated with the first displayed webpage and one or more web-browser controls 1106 Receiving a swipe gesture over the first tab in a direction along the tab row 1108 In response to receiving the swipe gesture, concurrently:

1110 Replacing display of the first displayed webpage and the first tab with a second displayed webpage and a second tab 1112 Maintaining display of the control region and the one or more web-browser controls 1114 Maintaining display of the one or more web-browser controls includes keeping the one or more web-browser controls static in response to receiving the swipe gesture 1116 The one or more web-browser controls include: a webpage navigation control, a sharing control for sharing a webpage, a bookmark control for displaying bookmarked webpages, and a tab control for selecting between different tabs 1118 One or more web-browser control user interface elements are displayed at a location that is below the tab row

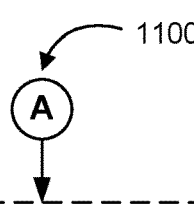

A

1120 The first tab and the second tab, each include a multifunction region, the method including:

receiving an input at the multifunction region; and in response to receiving the input at the multifunction, displaying one or more additional controls, wherein at least one of the additional controls is a control for enhancing readability of the first displayed webpage.

1122 The one or more additional controls include one or more controls for interacting with the first displayed webpage and one or more controls for interacting with the web-browser 1124 The multifunction region displays one or more icons that indicate that an installed extension is operating 1126 The multifunction region displays an icon that indicates that a simplified version of the first displayed webpage is available 1128 In response to receiving the swipe gesture over the first tab in a direction along the tab row, displaying one or more additional web-browser controls that were not previously displayed 1130 In response receiving the swipe gesture over the first tab in a direction along the tab row, ceasing to allow selection of at least one of the one or more web-browser controls 1132 The first displayed webpage and the first tab are distinct and different from the second displayed webpage and the second tab, respectively

Figure 11B

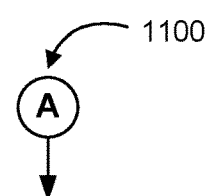

1100

(A)

1134 The control region overlays the first displayed webpage

1136 Replacing display of the first displayed webpage and the first tab with the second displayed webpage and the second tab includes sliding the first webpage off a first edge of the display region, while sliding another webpage into the display region from a second edge that is opposite the first edge 1138 The first tab includes at least one additional control and the second tab includes the at least one additional control

Figure 11C

DEVICES, METHODS, AND GRAPHICAL USER INTERFACES FOR INTERACTING WITH A WEB-BROWSER

RELATED APPLICATIONS

This application claims priority to U.S. Provisional Patent Application No. 63/263,014, filed Oct. 25, 2021, and U.S. Provisional Patent Application No. 63/197,495, filed Jun. 6, 2021, both of which are hereby incorporated by reference in their entireties.

TECHNICAL FIELD

This relates generally to electronic devices that display graphical user interfaces for a web-browser application.

BACKGROUND

Web-browser applications continue to evolve, adding new controls, multitasking abilities, and additional features. Web-browser applications that utilize tabbed browsing have allowed users to easily navigate between webpages without the need to close an existing webpage and open a new webpage. Tabbed browsing, however, often leads to users opening too many webpages without being able to easily tell one open webpage from another, i.e., the user interfaces are cluttered with so many tabs that the user no longer knows which webpages are open and or relevant. Further these webpage tabs and controls occupy valuable screen area, and distract users from enjoying and interacting with the webpage content. Moreover, these devices typically include bifurcated regions for the tabs and for inserting a URL or performing a web-search. This bifurcation exacerbates the lack of screen area for the webpage content. Moreover, these problems are especially problematic on devices with limited screen area, such as mobile devices.

Current methods for operating web-browser applications are cumbersome and inefficient (e.g., trying to find a relevant tab amongst numerous unrelated tabs by randomly clicking on each one), and creates a significant cognitive burden on a user. In addition, these methods take longer than necessary, thereby wasting energy. This latter consideration is particularly important in battery-operated devices.

SUMMARY

Accordingly, there is a need for electronic devices that allow for easier operation and navigation, while providing a more convenient way to utilize all of the features of modern web browsers. This is especially the case for mobile devices with limited screen area. Such methods and interfaces optionally complement or replace conventional methods for operating a web-browser application. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In other embodiments, the device is a portable computing device (e.g., a notebook computer, tablet computer, or handheld device). In yet other embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a display generation component and one or more input devices. In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

Some embodiments provide a method for web browsing on a portable device, where the portable device is in communication with a display generation component, and one or more input devices. This method includes displaying, via the display generation component, a web-browser user interface that includes a currently displayed webpage and an associated tab in a tab row, wherein the currently displayed webpage forms part of a group of webpages. The method also includes, receiving a swipe gesture in a first direction. The method includes, in response to receiving the swipe gesture in the first direction: in accordance with a determination that the swipe gesture in the first direction occurs at a location corresponding to the associated tab in the tab row, concurrently: ceasing to display the currently displayed webpage, and scrolling the tab row to cause display of an additional webpage and its associated additional tab. The method also includes that in accordance with a determination that the swipe gesture in the first direction occurs at a location corresponding to the currently displayed webpage, performing a webpage navigation function.

Other embodiments provide a method performed at a computer system that is in communication with a display generation component, one or more input devices. The method includes displaying, via the display generation component, a web-browser user interface that displays a webpage with an associated tab and content, wherein an identifier for the webpage is displayed within the tab. The method includes receiving an input at the tab, and in response to receiving the input at the tab, ceasing to display the identifier and displaying a text entry field within the tab. The method includes receiving a user input of text into the text entry field. The method includes that in response to receiving the user input: in accordance with a determination that the text is a web site address, fetching and displaying a webpage associated with the website address, and in accordance with a determination that the request is not a website address, performing an internet search using the text as a search input and displaying search results.

Another embodiment provides a method for web browsing on an electronic device that is in communication with a display generation component, and one or more input devices. The method includes, displaying, via the display generation component, a user interface that includes a currently displayed webpage and an associated tab in a tab row. The method includes, receiving an input at the associated tab in the tab row. The method includes, in response to receiving the input at the associated tab, concurrently ceasing to display the currently displayed webpage and the associated tab and displaying a search user interface. The search user interface includes a keyboard, an input region displayed adjacent to the keyboard, where the input region is capable of receiving a textual input, and a suggestion region above the input region that includes at least one user interface element linked to a webpage.

Another embodiment provides a method for web browsing on an electronic device that is in communication with a display generation component, and one or more input devices. The method includes, displaying, via the display generation component, a web-browser user interface that includes a first displayed webpage and a control region, where the control region includes, a first tab in a tab row that is associated with the first displayed webpage and one or more web-browser controls. The method includes, receiving a swipe gesture over the first tab in a direction along the tab row. The method includes, in response to receiving the swipe gesture, concurrently: replacing display of the first displayed webpage and the first tab with a second displayed webpage and a second tab and maintaining display of the control region and the one or more web-browser controls.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces, thereby increasing the effectiveness, efficiency, and user satisfaction with such devices. Such methods and interfaces may complement or replace conventional methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1B is a block diagram illustrating example components for event handling in accordance with some embodiments.

FIG. 4B illustrates an example user interface for a multifunction device with a touch-sensitive surface that is separate from the display in accordance with some embodiments.

FIGS. 7A-7E are flow diagrams of a process for interacting with a web-browser application, in accordance with some embodiments.

FIGS. 8A-8D are flow diagrams of a process for interacting with a web-browser application, in accordance with some embodiments.

FIGS. 10A-10D are flow diagrams of a process for interacting with a web-browser application, in accordance with some embodiments.

FIGS. 11A-11C are flow diagrams of a process for interacting with a web-browser application, in accordance with some embodiments.

DESCRIPTION OF EMBODIMENTS

Figure 1A:
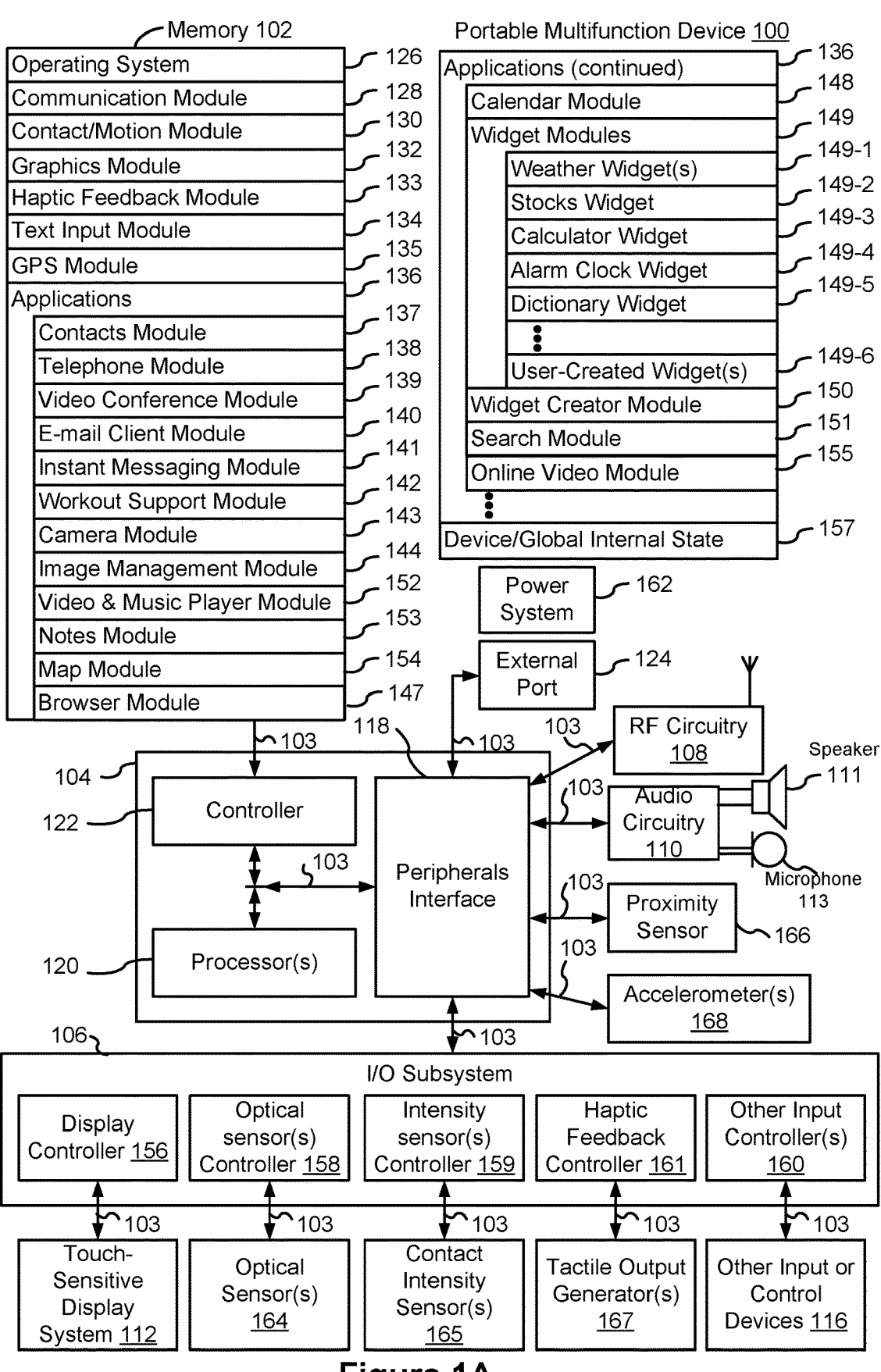
FIG. 1A is a block diagram illustrating a portable multifunction device with a touch-sensitive display in accordance with some embodiments.

Many electronic devices have web-browsing applications for accessing websites. In recent years, however, web-browser applications have become more powerful and more feature rich. Consequently, user interfaces have become more complex in nature and consequently more cluttered (e.g., as a result of tabbed browsing, extensions, and many other features). Some methods for simplifying user interfaces include redesigning tabbed browsing to reduce cluttered tab rows. For example, having a simplified tab row that can be scrolled through without displaying all the tabs declutters the user interface. Additionally, having simple gestures replace dedicated buttons also further helps with decluttering web-browsing applications.

One example for simplifying web browsing on a portable device that is in communication with a display generation component, and one or more input devices, includes displaying, via the display generation component, a web-browser user interface that includes a currently displayed webpage and an associated tab in a tab row, where the currently displayed webpage forms part of a group of webpages. In some embodiments, the portable device receives a swipe gesture in a first direction, and in response to receiving the swipe gesture in the first direction: in accordance with a determination that the swipe gesture in the first direction occurs at a location corresponding to the associated tab in the tab row, concurrently: ceasing to display the currently displayed webpage, and scrolling the tab row to cause display of an additional webpage and its associated additional tab. In some embodiments, in accordance with a determination that the swipe gesture in the first direction occurs at a location corresponding to the currently displayed webpage, the portable device performs a webpage navigation function.

Another example, for web browsing, at a computer system that is in communication with a display generation component, one or more input devices, includes, the computer system displaying, via the display generation component, a web-browser user interface that displays a webpage with an associated tab and content, where an identifier for the webpage is displayed within the tab. In some embodiments, the computer system receives an input at the tab, and in response to receiving the input at the tab, the computer system ceases to display the identifier and displaying a text entry field within the tab. In some embodiments, the computer system receives a user input of text into the text entry field, and in response to receiving the user input: in accordance with a determination that the text is a website address, the computer system fetches and displays a webpage associated with the website address, and in accordance with a determination that the request is not a website address, the computer system performs an internet search using the text as a search input and displaying search results.

Below, FIGS. 1A-1B, 2, and 3 provide a description of example devices. FIGS. 4A-4B 5A-5X illustrate example user interfaces for interacting with a web-browser application, and FIGS. 6A-6AV further illustrate example user interfaces for interacting with a web-browser application. FIGS. 7A-7E illustrate a flow diagram of a method of interacting with a web-browser application. FIGS. 8A-8D illustrate a flow diagram of a method of interacting with a web-browser application. The user interfaces in FIGS. 5A-5X and 6A-6AV are used to illustrate the processes in FIGS. 7A-7E and 8A-8D, respectively. FIGS. 9A-9U illustrate example user interfaces for interacting with a web-browser application. The user interfaces in FIGS. 9A-9U illustrate the processes shown in FIGS. 10A-10D and 11A-11C, which are flow diagrams of processes for interacting with a web-browser application, in accordance with some embodiments.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touch-pads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web-browser application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 (hereinafter also referred to as the "device," "portable device," and "computer system") with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as processor(s) or CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with camera module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
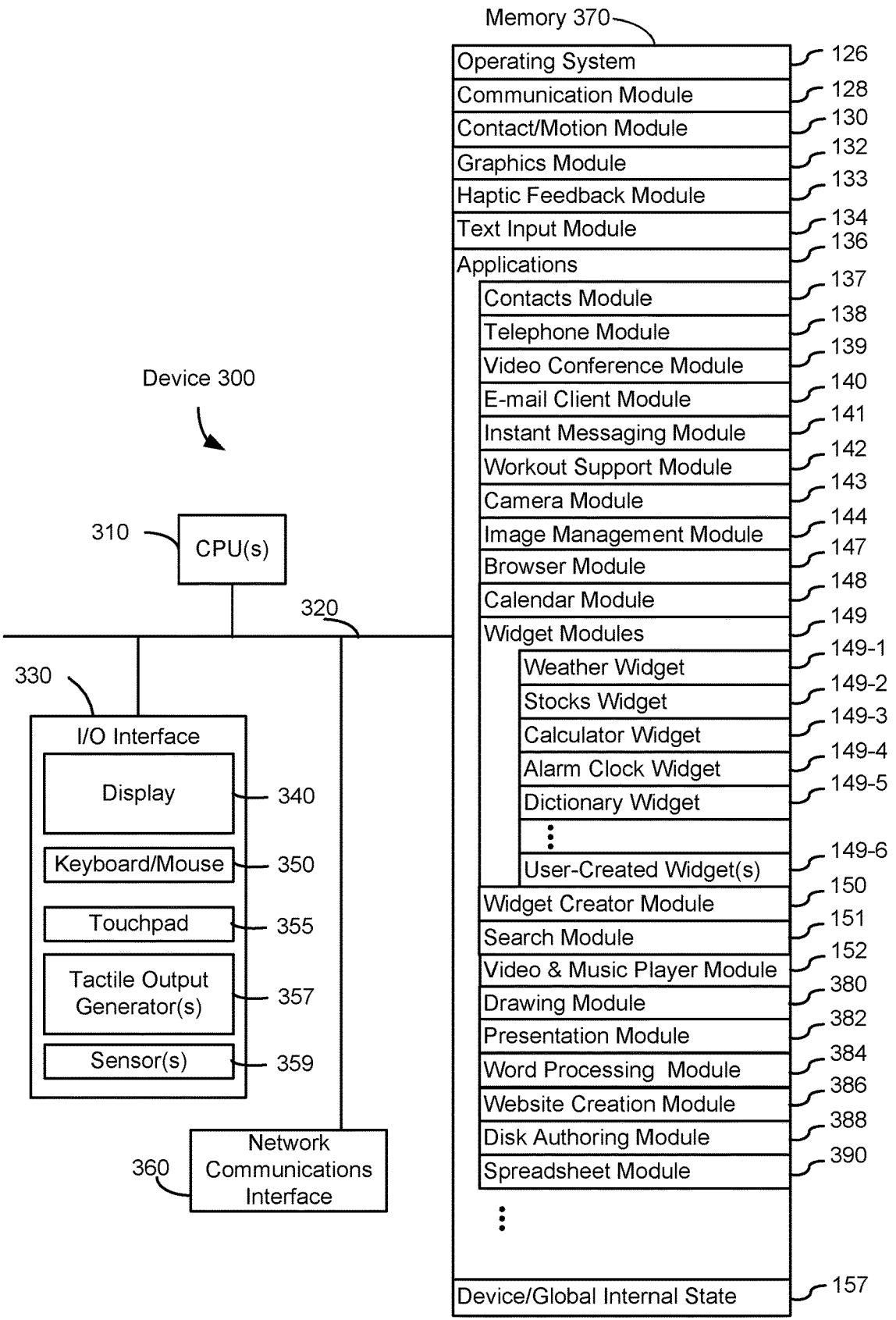
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the pre-defined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);

telephone module 138;

video conferencing module 139;

e-mail client module 140;

instant messaging (IM) module 141;

workout support module 142;

camera module 143 for still and/or video images;

image management module 144;

browser module 147;

calendar module 148;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed.

As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147 (e.g., web-browser application), widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
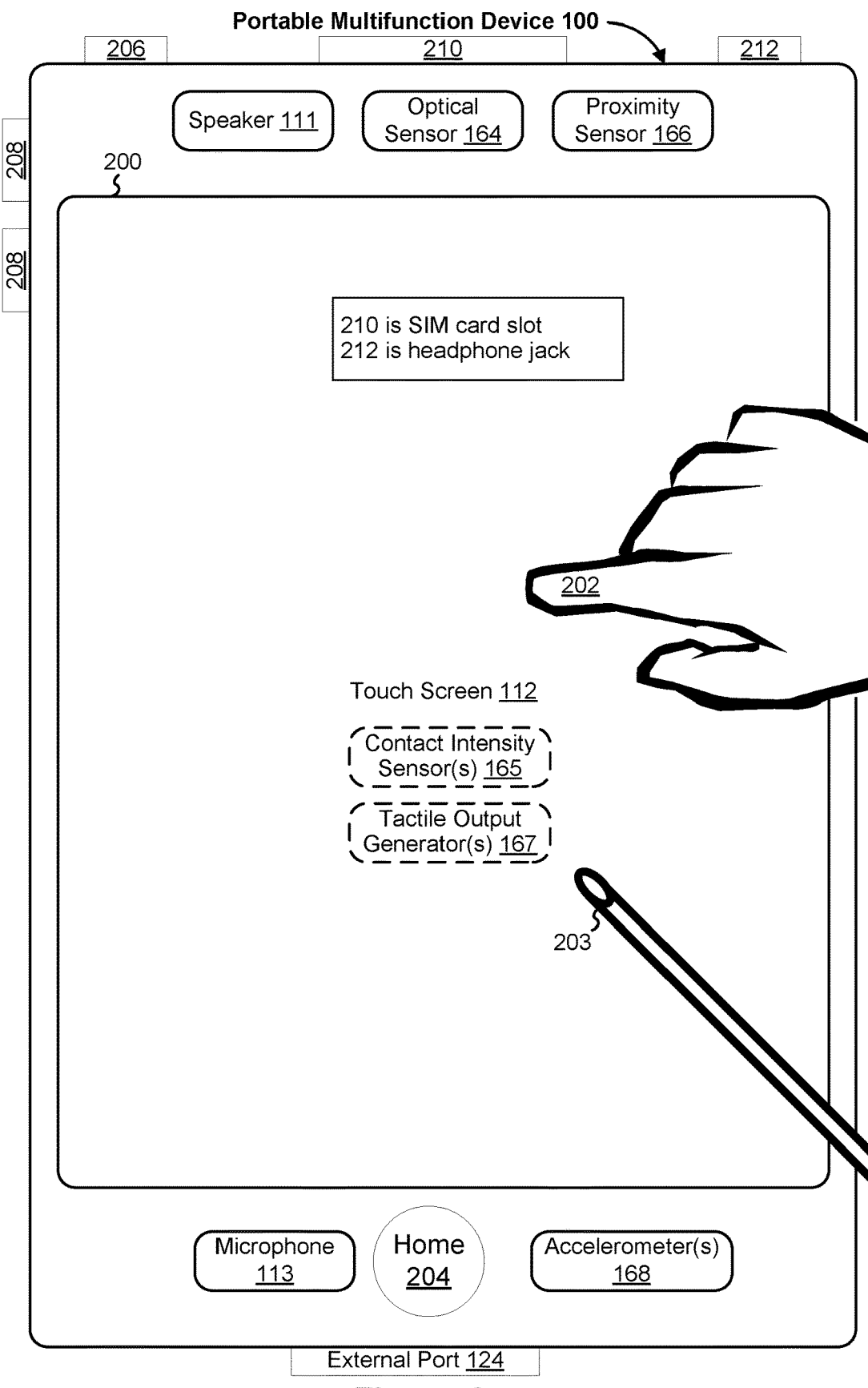
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG.

1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
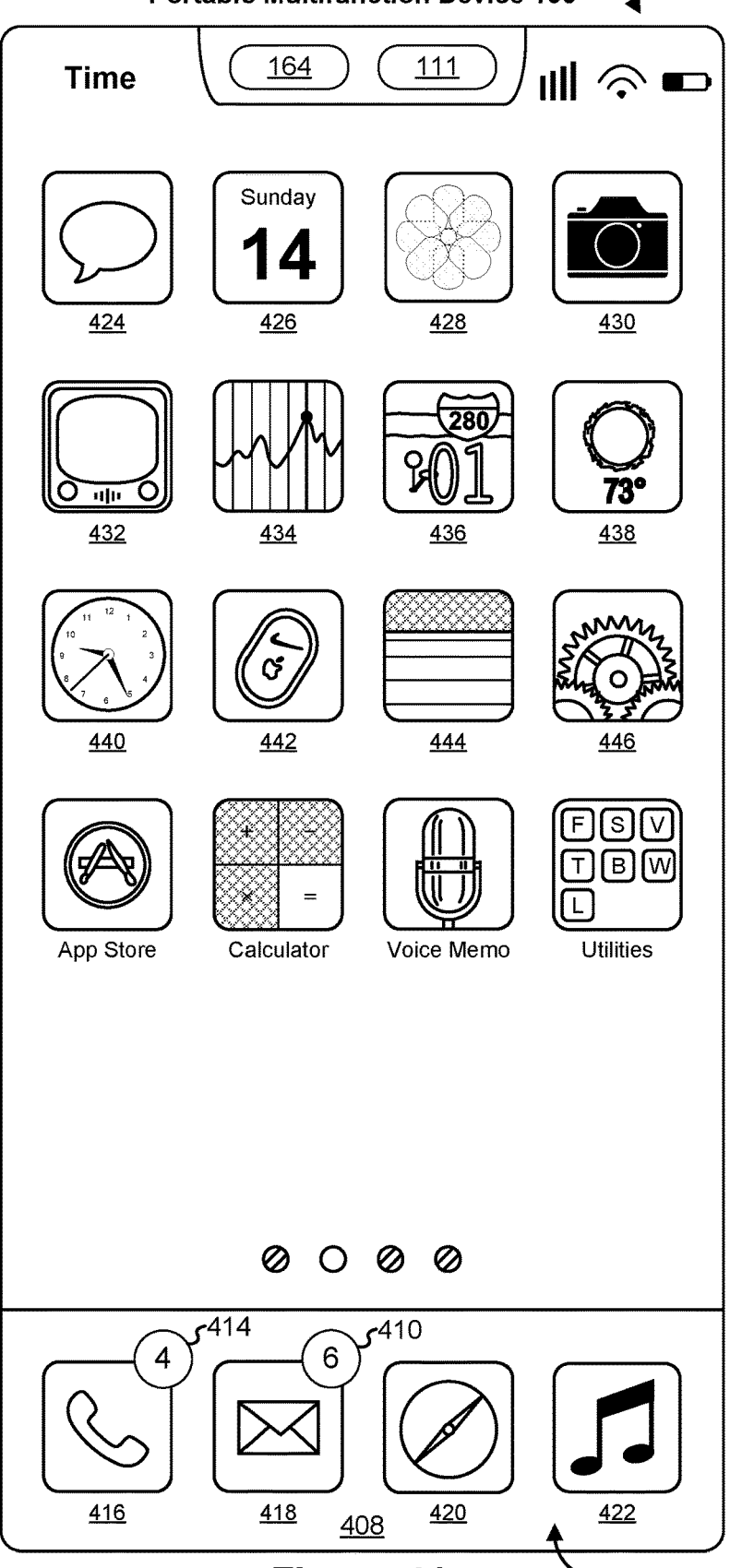
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;

Time;

a Bluetooth indicator;

a Battery status indicator; Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, labeled "Music;" and

Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Some of the examples that follow will be given with reference to a device that detects inputs on a touch-sensitive surface that is separate from the display, as shown in FIG. 4B. Some of the examples that follow, however, will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

Figure 5A:
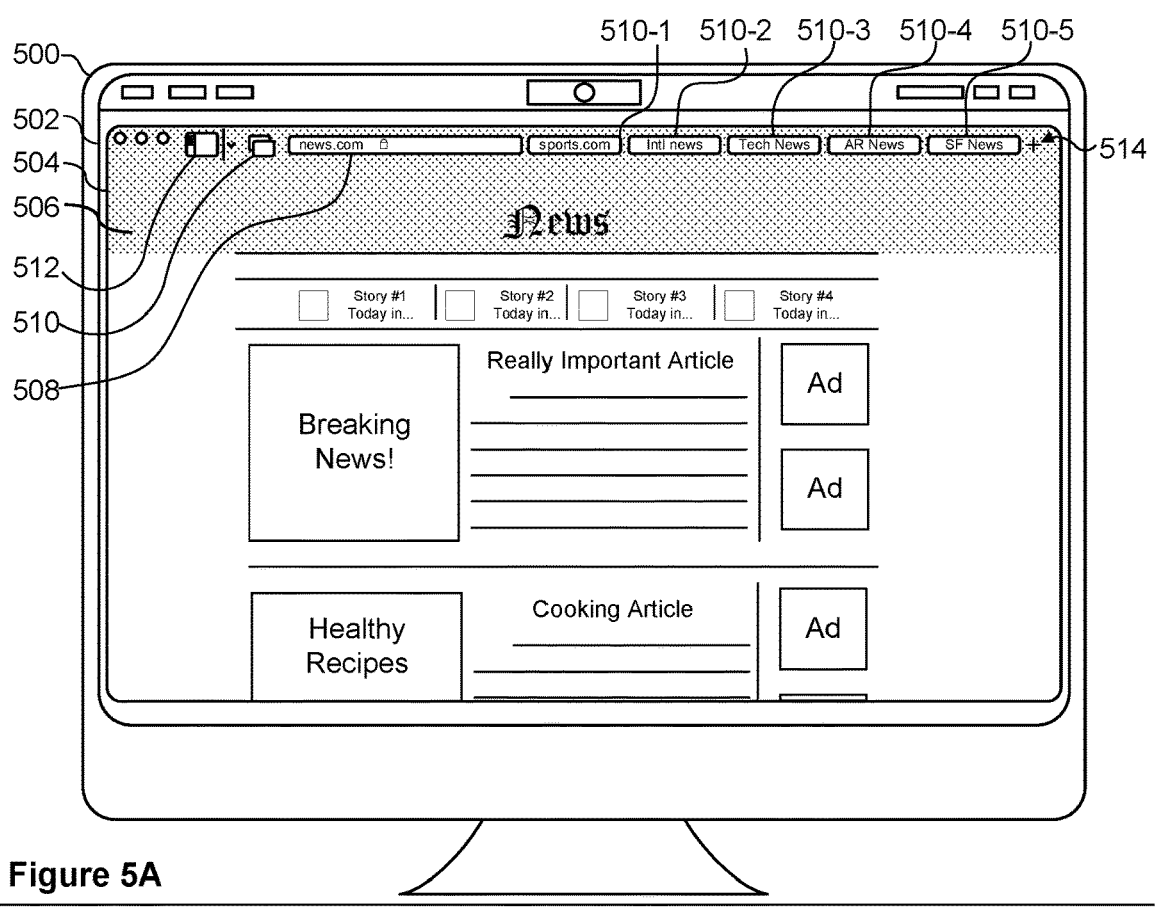
FIGS. 5A-5X illustrate example user interfaces for interacting with a web-browser application, in accordance with some embodiments.
Figure 5B:
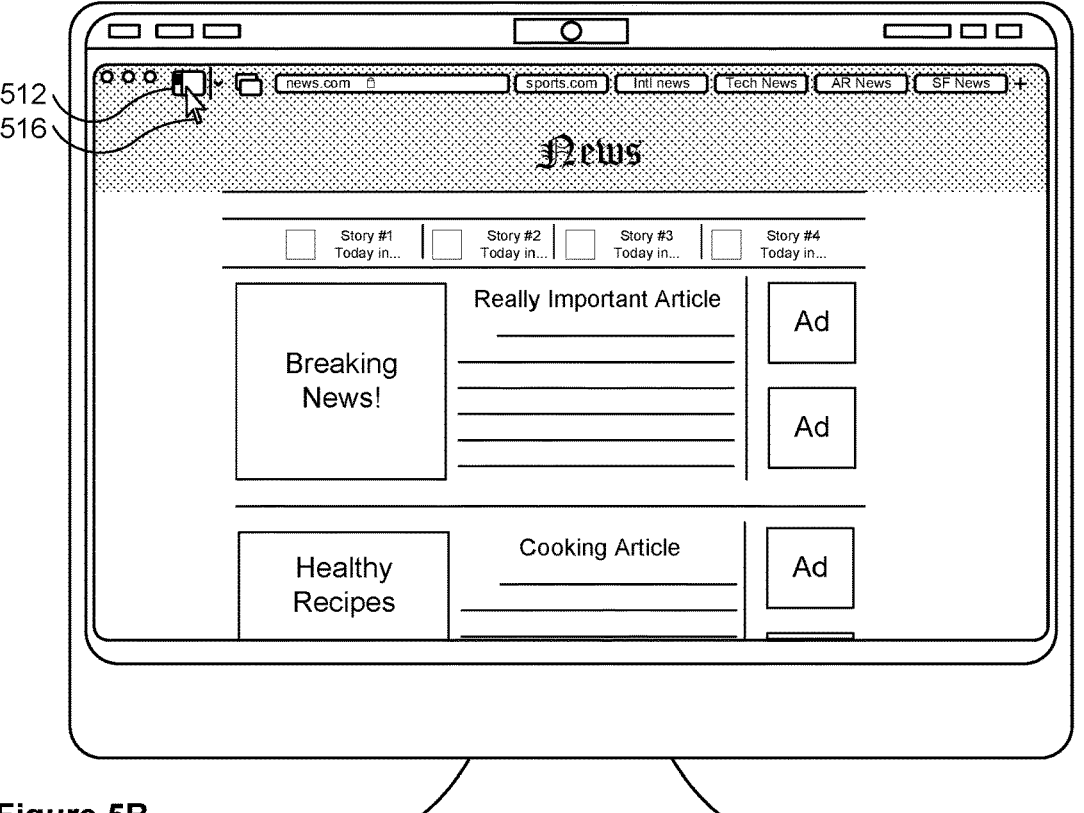
Figures 5C, 5D:
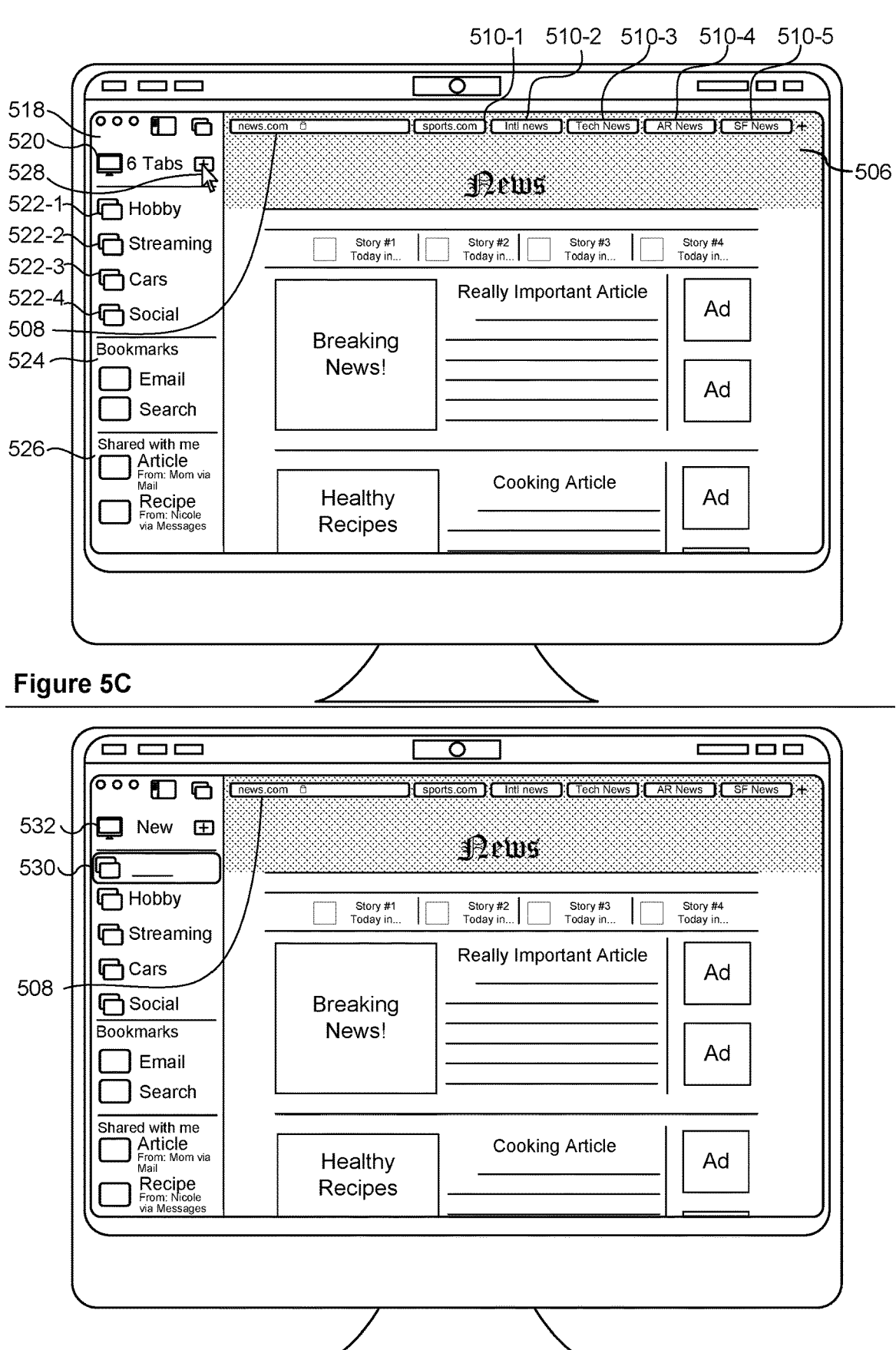
Figure 5E:
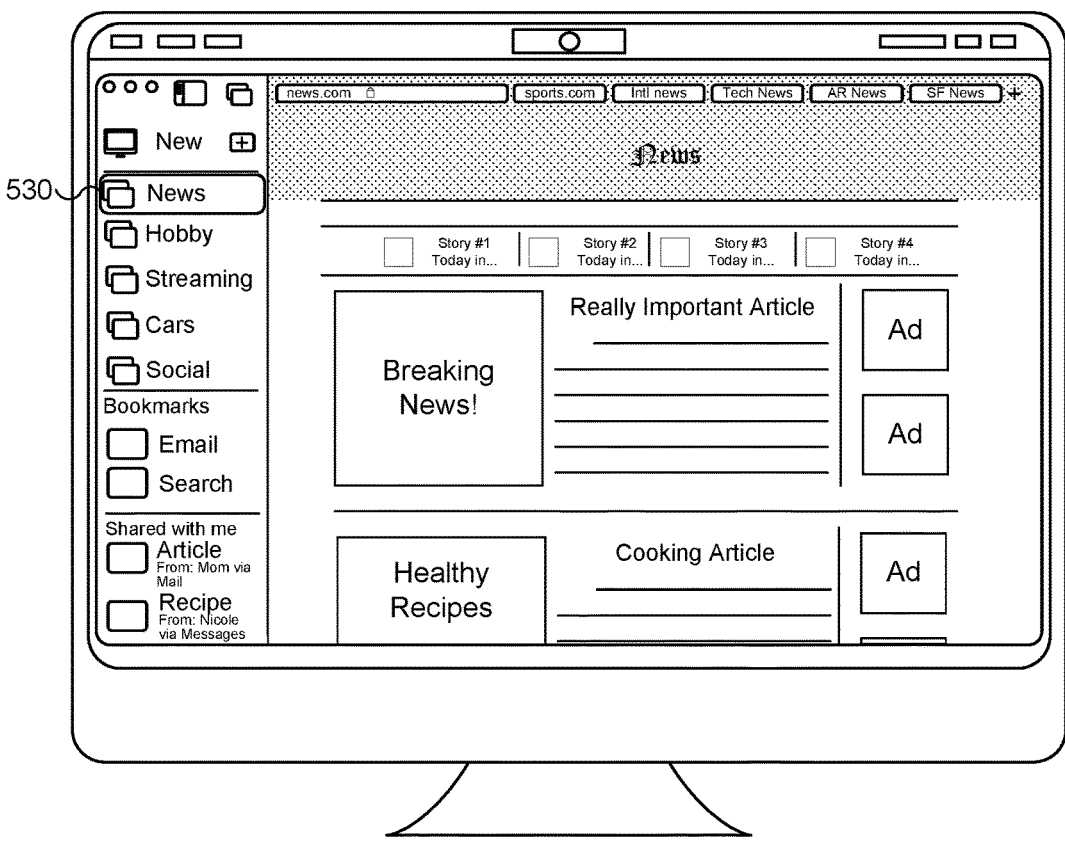
Figure 5F:
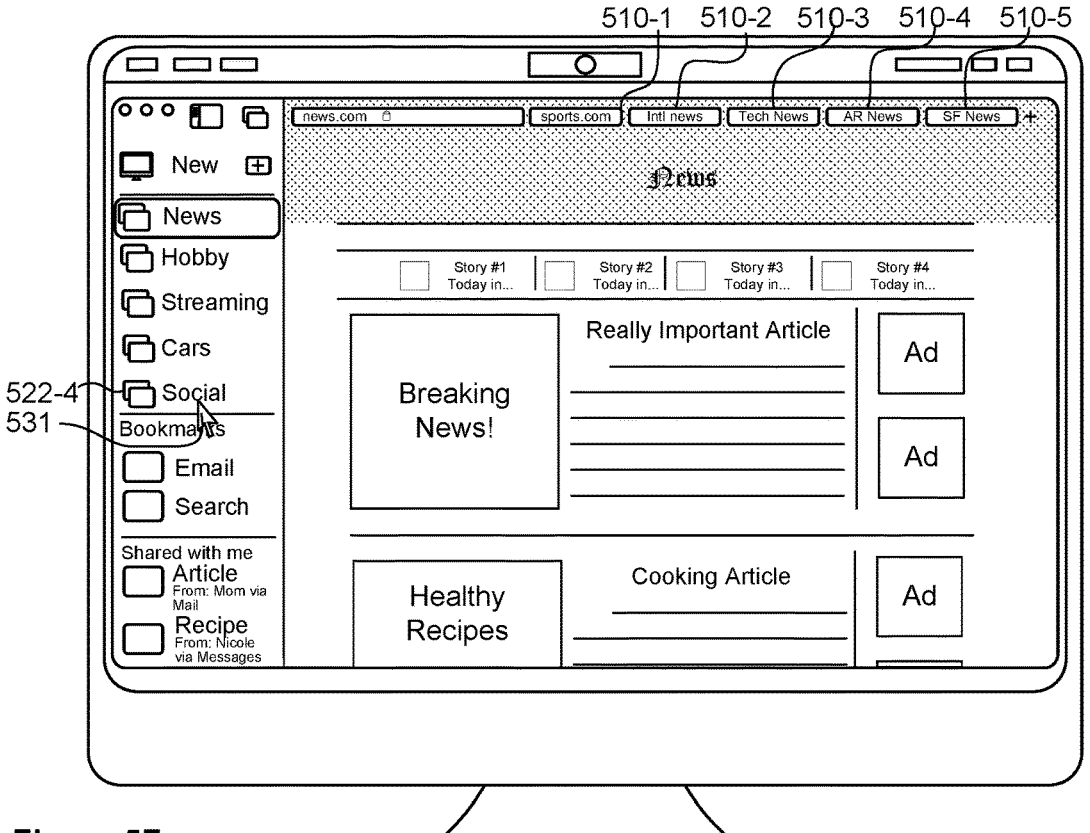
Figure 5G:
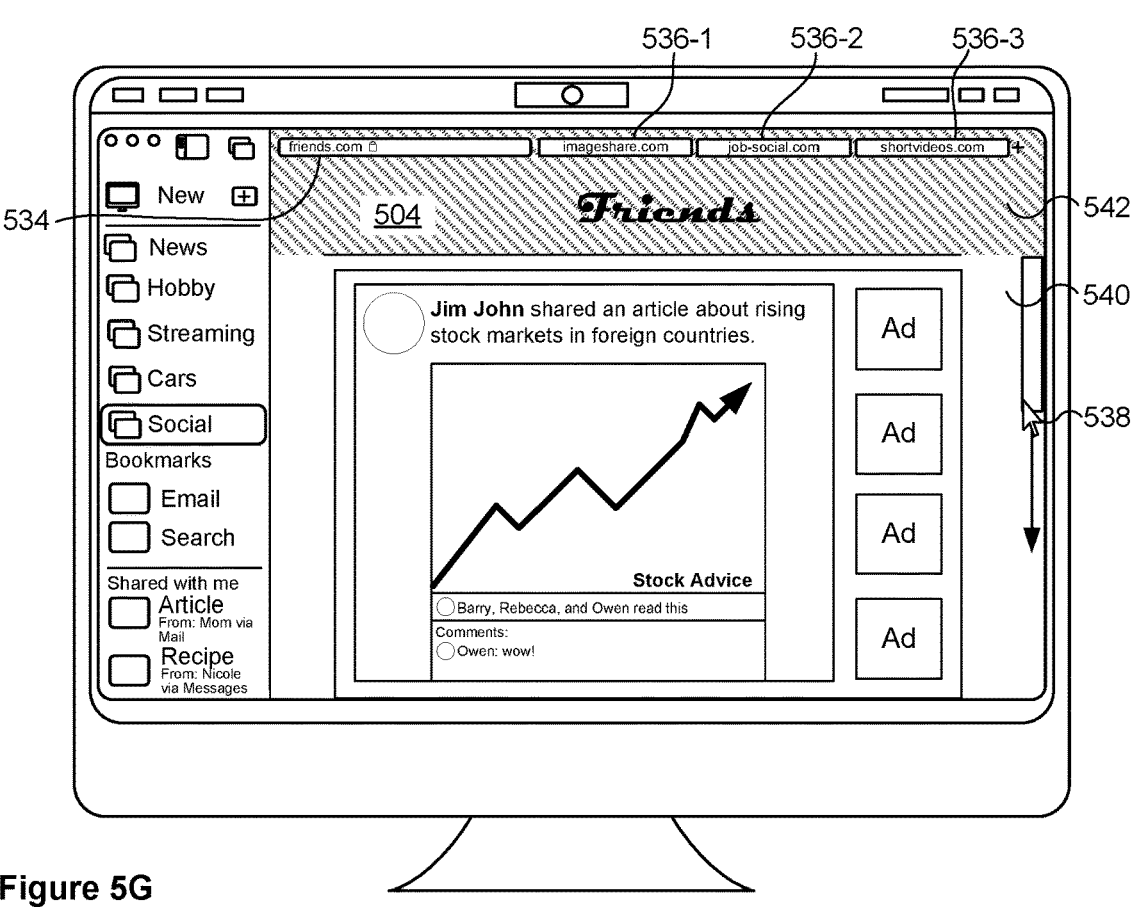
Figure 5H:
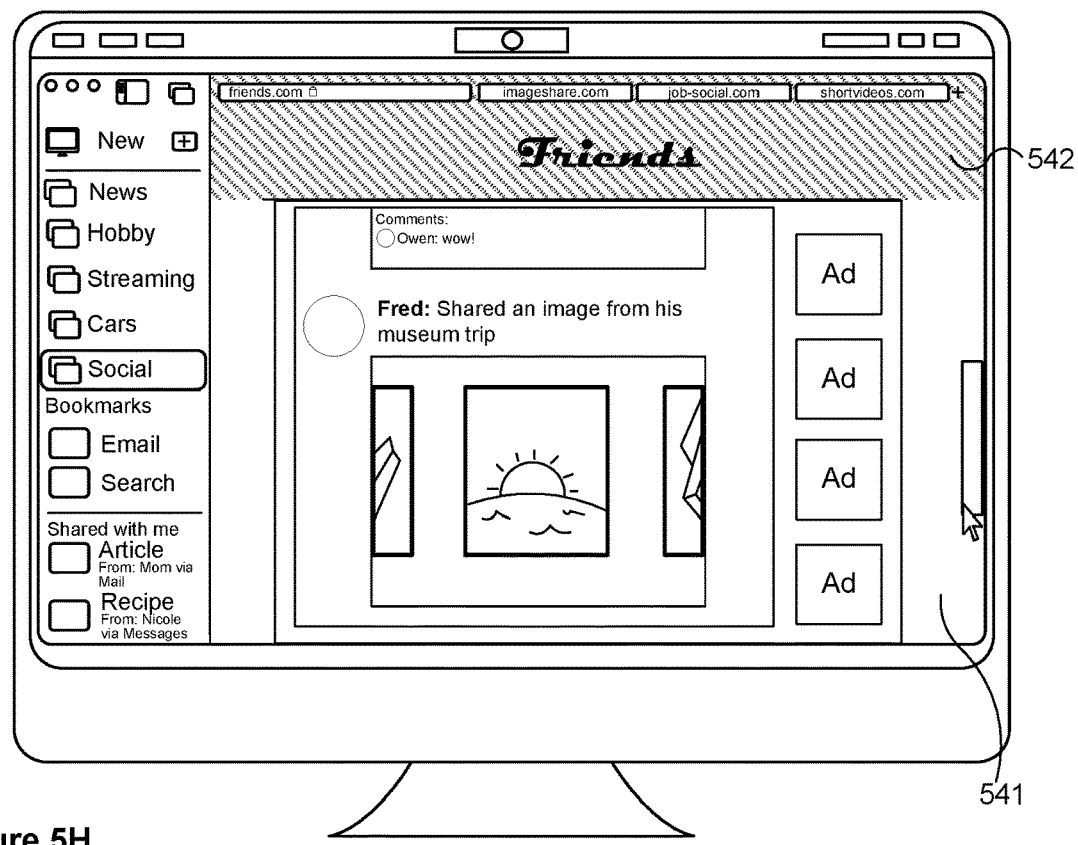
Figures 5I, 5J:
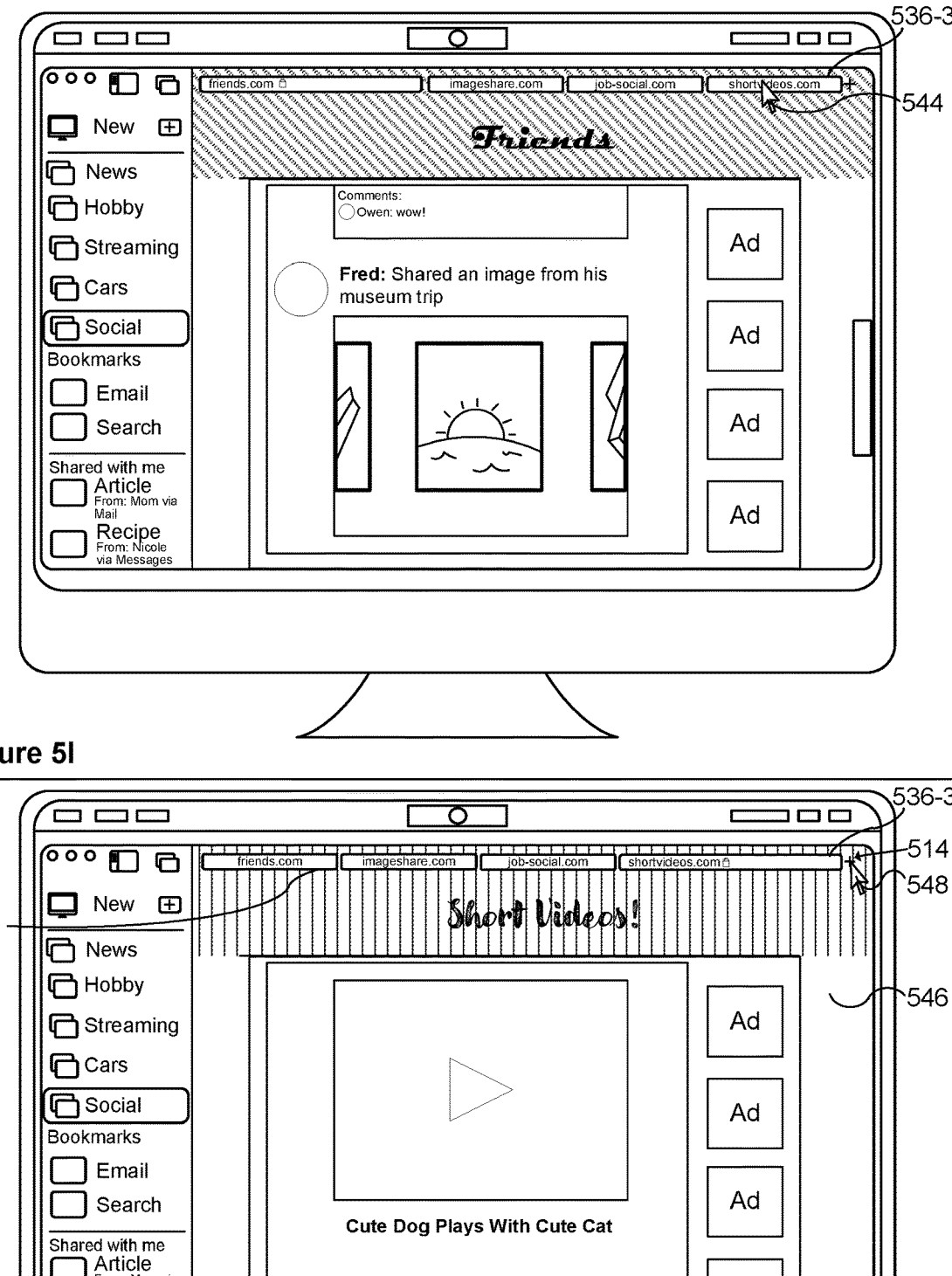
Figure 5K:
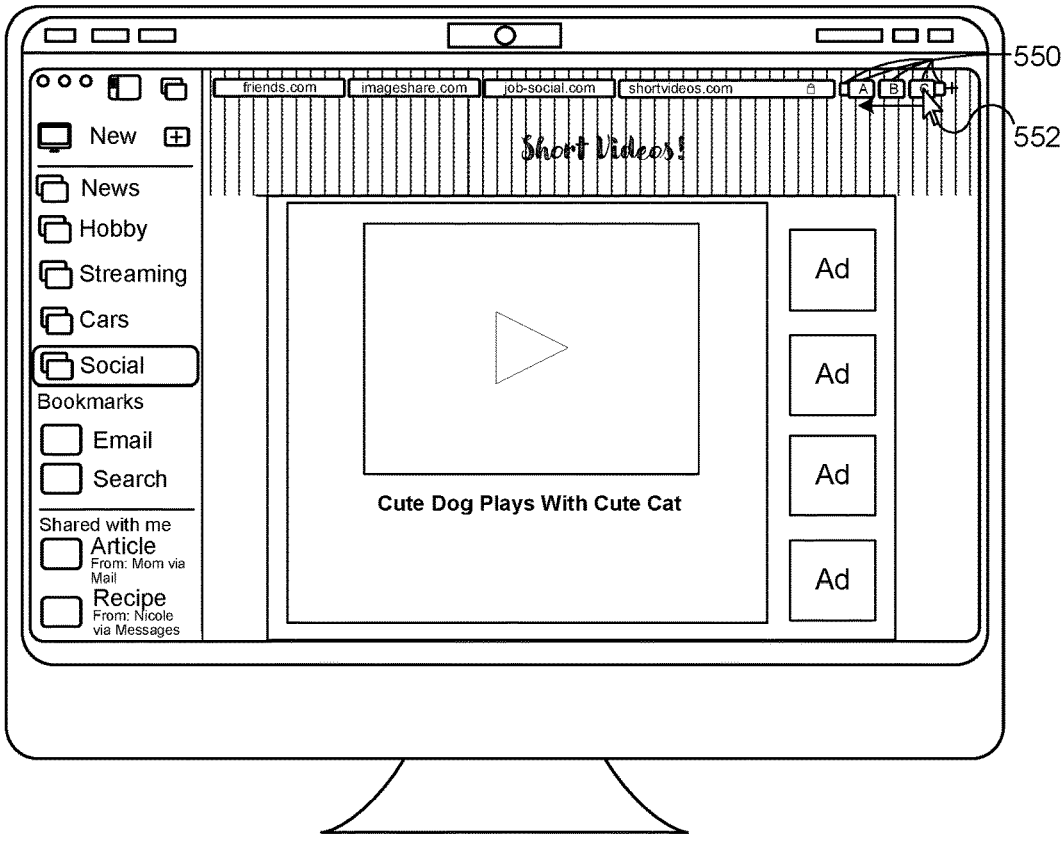
Figure 5L:
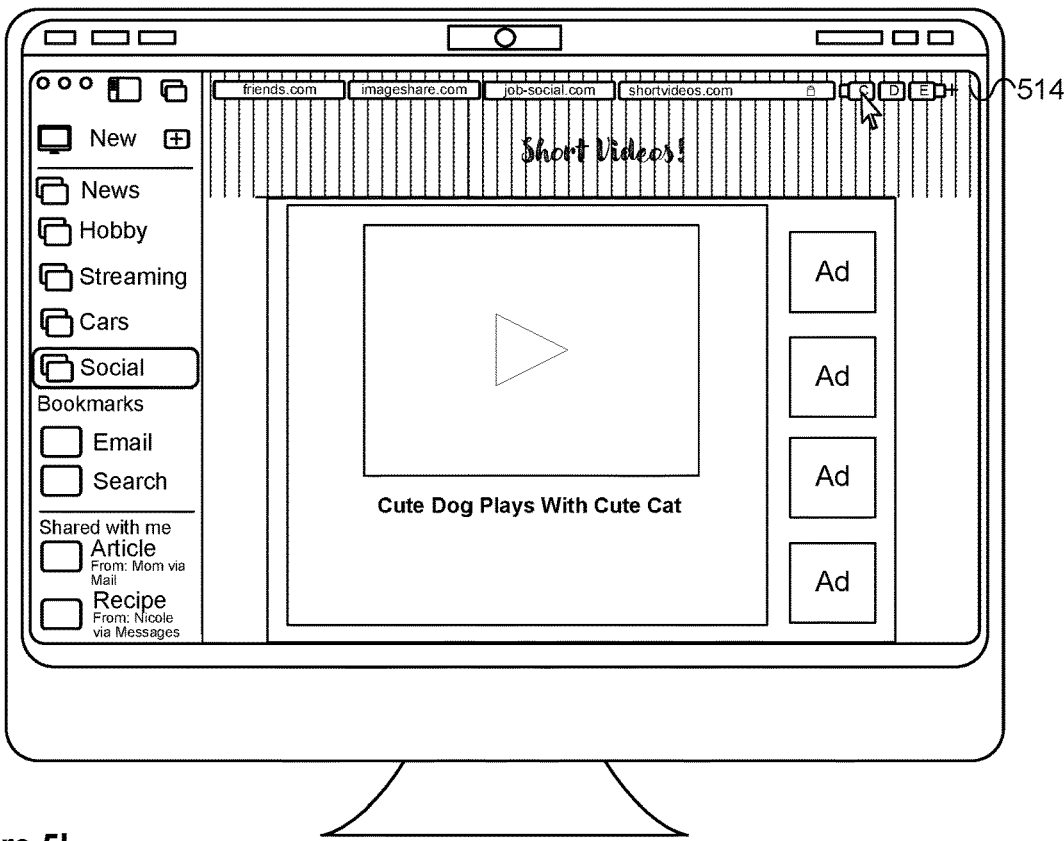
Figure 5M:
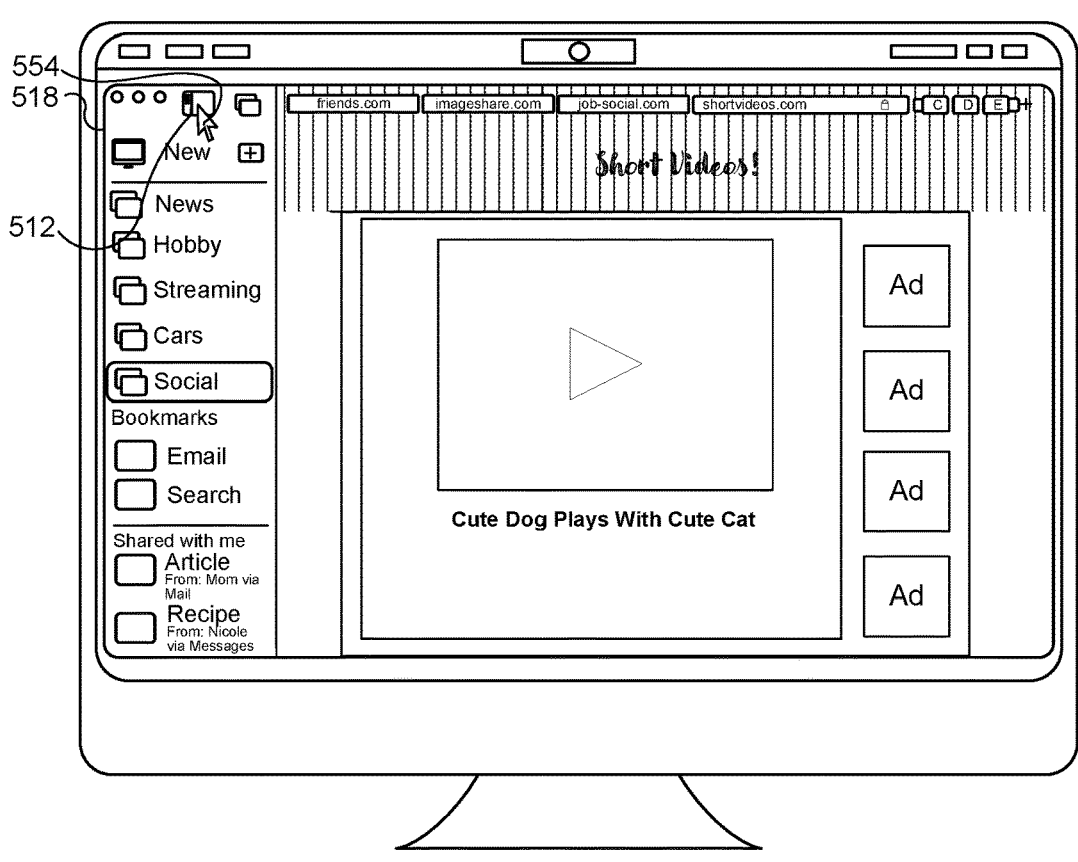
Figure 5N:
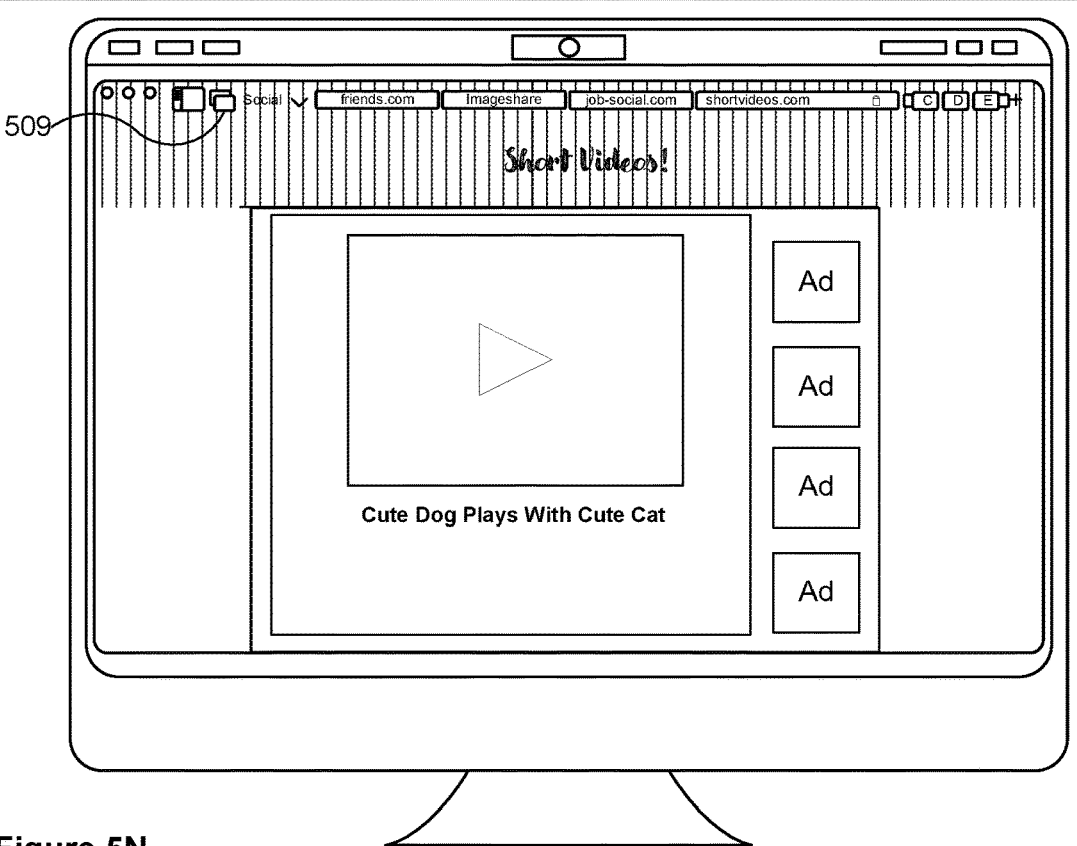
Figure 5O:
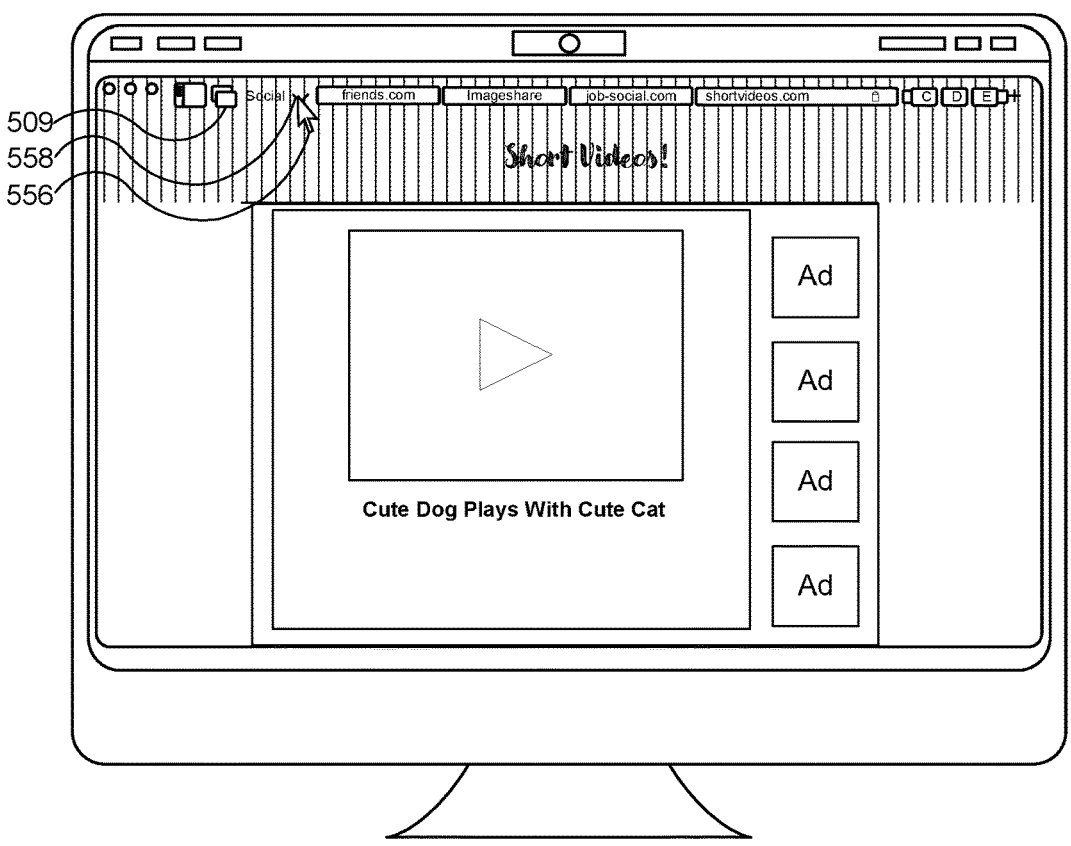
Figure 5P:
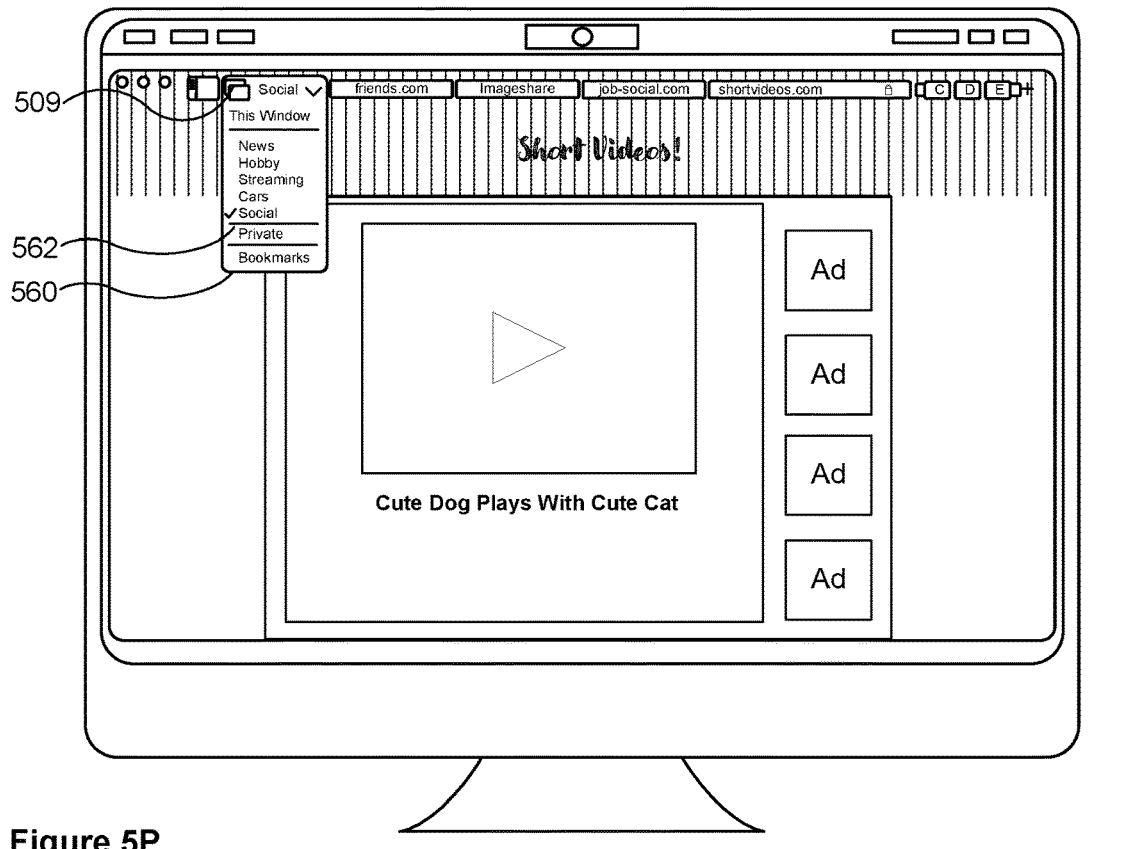
Figure 5Q:
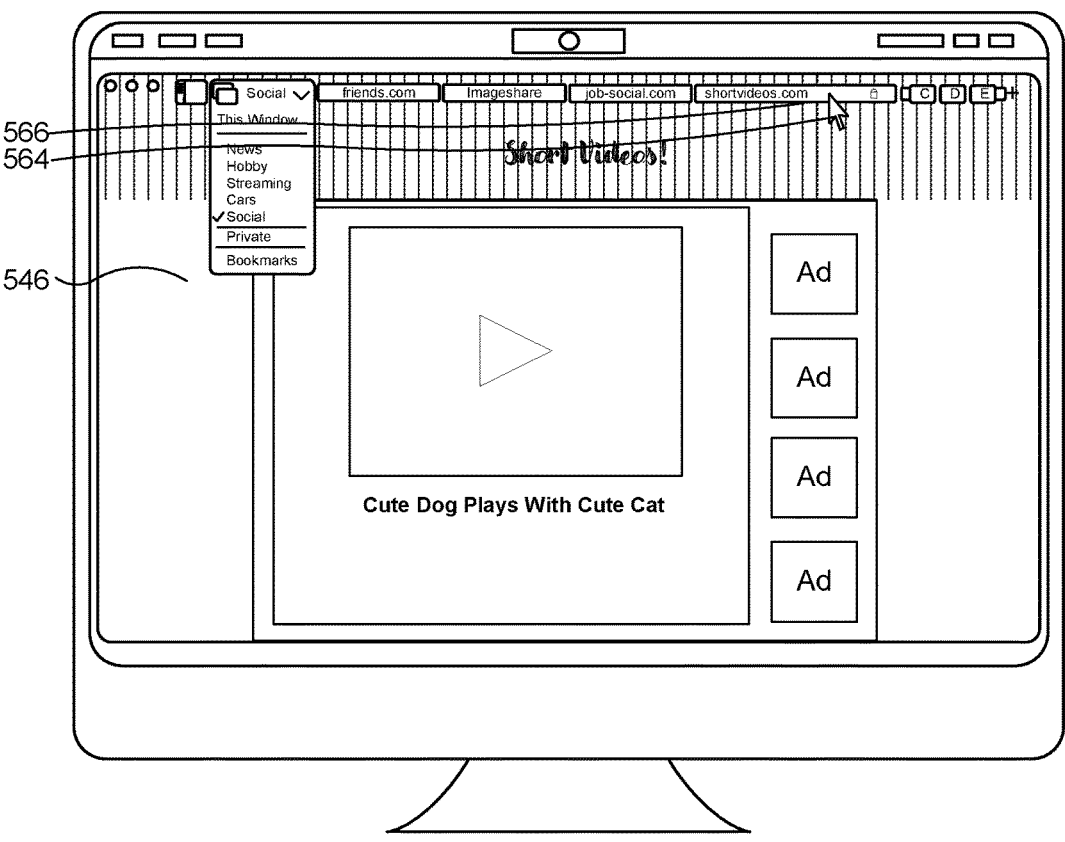
Figure 5R:
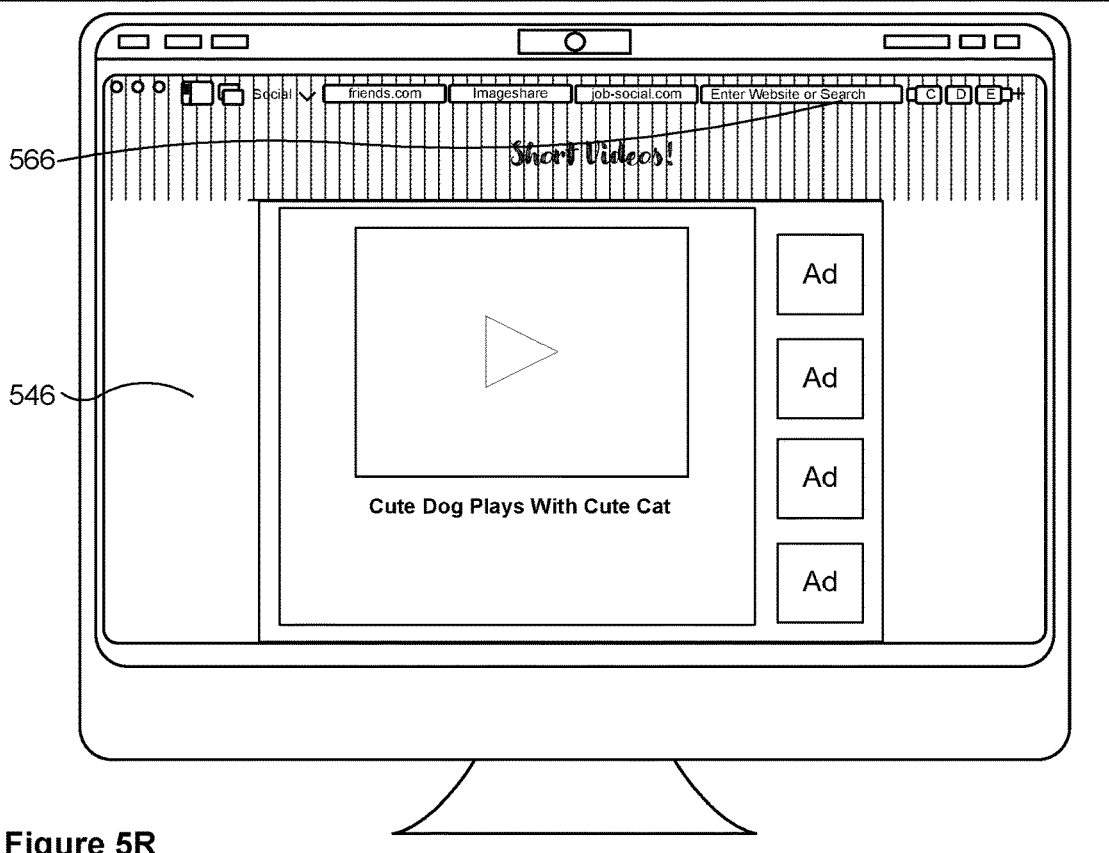
Figure 5S:
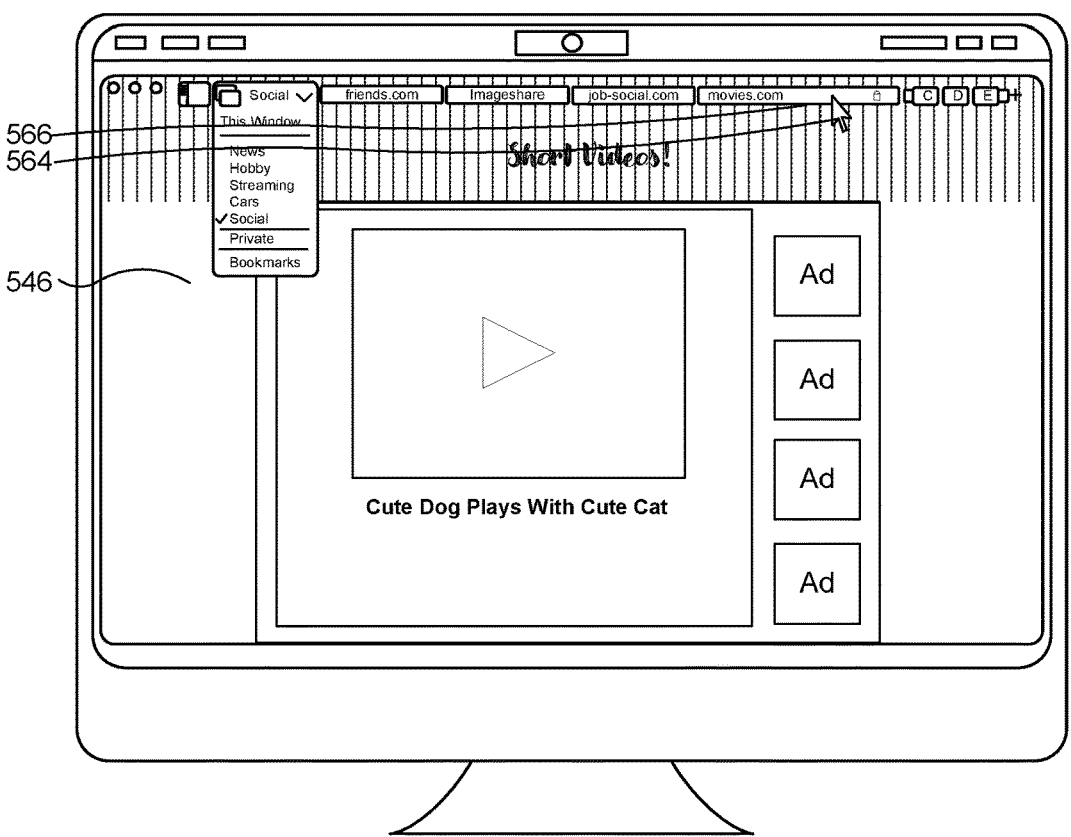
Figure 5T:
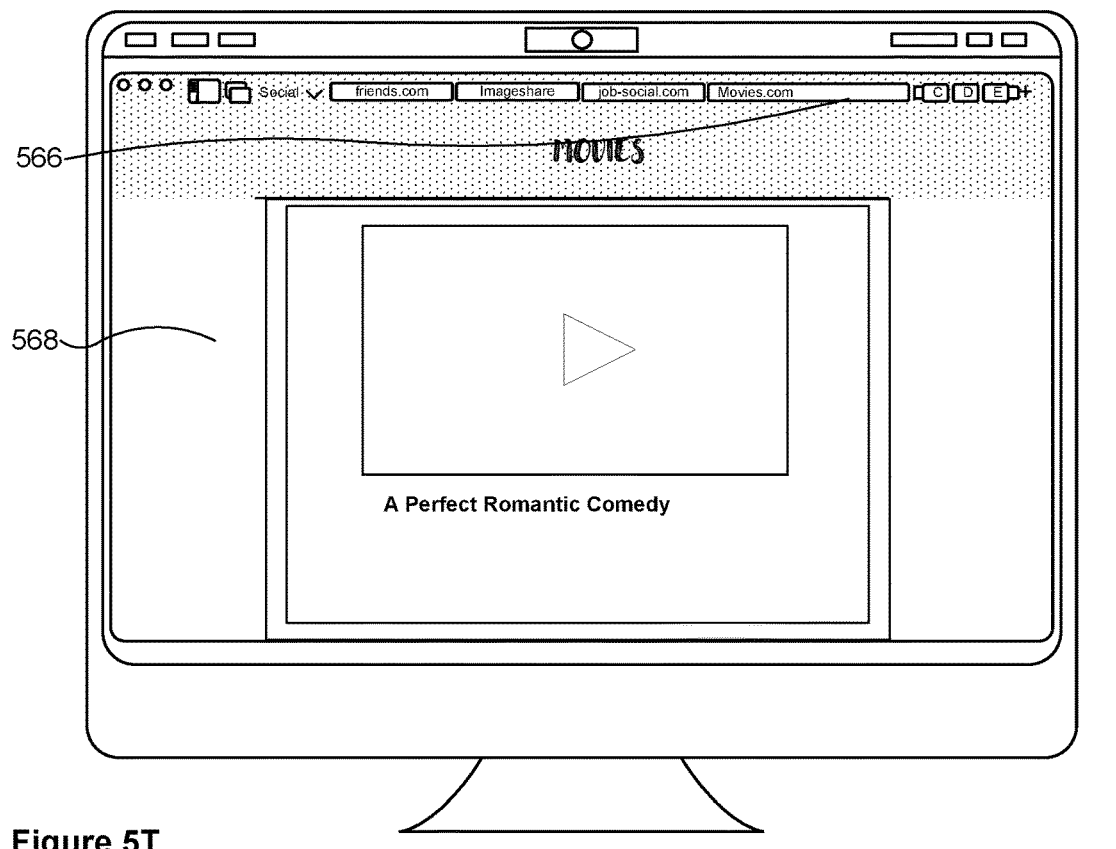
Figure 5U:
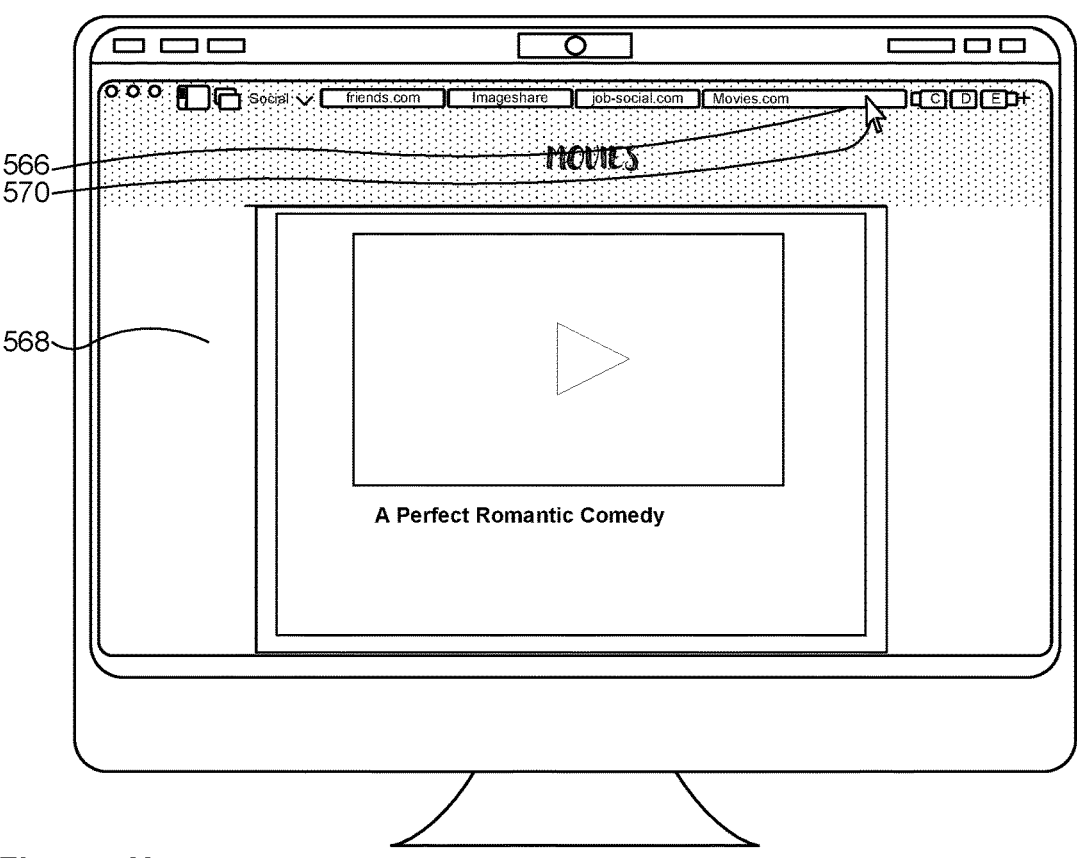
Figure 5V:
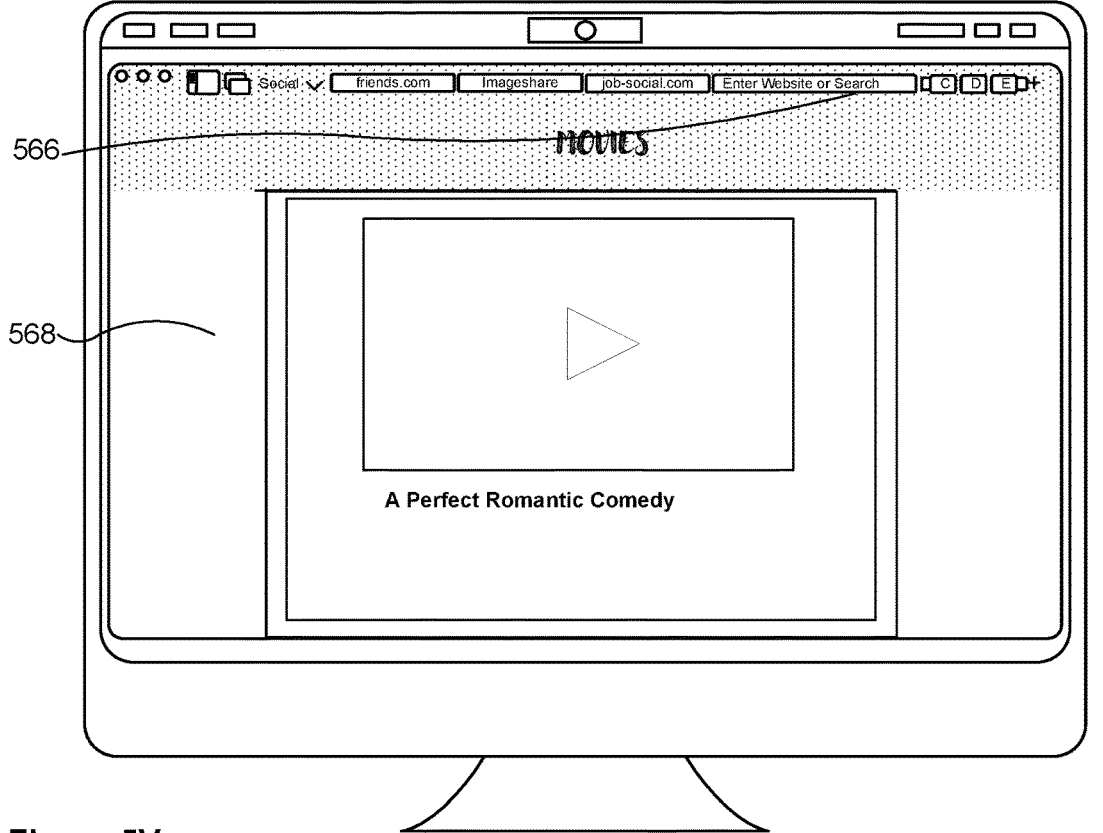
Figure 5W:
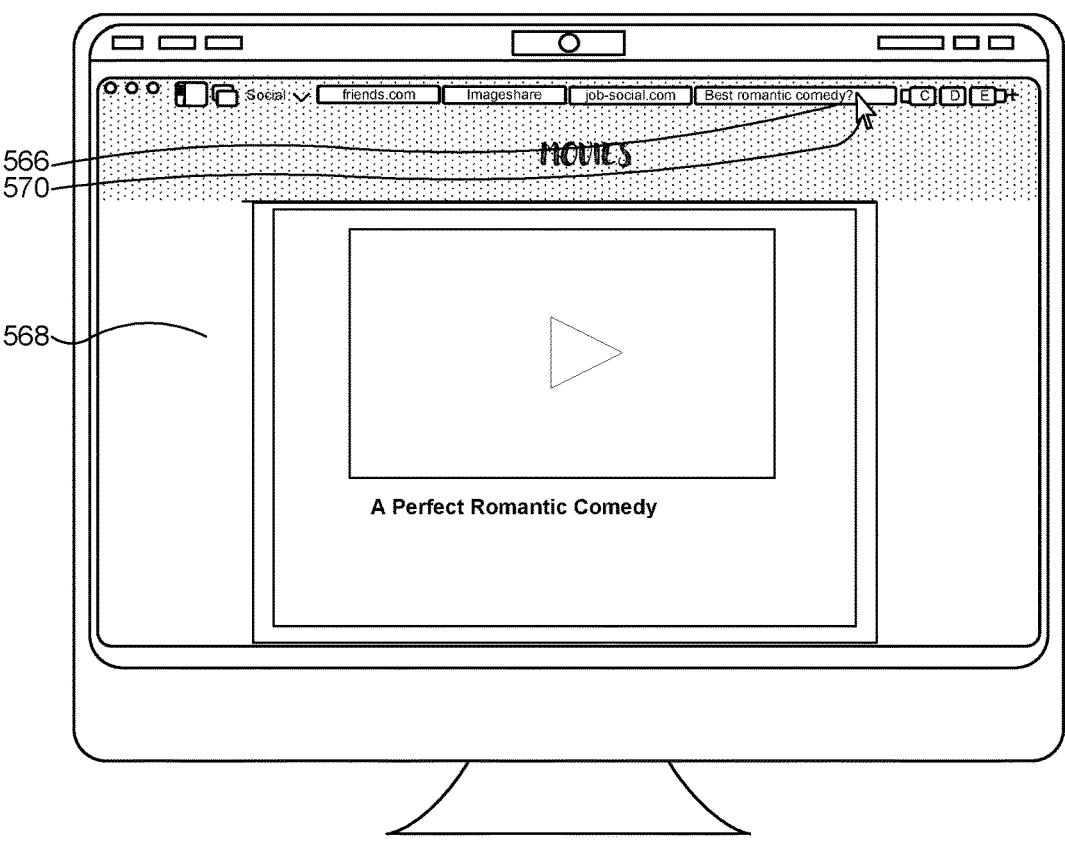
Figure 5X:
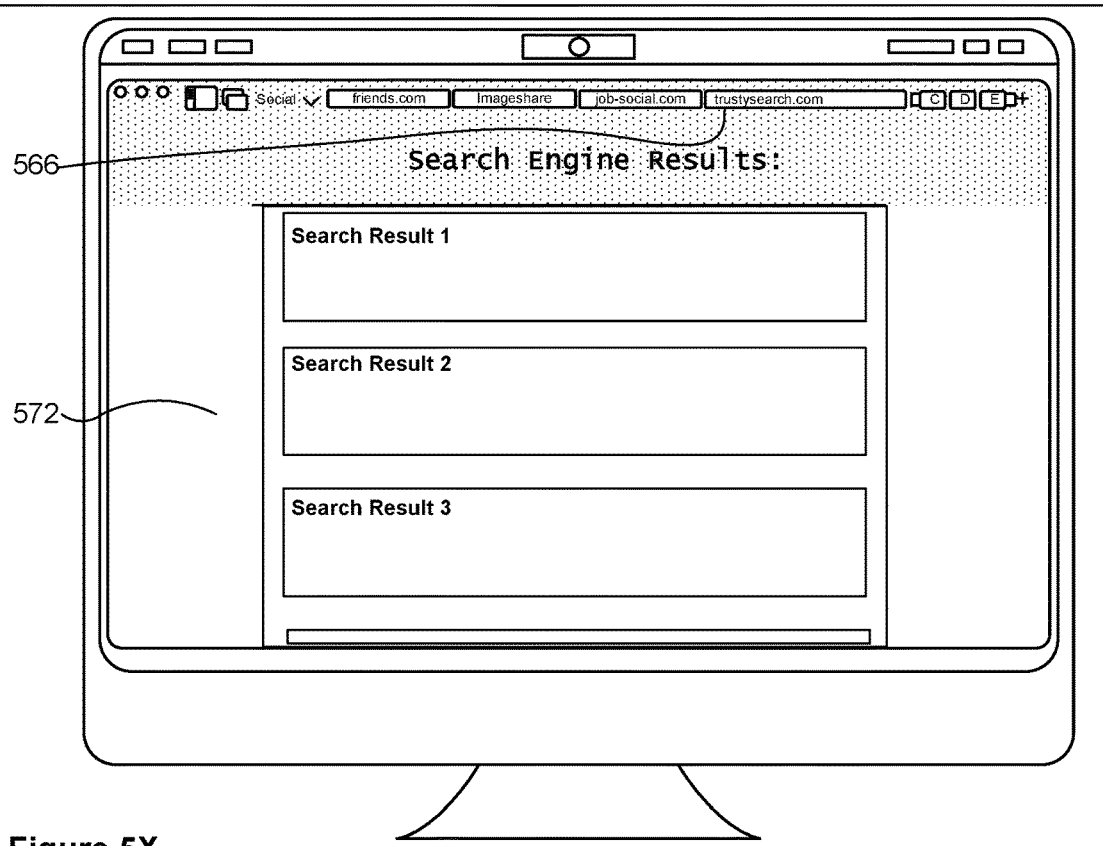
Figure 6B:
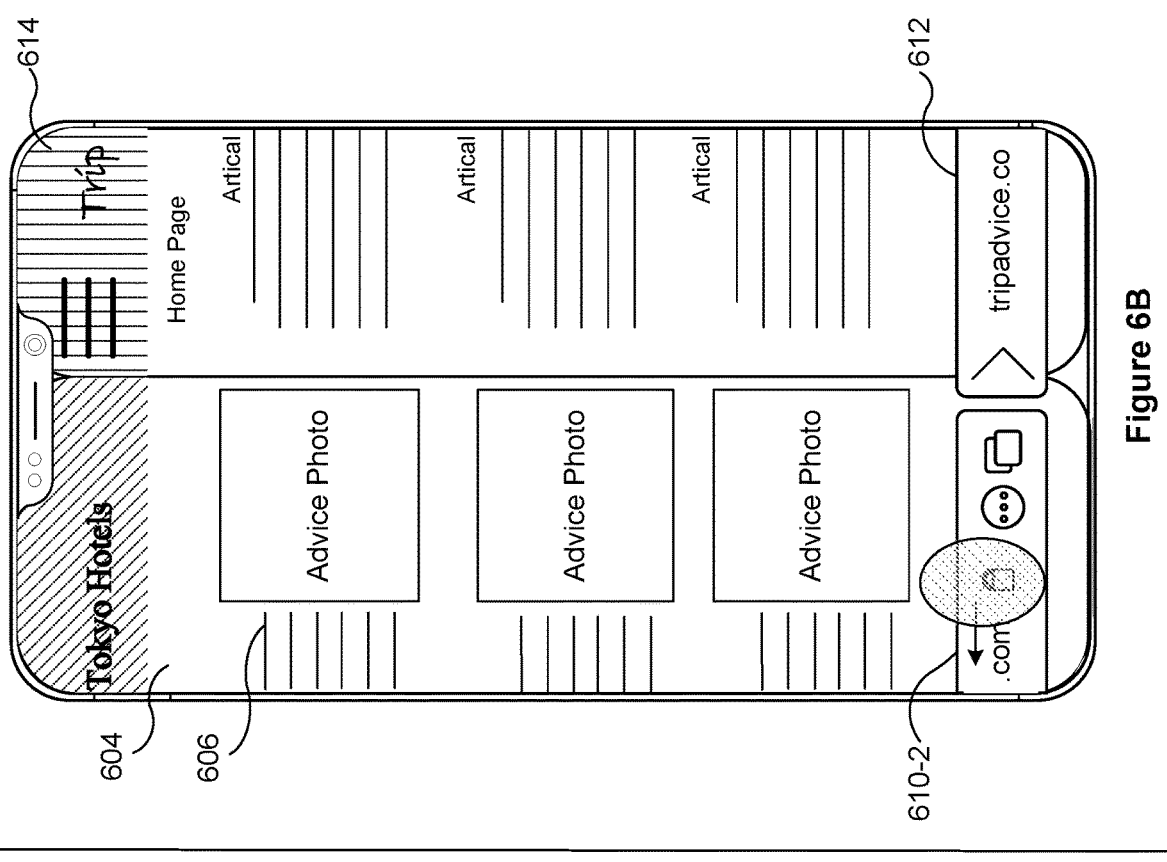
FIGS. 6A-6AV illustrate example user interface for interacting with a web-browser application, in accordance with some embodiments.
Figure 6A:
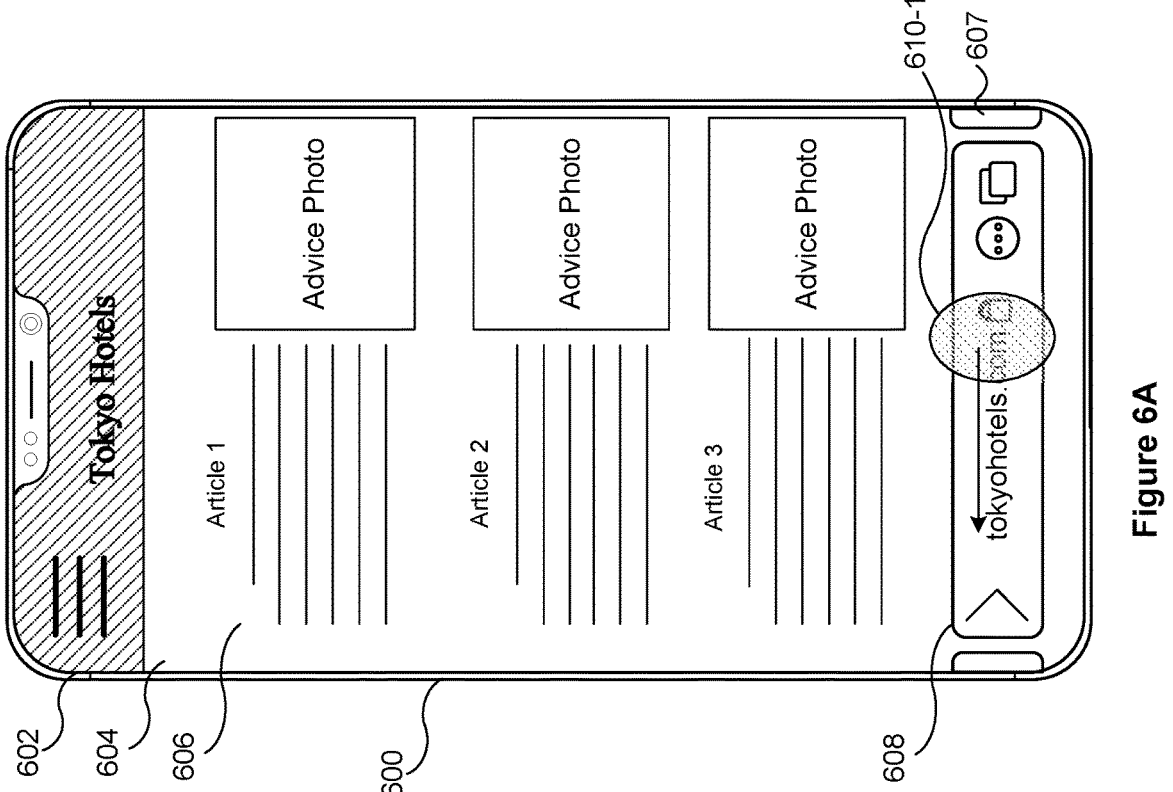

FIGS. 5A-5X and FIGS. 6A-6AV illustrate example user interfaces for interacting with a web-browser application in accordance with some embodiments. The user interfaces in these figures are used to illustrate the processes described below, including the processes in FIGS. 7A-7E, and 8A-8D. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5X and FIGS. 6A-6AV illustrate example user interfaces for interacting with a web-browser application in accordance with some embodiments. FIG. 5A illustrates a computing device 500, also referred to as portable multi-function device 100 that includes a display generation component 502 (e.g., a touch screen 112 or a traditional display with a mouse and keyboard as input devices). The display generation component 502 includes an example web-browser user interface 504 that displays a currently displayed webpage 506 with its associated content (e.g., news.com and its corresponding webpage), an associated tab 508 that corresponds to the currently displayed webpage 506 (e.g., news.com). The web-browser user interface also includes one or more other tabs (e.g., 510-1 through 510-5) that are each associated with webpages that are currently not displayed. In some embodiments, the associated tab 508 and the one or more other tabs (e.g., 510-1 through 510-5) overlay the example web-browser user interface 504. The other tabs (e.g., 510-1 through 510-5) correspond to the websites with identifiers listed as "sports.com," "intl news," "Tech News," "AR News," and "SF News," respectively. In some embodiments, the associated tab 508 is larger in length (and in some embodiments larger in width) than the other tabs, this is done to indicate to a user, which tab corresponds to the displayed webpage 506. Although not shown the associated tab and other tabs can also include a pictorial identifier (e.g., a website specific icon, or a default identifier) in the tab. Example web-browser user interface 504 also includes a new tab group user interface element 509, which will be discussed in detail in relation to subsequent figures. Example web-browser user interface 504 also includes a shortcut menu user interface element 512 for revealing additional controls for causing websites to display. In addition, example web-browser user interface 504 includes a new tab button 514 for adding additional tabs and their corresponding webpage or start page. In some embodiments, when a tab is added it becomes the currently displayed tab.

FIG. 5B illustrates a cursor input 516 at shortcut menu user interface element 512. In some embodiments, the computing device instead registers touch-inputs or stylus-inputs. In some embodiments, no cursor us displayed when touch-inputs or stylus inputs are received. FIG. 5C shows that in response to cursor input 516 in FIG. 5B, a shortcut user interface window 518 is displayed. In some embodiments, the shortcut user interface window 518 overlaps the displayed webpage 506. In some embodiments, when the shortcut user interface window 518 is displayed, the displayed webpage 506 is reduced in size to accommodate the shortcut user interface window 518.

The shortcut user interface window 518 of FIG. 5C also includes a user interface element 520 for creating a new grouping of tabs from the associated tab 508 and other tabs (510-1 through 510-5) (e.g., the user interface element 520 adds all open tabs in a current session to a new Tab Group). In some embodiments, when a tab group is selected, user interface element 520 will include an identifier indicating which tab group is currently selected. The shortcut user interface window 518 also includes a list of other user defined tab groups (e.g., "Hobby" tabs 522-1, "Streaming" tab group 522-2, "Cars" tab group 522-3, and "Social" tab group 522-4). Which when selected, causes tabs associated with the respective tab group to be displayed in the web-browser user interface. In some embodiments, the tabs and associated webpage of the other tab group replace the associated webpage 506, associated tab 508, and other tabs (510-1 through 510-5) in the web-browser user interface. The shortcut user interface window 518 also includes a bookmark region 524 and a shared webpage region 526. The shared webpage region 526 includes links retrieved from other applications such as messages, email, and other applications in-which links can be received. FIG. 5C also illustrates a cursor input 528, here at the user interface element (e.g., button) 520 for creating a new grouping of tabs. In some embodiments, the shared webpage region 526 also includes other regions, such as a region for browsing history.

FIG. 5D shows that in response to cursor input 528, shown in FIG. 5C, at the user interface element (e.g., button) 520, a new tab group 530 is created. In some embodiments, new tab group 530 is not initially assigned a name or may be populated with a generic name such as "Tab Group 1." As shown in FIG. 5D, new tab group 530 is currently unlabeled and awaits user input to define the name of the new tab group 530. FIG. 5D also shows that the user interface element 520, shown in FIG. 5C, for creating a new grouping of tabs from the associated tab 508 and other tabs (510-1 through 510-5), which are shown in FIG. 5C, is replaced with a new tab group button 532. Although similar in appearance, user interface element 520 in FIG. 5C states "6 Tabs," meaning a new grouping of tabs will be created from the open six tabs, whereas the user interface element 532 when selected only creates a new group with a blank tab (e.g., a start page). In some embodiments, the user interface element 520 in FIG. 5C states "6 Tabs," is a button that allows the user to switch between the ungrouped tabs (e.g., the "6 tabs" session) and a user-defined tab group (e.g., News). For example, the user could select a new tab group from this icon, but still be able to return to the ungrouped tabs session. New tab group button 532 replaces the user interface element 520, because there are no unassigned tabs to create a new tab group from (e.g., all the displayed tabs are associated with the new "presently unnamed tab group. FIG. 5E shows that new tab group 530 is defined by a user as being a "News" tab group. In some embodiments, the tab group 530 is defined by a typing input received at the space next to new tab group 530, voice input, or touch input at an on-screen keyboard.

FIG. 5F illustrates a cursor input 531 at "Social" tab group 522-4 for opening the tabs associated with the "Social" tab group 522-4. FIG. 5G shows that in response to cursor input 532 at "Social" tab group 522-4, the associated tab 508 and other tabs (510-1 through 510-5) of FIG. 5F are replaced with tabs of the "Social" tab group 522-4 (e.g., associated tab 534 and other tabs 536-1 through 536-3). In addition, the top portion of the webpage 542 changes in accordance with a change in the webpage. For example, each webpage can have a different style (e.g., color, texture, shading, pattern, etc.), and the web-browser application then uses that style to match the example web-browser user interface 504 to a displayed webpage. In some embodiments, a displayed webpage does not include a predefined style, however, the web-browser application can monitor portions of the webpage (e.g., a top-portion of the webpage, corners of the webpage, the whole webpage, etc.) to best approximate a style (e.g., color, texture, shading, pattern, etc.) and match the example web browser user interface to the webpage. In some embodiments, the web-browser application determines the color, pattern, or graphic of top portion of the webpage being displayed (or about to be displayed) and displays a matching color, pattern, or image behind the tabs 534, 536 to match the webpage, i.e., effectively extending the webpage upwards and behind the tabs.

FIG. 5G also illustrates a request to scroll (e.g., via cursor input 538) the displayed webpage 540 corresponding to associated tab 534. FIG. 5H illustrates that in response to the request to scroll, the webpage 540 is scrolled to reveal an additional portion of the webpage 541. FIG. 5H also illustrates that the top portion under the tabs remains fixed and remains visually continuous with the webpage's web-browser user interface 504.

FIG. 5I shows a cursor input 544 at the other tab 536-3. FIG. 5J shows that in response to the cursor input 544 at other tab 536-3, the webpage 546 corresponding to the other tab 536-3 is displayed. In addition, the other tab 536-3 resizes to a larger length (and in some embodiments a larger height), similar to the size of the associated tab 534 in FIG. 5G. In FIG. 5J, the associated tab 534 is reduced in size (e.g., length and/or height) to the size of the other tabs. This change in size illustrates which tab corresponds to the displayed webpage (e.g., the larger tab corresponds to the displayed webpage). In some embodiments, an outline or other identifier may be present around the associated tab to illustrate that it is currently the selected tab.

FIG. 5J also illustrates one or more cursor inputs 548 at a new tab button 514. In response to the cursor input(s) 548 at new tab button 514, FIG. 5K illustrates one or more new tabs (e.g., new tabs "A"-"E") being displayed (depending on how many new tabs were opened by the user). When these new tabs are so numerous that all of the tabs do not fit within the tab row, then a horizontally scrollable list of the new tabs 550 is displayed. In some embodiments, horizontally scrollable list of the new tabs 550 includes other tabs such as the friends.com tab, the imageshare.com tab, and the job-social-.com tab. In other words, only the in-focus tab (e.g., short-videos.com tab) is not in the scrollable list. FIG. 5K also shows a cursor input 552 at one of the tabs of the scrollable list of the new tabs 550. FIG. 5L shows that in response to cursor input 552 at one of the tabs of the scrollable list of the new tabs 550, the tabs of the scrollable list of the new tabs 550 are scrolled.

FIG. 5M shows a cursor input 554 at the shortcut menu user interface element 512. FIG. 5N illustrates that in response to cursor input 554 at the shortcut menu user interface 512, the shortcut user interface window 518 is ceased to be displayed. In response, the displayed webpage resizes to take up the space previously occupied by the shortcut user interface window 518. FIG. 5N also shows that since a tab group is selected (e.g., "Social") then the new tab group user interface element 509 indicates "Social." In addition, the new tab group user interface element 509 is selectable and can reveal similar controls to those shown in shortcut user interface window 518 (e.g., different tab groups available for selection, an option for enabling private browsing, and a shortcut for displaying bookmarked webpage(s)).

FIG. 5O shows a cursor input 556 at the carrot 558 associated with the new tab group user interface element 509. FIG. 5P shows that in response to cursor input 556 at the carrot 558 associated with the new tab group user interface element 509, a second shortcut user interface window 560 is displayed that includes similar controls to those shown in shortcut user interface window 518. In addition to the controls shown in shortcut user interface window 518, a private browsing button 562 is also displayed, which when selected causes a private browsing tab to be opened.

FIG. 5Q through FIG. 5X illustrate that the tabs can receive textual inputs for performing a search, via search engine, or for entering a specific URL. FIG. 5Q shows an input 564 at tab 566. FIG. 5R shows that in response to the input 564, the tab 566 is updated to receive a textual input (e.g., the tab 566 recites "Enter Website or Search") and the webpage name shown in FIG. 5Q is no longer displayed. FIG. 5S shows that a typed input of "movies.com" is received at the tab 566, and FIG. 5T illustrates that in response to receiving a request to visit the typed input, webpage 568 is displayed. In some embodiments, until typing inputs are received (e.g., in some embodiments, this occurs when the search field is focused while a tab is open), the webpage will continue to show the webpage name (e.g., name or URL). FIG. 5U shows another input 570 occurring at tab 566. FIG. 5V shows that in response to the input 570, the tab 566 is updated to receive a textual input (e.g., the tab 566 recites "Enter Website or Search") and the webpage name shown in FIG. 5U is no longer displayed. FIG. 5W shows that a typed input of "Best romantic comedy?" is received at the tab 566, and FIG. 5X illustrates that in response to receiving the search terms (e.g., not a URL), search result webpage 572 is displayed. In some embodiments, in response to typing, search suggestions and/or instant results are displayed in a drop-down from the field, even before committing to navigation (e.g., before pressing "Go" or clicking enter on a keyboard).

FIG. 6A illustrates a computing device 600 (e.g., a laptop, a tablet, a desktop computer, or mobile device), also referred to as portable multifunction device 100 that includes a display generation component 602 (e.g., a touch screen 112 or a traditional display with a mouse and keyboard as input devices). The display generation component 602 includes an example web-browser user interface 604 that displays a currently displayed webpage 606 with its associated content (e.g., tokyohotels.com and its corresponding webpage), an associated tab 608 that corresponds to the currently displayed webpage 606 (e.g., tokyohotels.com). In some embodiments, the tab is an elongate user interface element along a bottom edge of the device's display region. The web-browser user interface also includes a hint tab 607 that indicates that at least one other tab is available to be selected. The one at least one other tab is associated with a webpage that is currently not displayed. Although not shown the associated tab and the at least one other tab can also include a pictorial identifier in the tab. FIG. 6A also illustrates a horizontal swipe gesture 610-1 occurring over the associated tab 608.

FIG. 6B illustrates the horizontal swipe gesture 610-2 continuing, and causing another tab 612 and another associated webpage 614 to replace associated tab 608 and currently displayed webpage 606. In some embodiments, the horizontal gesture 610-2 and other gestures described below are along a substantial direction (e.g., a substantially horizontal swipe gestures or a substantially vertical swipe gestures). In some embodiments, substantially can mean a gesture that is +/-10 degrees or less in a vertical or horizontal direction may still be considered a horizontal or vertical swipe gesture. In some embodiments, a horizontal swipe gesture is a gesture that is oriented so that when a user of the computing device 600 is standing upright (e.g., or sitting upright) and holding the computing device 600 in front of them (e.g., where the computing device 600 is aligned with earth's gravitational axis), then a horizontal swipe gesture would be orthogonal (or substantially orthogonal) to the vertical gravitational axis of the earth (e.g., a horizontal swipe gesture would be along the direction of the horizon of the earth). In some embodiments, a vertical swipe gesture is a gesture that is oriented so that the computing device 600 is standing upright (e.g., or sitting upright) and holding the computing device 600 in front of them (e.g., where the computing device 600 is aligned with earth's gravitational axis, then a vertical swipe gesture would be parallel (or substantially parallel) to the vertical gravitational axis of the earth (e.g., a vertical swipe gesture would be in an orthogonal direction to the horizon of the earth).

Figures 6C, 6D:
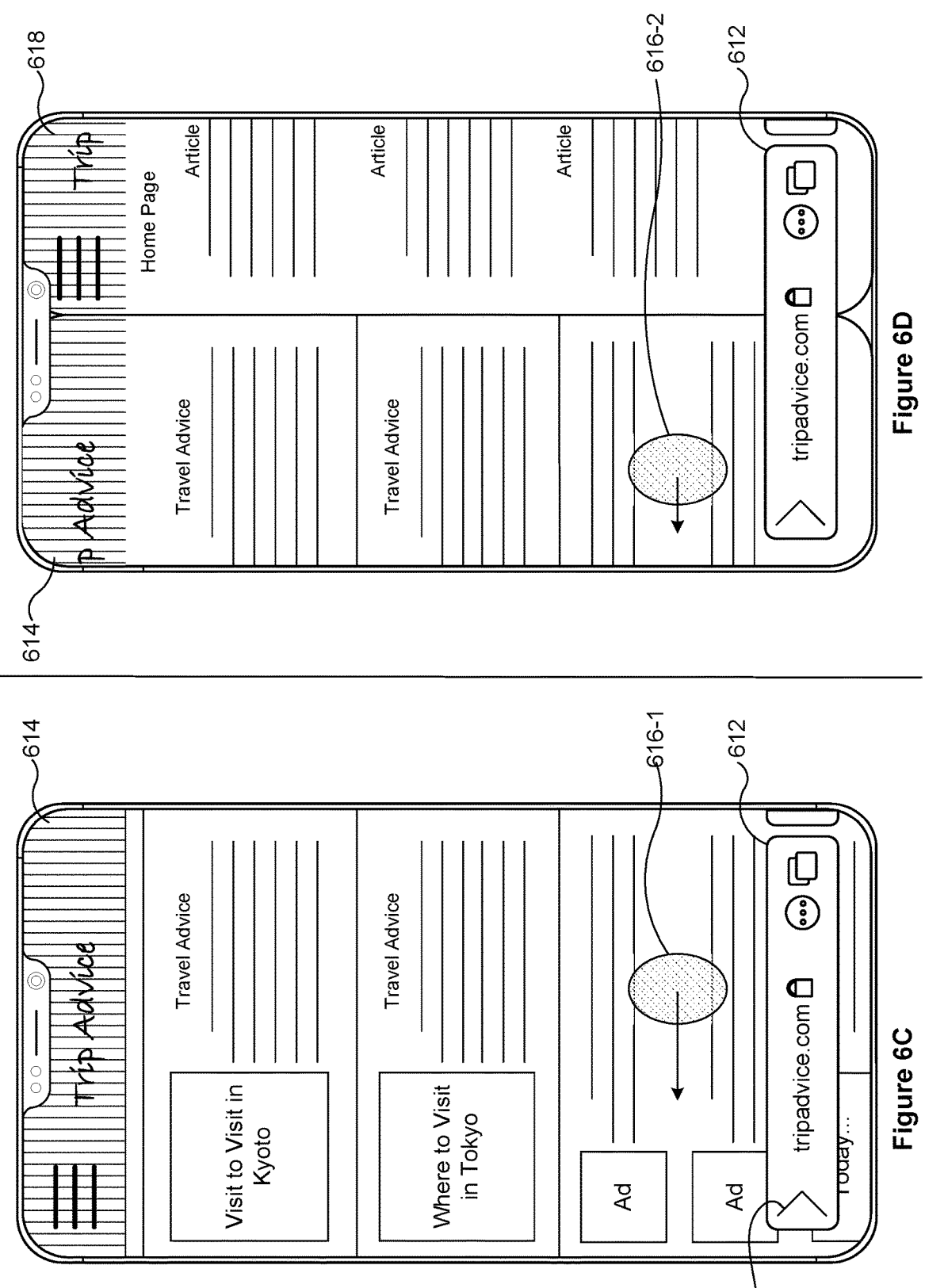

FIG. 6C illustrates that in response to horizontal swipe gesture 610-2 completing, the other tab 612 and the other associated webpage 614 completely replaces associated tab 608 and currently displayed webpage 606. In some embodiments, the webpages are replaced by sliding the currently displayed webpage off the screen while sliding-in the replacement webpage, both in the direction of the horizontal swipe gesture. FIG. 6C also illustrates that the other tab 612 includes a webpage navigation control (e.g., forward button 613 indicating that a page can be moved forward). In some embodiments, page navigation controls are displayed dynamically, which means that relevant controls are displayed while irrelevant controls are not displayed. This helps reduce unnecessary buttons shown in the user interface, which is especially helpful on mobile devices with limited screen real estate. FIG. 6C also illustrates horizontal swipe gesture 616-1 occurring over the associated webpage 614 and not at the other tab 612. FIG. 6D shows horizontal swipe gesture 616-2 continuing, and in response a website navigation action is performed (e.g., moving forward a webpage from the browsing history, or navigating to the next associated webpage). Alternatively, a swipe in the opposite horizontal direction would cause the webpage to move backwards a webpage in the browsing history, or navigating to a previous associated webpage). As a result, webpage 618 begins to be displayed, but the other tab 612 does not switch, as the same tab is still in view. FIG. 6E illustrates that in response to swipe gesture 616-2 completing, the other associated webpage 614 is completely replaced by webpage 618. In addition, forward webpage navigation button 613 is replaced with back webpage navigation button 620, as the forward button is no longer needed, but a back button is.

Figure 6F:
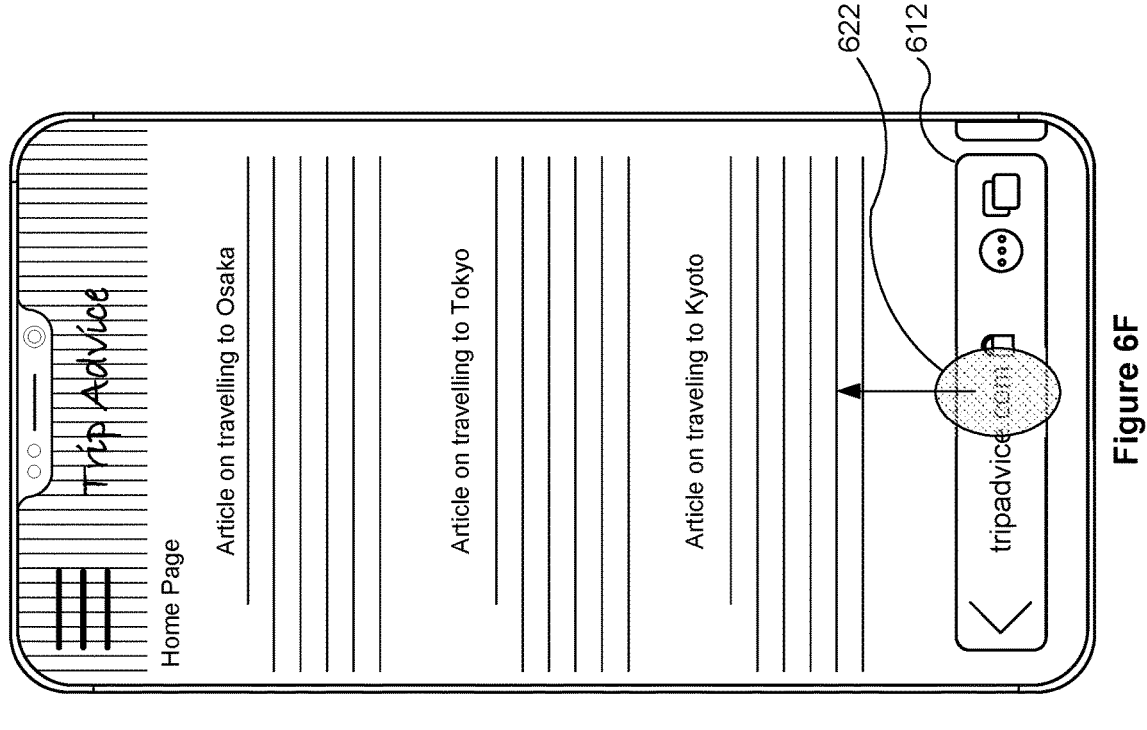
Figure 6E:
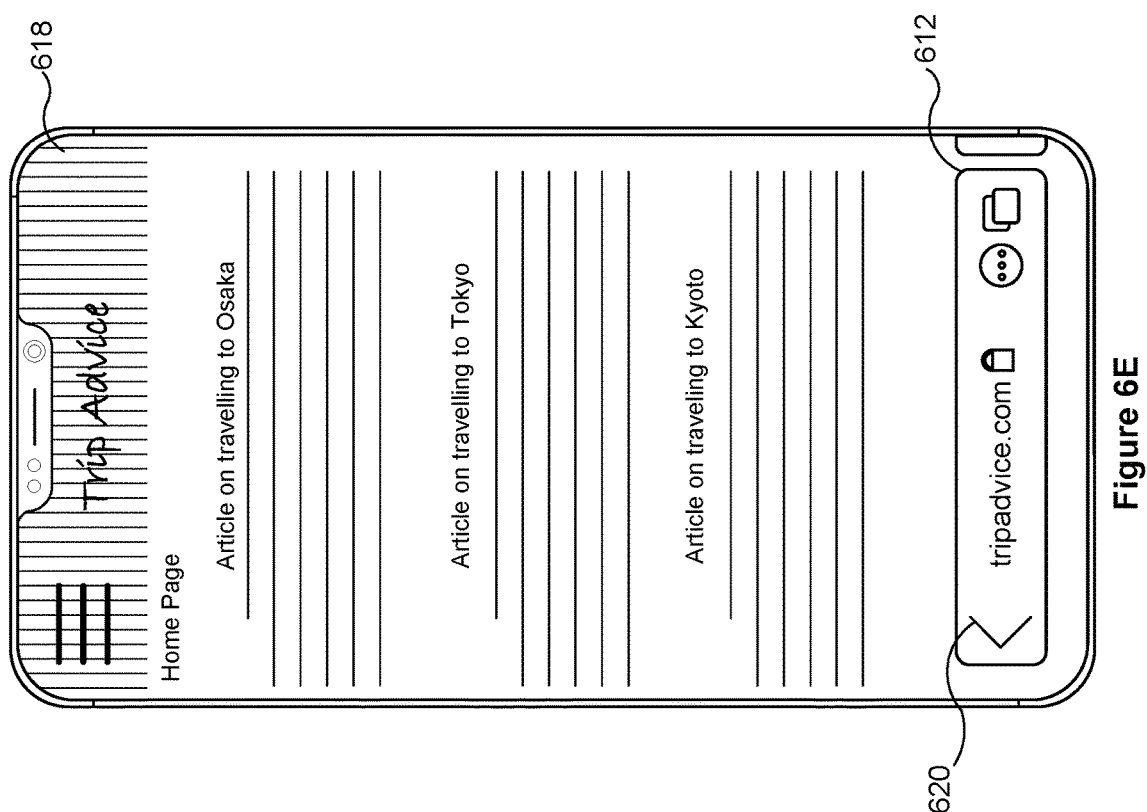

FIG. 6F illustrates a swipe gesture 622 occurring over the other tab 612 in a vertical direction. FIG. 6G illustrates that in response to the swipe gesture 622 occurring over the other tab 612 in a vertical direction, a tab management user interface 624 is displayed. The tab management user interface 624 displays a scrollable list of all tabs 626 in this current web-browsing session. In some embodiments, due to the size of the display generation component, if there are many tabs, all of the tabs are not displayed. In some embodiments, to reveal the non-displayed tabs the device needs to receive a scrolling gesture (e.g., a swipe over the area displaying the tabs). FIG. 6G illustrates that the other tab 612 transitions into a tab control user interface element 628. FIG. 6G also includes close buttons 627 on each of the tabs of the scrollable list of tabs 626 for removing the tab from the scrollable list (and its associated tab group, if applicable). The tab control user interface element 628 includes a button 630 for revealing a tab group creation user interface, and also includes a tab counter 632 to indicate the number of tabs open in this session. Tab control user interface element 628 also includes a button 634 labeled "Done" for closing the tab management user interface 624.

In some embodiments, in response to vertical or substantially vertical swipe gesture 622 being received beneath other tab 612 (e.g., from a bottom edge of the display) a home page user interface is displayed (see e.g., FIG. 4A illustrating a home screen user interface) and the web-browser application is moved to the background (e.g., a launched application executing in the background on device 100) or no longer displayed and its current state stored. In some embodiments, the gesture 622 (e.g., a vertical gesture or substantially vertical gesture), depending on its location on the display, can cause either scrolling of content of a displayed webpage (e.g., if the gesture is substantially over the webpage), displaying a tab management user interface 624 (e.g., if the gesture is substantially over the other tab), or returning to a home screen user interface (e.g., if the gesture is substantially at the bottom edge of the display and/or substantially beneath the other tab).

Figure 6H:
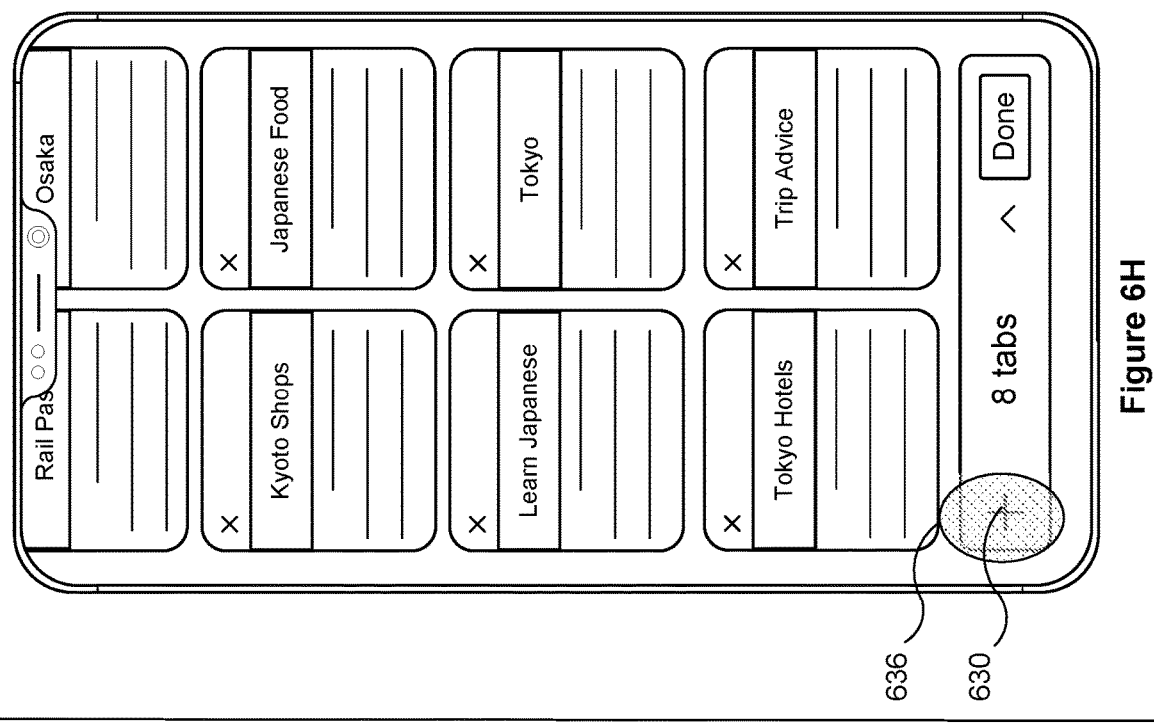
Figure 6G:
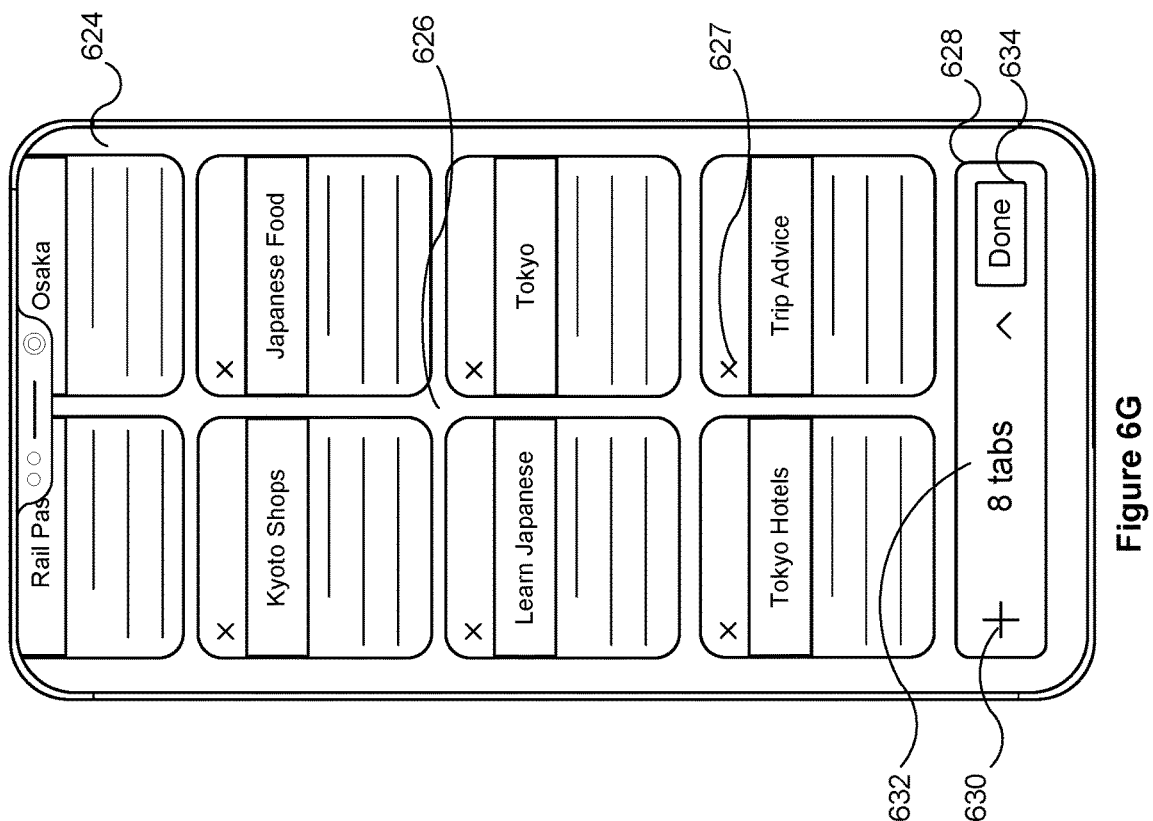

FIG. 6H shows an input 636 occurring at the button 630 for revealing a tab group creation user interface. FIG. 6I shows a tab group creation user interface 638 that is displayed in response to the input 636 occurring at the button 630. The tab group creation user interface 638 includes a first user interface button 640-1, that when selected returns to the previous user interface. The tab group creation user interface 638 also includes a second user interface button 640-2, that when selected causes a new private browsing tab to be opened. The tab group creation user interface 638 also includes other user interface buttons (e.g., 640-3, 650-4) that when selected causes tabs associated with tab groups to be displayed (e.g., tab groups titled "Car Blogs" or "News"). The tab group creation user interface 638 also includes a fifth user interface button 640-5, that when selected creates a new tab group. The tab group creation user interface 638 also includes a sixth user interface button 640-6, that when selected causes a new tab group to be created from the tabs open in the current web-browsing session.

Figure 6J:
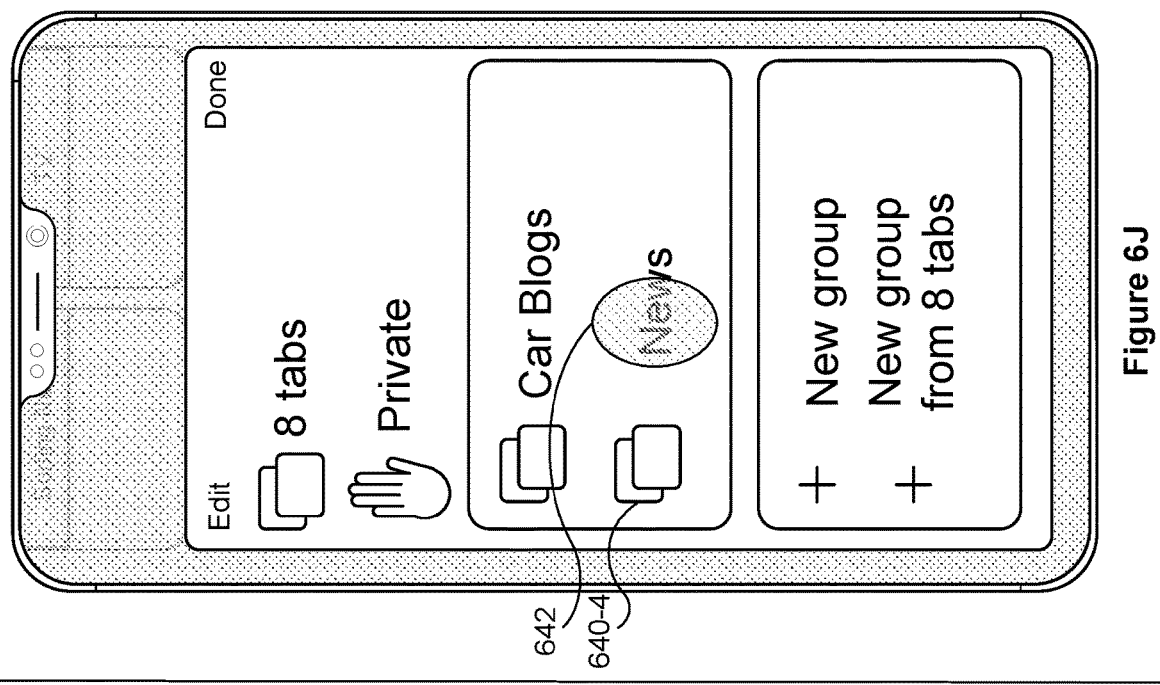
Figure 6I:
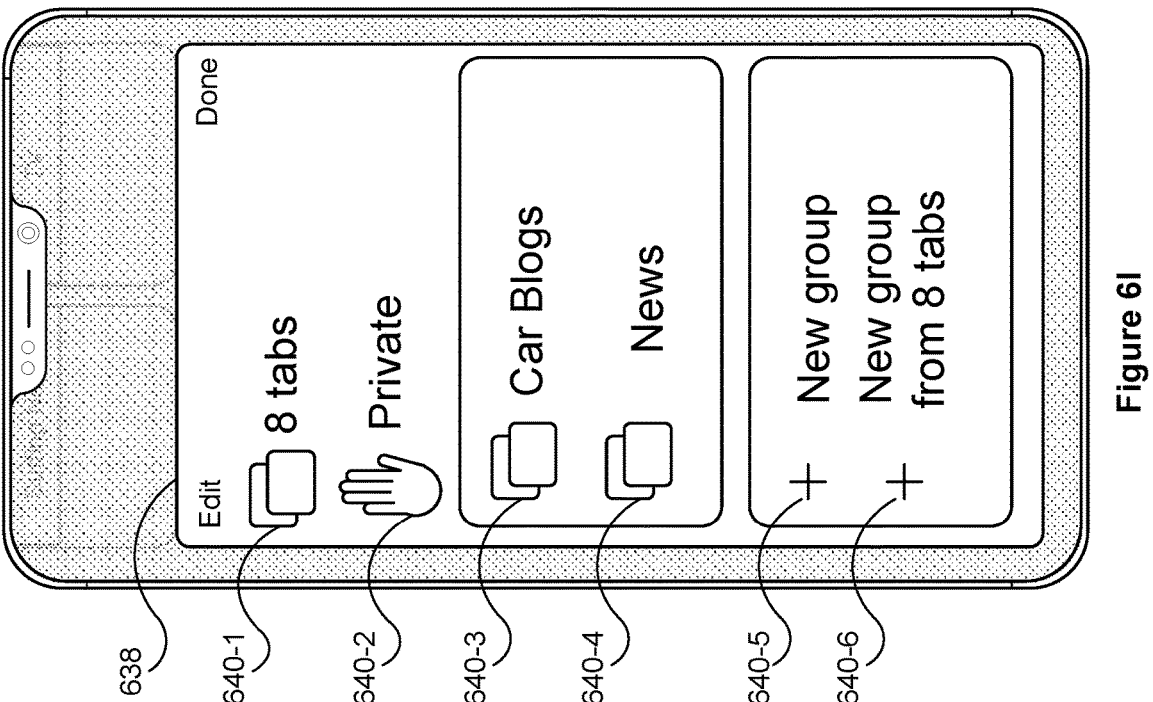
Figure 6L:
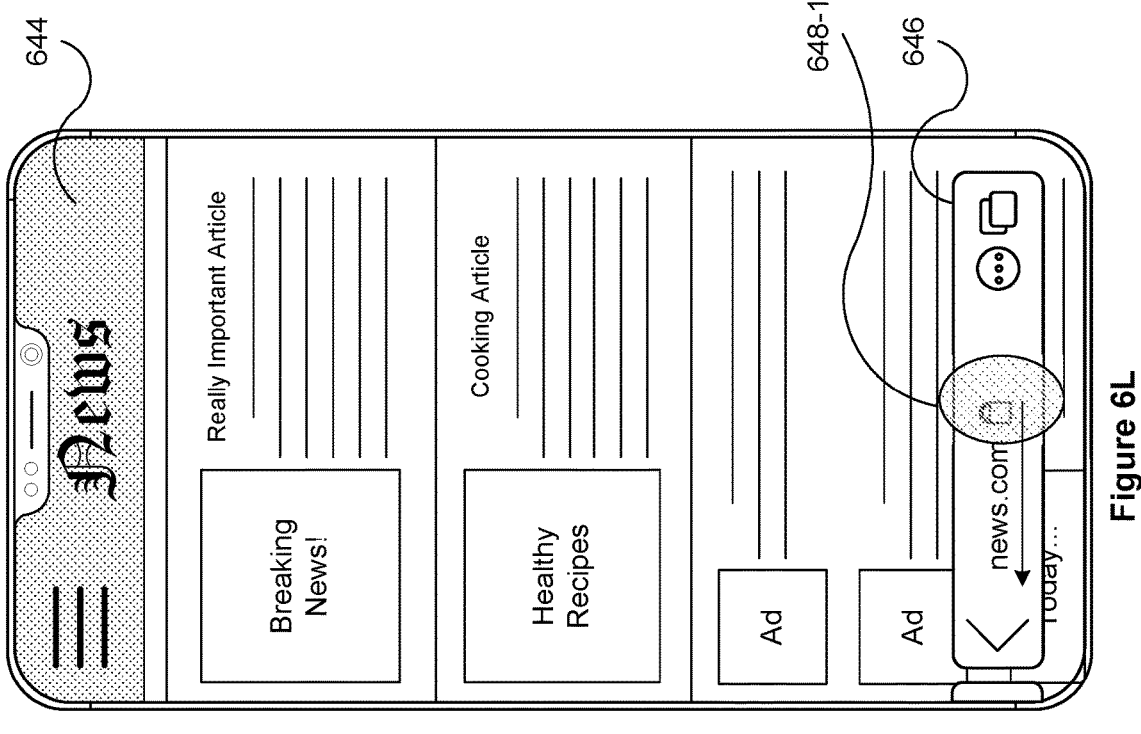
Figure 6K:
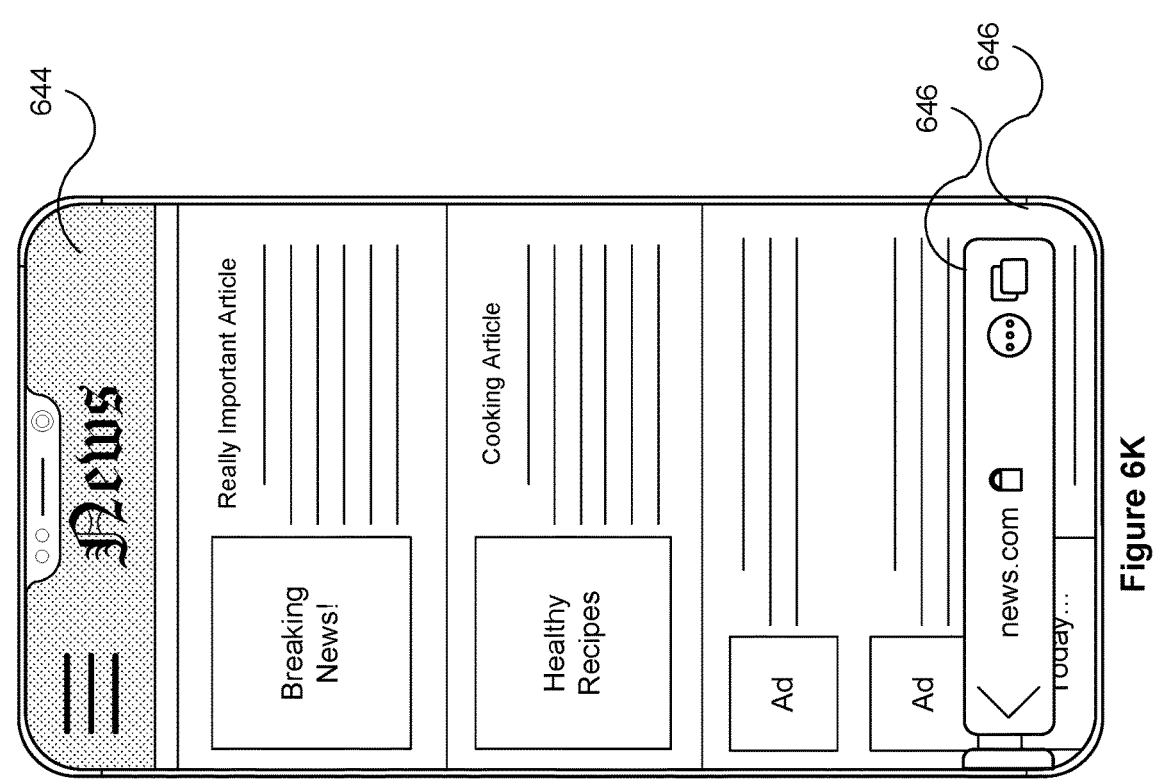
Figure 6N:
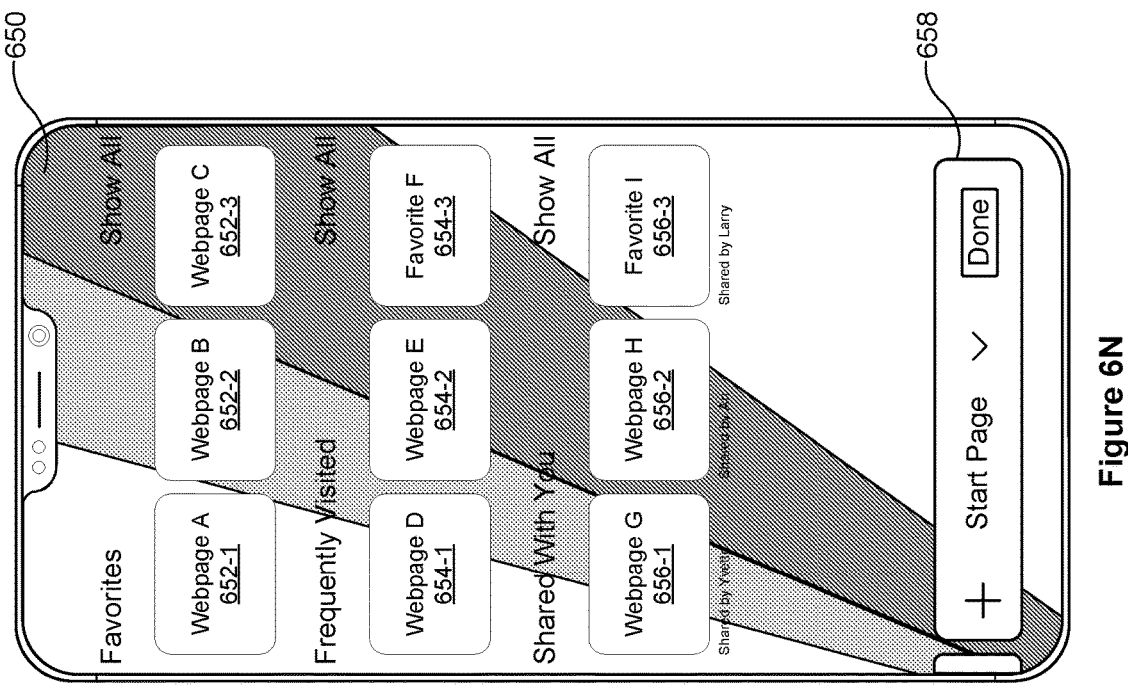
Figure 6M:
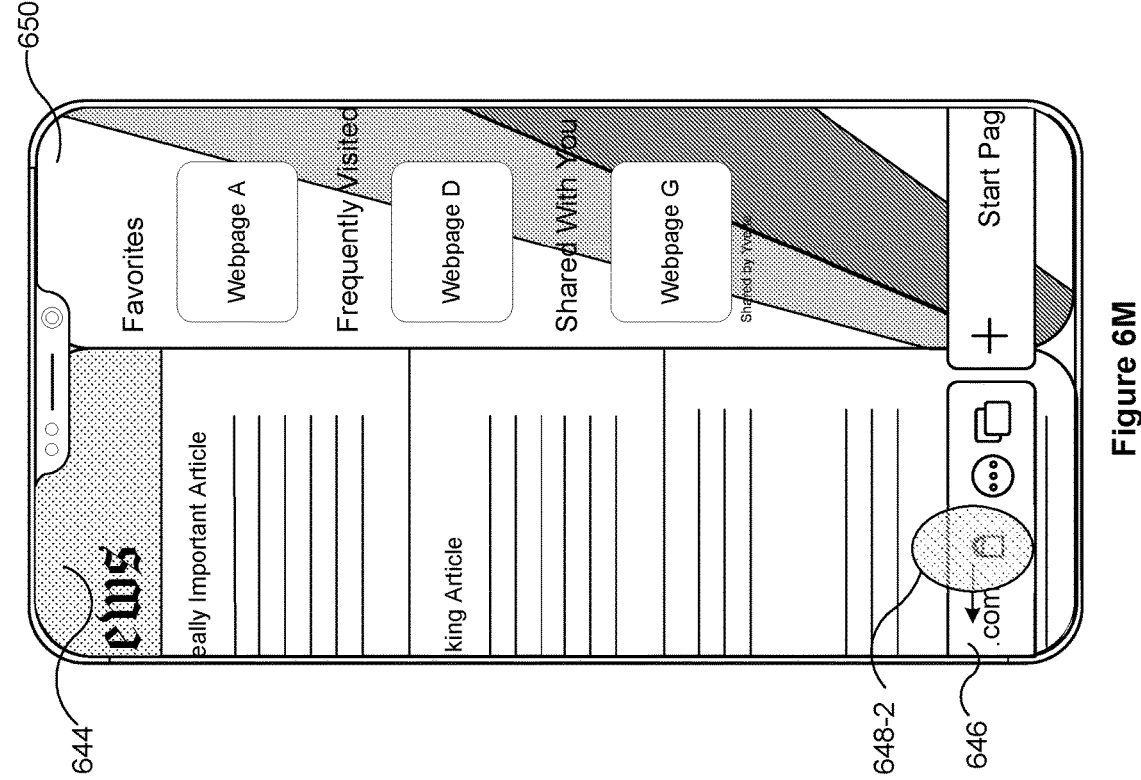

FIG. 6J illustrates a touch input 642 occurring at user interface button 640-4. FIG. 6K shows that in response to touch input 642 occurring at button 640-4, the previously open tabs are closed and replaced with tabs and webpages associated with the button 640-4 labeled "News." In place of webpage 618, webpage 644 titled "news.com" and associated tab 646 are displayed. FIG. 6L illustrates a swipe gesture occurring 648-1 over the associated tab 646. Since no hint tab is displayed indicating that there are more tabs to switch to from the right, then a new tab user interface is displayed instead. FIG. 6M illustrates swipe gesture 648-2 continuing, and causing new tab user interface 650 to begin displaying. FIG. 6N illustrates that in response to swipe gesture 648-2 completing, new tab user interface 650 is fully displayed. As above, in some embodiments, the webpage is slid off the display while the start page 650 is slid onto the display, both in the direction of the swipe gesture. In some embodiments, the new tab user interface 650 displays a partial list of favorited webpage buttons (e.g., 652-1 through 652-3), a partial list of frequently visited webpage buttons (e.g., 654-1 through 654-3), and a partial list of shared webpage buttons (e.g., 656-1 through 656-3). FIG. 6N also includes a tab control user interface element 658, which is similar in function to the tab control user interface element 628 discussed in FIGS. 6G-6J.

In some embodiments, in response to swipe gesture 648-1 and 648-2 (e.g., or a similar gesture in the horizontal direction) occurring beneath the associated tab 646, or substantially beneath the associated tab 646, the device switches between applications, e.g., between the currently displayed application and a previously launched application executing in the background on device 100 (e.g., a music application or any other application installed on device 100)). For example, e.g., the device switches from displaying the web-browser application to displaying a different application. In some embodiments, the gesture 648-1 and 648-2 (e.g., a horizontal gesture or substantially horizontal gesture), depending on its location on the display, can cause either a webpage navigation function (e.g., if the gesture is substantially over the webpage), tab-switching (e.g., if the gesture is substantially over the associated tab), or switching between applications (e.g., if the gesture is substantially at the bottom edge of the display and/or substantially beneath the associated tab).

Figure 6P:
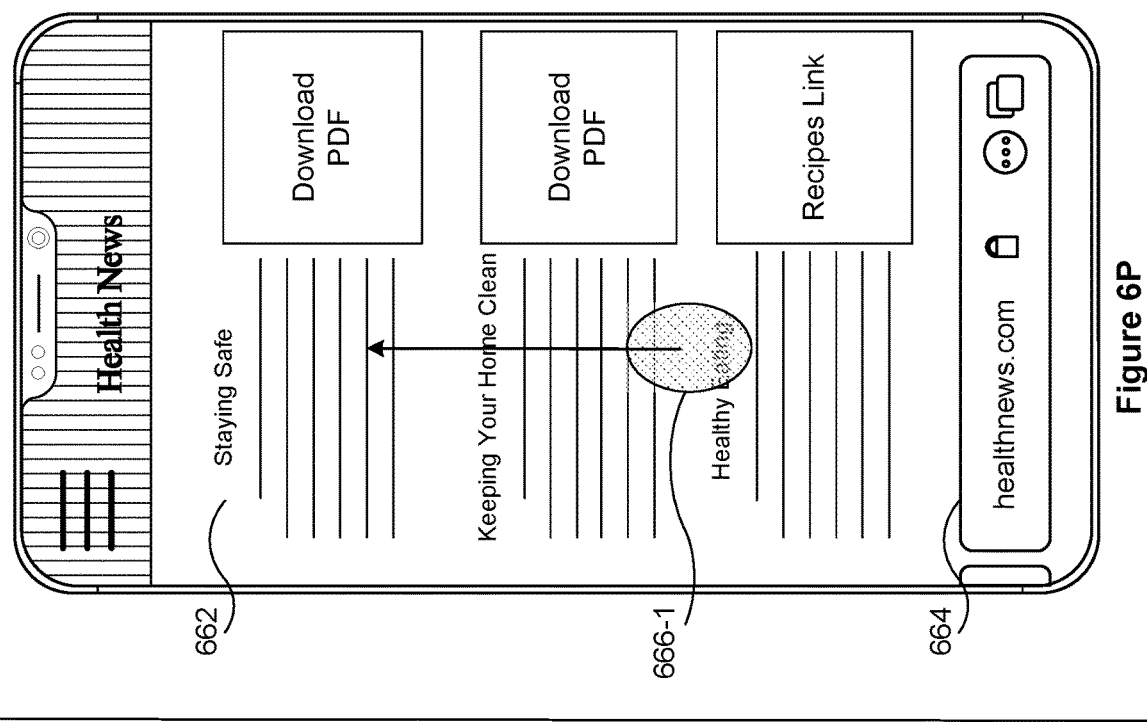
Figure 6O:
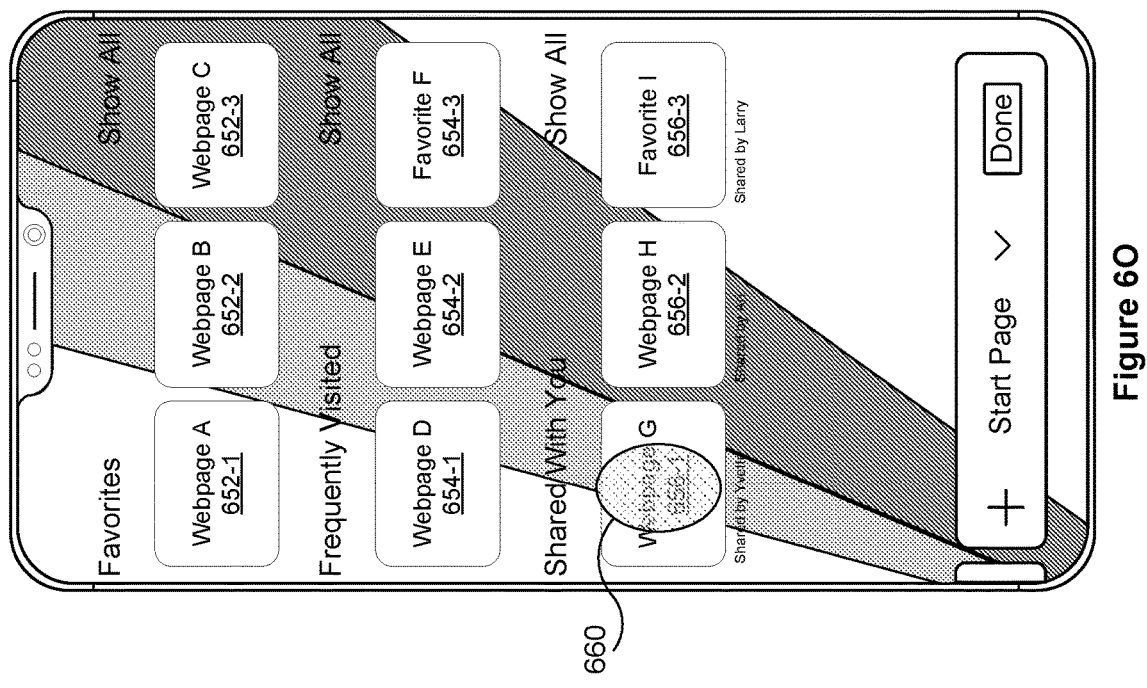
Figure 6R:
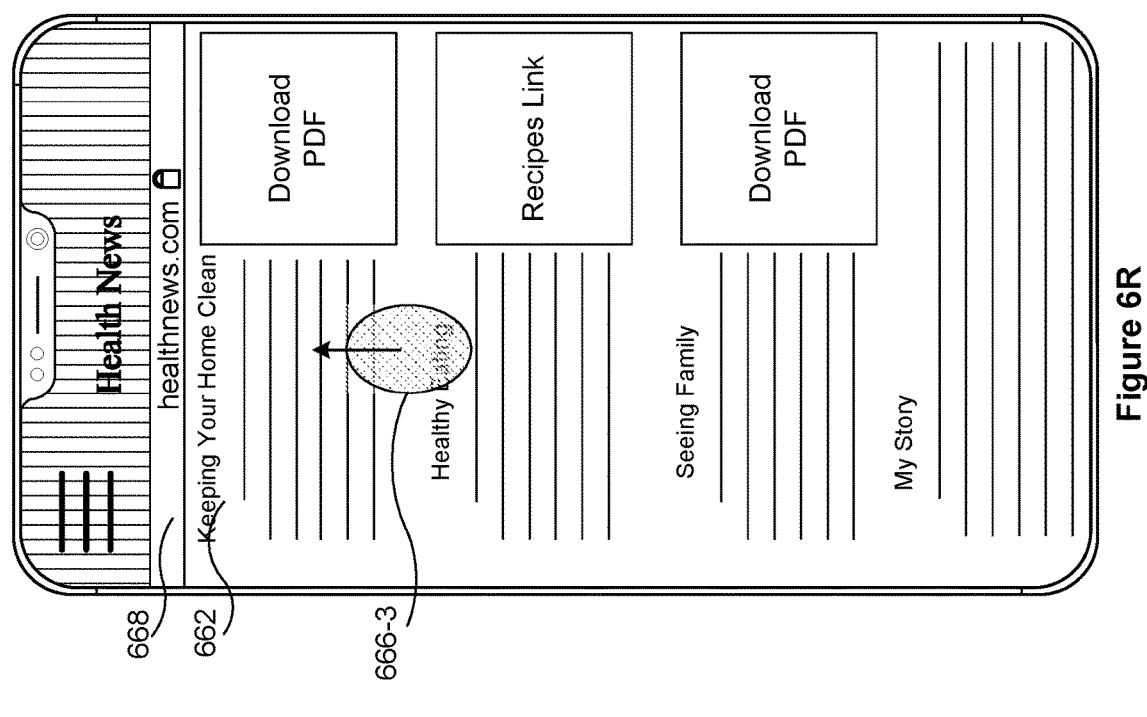
Figure 6Q:
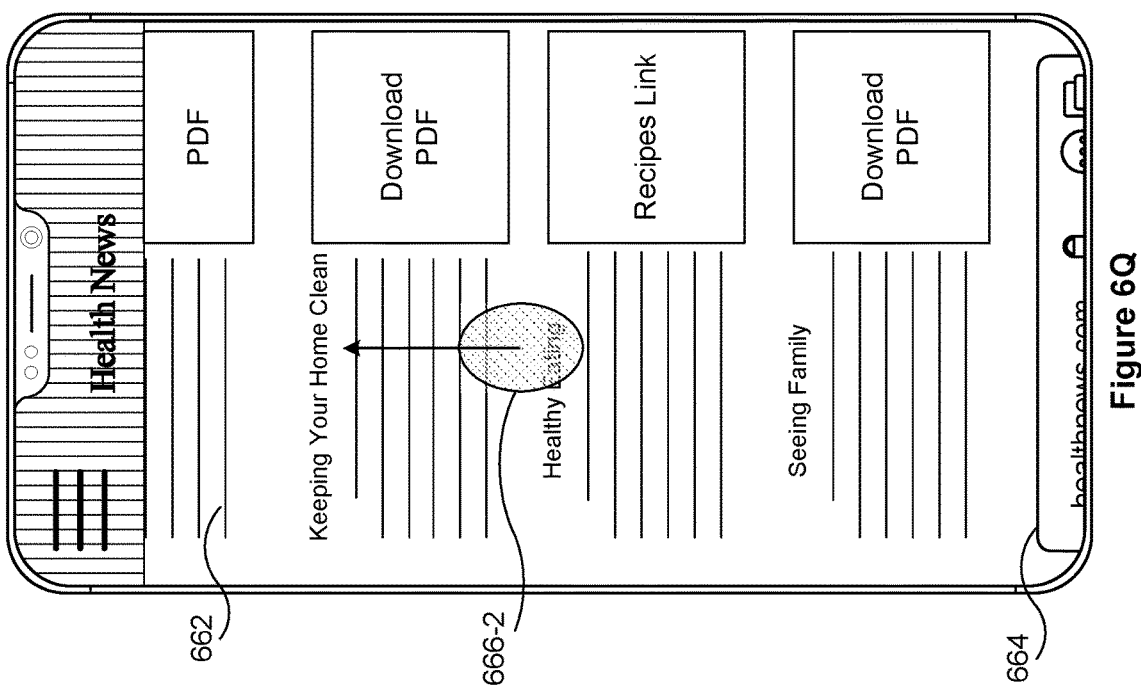

FIG. 6O illustrates an input 660 being received at shared webpage button 656-1. FIG. 6P shows that in response to input 660 being received at shared webpage button 656-1, a webpage 662 and tab 664 corresponding to the shared webpage button 656-1 is displayed. FIG. 6P also shows a scroll-down gesture 666-1 beginning on-top of the webpage 662. FIG. 6Q shows the scroll-down gesture continuing 666-2, and in response to scroll-down gesture continuing 666-2, tab 664 begins to disappear (e.g., minimize). FIG. 6R shows the scroll-down gesture continuing 666-3, and once it passes a distance (e.g., a movement distance of the scroll down gesture or a distance from the bottom of the webpage) and/or velocity threshold (e.g., a velocity of the scroll down gesture is above a threshold), the tab 664 completely disappears (e.g., minimizes or slides downwards off the display). In some embodiments, in response to the tab 664 disappearing, minimized website and security information 668 is displayed at either the top portion of the user interface (see e.g., FIG. 6R) or at the bottom of the user interface (see e.g., FIG. 6AM).

Figure 6T:
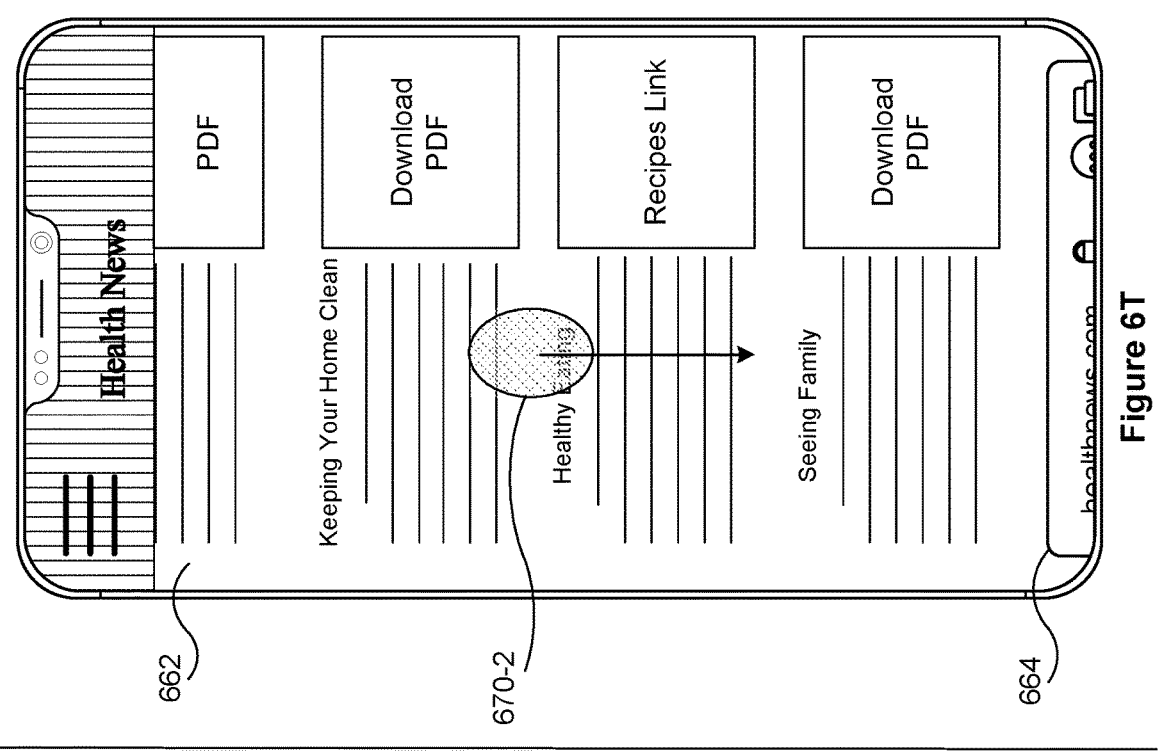
Figure 6S:
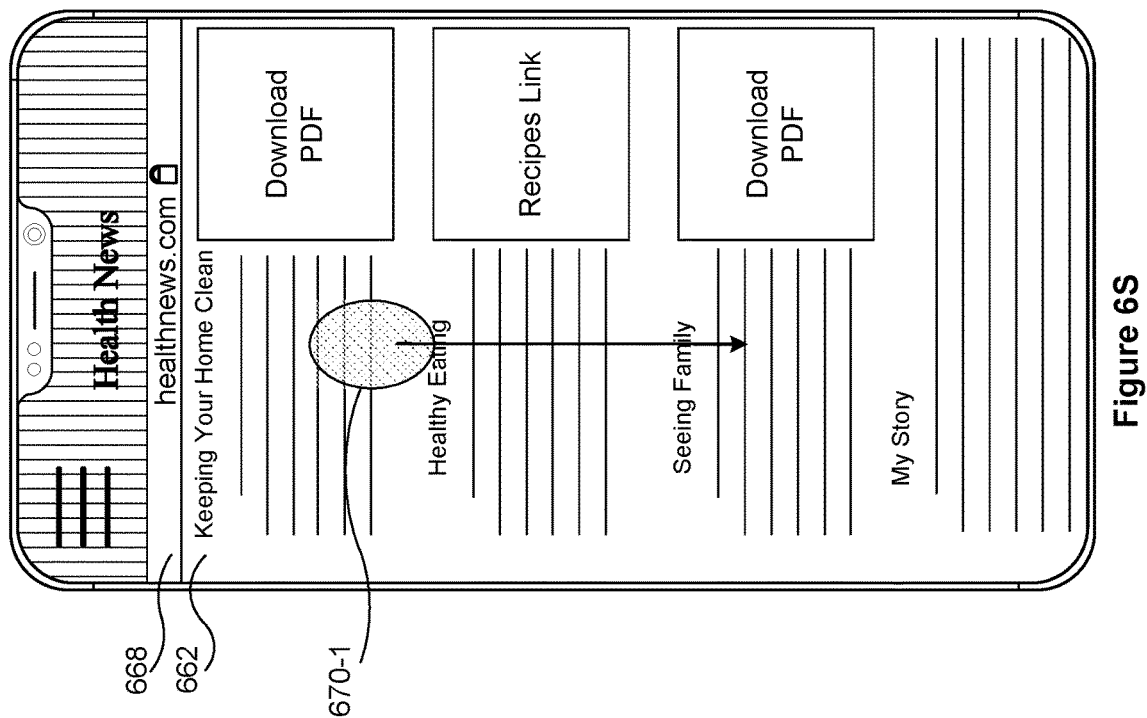

FIG. 6S shows a scroll-up gesture 670-1 beginning on-top of the webpage 662. FIG. 6T shows the scroll-up gesture continuing 670-2, and while it is continuing tab 664 begins to appear and the minimized website and security information 668. FIG. 6U shows the scroll-up gesture continuing 670-3, and once it passes a distance and/or velocity threshold, the tab 664 completely appears. In some embodiments, in response to the tab 664 appearing, website and security information 672 is displayed only within the tab.

Figure 6V:
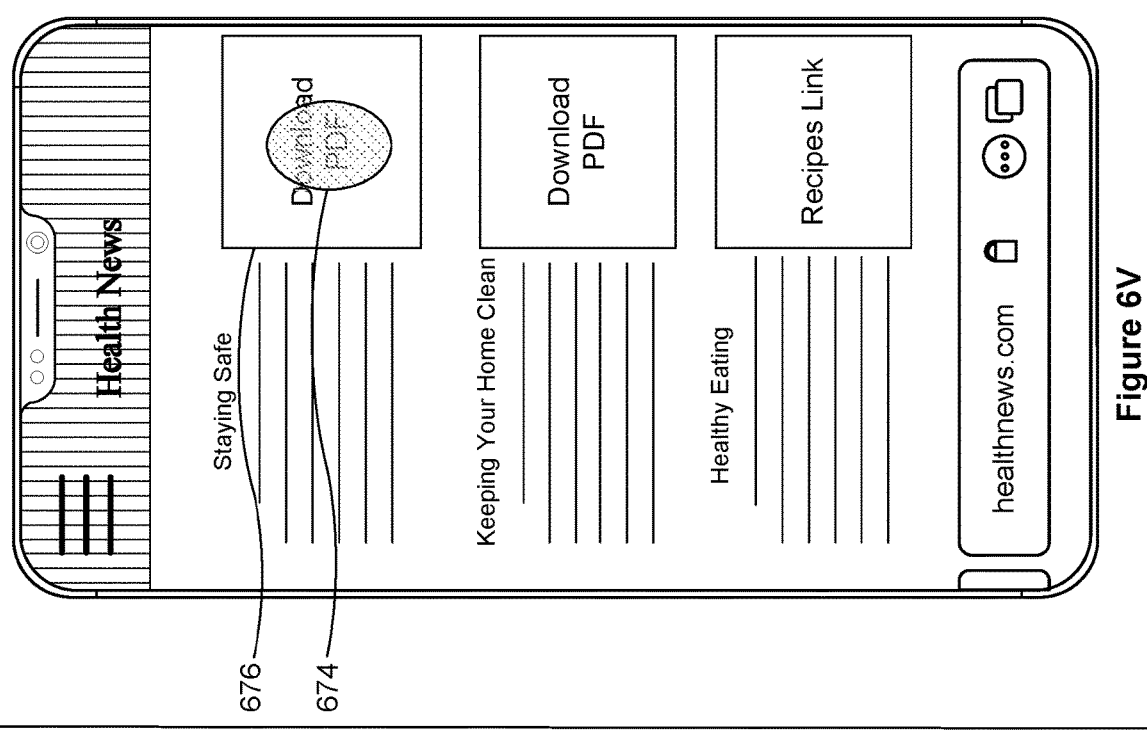
Figure 6U:
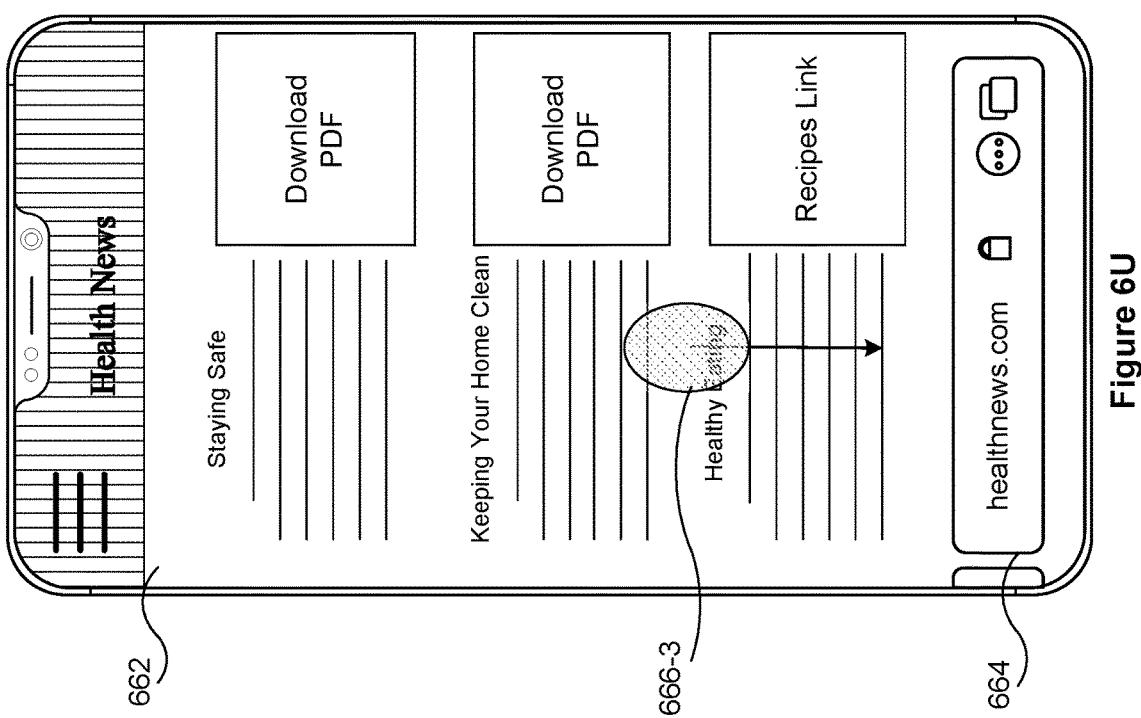
Figure 6X:
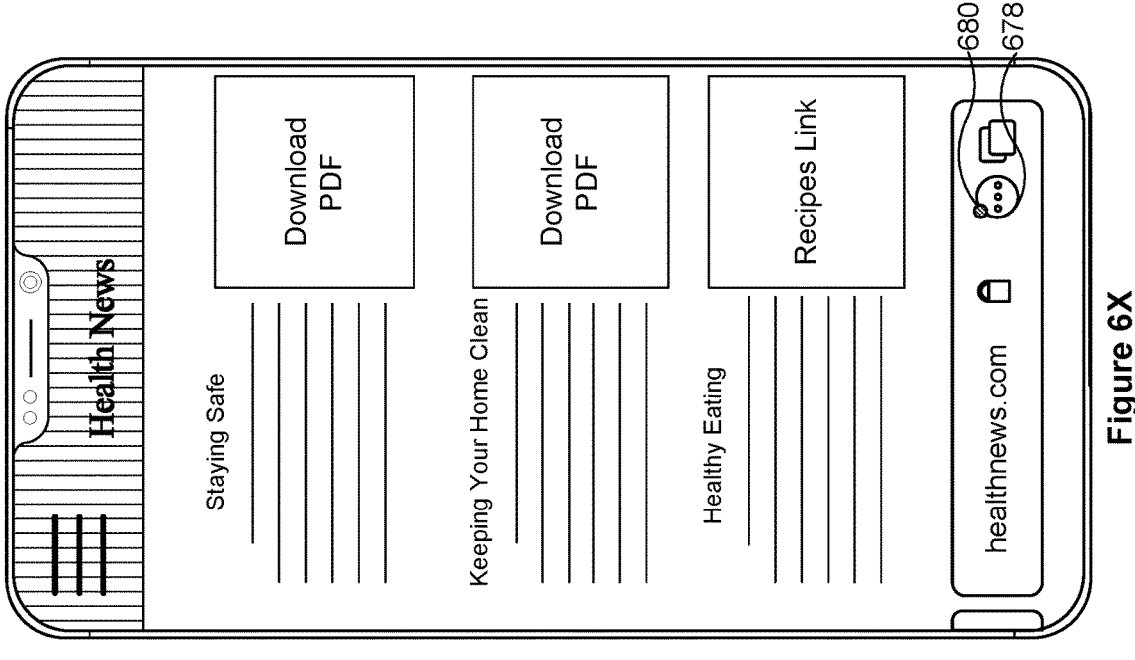
Figure 6W:
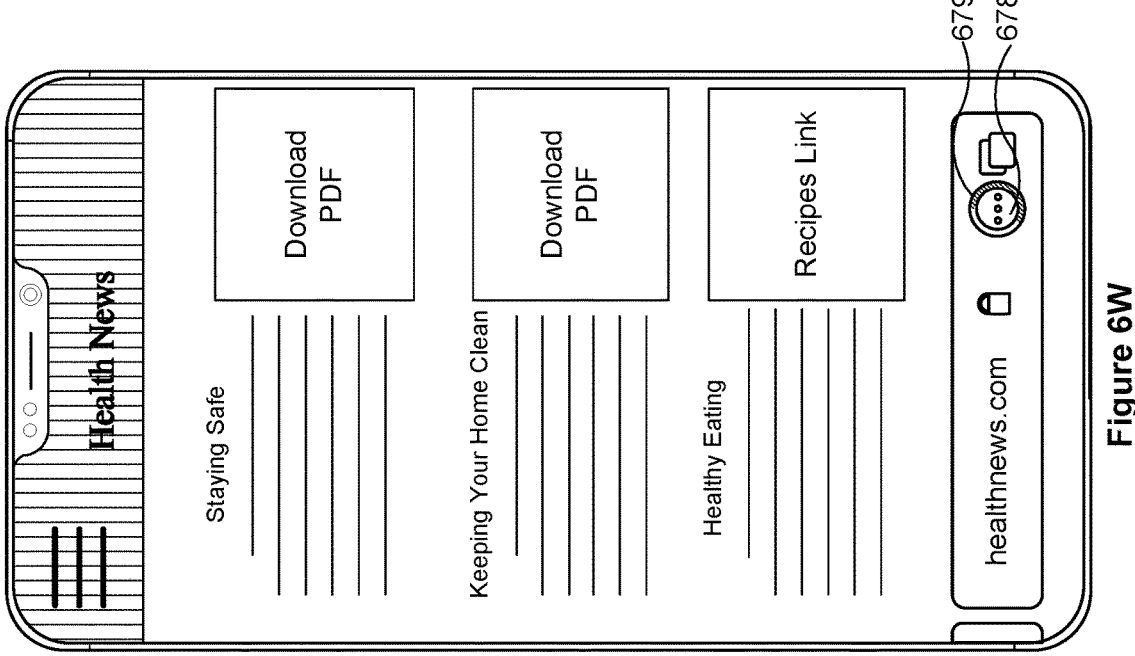
Figure 6Z:
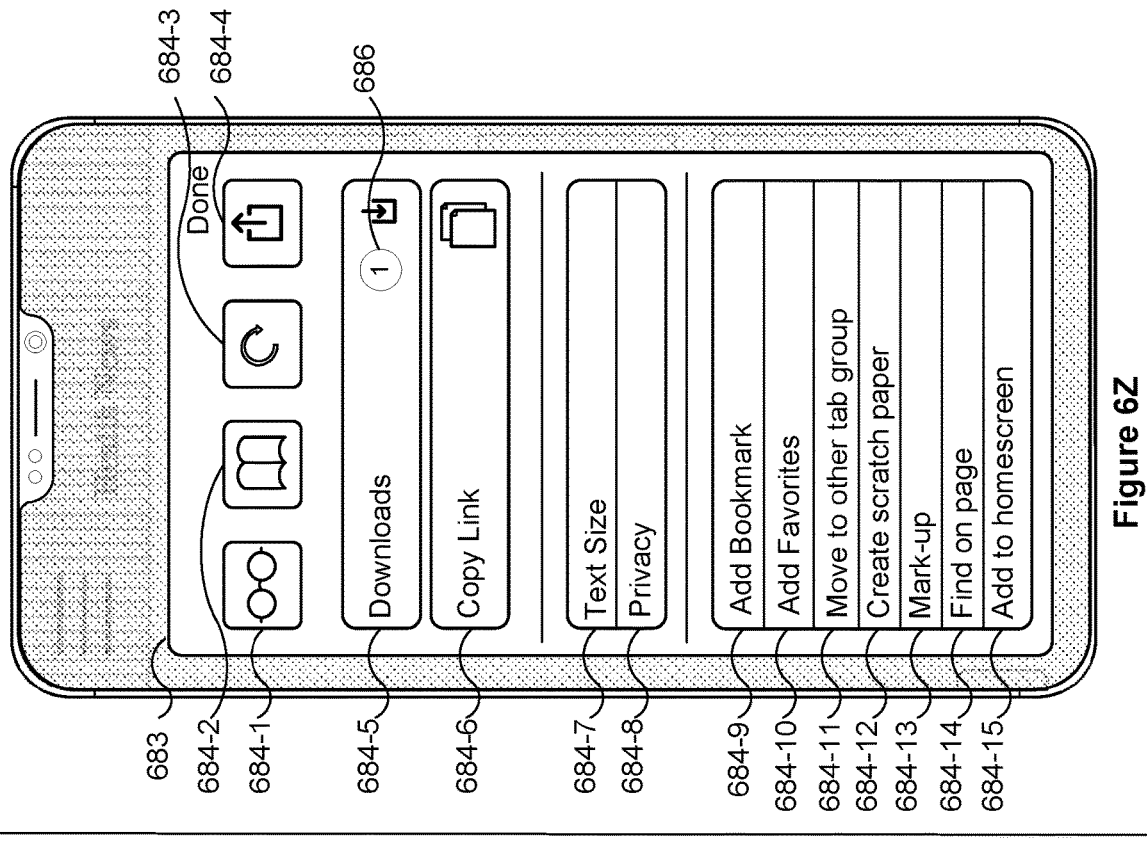
Figure 6Y:
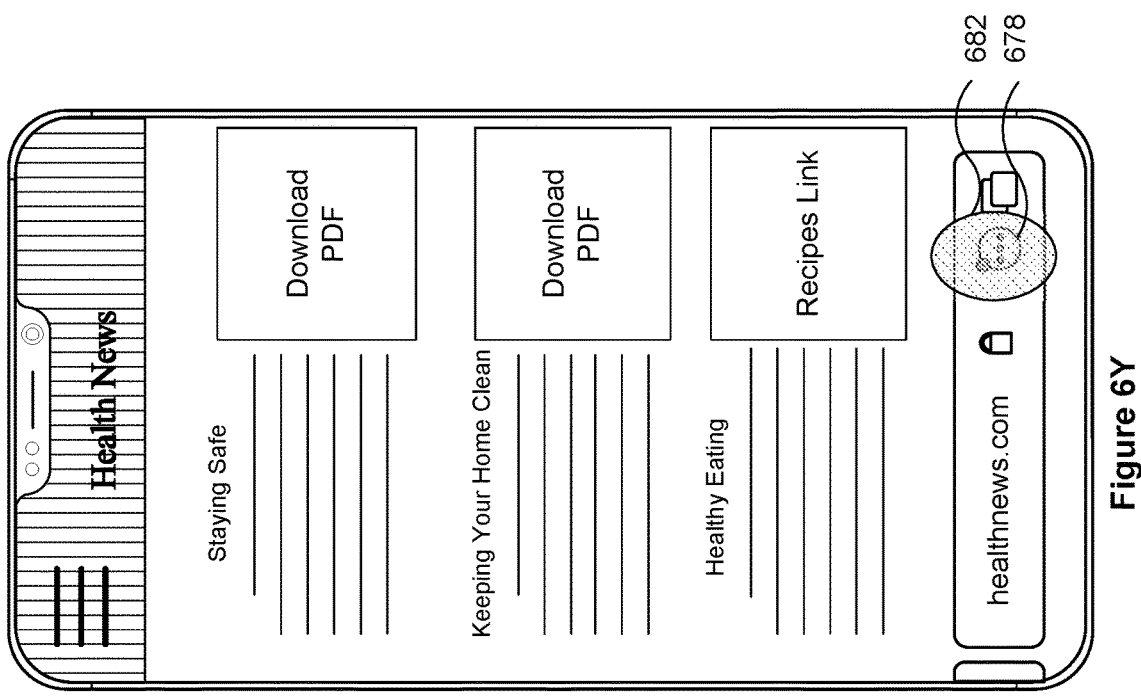
Figure 6A:
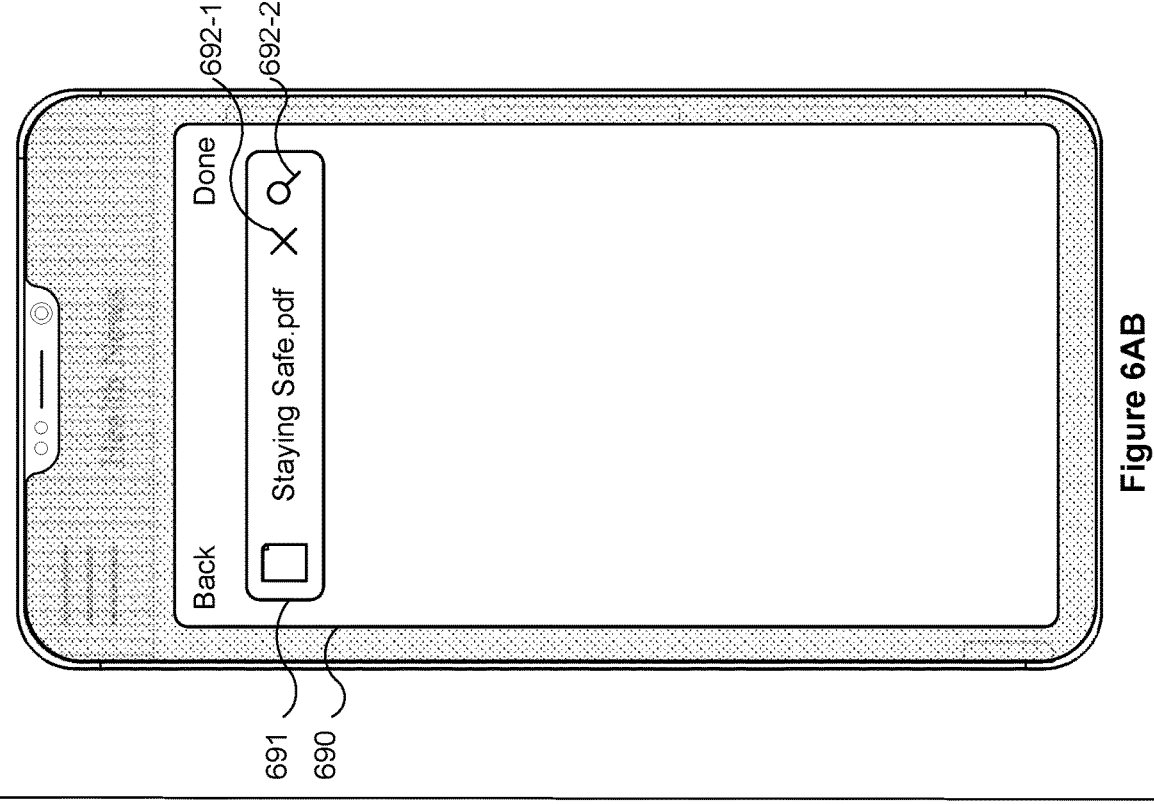
Figure 6A:
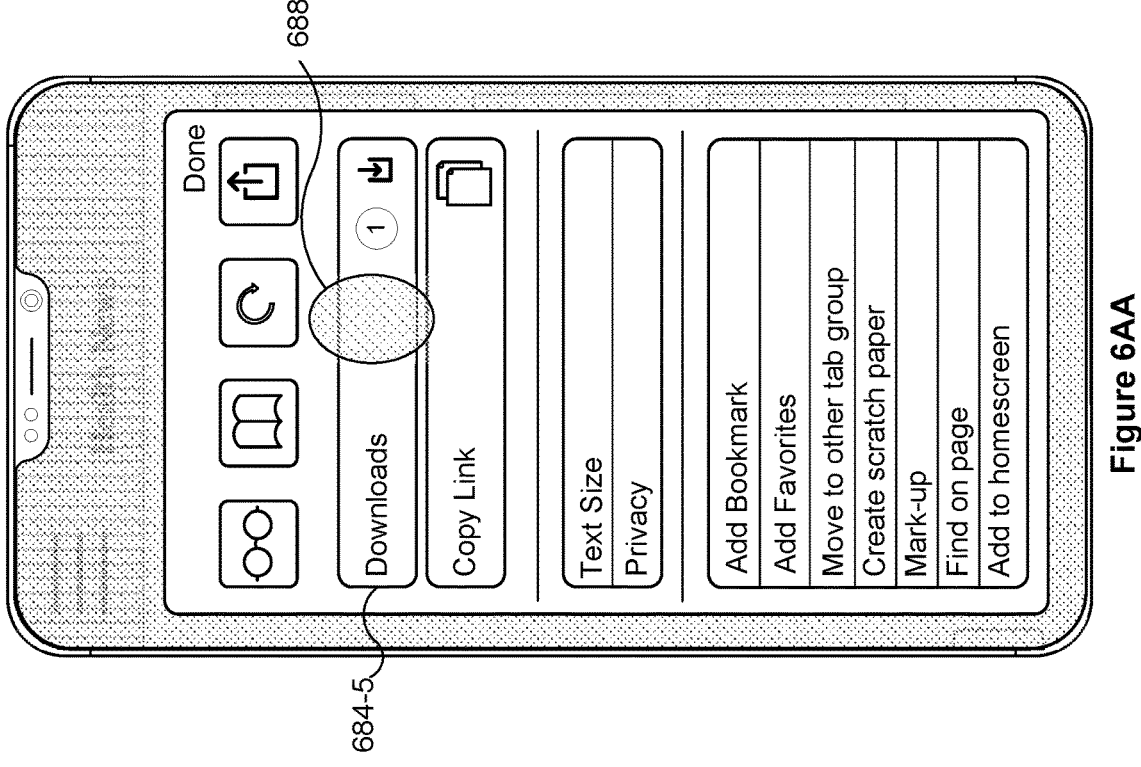
Figure 6A:
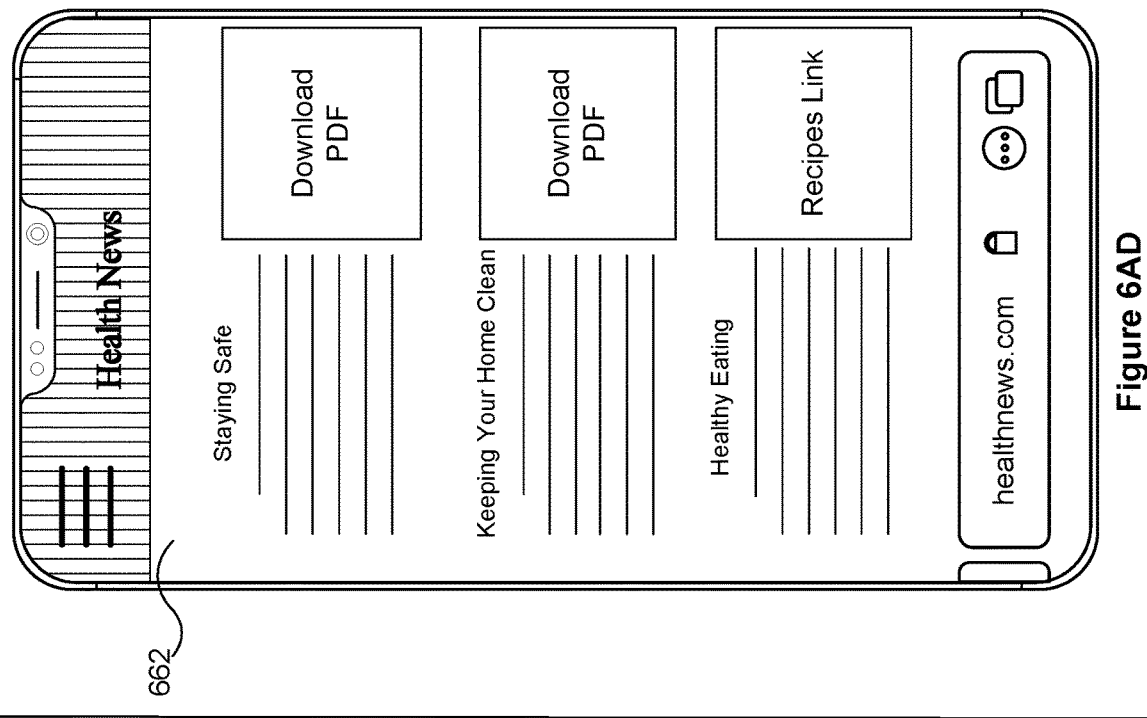
Figure 6A:
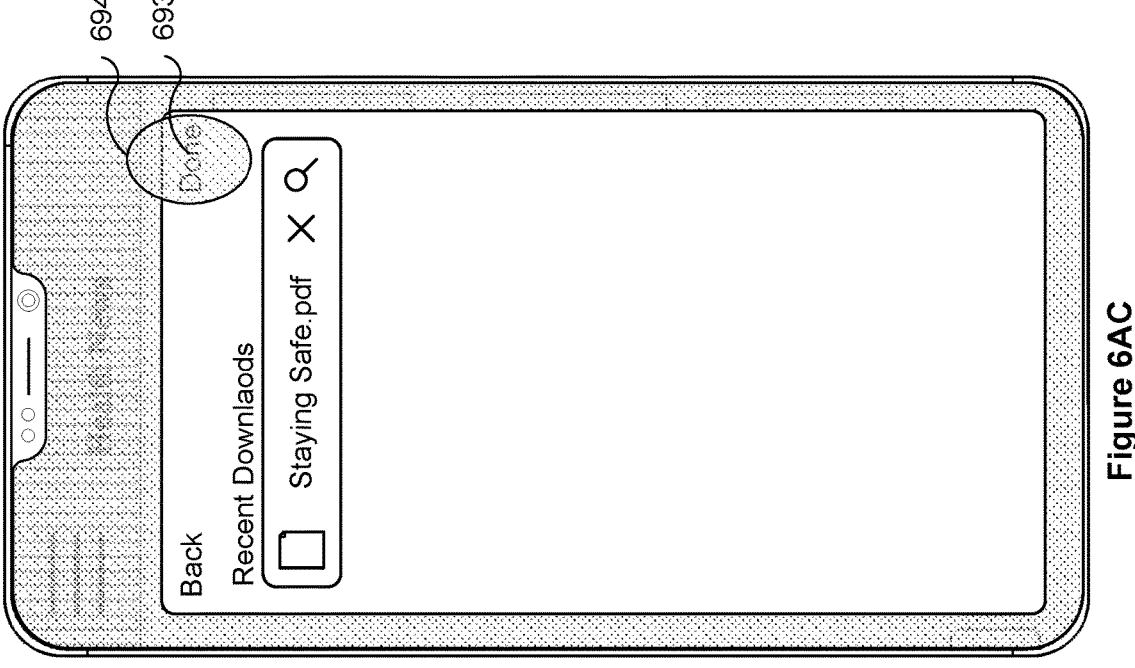
Figure 6A:
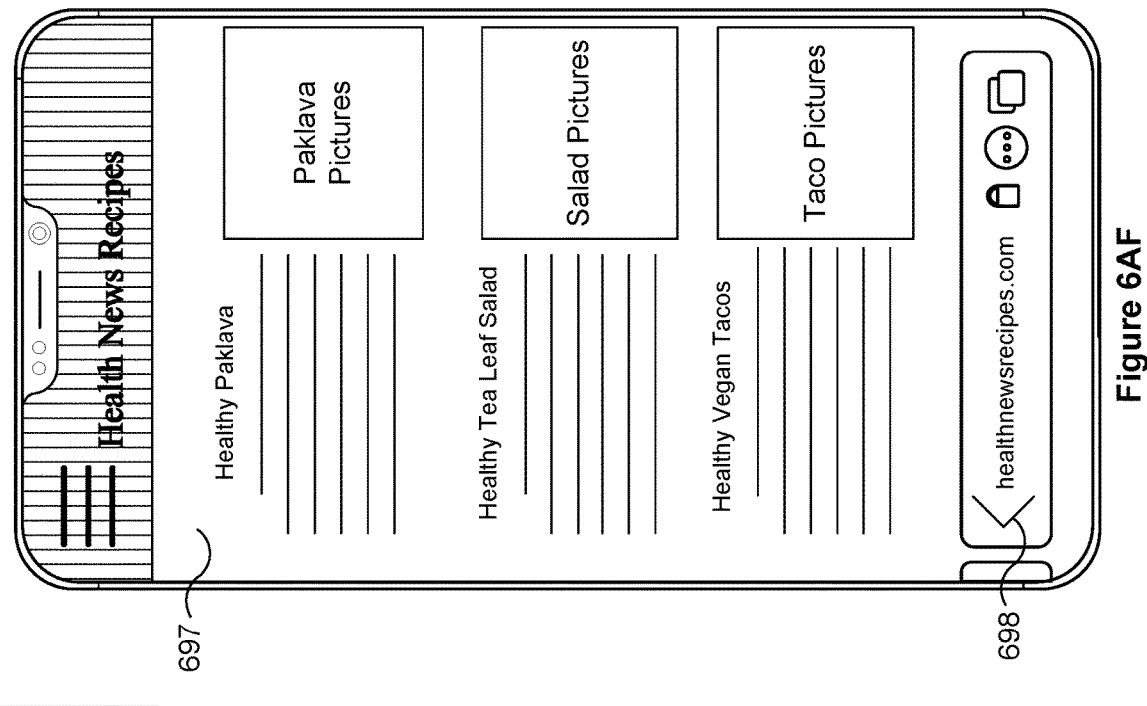
Figure 6A:
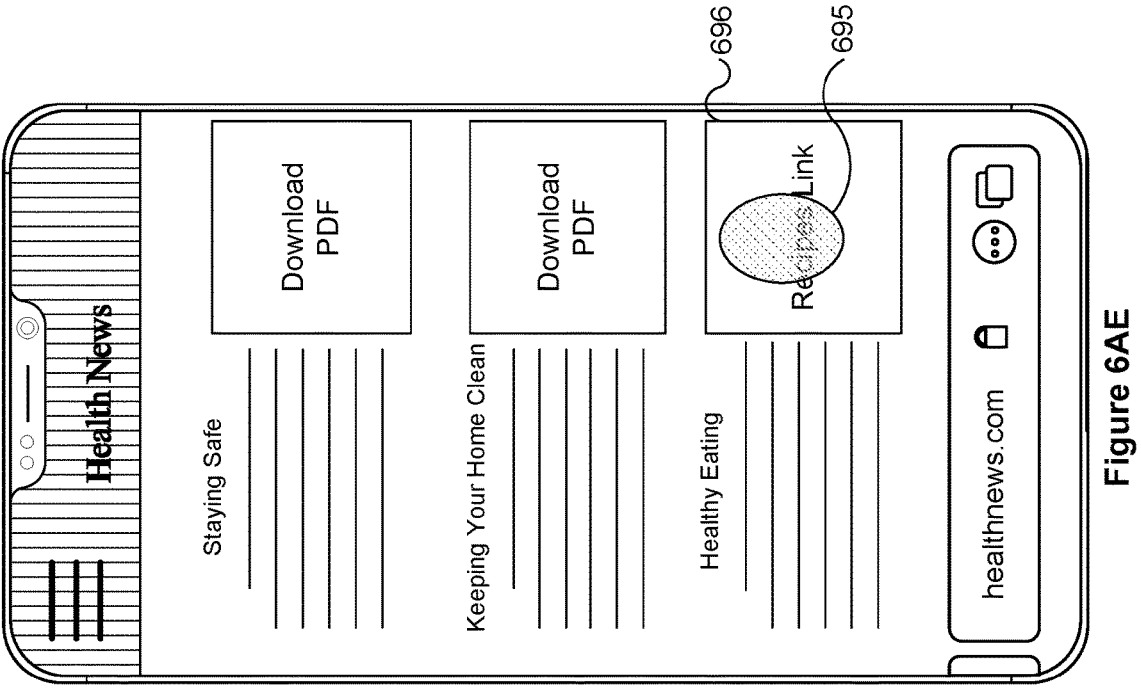
Figure 6A:
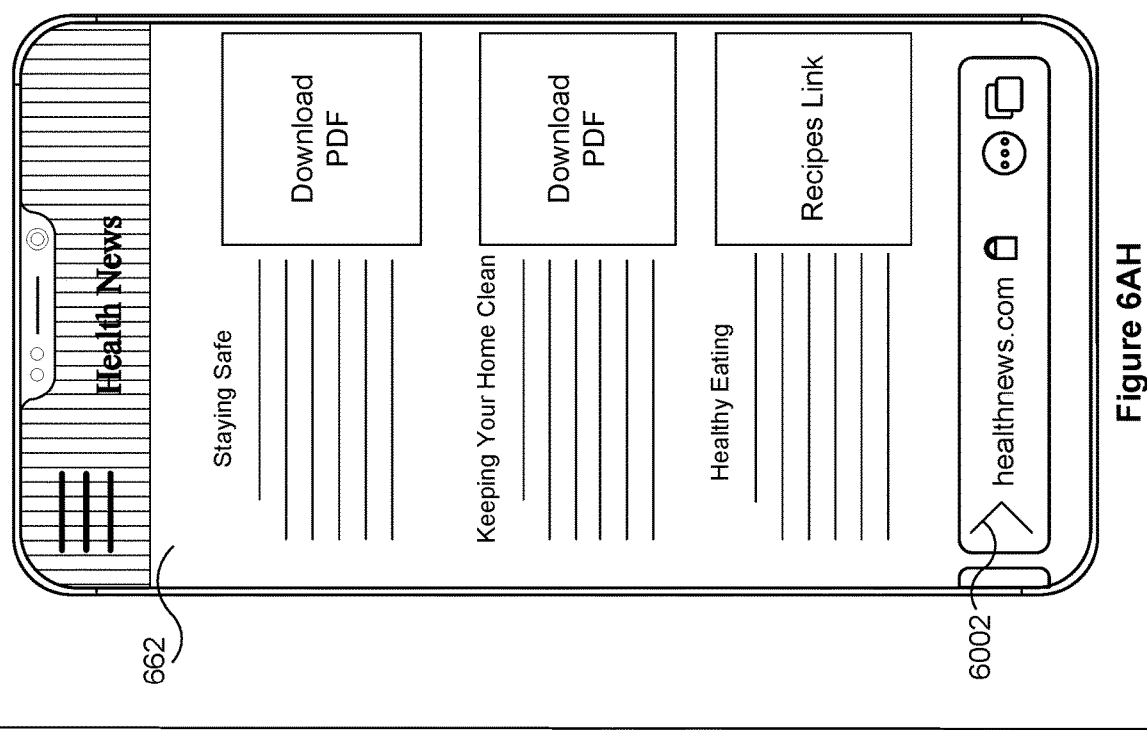
Figure 6A:
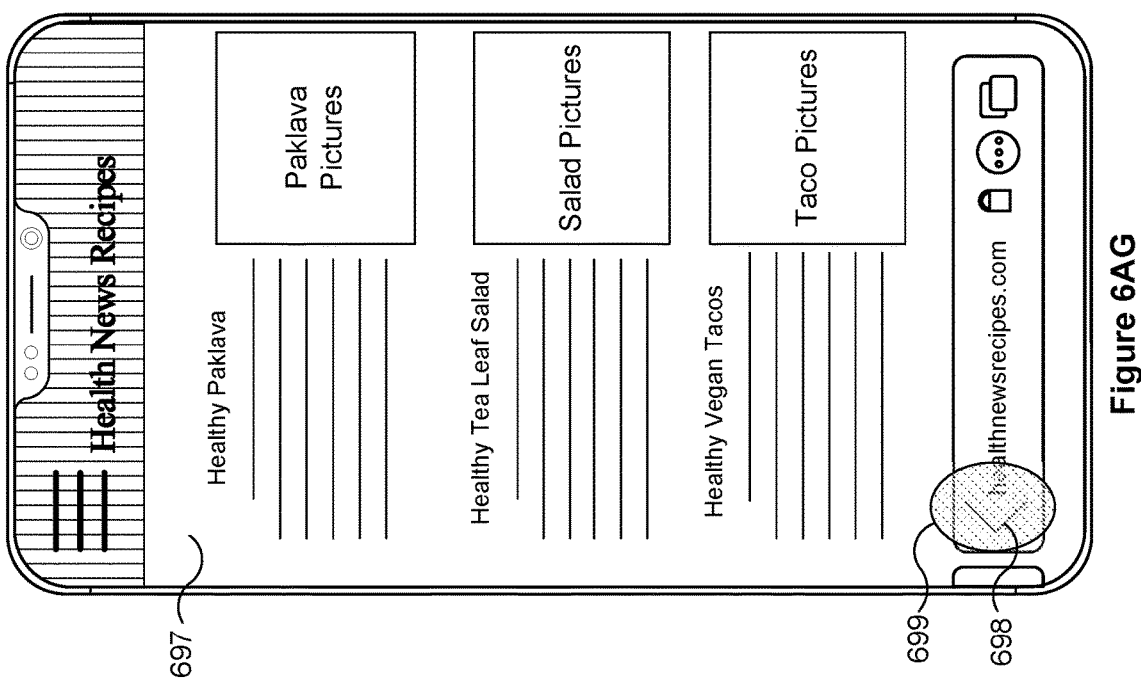
Figure 6A:
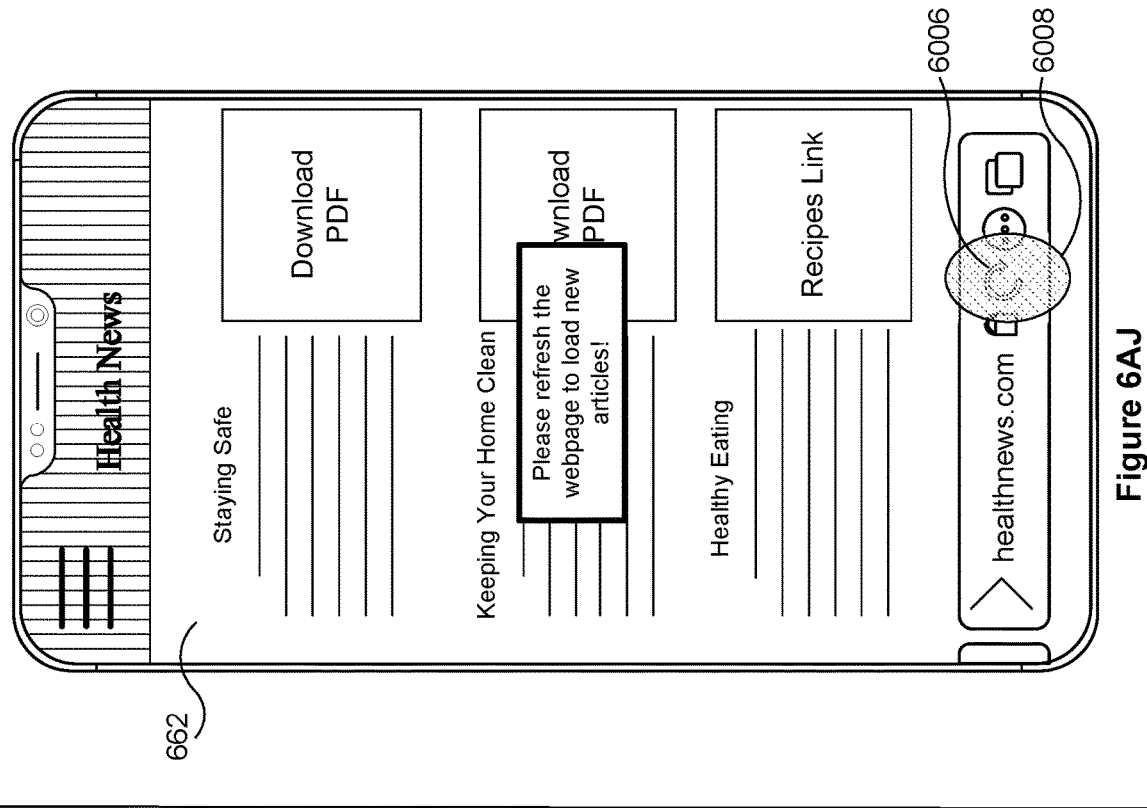
Figure 6A:
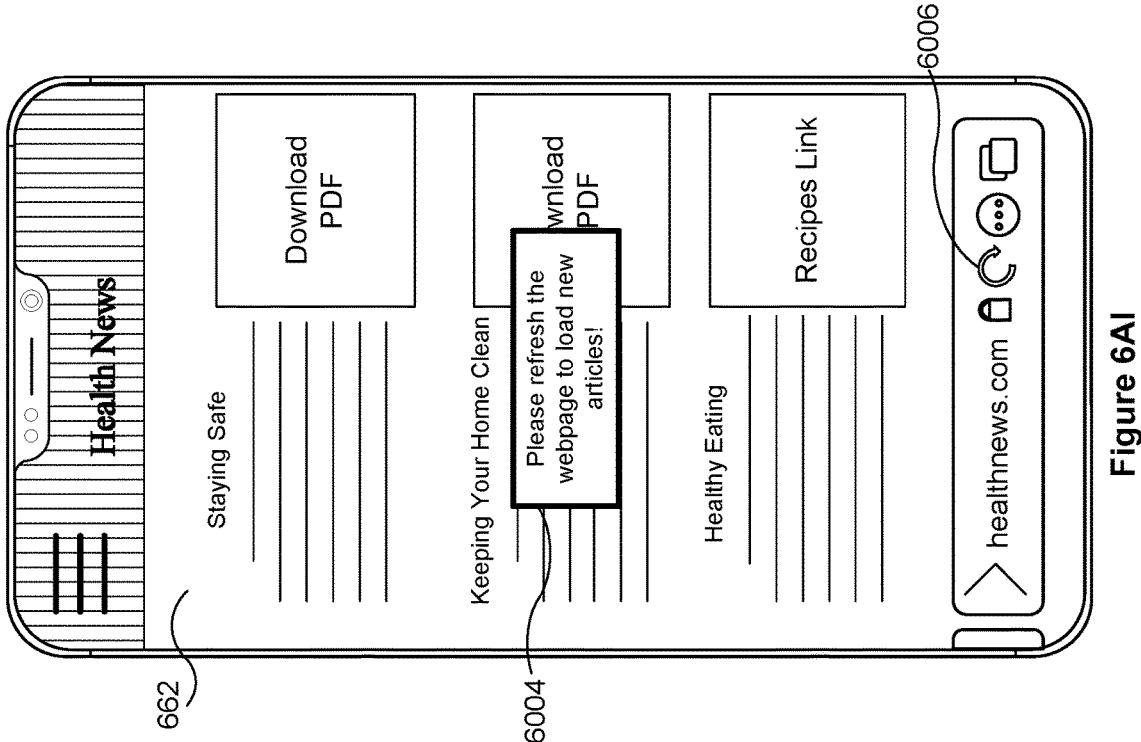
Figure 6A:
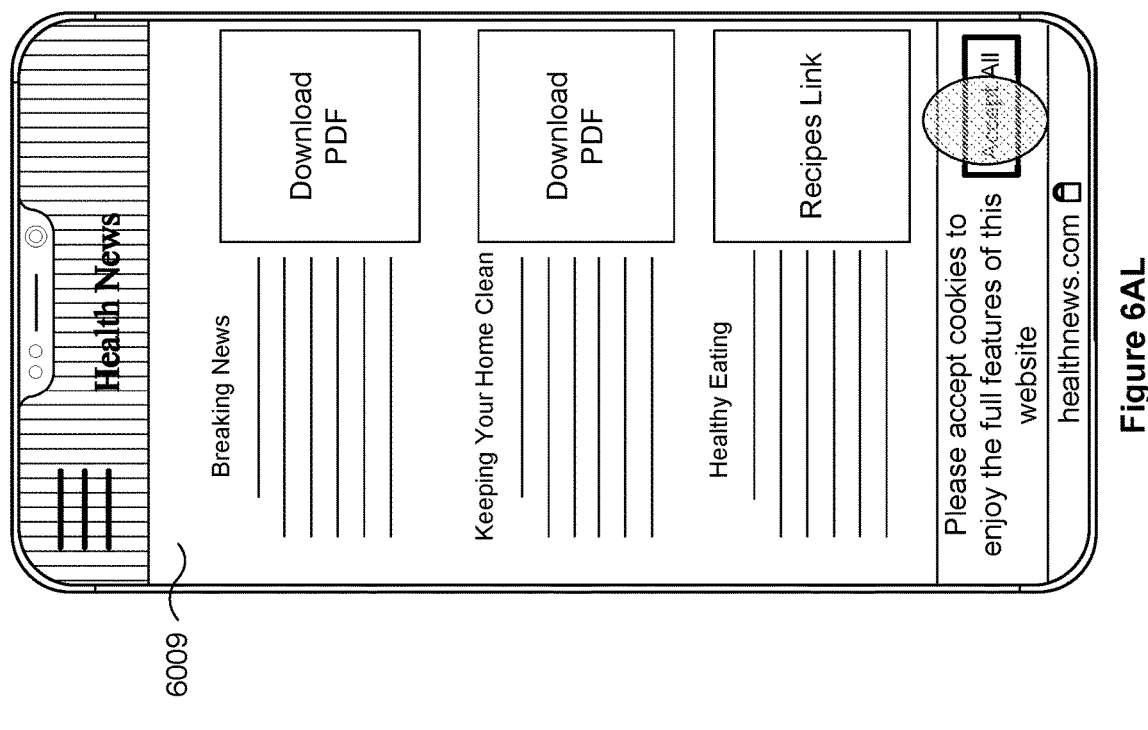
Figure 6A:
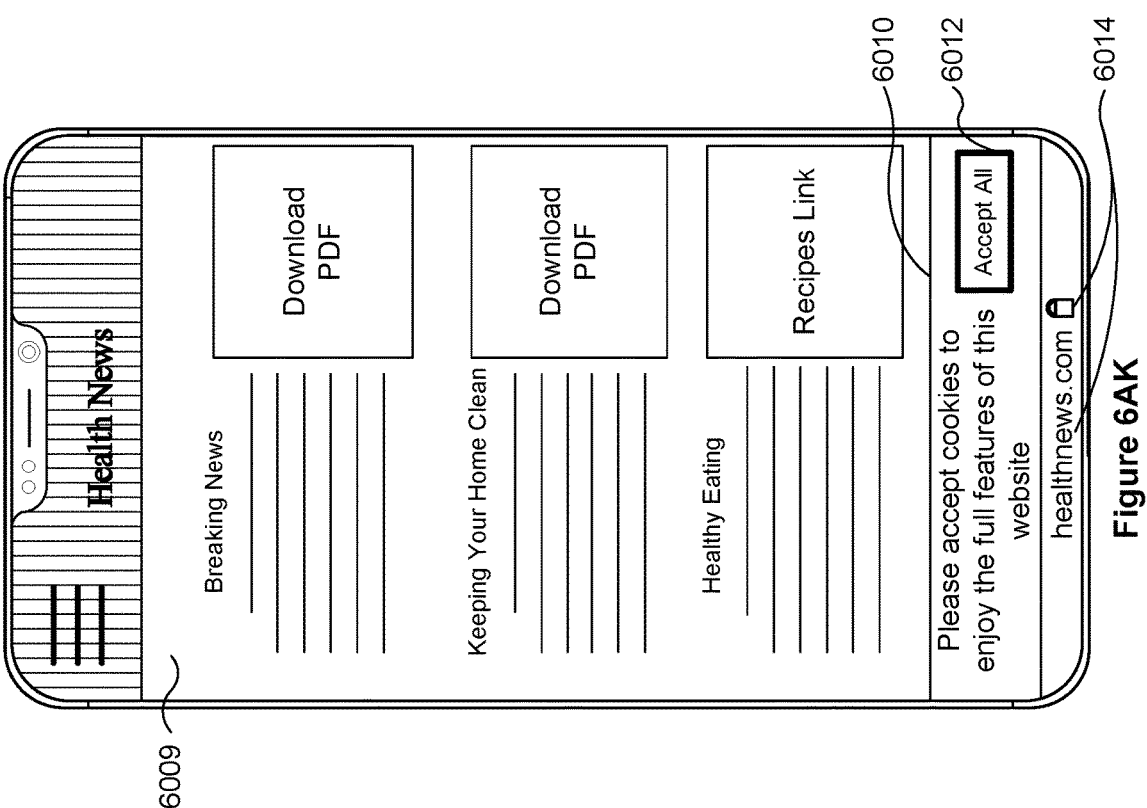
Figure 6A:
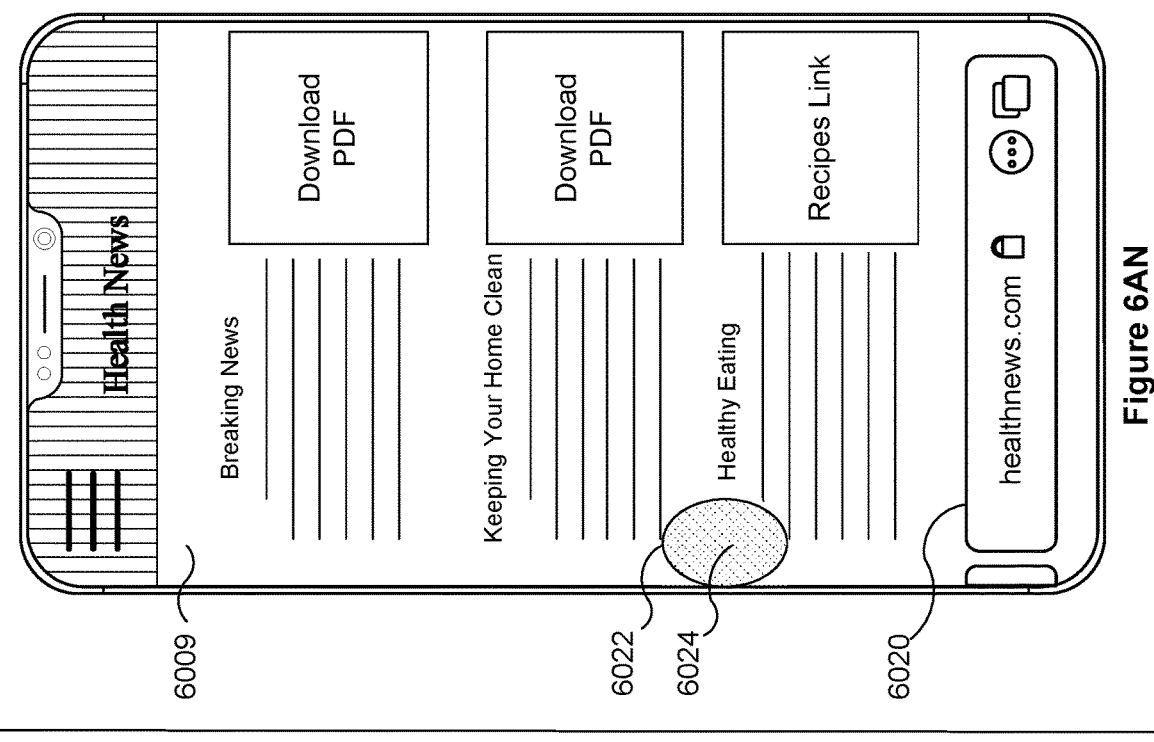
Figure 6A:
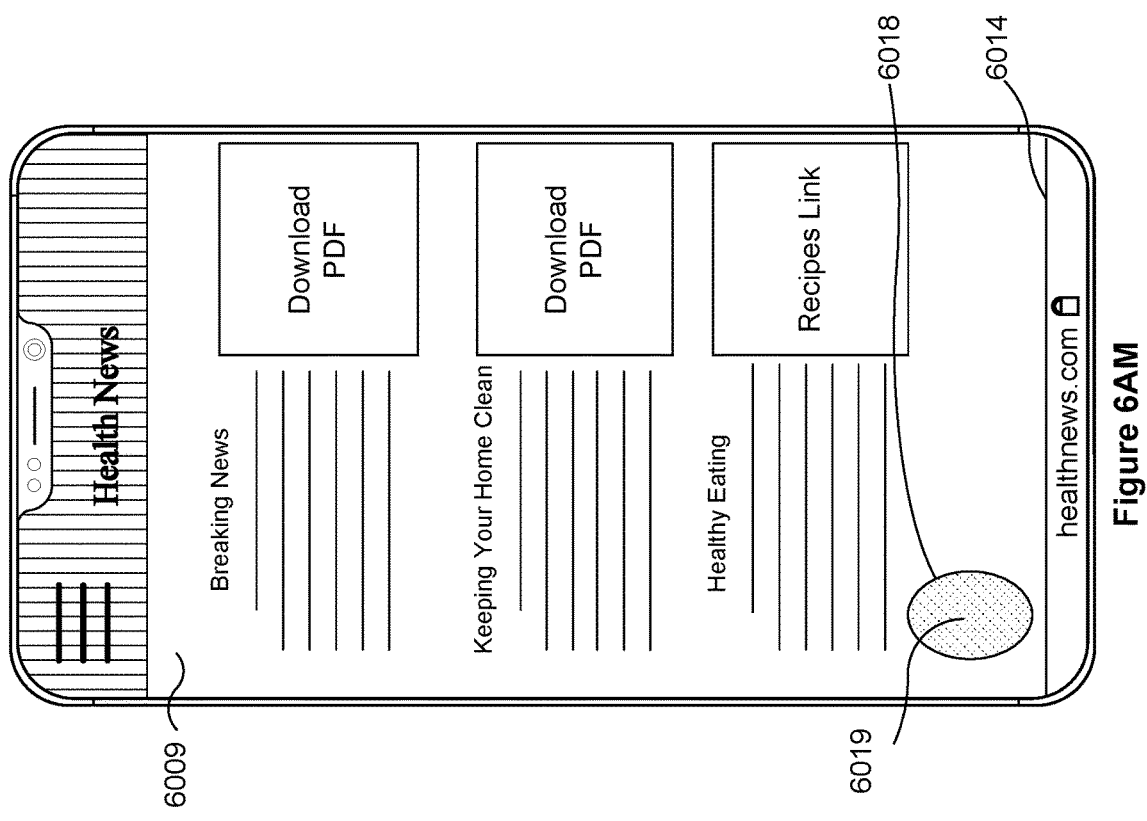
Figure 6A:
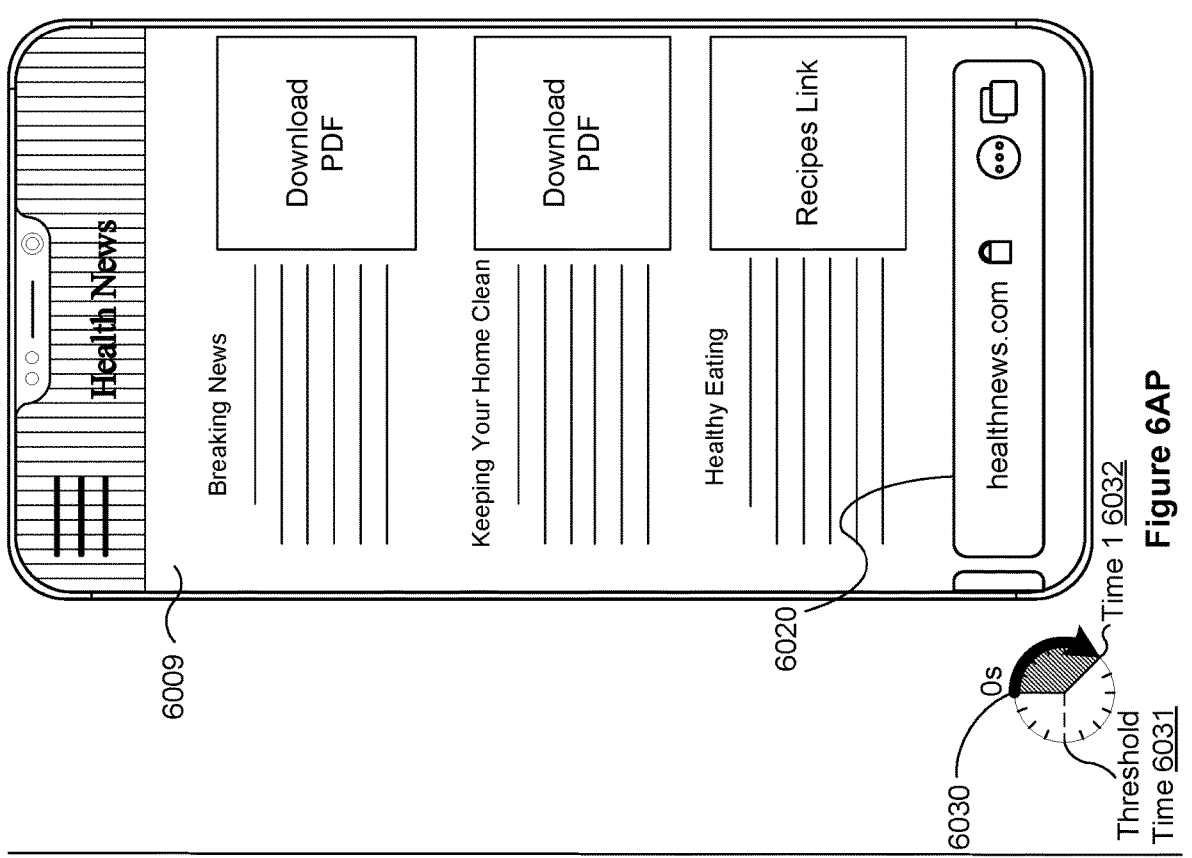
Figure 6A:
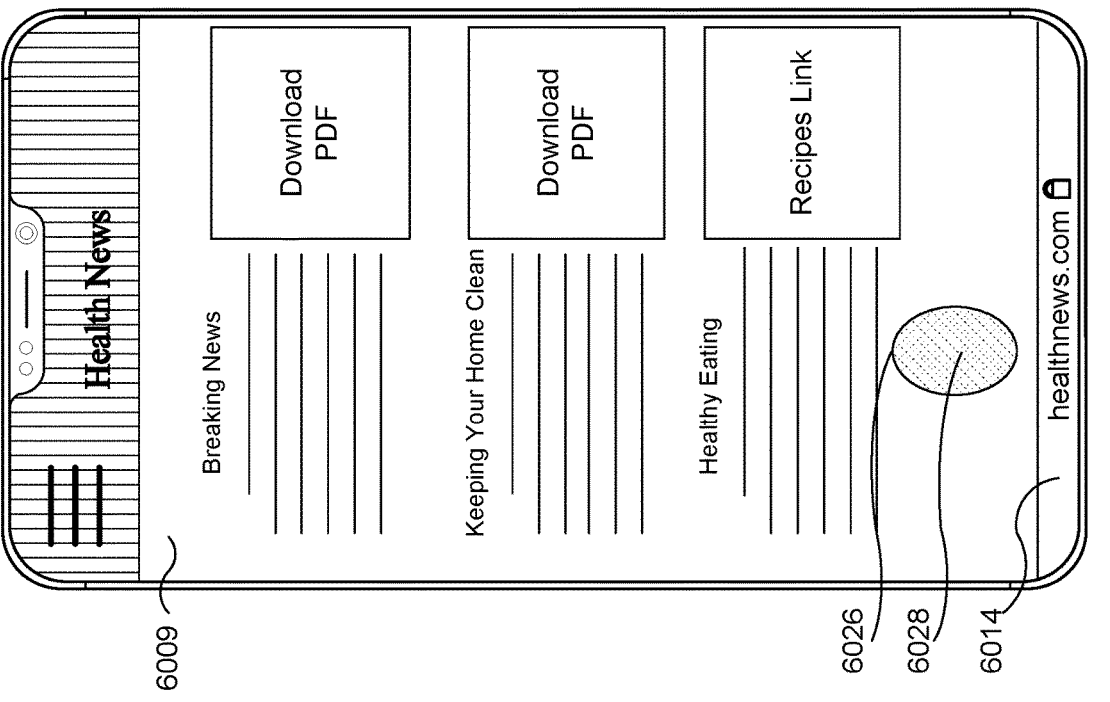
Figure 6A:
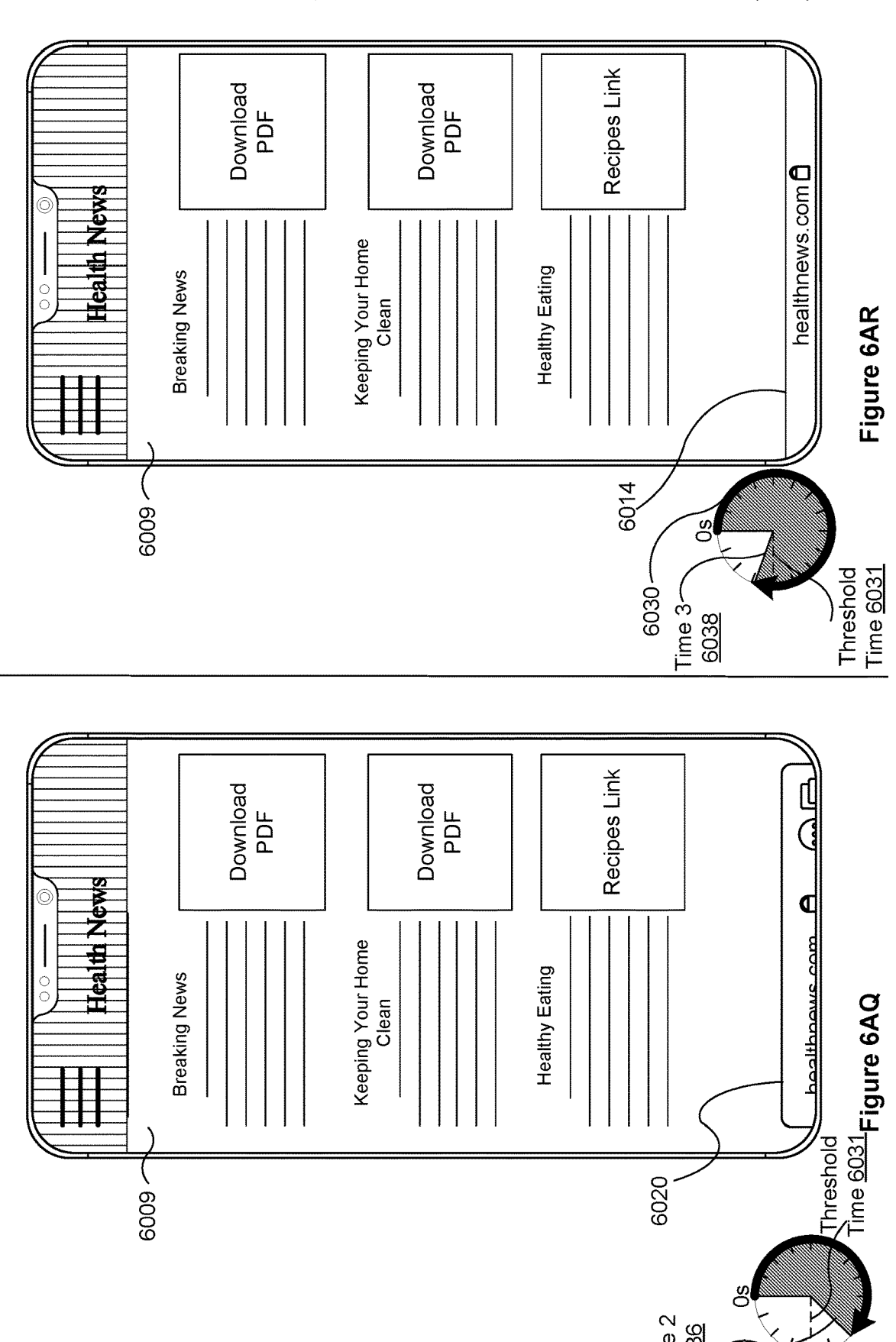
Figure 6A:
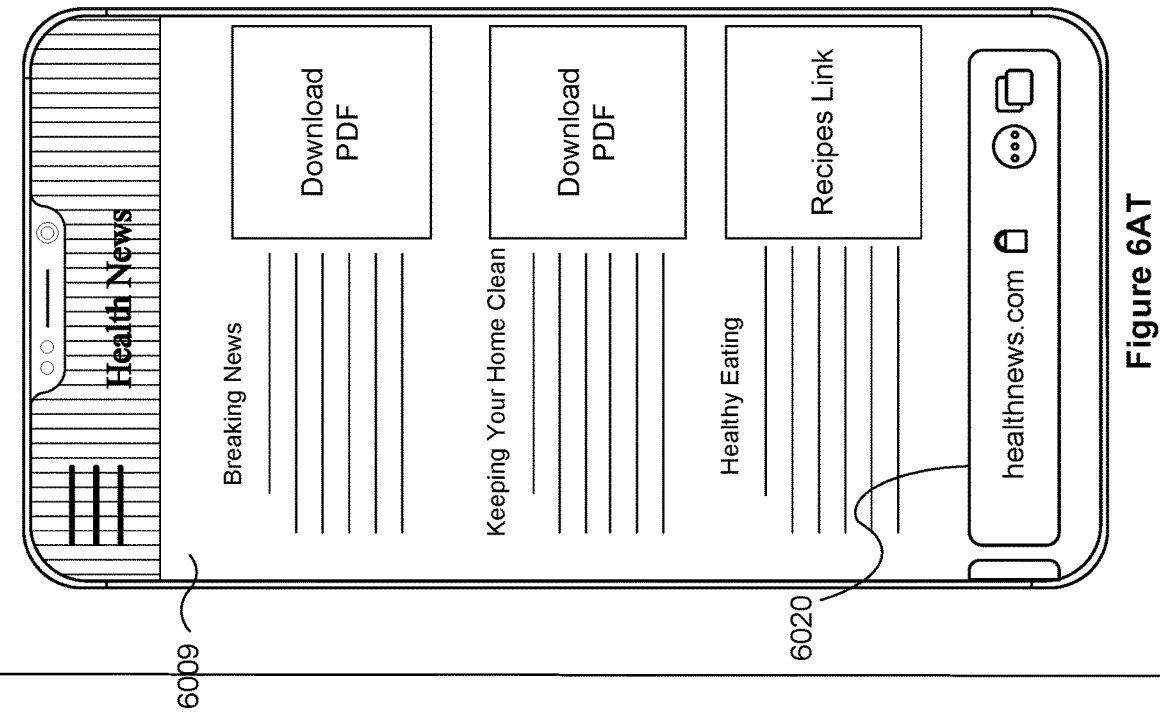
Figure 6A:
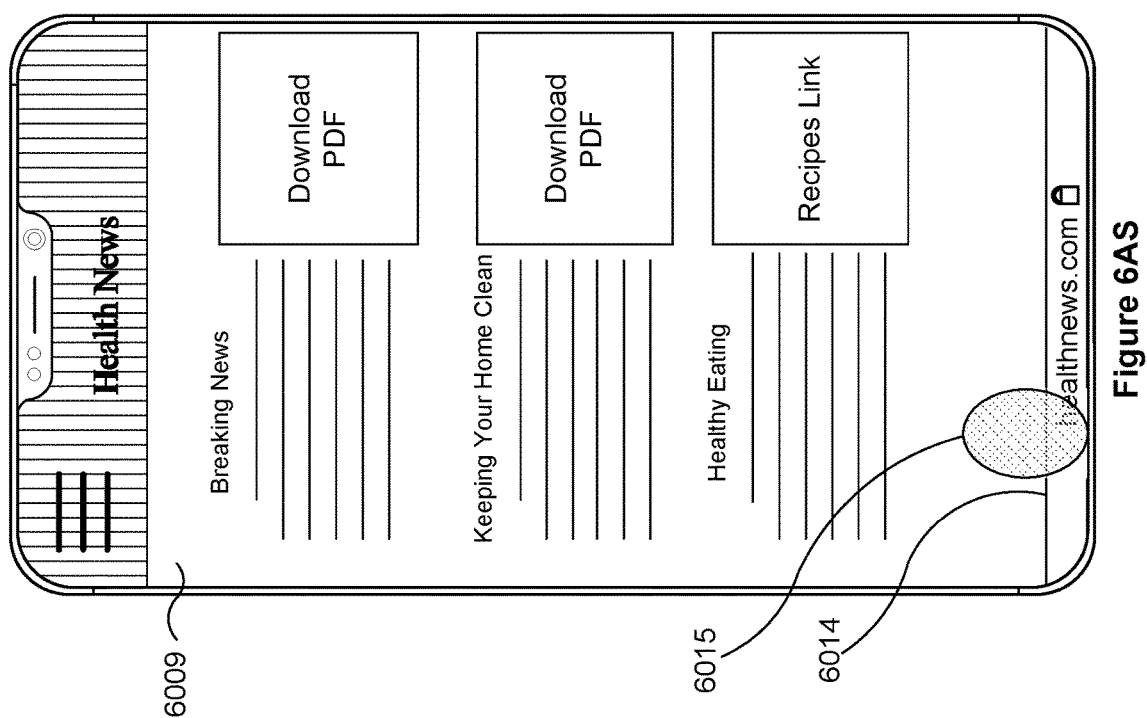
Figure 6A:
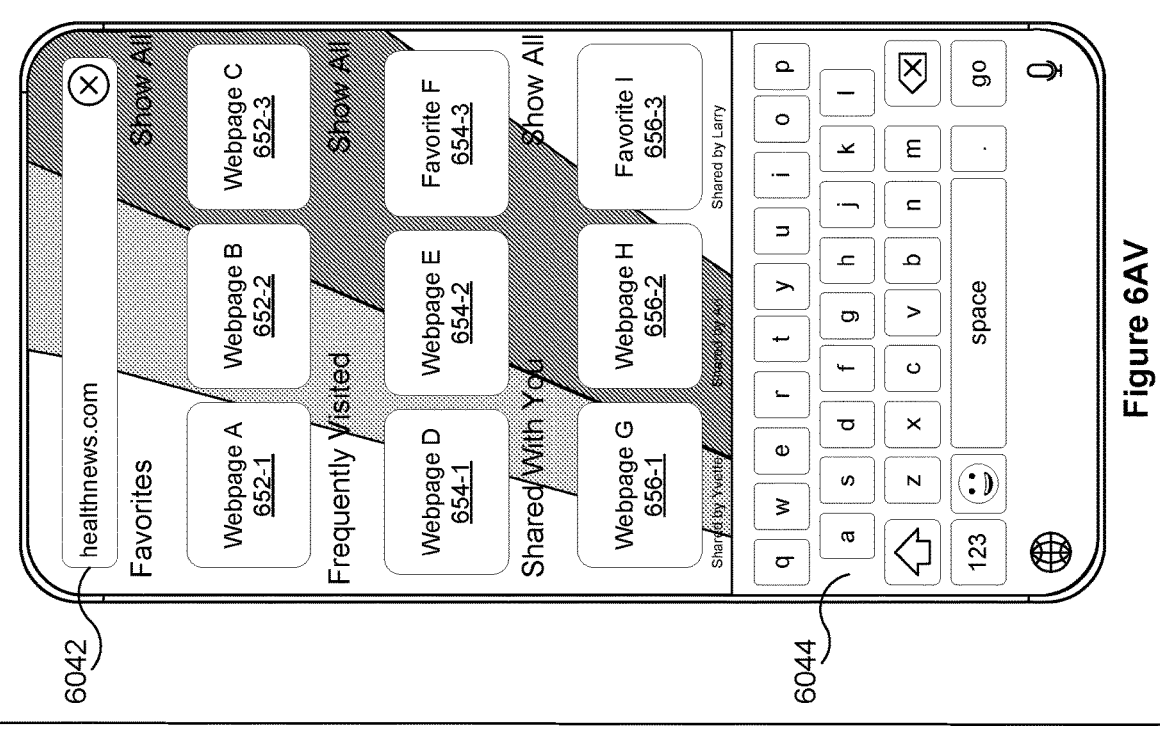
Figure 6A:
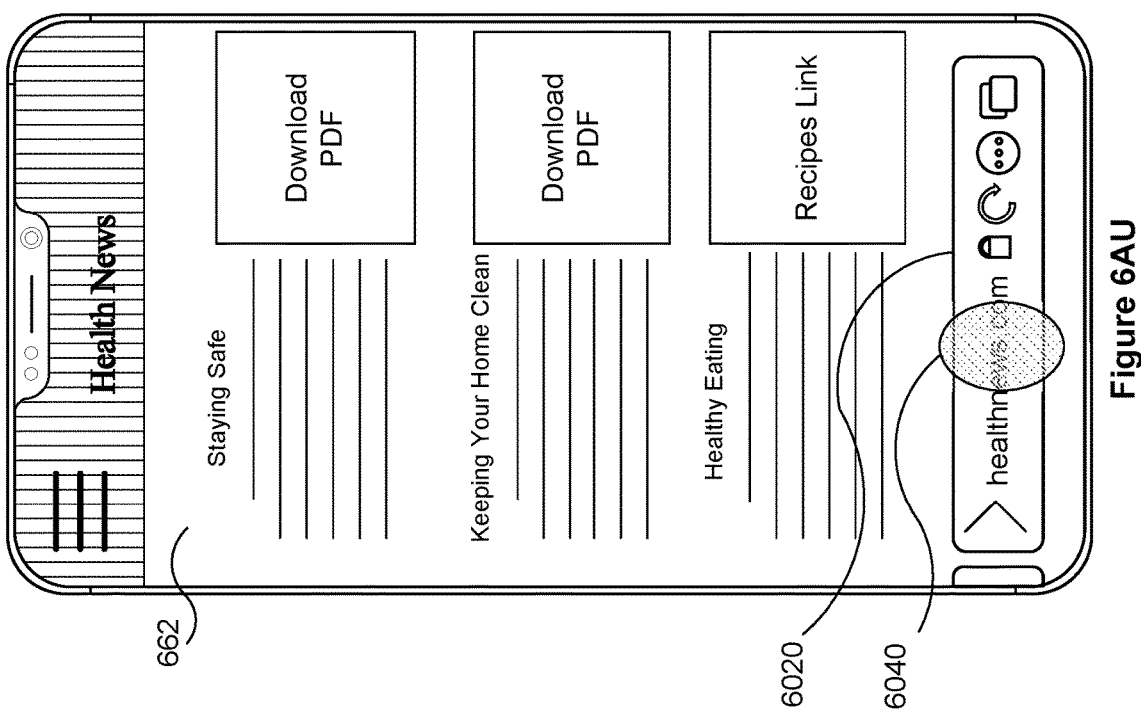

FIG. 6V illustrates an input 674 on button 676, that when selected initiates a download of a PDF document. FIG. 6W shows that in response to a download request, e.g., caused by the input 674 on button 676, the multifunction user interface element 678 indicates download progress 679. In some embodiments, the download progress 679 is indicated by a progress bar that wraps around the circumference of the multifunction user interface element 678. FIG. 6X shows the multifunction user interface element 678 further updated to now include a badge 680 that indicated that the download has completed. FIG. 6Y illustrates an input 682 over the multifunction user interface element 678. FIG. 6Z illustrates that in response to the input 682 over the multifunction user interface element 678, a user interface 683 that includes a plurality of controls is displayed. In some embodiments, the plurality of controls includes some or all of the following:

a reading list button 684-1 for revealing webpages added to a reading list, a bookmarked button 684-2 for revealing bookmarked webpages, a refresh button 684-3 for refreshing the webpage, a share button 684-4 for sharing a webpage, a download button 684-5 for revealing more information of the downloads, a copy link button 684-6 for copying the webpages URL, a text size button 684-7 for adjusting the text size on the webpage, a privacy button 684-8 for revealing privacy information of the website (e.g., certificate information, whether the connection is secure, cookies, etc.), an add bookmark button 684-9 for adding a webpage as a bookmark, an add favorites button 684-10 for adding a webpage to favorited list, a move to another tab group button 684-11 which allows for a user to request to move a webpage from one tab group to another tab group, a create scratch paper button 684-12, that when selected reveals a notepad that allows for a user to take notes that in some embodiments are specific to each visited webpage (e.g., on a shopping website, a note may be taken that includes a discount code for a later purchase)

a mark-up button 684-13, that when selected allows for the user to mark-up (e.g., write on top of) a webpage, a find on page button 684-14, that when selected allows for a user to perform a keyword search of a webpage, an add to home screen button 684-15 that when selected causes a shortcut to a webpage (e.g., an icon) to be displayed on the home screen user interface of the electronic device.

In some embodiments, the download button 684-5 also includes a badge 686 indicating the number of recent downloads.

FIG. 6AA shows an input 688 occurring at download button 684-5. FIG. 6BB illustrates that in response input 688 occurring at download button 684-5, a user interface 690 that includes a download list is displayed. The user interface 690 includes a list of the recently downloaded item 691 and an option 692-1 to find access the file in a file repository and a delete affordance 692-2 for either deleting the download or removing it from the user interface 690.

FIG. 6AC illustrates an input 693 at done button 694 for closing the user interface 690. FIG. 6AD shows that in response to input 693 at done button 694, webpage 662 is redisplayed. FIG. 6AE illustrates an input 695 at link 696 titled "Recipes link." FIG. 6AF illustrates that in response to input 695, webpage 697 is displayed, and back webpage navigation button 698 is displayed. FIG. 6AG illustrates an input 699 being received at back webpage navigation button 698. FIG. 6AH illustrates that in response to input 699 being received at back webpage navigation button 698, webpage 662 is redisplayed. FIG. 6AH also illustrates that the back webpage navigation button 698 is no longer displayed and forward webpage navigation button 6002 is displayed.

FIG. 6AI shows webpage 662 displaying a pop-up 6004 that indicates that a page refresh is needed to load new articles. FIG. 6AI also dynamically adds a refresh button 6006 as the webpage is requesting the user to refresh the webpage. FIG. 6AJ illustrates an input 6008 at refresh button 6006. In other embodiments, other buttons are dynamically displayed in the tab based on activity within the web browser application. In some embodiments, the webpage can also be refreshed by performing a substantially vertical gesture that moves from an upward location to a downward location.

FIG. 6AK shows refreshed webpage 6009 that is displayed in response to an input 6008 at refresh button 6006. FIG. 6AK also shows a webpage region 6010 that asks a user to accept cookie(s) associated with refreshed webpage 6009. The webpage region 6010 includes a button 6012 tilted "Accept All" for accepting all the cookie(s) associated with refreshed webpage 6009. Since the webpage region 6010 would conflict with a displayed tab that overlays the refreshed webpage 6009, the tab is not displayed. Instead, a minimized tab 6014 that includes webpage name and security information is displayed at the bottom (or top) of refreshed webpage 6009.

FIG. 6AL shows an input 6016 at the button tiled "Accept All." FIG. 6AM shows that in response to input 6016 the webpage region 6010 disappears. FIG. 6AM also shows an input 6018 (e.g., a tap input) at a portion 6019 of the refreshed webpage 6009. In some embodiments, this portion of the webpage 6009 does not have any interactive user interface elements that would cause a change in what is being displayed (e.g., no hyperlink).

FIG. 6AN shows that in response to input 6018 (e.g., a tap input) at a portion of the refreshed webpage 6009 that does not have any interactive user interface elements, the minimized tab 6014 is maximized into full tab 6020. FIG. 6AN illustrates input 6022 includes at a portion 6024 of the refreshed webpage 6009. This portion 6024 of the refreshed webpage can be any portion of the refreshed webpage that does not cause a change in what is displayed on the webpage (e.g., a non-interactive portion of the webpage).

FIG. 6AO shows that in response to input 6022, full tab 6020 is minimized into minimized tab 6014. FIG. 6AO also shows an input 6026 (e.g., a tap input) at a portion 6028 of the refreshed webpage 6009.

FIG. 6AP shows that in response to input 6026 (e.g., a tap input) at a portion 6028 of the refreshed webpage 6009, minimized tab 6014 is maximized into full tab 6020. FIG. 6AP also shows a schematic of a timer 6030, which is shown to indicate that once a time threshold 6031 is reached, the full tab 6020 is automatically minimized into the minimized tab 6014. In some embodiments, the timer is reset in response to a tap input on a non-interactive portion of the webpage. Timer 6030 indicates that the current time is "time 1" 6032, which is below the time threshold 6031.

Timer 6030 of FIG. 6AQ indicates that the current time is "time 2" 6036, which is greater than "time 1" 6032. As time progresses full tab 6020 begins to minimize. Timer 6030 of FIG. 6AR indicates that the current time is "time 3" 6038 now exceeds the time threshold 6031. Once the time threshold is met, full tab 6020 is fully minimized into the minimized tab 6014.

FIG. 6AS illustrates an input 6015 occurring at minimized tab 6014. FIG. 6AT illustrates that in response to input 6015 occurring at minimized tab 6014, maximizes into full tab 6020. In some embodiments, an animation can occur that illustrates the minimized tab 6014 transitioning into full tab 2020.

FIG. 6AU illustrates the full tab 6020 being displayed again, and also illustrates an input 6040 occurring over the full tab 6020. FIG. 6AV illustrates that in response to input 6040 occurring over the full tab 6020, the full tab 6020 ceases to be displayed. Instead, an address/search bar 6042 is displayed in an upper region of the user interface and a keyboard 6044 is displayed at a lower region of the user interface. Keyboard inputs are shown in the address/search bar 6042, and upon receiving an input at the "go" button the request webpage is retrieved, or a search is performed (e.g., at a website's search engine). In some embodiments, an input received outside of the address/search bar 6042 and keyboard 6044 causes the UI to redisplay the webpage 662, as shown in FIG. 6AU.

FIGS. 7A-7E are flow diagrams illustrating method 700 of interacting with a web-browser application in accordance with some embodiments. Method 700 is performed at a portable device (e.g., device 300, FIG. 3, or portable multifunction device 100, FIG. 1A) that is in communication with a display generation component (e.g., a display integrated into a portable device, such as touch screen 112 of FIG. 2), or a dedicated display that a computing device connects to), and one or more input devices e.g., a touch-sensitive surface (e.g., touch screen 112 of FIG. 112), an input device for receiving inputs at virtual reality device or augmented reality device, a mouse, a keyboard, etc.) (702). In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an intuitive way to interact with a web-browser application. The method reduces the number, extent, and/or nature of the inputs from a user when interacting with a web-browser application, thereby creating a more efficient human-machine interface. For battery-operated electronic devices, enabling a user to interact with a web-browser application faster and more efficiently conserves power and increases the time between battery charges (e.g., it improves responsiveness of the user interface, improves the visual feedback provided to the user (e.g., by making the device appear more responsive to user input), and enhances the operability of the device (e.g., by helping the user to provide proper inputs and reducing user mistakes when operating/interacting with the device).

Receiving a single gesture, at a portable device, that can be used to perform different actions depending on the location the gesture is received on a touch sensitive surface is highly convenient to users. This is highly convenient because the user needs to memorize fewer gestures. In particular, having a single gesture perform either a webpage navigation function (e.g., move forwards or backwards a webpage) or perform tab switching based on the location in-which the gesture is received makes interacting with touch-screen user interfaces easier. Additionally, providing gestures to perform actions instead of dedicated buttons declutters the user interface and allows the user to interact more with their desired content. Reducing the number of user interface elements and reducing the number of unique gestures makes the device easier to interact and does not require the user to learn numerous controls, thereby providing additional control options without cluttering the UI with additional displayed controls.

The portable device displays (704), via the display generation component, a web-browser user interface (e.g., a web browser user interface that is used for navigating and using a web-browser application (e.g., example web-browser user interface 604 of FIG. 6A)) that includes a currently displayed webpage (e.g., currently displayed webpage 606 of FIG. 6A) and an associated tab in a tab row (e.g., associated tab 608 in FIG. 6A). In some embodiments, the currently displayed webpage forms part of a group of webpages. In some embodiments, the tab row does not display all of the tabs in the tab row, and in some embodiments only displays an indication is displayed that indicates other tabs are open.

In some embodiments, the portable device receives (706) a swipe gesture (e.g., FIG. 6A and FIG. 6B illustrate a swipe gesture occurring in a first direction (e.g., from right to left)) in a first direction (e.g., the first direction is along a horizontal axis). In some embodiments, in response to receiving (708) the swipe gesture in the first direction: in accordance with a determination that the swipe gesture in the first direction occurs at a location corresponding to the associated tab in the tab row (e.g., FIG. 6A-6B illustrate horizontal swipe gesture 610-1 and 610-2 occurring at the associated tab 608)), concurrently: the portable device ceases (710) to display the currently displayed webpage (e.g., FIG. 6B illustrates that currently displayed webpage 606 of FIG. 6A is being moved out of the example web-browser user interface 604 of FIG. 6A), and the portable device scrolls the tab row to cause display of an additional webpage (or a start page user interface for selecting saved or predefined webpages) and its associated additional tab. For example, FIG. 6B-6C shows that in response to receiving the swipe gesture at, displaying another tab 612 and another associated webpage 614).

In some embodiments, in response to receiving (708) the swipe gesture in the first direction: in accordance with a determination that the swipe gesture in the first direction occurs at a location corresponding to the currently displayed webpage, the portable device performs (712) a webpage navigation function. For example, moving forward one or more webpages, moving back one or more webpages, refreshing one or more webpages, and/or selecting a link on a webpage (e.g., FIG. 6C-6E show that the same swipe gesture (e.g., horizontal swipe gesture 616-1 and 616-2) occurring on the webpage 614 but on the other associated webpage, and in response to swipe gesture 616-1 and 616-2, the webpage moves forward a webpage to display webpage 618)).

In some embodiments, the swipe gesture in a first direction is a swipe gesture moving from left to right (714). For example, FIGS. 6A-6D indicate that the horizontal swipe gestures 610-1, 610-2, 616-1, and 616-2 are occurring from left to right. In some embodiments, the swipe gesture in a first direction is a swipe gesture moving from right to left. Having a simple gesture such as a swipe moving from left to right across the display, provides an intuitive way to interact with the portable device and also provides an easy to remember gesture which ensures the user will use the features associated with the gesture, thereby reducing the number of inputs needed to perform an operation.

In some embodiments, the portable device receives (716) the swipe gesture in a second direction (e.g., perpendicular to the first direction, and/or in an opposite direction to the first direction) (e.g., FIG. 6F shows a swipe gesture 622 occurring over the other tab 612 in a vertical direction). In some embodiments, the length and/or duration of the gesture increases depending on the sizing of the display. For example, a swipe in a direction corresponding to a major length of the display can be larger than a swipe in a direction correspond to a minor length of the display. In some embodiments, in response to receiving the swipe gesture in the second direction: in accordance with a determination that the swipe gesture occurs at a location corresponding to the associated tab in the tab row (e.g., as shown in FIG. 6F), displaying a plurality of representations of webpages (e.g., FIG. 6G illustrates a tab management user interface 624 that displays a scrollable list of all tabs 626 in this current web-browsing session), including a representation of the currently displayed webpage (e.g., scrollable list of all tabs 626), the plurality of representations of webpages corresponding to at least some of the group of webpages, and in accordance with a determination that the swipe gesture occurs at a location corresponding to the currently displayed webpage (e.g., FIGS. 6P-6R show a scroll-down gesture 666-1, 666-1, 666-3 occurring over the webpage 662, which causes the webpage 662 to be scrolled), scrolling the currently displayed webpage.

Allowing a swipe in the vertical direction to cause either scrolling of a webpage or bringing up a tab-switching user interface depending on the location at which the swipe is received, provides a simplified interaction with the portable device as the user does not need to remember multiple complex inputs to bring up certain menus. Instead the user need only to remember where the input needs to be received at. Moreover, a tab-switching user interface provides the user with a simple way of accessing open tabs in the current session, thereby reducing the number of inputs needed to perform an operation.

In some embodiments, the swipe gesture in the second direction is a swipe gesture moving from a downward location to an upward location (e.g., FIG. 6F, 6P-6R show a swipe gesture 622 moving from a downward location to an upward location) (718). Having a simple gesture such as swiping from a downward location to an upward location across the display provides an intuitive way to interact with the portable device and also provides an easy to remember gesture which ensures the user will use the features associated with the gesture, thereby reducing the number of inputs needed to perform an operation.

In some embodiments, the plurality of representations of webpages each include a respective affordance for removing a tab associated with the respective webpage from the group of webpages (e.g., FIG. 6G shows that each displayed tab includes a button 627 (e.g., a user interface element) for closing each respective tab) (720). Having simple affordances placed on each tab in the tab-switching user interface provides the user with a quick and easy way to remove webpages from a current group and/or web-browsing session, thereby reducing the number of inputs needed to perform an operation.

In some embodiments, in response to scrolling the currently displayed webpage (e.g., scroll-down gesture 666-1, 666-1, 666-3 as shown in FIG. 6P-6R), concurrently: the portable device ceases (722) to display the associated tab (e.g., FIG. 6Q shows the tab 664 minimizing), and the portable device displays reduced size website information (e.g., the website address and associated security information) at a different location than the associated tab. For example, FIG. 6R shows that once the tab 664 is minimized, minimized web site and security information 668 is displayed in a top region of the webpage. In some embodiments, in response to scrolling up on the currently displayed webpage, concurrently ceasing to display the reduced size website information, and displaying the associated tab. Allowing user interface elements such as a tab/address bar to be reduced in size when not in use provides the user with more screen real-estate to view their requested content on. Additionally, including website name and security information in the minimized tab provides the user with the necessary information for determining whether or not they are on a safe webpage, thereby providing improved feedback.

In some embodiments, the group of webpages is not a user defined group (e.g., FIG. 6G-6H include tab counter 632 to indicate the number of tabs open in this session, and when no user-defined group is selected the number of webpages in the session is displayed (e.g., 8 tabs) instead of a group identifier (e.g., such as "News" group identifier)) (724). In some embodiments, in response to receiving the swipe gesture in the second direction (e.g., FIG. 6F illustrates a swipe gesture 622 occurring over the other tab 612 in a vertical direction), and in accordance with a determination that the swipe gesture occurs at a location corresponding to the associated tab in the tab row, the portable device displays an affordance for creating a new user defined group of webpages (e.g., FIG. 6H-6G illustrate a button 630 for revealing a tab group creation user interface).

Creating a new tab group from already open webpages in a current session provides the user a simple way of grouping together tabs in an impromptu manner. The user need not individually add each tab to the tab group and can instead add them all at once. This further provides the user with the ability to save a group of webpages for easy access in future browsing sessions, thereby reducing the number of inputs needed to perform an operation.

In some embodiments, the plurality of representations of webpages do not all fit within the web-browser user interface. In some embodiments, the portable device receives (726) a gesture via the one or more input devices (e.g., a swipe gesture in the vertical direction). In some embodiments, in response to receiving the gesture, scrolling the plurality of representations of webpages to reveal previously non-displayed representation of webpages (e.g., FIGS. 6G-5H illustrates scrollable list of all tabs 626). Allowing the user to scroll through plurality of open tabs via an intuitive scroll-gesture, provides the user with an easy way of selecting or closing a desired tab within tab-switching user interface, thereby reducing the number of inputs needed to perform an operation.

In some embodiments, in response to receiving the swipe gesture in the second direction, and in accordance with a determination that the swipe gesture occurs at a location corresponding to the associated tab in the tab row (e.g., FIG. 6G-6H include tab counter 632 to indicate the number of tabs open in this session, however, this tab counter is replaced with a group name, when a use-defined group of tabs is selected), the portable device displays (728) an identifier for the group of webpages (e.g., a textual or emoji name assigned to represent the group of webpages). Displaying an identifier for the group of webpages provides the user with an easy way of tracking which tab-group is currently open (e.g., the user is able to identify that a tab-group labeled "News" would include tabs related to news), thereby providing improved feedback.

In some embodiments, in response to receiving the swipe gesture in the second direction, and in accordance with a determination that the swipe gesture occurs at a location corresponding to the associated tab in the tab row, the portable device displays (730) a user interface element for displaying one or more other groups of webpages. In some embodiments, the portable device receives an input at the user interface element, and in response to receiving the input, displaying one or more identifiers each associated with the one or more other groups of webpages. For example, a first identifier associated with a first group of webpages, and a second identifier associated with a second group of webpages (e.g., FIGS. 6I and 6J both illustrate a user interface button 640-3, that when selected causes tabs associated with a tab group titled "Car Blogs" to be displayed, and a user interface button 640-4, that when selected causes tabs associated with a tab group titled "News" to be displayed. Allowing the user to quickly switch between different groupings of tabs from a single user interface reduces the number of menus the user normally needs to navigate to. In addition, having groupings of tabs that are all displayed in response to a single input greatly reduces the amount of time spent opening each individual tab, thereby reducing the number of inputs needed to perform an operation.

In some embodiments, the portable device receives (732) an input at an identifier of the one or more identifiers. In some embodiments, in response to receiving the input (e.g., FIG. 6J illustrates touch input 642 occurring at user interface button 5640-4, that when selected causes tabs associated with a tab group titled "News" to be displayed): the portable device closes the group of webpages, and the portable device displays another group of webpages associated with the identifier. For example, FIG. 6K shows that in response to touch input 642 occurring at button 640-4, the previously open tabs are closed and replaced with tabs and webpages associated with the button 640-4 labeled "News."

In some embodiments, displaying, via the display generation component, a web-browser user interface that includes an open (e.g., displayed) webpage and an associated tab in a tab row (e.g., the associated tab overlays a side of the webpage, and in some embodiments the tab is not coupled to the webpage), receiving a gesture (e.g., a swipe along a tab row axis), via the one or more input devices, corresponding to a location of the associated tab in the tab row. In some embodiments, in response to receiving the gesture, concurrently: ceasing to display the open webpage; and scrolling the tab row (e.g., along the tab row direction) to cause display of an additional webpage and its associated additional tab.

Allowing the user to quickly switch between different groupings of tabs from a single user interface reduces the requirement to close each previously used ungrouped tabs and individually open each new tab. Instead the user need only perform a single input to close all of the tabs and open the tabs associated with a tab group. This provides the user with the ability to quickly switch between multiple tabs without having to perform many inputs, thereby performing an operation when a set of conditions has been met without requiring further user input.

In some embodiments, the group of webpages is defined by a user of the portable device (734). For example, FIG. 6I shows a tab group titled "Car Blogs" and the tab group titled "News" are both user defined. FIG. 6I also shows how to create new user defined tab groups by selecting either user interface button 640-5 or user interface button 640-6. See also, FIG. 5D-5E that illustrates how a user can define the name of the tab group. Allowing the user to define tab group names ensures that the user will be able to quickly recognize which grouping of tabs they are selecting (e.g., if a user defines a tab group name as "Clothing Stores" then they will know tab group corresponds websites of clothing stores), thereby providing improved feedback.

In some embodiments, the associated tab in the tab row partially overlays (e.g., is displayed above) a side of the currently displayed webpage (e.g., FIG. 6C shows the other tab 612 overlaying associated webpage 614) (736). In some embodiments, the tab is not coupled with the webpage. Having a tab row that partially overlays a side of the currently displayed webpage provides a user with a consistent user interface that keeps the same placement of key elements despite the webpage changing, thereby providing additional control options without cluttering the UI with additional displayed controls.

In some embodiments, the portable device is a smartphone with a limited screen area (e.g., less than 150 cm2) (738).

In some embodiments, the swipe gesture in the first direction occurs along an axis of the tab row (e.g., FIGS. 6A and 6B illustrate the horizontal swipe gesture 610-1 and 610-2 occurring along an axis of the tab row) (740). In some embodiments, the swipe gesture in the second direction occurs along another axis of the tab row. Having a simple gesture such as swiping across the display along an axis of the tab row provides an intuitive way to interact with the portable device and also provides an easy to remember gesture which ensures the user will use the features associated with the gesture, thereby reducing the number of inputs needed to perform an operation.

In some embodiments, in accordance with a determination that one or more tabs are scrollable from the tab row in a first direction, the portable device displays (742) a user interface element that indicates whether additional tabs are available for selection from the tab row (e.g., a partial showing of another tab, such as hint tab 607 in FIG. 6A). In some embodiments, in accordance with a determination that no more tabs are scrollable in the first direction, the portable device forgoes display of the user interface element that indicates whether additional tabs are available for selection from the tab row (e.g., FIG. 6L does not indicate that there are any more additional tabs to be scrolled in from the rightward side of the display). Providing a user with a hint that other tabs are selectable form the tab row allows the user to know there are other tabs available for selection without including all of the tabs in the user interface at the same time. This declutters the user interface and allows the user to better immerse themselves in the content they are interacting with, thereby providing additional control options without cluttering the UI with additional displayed controls.

In some embodiments, no additional associated tabs are left to scroll in the tab row (744). In some embodiments, in response to receiving an additional swipe gesture in the first direction (e.g., swipe gesture 648-1 and 648-2): in accordance with a determination that the additional swipe gesture in the first direction occurs at a location corresponding to the associated tab in the tab row, concurrently (e.g., FIG. 6L illustrates a swipe gesture occurring 648-1 over the associated tab 646): the portable device ceases to display the currently displayed webpage (e.g., FIG. 6M shows webpage 644 being shifted off the display), and the portable device displays a new user interface that includes one or more user interface elements for selecting a new webpage to display (e.g., FIGS. 6M-6N illustrate new tab user interface 650 being displayed).

When no other tabs are available to be scrolled to in a certain direction, allowing the user to bring up a new tab user interface that includes options for opening a new webpage provides the user with the flexibility to quickly add a new webpage without having to navigate multiple menus. Additionally, allowing the same gesture performing two different operations when different conditions are met allows the user to not have to memorize as many gestures, and provides a more simplified user experience, thereby providing additional control options without cluttering the UI with additional displayed controls.

In some embodiments, the new user interface is a start page of the web browser user interface (e.g., FIG. 6N illustrates new tab user interface 650), and the one or more user interface elements are favorited webpages (e.g., FIG. 6N illustrates a partial list of favorited webpage buttons (e.g., 652-1 through 652-3)), shared webpages (e.g., partial list of shared webpage buttons (e.g., 656-1 through 656-3)), and(/or) frequently visited webpages (e.g., FIG. 6N illustrates a partial list of frequently visited webpage buttons (e.g., 654-1 through 654-3)) (748). In some embodiments, the start page includes an address bar for manual entry of URLs, and in some embodiments, the address bar is located at location previously occupied by the associated tab in the tab row.

Including a simplified user interface that includes the most likely requested webpage links (e.g., frequently visited links, shared links, and favorited links), provides a collated user interface for the user to select links from. Having a collated user interface that includes links from different sources provides the user with quick access to their most desired webpages, thereby reducing the number of inputs needed to perform an operation.

In some embodiments, the associated tab in the tab row includes webpage navigation controls (e.g., forward, backward, refresh) in accordance with a determination that those controls are applicable (750). For example, a new webpage will not include a back button or a forward button in the UI since no links on the currently displayed webpage have been selected. When a link has been selected and another webpage has been opened, a back button will be presented. When the back button is selected the webpage will return and the back button will cease to be displayed, and a forward navigation button will be displayed. For example, the transition from FIG. 6AE to 6AF shows that the back button 698 is only displayed in response to there being a webpage to return to. In another example, in response to receiving an input 699 at back button 698 in FIG. 6AG, the back button 698 is removed and the forward button 6002 is be displayed in FIG. 6AH. In yet another example, FIGS. 6AI-6AJ show that in response to the webpage requesting a refresh, the refresh button 6006 is displayed. Having webpage navigation controls that are displayed dynamically (e.g., when relevant) provides the user with decluttered user interface that does not include controls that do not perform any function (e.g., a backwards button is displayed, but there is no webpage to go back to). Dynamically displaying user interface elements, provides additional control options without cluttering the UI with additional displayed controls.

In some embodiments, the associated tab includes a multifunction user interface element that when selected displays control options related to the webpage (e.g., multifunction user interface element 678). In some embodiments, the portable device receives (752) a request to download a file associated with the webpage (e.g., FIG. 6V illustrates an input 674 on button 676, that when selected initiates a download of a PDF document), and in response to receiving the request, the portable device modifies the multifunction user interface element to show a download progress of the file. For example, FIG. 6W shows that in response to the input 674 on button 676, the multifunction user interface element 678 indicates download progress 679, and FIG. 6X also indicates download completion via displaying badge 680 overlaying the multifunction user interface element. Having a user interface element that is multipurpose and is capable of being an options button as well as displaying download information, reduces the number of user interface elements that need to be presented in the user interface. Reducing the number of user interface elements displayed in the user interface, provides improved feedback.

In some embodiments, the webpage navigation function includes either moving forward or backwards a webpage in a webpage navigation history corresponding to the associated tab (754) (e.g., FIG. 6C-6E illustrate moving forward a webpage from another associated webpage 614 to webpage 618). Having webpage navigation controls that are displayed dynamically (e.g., when relevant) provides the user with decluttered user interface that does not include controls that do not perform any function (e.g., a backwards button is displayed, but there is no webpage to go back to). Dynamically displaying user interface elements, provides additional control options without cluttering the UI with additional displayed controls.

In some embodiments, at a computer system that is in communication with a display generation component, and one or more input devices, displaying, via the display generation component, a user interface of a web-browser application including one or more open webpages and a webpage group user interface element for invoking[/opening] a user configurable group of webpages. In some embodiments, receiving an input, via the one or more input devices, selecting the webpage group user interface element, and in response to receiving the input (e.g., the input is a single tap on the webpage group user interface element), ceasing to (e.g., closing) display the one or more open webpages, wherein ceasing to display the one or more webpages removes the one or more webpages from an active session (e.g., ceasing to display means that the webpage is not stored in RAM). In some embodiments, the one or more webpages each have a corresponding tab and when the one or more webpages are closes the webpage and corresponding tabs are closes (e.g., not in a collapsed state). In some embodiments, in response to receiving the input, displaying the user configurable group of webpages associated with the webpage group user interface element. In some embodiments, in response to receiving the selection of the webpage group user interface element: redisplaying the one or more webpages with the user configurable group of webpages associated with the webpage group user interface element.

In some embodiments, the webpage group user interface element includes an expandable list (e.g., that overlays the user interface of a web-browser application and/or the one or more open webpages) that includes a first user interface element representing the user configurable group of webpages and a second user interface element representing an additional user configurable group of webpages.

In some embodiments, the computer system receives another input, via the one or more input devices, of the second user interface element representing the additional user configurable group of webpages. In some embodiments, in response to receiving the selection of the second user interface element representing the additional user configurable group of webpages: the computer system ceases to display the webpages associated with the webpage group user interface element; and the computer system displays the additional user configurable group of webpages associated with the second user interface element.

In some embodiments, the user configurable group of webpages are each represented by a respective tab. In some embodiments, the user interface of the web-browser application further includes: a first area that includes webpage content corresponding to an active webpage of the user configurable group of webpages, a second area above or below the first area, wherein the second area includes a row of one or more tabs each representing a webpage of the user configurable group of webpages, and a third area adjacent the first area, wherein the third area includes the webpage group user interface element representing the user configurable group of webpages and a first user interface element representing an additional user configurable group of webpages.

In some embodiments, the third area further includes: a second user interface element that when selected causes display of representations of bookmarked webpages, and a third user interface element that when selected causes display of representation of webpages of shared with a user of the computer system. In some embodiments, the third area further includes a fifth user interface element that when selected causes a private viewing webpage to be opened.

In some embodiments, the second area includes a user interface element for adding an additional webpage to the user configurable group of webpages associated with the webpage group user interface element. In some embodiments, the additional webpage is that of a start screen, a homepage, or specific webpage.

In some embodiments, the third area includes a user interface element for redisplaying the one or more open webpages, in accordance with a determination that the one or more webpages are not collectively associated with a webpage group user interface element.

In some embodiments, the webpage group user interface element is associated with a textual description that is displayed on the display generation component. In some embodiments, the textual description is user defined. In some embodiments, closing the one or more open webpages ceases to display the one or more webpages and associated tabs.

In some embodiments, in accordance with a determination that the one or more open webpages do not collectively correspond to a webpage group user interface element, the computer system displays a user interface element for creating a new webpage group that includes all of the one or more open webpages. In some embodiments, the user interface element for creating a new webpage group replaces display of the webpage group user interface element. In some embodiments, the one or more input devices is a touch-sensitive display, a trackpad, a computer mouse, or an AR/VR input mechanism. In some embodiments, the computer system is a portable multifunction device, a laptop computing device, a desktop computing device, an augmented reality device, and/or a virtual reality device.

At a computer system that is in communication with a display generation component and one or more input devices, the computer system displays, via the display generation component, a web-browser application that includes user interface that includes a webpage and an associated tab. In some embodiments, the tab includes a webpage identifier and a multifunction user interface element that when selected displays control/command options related to the webpage. In some embodiments, the computer system receives a request to download a file associated with the webpage, and in response to receiving the request, the computer system modifies the multifunction user interface element to show a download progress of the file.

In some embodiments, the download progress of the file is indicated by an animated progress bar (e.g., a progress bar that goes around the circumference of the multifunction user interface element) during the download, and after downloading an indication of completed download is displayed (e.g., a badge overlaying the multifunction user interface element). In some embodiments, the multifunction user interface element can be selected to bring up additional controls related to the browser and/or additional information about the download and other recent downloads.

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 5A-6AV. For example, the gestures, user interface objects, focus selectors, and animations described above with reference to method 700 optionally have one or more of the characteristics of the gestures, user interface objects, focus selectors, and animations described herein with reference to other methods described herein (e.g., method 800). For brevity, these details are not repeated here.

FIGS. 8A-8D are flow diagrams illustrating method 800 of interacting with a web-browser application in accordance with some embodiments. Method 800 is performed at a computer system (e.g., device 300, FIG. 3, or portable multifunction device 100, FIG. 1A, a computing device 500 of FIGS. 5A-5P, computing device 600 of FIGS. 6A-6AV, a tablet device, a desktop computer, an augmented reality device, virtual reality device, etc.) that is in communication with a display generation component (e.g., a display integrated into a portable device, such as touch screen 112 of FIG. 2), or a dedicated display that a computing device connects to), and one or more input devices e.g., a touch-sensitive surface (e.g., touch screen 112 of FIG. 112), an input device for receiving inputs at virtual reality device or augmented reality device, a mouse, a keyboard, etc.) (802). In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an intuitive way to interact with a web-browser application. The method reduces the number, extent, and/or nature of the inputs from a user when interacting with a web-browser application, thereby creating a more efficient human-machine interface. For battery-operated electronic devices, enabling a user to interact with a web-browser application faster and more efficiently conserves power and increases the time between battery charges (e.g., it improves responsiveness of the user interface, improves the visual feedback provided to the user (e.g., by making the device appear more responsive to user input), and enhances the operability of the device (e.g., by helping the user to provide proper inputs and reducing user mistakes when operating/interacting with the device).

In a web-browsing user interface, making a user interface element both a website address/search bar and a tab within a tab row reduces the number of regions within the user interface that are occupied by controls. Instead, more of the requested content (e.g., more of the webpage is displayed). Additionally, having a tab capable of receiving either a website address or a search term reduces the number of inputs required by the user (e.g., the user does not need to first input their desired search engine website, then perform their desired search). Having a single user interface element be capable of performing different functions, provides additional control options without cluttering the UI with additional displayed controls.

The computer system displays (804), via the display generation component, a web-browser user interface that displays a webpage with an associated tab and content, wherein an identifier for the webpage is displayed within the tab (e.g., webpage 546 and tab 566 in FIG. 5Q). The computer system receives (806) an input [e.g., a single tap input, a mouse click, and/or a touch input from a stylus] at the tab (e.g., input 564 in FIG. 5Q). In response to receiving the input at the tab (e.g., input 564 in FIG. 5Q), the computer system ceases (808) to display the identifier and displaying a text entry field within the tab (e.g., allowing requests to be received at the associated tab). For example, FIG. 5R illustrates provide a prompt that states "Enter Website or Search" in place of the previously displayed identifier (e.g., URL) shown in FIG. 5Q). The computer system receives (810) a user input of text into the text entry field (e.g., via an on-screen keyboard, a physical keyboard, and/or via dictation] (e.g., FIG. 5S illustrates that a text entry of "movies.com" is received, and FIG. 5W illustrates that a text entry of "Best romantic comedy?" is received). In response to receiving the user input of text into the text entry field (812), in accordance with a determination that the text is a website address (e.g., a domain name), the computer system fetches and displays (814) a webpage associated with the website address (e.g., FIG. 5T displays a webpage corresponding to the entered webpage name of "movies.com"). In response to receiving the user input (812), in accordance with a determination that the user input of text is not a website address (e.g., any form of text that does not meet webpage address criteria (e.g., not a domain name)), the computer system performs (816) an internet search using the text as a search input and displaying search results. In some embodiments, the internet search engine is specified by the user of the computer system. For example, FIG. 5X shows a search result webpage 572 in response to receiving the text that recites "Best romantic comedies?" in the tab 566.

In some embodiments, the associated tab has a first tab size (e.g., a first length) and the tab is displayed in a tab row, and the web-browser user interface further includes one or more other tabs each associated with a respective webpage (818). In some embodiments, the one or more other tabs have one or more sizes that are different to the first tab size and are also displayed in the tab row (e.g., a second length). For example, FIGS. 5I-5J illustrate that the tab that corresponds to the displayed webpage is presented at a larger size than the other tabs that do not correspond to the displayed webpage. In some embodiments, in accordance with a determination that a combination of the tab and the one or more other tabs meet a threshold number of tabs for displaying in the tab row, the computer system displays less than all of the combination of tabs in the tab row and making the tab row scrollable. In some embodiments, a tab of a third size is also displayed. In some embodiments, there is a third size of tab that is displayed when the tabs on one side of the active tab (e.g., the tab of the first size) are so numerous that they become scrollable (e.g., tabs on the second size) while tabs on the other side of the active tab do not meet a tab threshold amount to become scrollable (e.g., tabs of a third size). For example, FIGS. 5K-5L illustrate a horizontally scrollable list of the new tabs 550).

Having a tab that visually distinct from the other tabs when that tab is associated with the in-view webpage, informs the user of, which tab corresponds to the in-view webpage, thereby providing improved feedback. Additionally, having the tabs be scrollable when a threshold number of tabs are met, allows the user interface to not be cluttered with an excess number of tabs, thereby providing additional control options without cluttering the UI with additional displayed controls.

In some embodiments, the computer system (820) receives a request to switch from the associated tab to another tab of the one or more tabs, and in response to receiving the request, the computer system resizes the one or more other tabs to the first tab size (e.g., FIGS. 5I-5J illustrate switching between tabs and resizing the other unselected tabs (e.g., tab 534 increases in size after being selected)). In some embodiments, the tab that corresponds to the displayed webpage is presented at a larger size than the other tabs that do not correspond to the displayed webpage. Having a tab that visually distinct from the other tabs when that tab is associated with the in-view webpage, informs the user of, which tab corresponds to the in-view webpage, thereby providing improved feedback.

In some embodiments, the computer system receives (822) a request to switch from the associated tab to another tab of the one or more tabs, and in response to receiving the request, the computer system resizes the associated tab to a tab size that is different to the first tab size. (e.g., FIGS. 5I-5J illustrate switching between tabs and resizing the selected tab (e.g., tab 536-3 increases in size after being selected)).

Having a tab that visually distinct from the other tabs when that tab is associated with the in-view webpage, informs the user of, which tab corresponds to the in-view webpage, thereby providing improved feedback.

In some embodiments, the associated tab and one or more other tabs form together a user-defined group of tabs (e.g., FIG. 5C illustrates a list of other user defined tab groups (824) (e.g., "Hobby" tabs 522-1, "Streaming" tab group 522-2, "Cars" tab group 522-3, and "Social" tab group 522-4)). For example, a user of the device can collect multiple tabs to be included under a shared identifier (e.g., news websites under a "News" identifier). Having tabs correspond to a tab group provides a user with an option to quickly switch between different groupings of tab, thereby reducing the number of inputs needed to perform an operation.

In some embodiments, the first tab size is larger (e.g., in a horizontal and/or vertical direction) than the other tabs having one or more sizes (826). In some embodiments, the first tab also includes an indication, other than its size, that indicates it is currently the selected tab (e.g., an outline or shading). For example, FIGS. 5I-5J illustrate that the tab that corresponds to the displayed webpage is presented at a larger size than the other tabs that do not correspond to the displayed webpage. Having a tab that visually distinct from the other tabs when that tab is associated with the in-view webpage, informs the user of, which tab corresponds to the in-view webpage, thereby providing improved feedback.

In some embodiments, the associated tab has a first appearance and the one or more other tabs have a second appearance, distinct from the first appearance (830). For example, the first tab has a different opacity (e.g., having more opacity or less opacity) than the one or more other tabs). For example, FIGS. 5I-5J illustrate that the tab that corresponds to the displayed webpage is presented with a different appearance (e.g., at a larger size) than the other tabs that do not correspond to the displayed webpage. Having a tab that visually distinct from the other tabs when that tab is associated with the in-view webpage, informs the user of, which tab corresponds to the in-view webpage, thereby providing improved feedback.

In some embodiments, the identifier is an icon provided by the webpage for identifying the webpage (832). In some embodiments, when the one or more other tabs meet a minimum size threshold, only the identifier is displayed in each of the one or more other tabs. In other words, the address information and/or security information is not displayed. Providing an icon associated with each tab, when available, provides a user with another visual identifier so they can quickly identify which tabs are currently open. Including an image or other visual identifier, thereby improves feedback.

In some embodiments, the webpage has a visual characteristic (834) (e.g., a color or pattern, e.g., as shown in FIG. 5G, wherein the top portion of the webpage 542 changes in accordance with a change in the webpage). In some embodiments, in response to receiving at the web-browser user interface, the webpage (e.g., the webpage is transmitted to the computer system): computer system displays the content in a first region (e.g., the contents of a loaded webpage) of the web-browser user interface (e.g., webpage 540 and 541 in FIGS. 5F and 5G respectively), and the computer system displays information identifying the webpage (and a tab) in a second region of the web-browser, wherein the second region has a visual characteristic that is matched to the visual characteristic of the webpage having content with a visual characteristic (e.g., FIG. 5G illustrates that the top portion of the webpage 542 is matched to the webpage). In some embodiments, the second region is user interface of the web-browser application and is substantially persistent across multiple webpages (e.g., a web-browser application's native user interface). Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the web-browser user interface further includes one or more other tabs each associated with a respective webpage. In some embodiments, the computer system receives (836) a selection of another tab of the one or more other tabs (e.g., FIG. 5I illustrates a cursor input 544 at the other tab 536-3). In some embodiments, in response to switching to the other tab: the computer system displays other webpage content associated with the other tab in the first region of the web-browser user interface (e.g., FIG. 5J illustrates webpage 546 that is displayed in response to switching tabs), and the computer system displays information identifying the other webpage (and a tab) in the second region of the web-browser user interface, wherein the second region has a visual characteristic that is matched to the visual characteristic of the other webpage. For example, the top-portion of the webpage changes in style from what is shown in FIG. 5I (e.g., FIG. 5I shows a slanted line background at the top of the webpage, and FIG. 5J shows a vertical line background at the top of the webpage). Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the visual characteristic of the webpage is identified upon receipt of the webpage (838). For example, the webpage is fully loaded on the device, and/or the portion of the webpage that indicates the webpage's visual characteristic is transmitted to the computer system from the internet. In some embodiments, prior to displaying information identifying the webpage, determining the visual characteristic of the webpage, and generating the visual characteristic of the second region. In some embodiments, the visual characteristic of the webpage is identified each time a webpage is received and displayed. Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the visual characteristic of the webpage is determined (840) based on one or more of a background color of the webpage, predominant graphic of the webpage, and luminance of the webpage. Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the visual characteristic of the webpage is determined (842) based on a top portion of the webpage. In some embodiments, the top portion of webpage is defined as the first rows of pixels of the webpage. For example, a color of the first three rows of pixels on the top of a webpage may be used to determine the visual characteristic of the webpage. In some embodiments, the corners of the webpage are used to determine the visual characteristic of the webpage. Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the visual characteristic of the webpage is determined (844) based upon a supplied predefined style from the webpage (e.g., supplied by a style sheet for the website (e.g., CSS)). Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback. In some embodiments, the first region and the second region are visually continuous (846). For example, FIG. 5H also illustrates that the top portion of the webpage 542 remains fixed and remains visually continuous with the example web-browser user interface 504. For example, since the first region matches the webpage, then there is no dividing line between the user interface associated with the web-browser application and the displayed webpage. Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the computer system receives (848) a request to scroll the webpage (e.g., FIG. 5G illustrates a request to scroll (e.g., via cursor input 538) the displayed webpage 540 corresponding to associated tab 534). In some embodiments, in response to receiving the request: the computer system scrolls the webpage (e.g., 5H illustrates that in response to the request to scroll, the webpage 540 is scrolled to reveal an additional portion of the webpage 541), and the computer system maintains a visual characteristic of the second region, wherein the visual characteristic is matched to the visual characteristic of the webpage in an non-scrolled state. For example, the top of the webpage will remain persistent and the content of the webpage will be scrolled. Since the top of the webpage will remain persistent, then during scrolling the second region will remain with the same visual characteristic. For example, FIG. 5H illustrates that that the top portion of the webpage 542 remains fixed and remains visually continuous with the example web-browser user interface 504. Having a style of webpage remain fixed during scrolling, visually identifies to the user which webpage they are on without having to refer back to the tab. Improving visual cues to help the user navigate between tabs faster, thereby provides improved feedback.

In some embodiments, the second region overlays the first region (850). For example, FIG. 5H illustrates that that the top portion of the webpage 542 remains fixed and the webpage 541 is scrolled beneath it. In some embodiments, the overlap is not visually noticeable as the webpage and the second region may have identical visual characteristics.

Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the web-browser user interface further includes one or more other tabs each associated with a respective webpage (852). In some embodiments, the associated tab, the one or more other tabs, and one or more user interface elements of the web-browser user interface overlay the second region. For example, FIG. 5A illustrates that the associated tab 508 and the one or more other tabs (e.g., 510-1 through 510-5) overlay the example web-browser user interface 504. Having a seamless user interface, where the webpage is visually continuous with the web-browser user interface allows the user to experience a more immersive browsing experience. Having a more immersive experience allows the user to focus on the content of the webpage as opposed to the web-browser user interface, thereby providing improved feedback.

In some embodiments, the associated tab, the one or more other tabs, and the one or more user interface elements of the web-browser user interface are opaque and allows for the visual characteristic of the second region to partially appear (854). Having opaque user interface elements gives a user a more seamless browsing experience by obscuring less of the displayed webpage. Displaying more of the webpage, even if obscured, allows the user to experience a more immersive browsing experience. Having a more immersive experience allows the user to focus on the content of the webpage as opposed to the web-browser user interface, thereby providing improved feedback.

In some embodiments, at a computer system that is in communication with a display generation component and one or more input devices, the computer system displays, in a display region generated by the display generation component, a web-browser application window that includes a user interface having a plurality of tabs each associated with a respective tab in a tab row. In some embodiments, the computer system receives a dragging gesture over a tab of the plurality of tabs, and in response to receiving the dragging gesture over the tab of the plurality of tabs, and in accordance with a determination that the dragging gesture meets a first dragging threshold (e.g., a velocity threshold), the computer system moves the web-browser application window in the display region. In some embodiments, in response to receiving the dragging gesture over the tab of the plurality of tabs, and in accordance with a determination that the dragging gesture meets a second dragging threshold, different from the first dragging threshold, the computer system changes the order of the tab of the plurality of tabs among other tabs of the plurality of tabs within the tab row, or opening the tab into a new web-browser application window.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 5A-6AV. For example, the gestures, user interface objects, focus selectors, and animations described above with reference to method 800 optionally have one or more of the characteristics of the gestures, user interface objects, focus selectors, and animations described herein with reference to other methods described herein (e.g., method 700). For brevity, these details are not repeated here.

The operations described above with reference to FIGS. 7A-8D are, optionally, implemented by components depicted in FIGS. 1A-1B. For example, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9U illustrate example user interfaces for interacting with a web-browser application, in accordance with some embodiments. For example, FIG. 9A shows a webpage being displayed on a device, such as a mobile device like a smartphone. In some embodiments, a webpage 902 is displayed above (or overlaid over) a control region 904 that includes dynamic and/or persistent controls for interacting with a web browser. In some embodiments, these controls include webpage navigation controls 906-1 and 906-2, sharing control 908 for sharing a webpage, a bookmark control 910 for accessing bookmarks, and/or a tab control 912 for selecting different tabs. The control region 904 also includes a tab 914 that is associated with the webpage 902. In some embodiments, the tab 914 includes a reader mode icon 916 in a multifunction area 917, that when selected causes the webpage 902 to be displayed in a reader view, thereby simplifying the webpage 902 for reading (e.g., by removing advertisements etc.). In some embodiments, the tab 914 further includes a refresh button 913 for refreshing the webpage 902. In some embodiments, the refresh button 913 is dynamically displayed based on whether the device determines a refresh of the webpage would be beneficial for the user.

Figure 9B:
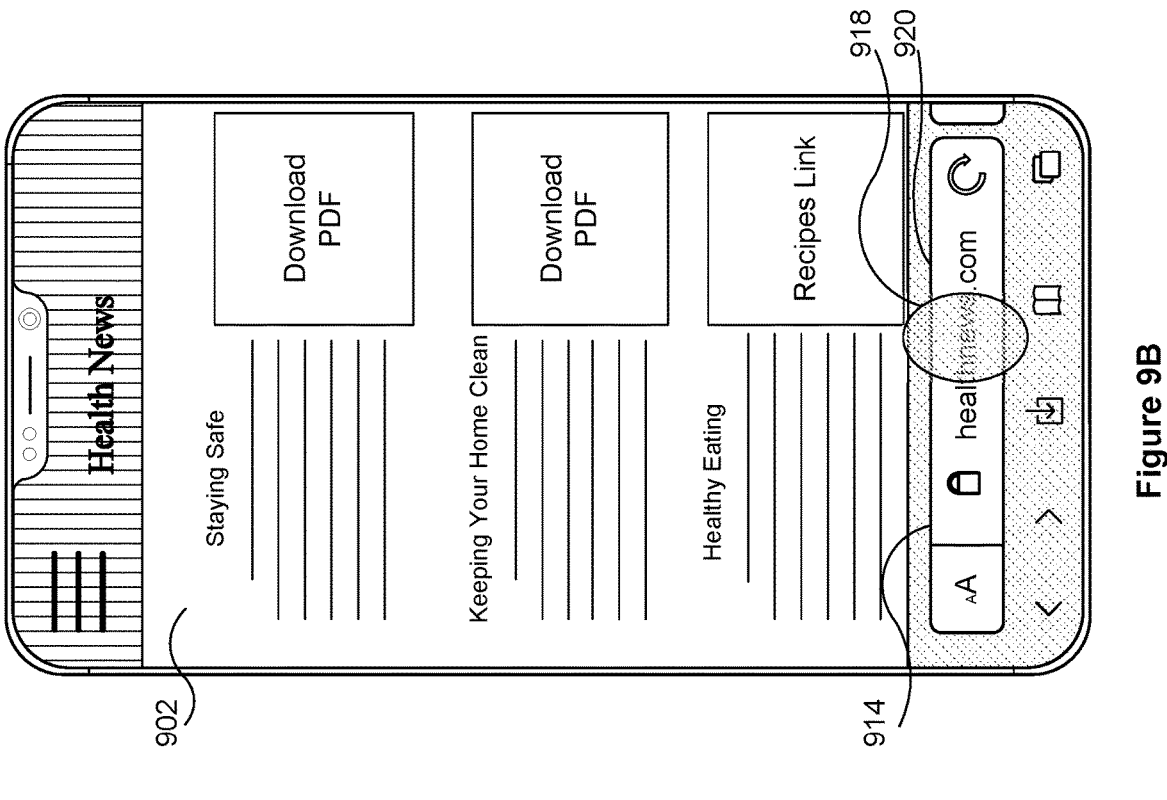
FIGS. 9A-9U illustrate example user interfaces for interacting with a web-browser application, in accordance with some embodiments.
Figure 9A:
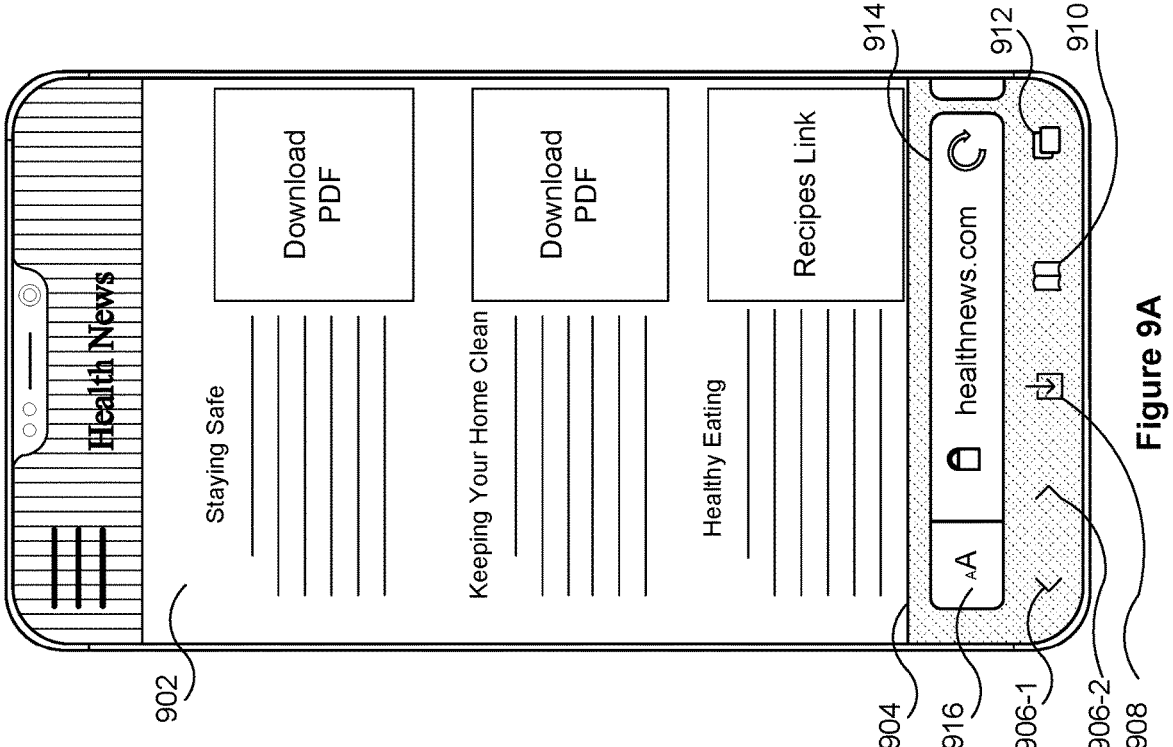

FIG. 9B shows an input 918 (e.g., a tap input) occurring over a webpage address 920 of the tab 914. FIG. 9C shows that in response to input 918 occurring over a webpage address 920 of the tab 914. FIG. 9C illustrates a new tab user interface 922. In some embodiments, the new tab user interface 922 displays one or more affordances for: favorite webpages (e.g., 924-1 through 924-3), frequently visited webpages (e.g., 926-1 through 926-3), and shared webpages (e.g., 928-1 through 928-3). In some embodiments, the interface 922 also includes an address/search bar 930 situated above a keyboard 932. As shown, the address/search bar 930 shows the web address associated with the currently displayed webpage (e.g., "healthnews.com"). Address/ search bar 930 also includes a "X" button 934 for clearing the webpage text and allowing for entry of a new webpages or search term in address/search bar 930 (or the current address can simply be overwritten). FIG. 9C illustrates an input 936 occurring over "X" button 934. FIG. 9C illustrates a speech-to-text user interface element 931 that when selected enables speech to be converted to text.

Figure 9D:
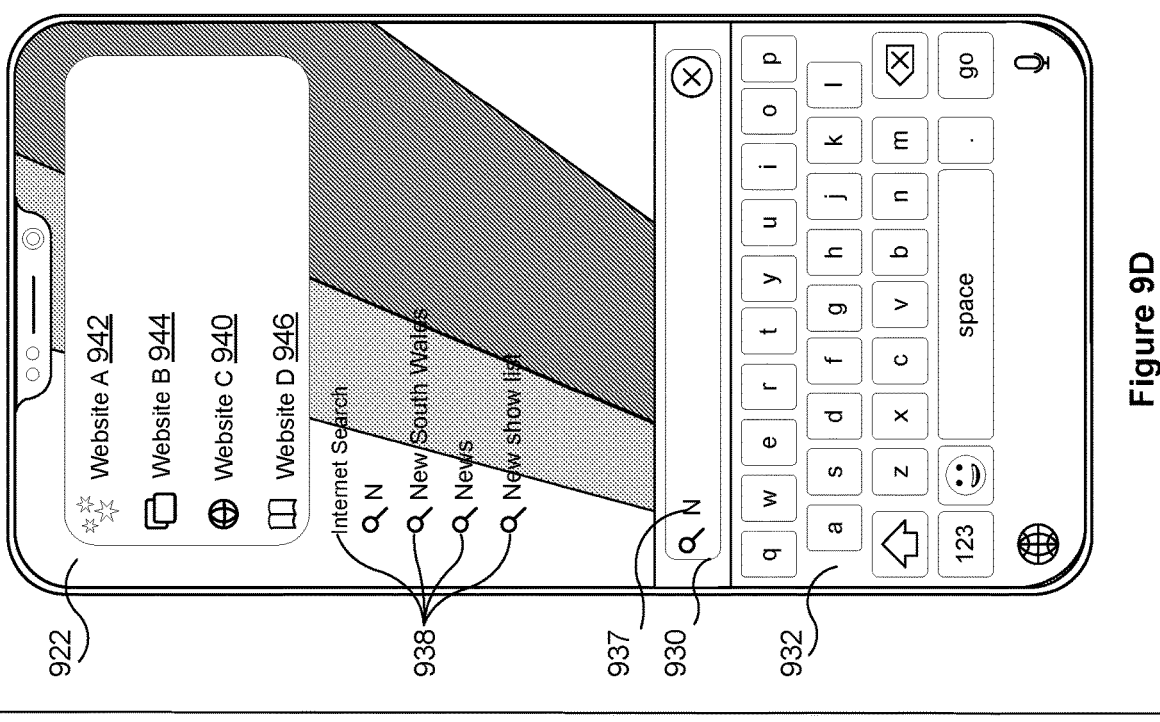
Figure 9C:
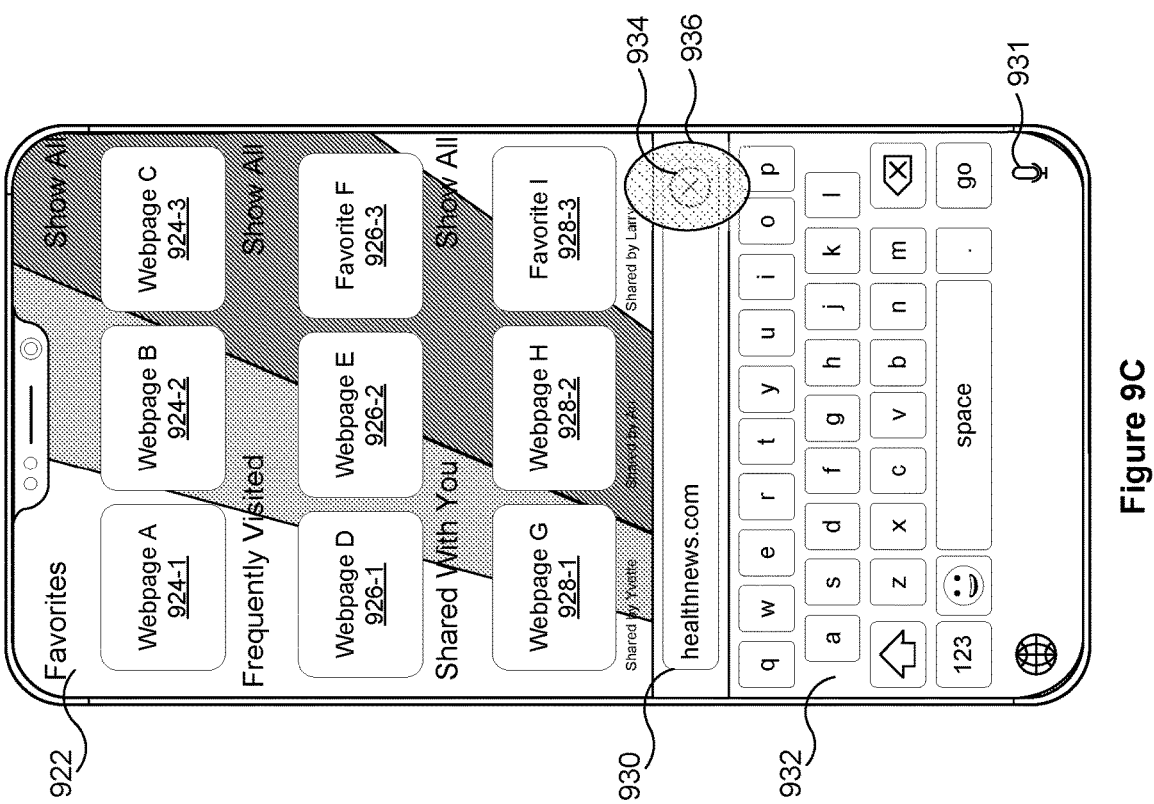

FIG. 9D illustrates that in response to input 936 occurring over "X" button 934, address/search bar 930 is cleared. FIG. 9D also illustrates a textual input 937 (e.g., via the keyboard 932 or via a speech-to-text feature) starting with the letter "N" being received in the address/search bar 930. In response to the textual input labeled "N" being received, the new tab user interface 922 displays one or more predictive results. For example, FIG. 9D shows a plurality of suggested internet searches 938 based at least in part on the input received (e.g., the letter "N"), and optionally takes into account past web browsing activity. FIG. 9D also shows a region that displays links to suggested webpages, such as (i) a link to suggested webpage(s) that were not previously visited 942 (e.g., as indicated by a start cluster icon next to the webpage "Website A"), (ii) a link to webpage(s) that are already open 944 (e.g., as indicated by a stacked rectangles icon next to the webpage "Website B"), (iii) a link to previously visited webpage(s) 940 (e.g., as indicated by a globe icon next to the webpage "Website C"), and (iv) a link to webpage(s) that are saved as bookmarks 946 (e.g., as indicated by a book icon next to a website "Website D").

Figure 9F:
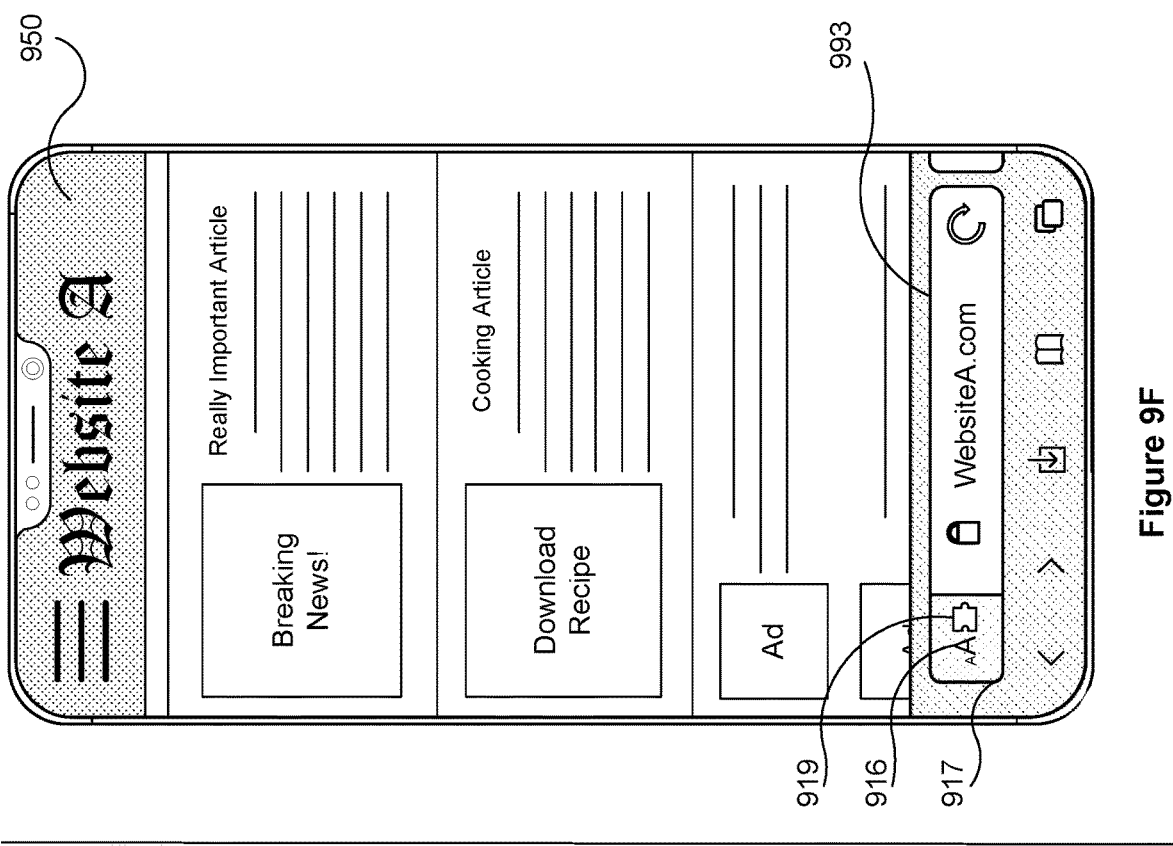
Figure 9E:
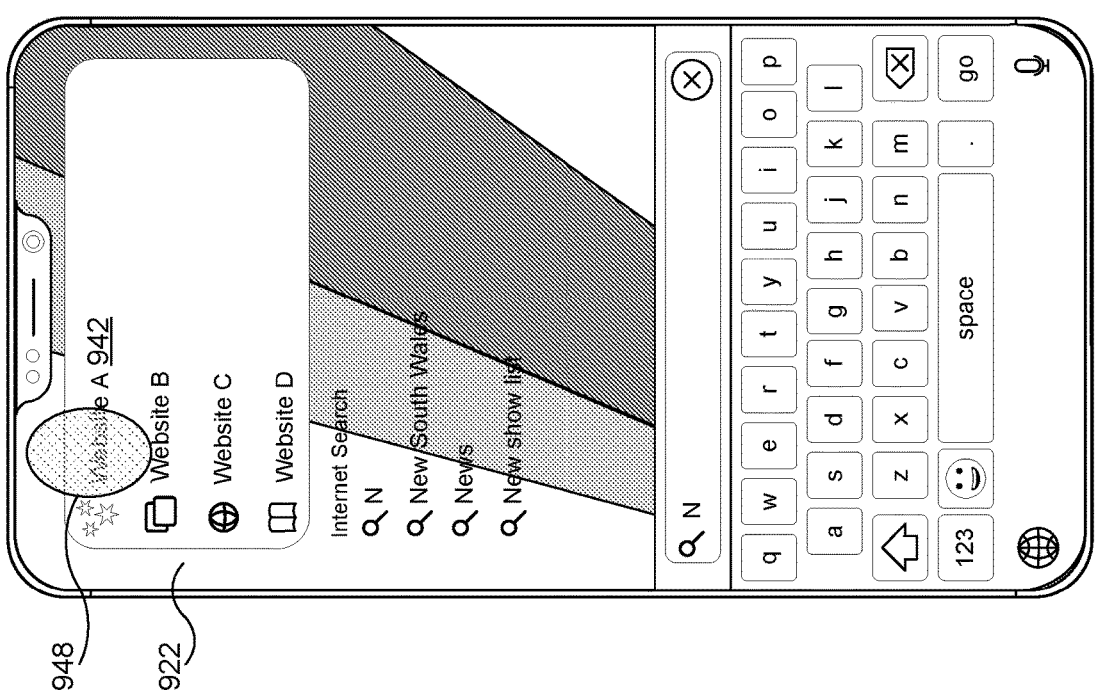

FIG. 9E illustrates an input 948 occurring at suggested webpage that was not previously visited 942 (e.g., as indicated by "Website A" with a star cluster icon next to it) in new tab user interface 922. FIG. 9F shows that in response to the input 948, a webpage 950 associated with the link to a suggested webpage that was not previously visited 942. FIG. 9F shows in multifunction area 917 in Website A tab 993 contains reader mode icon 916 an extension icon 919, which indicates that one or more web-browsing extensions are currently operating on webpage 950. Website A tab 993 also includes a refresh button 921 for refreshing the displayed webpage (e.g., webpage 950).

Figure 9H:
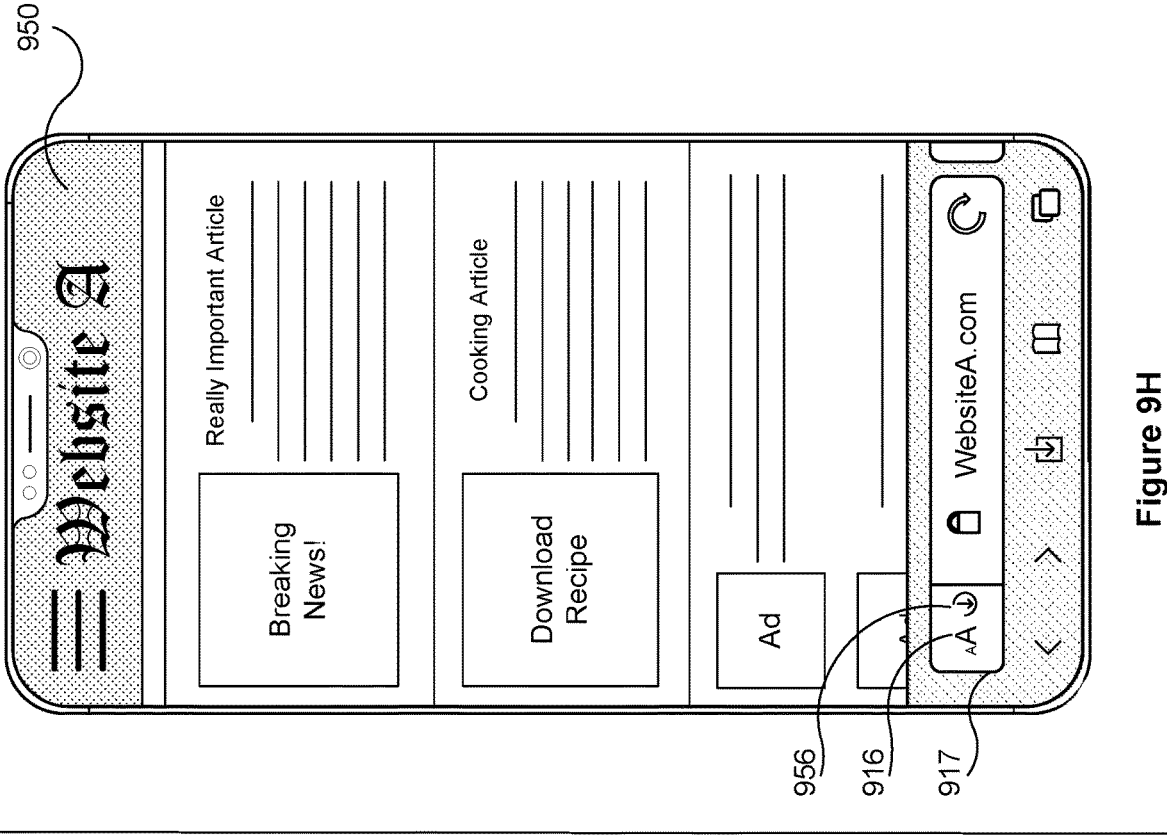
Figure 9G:
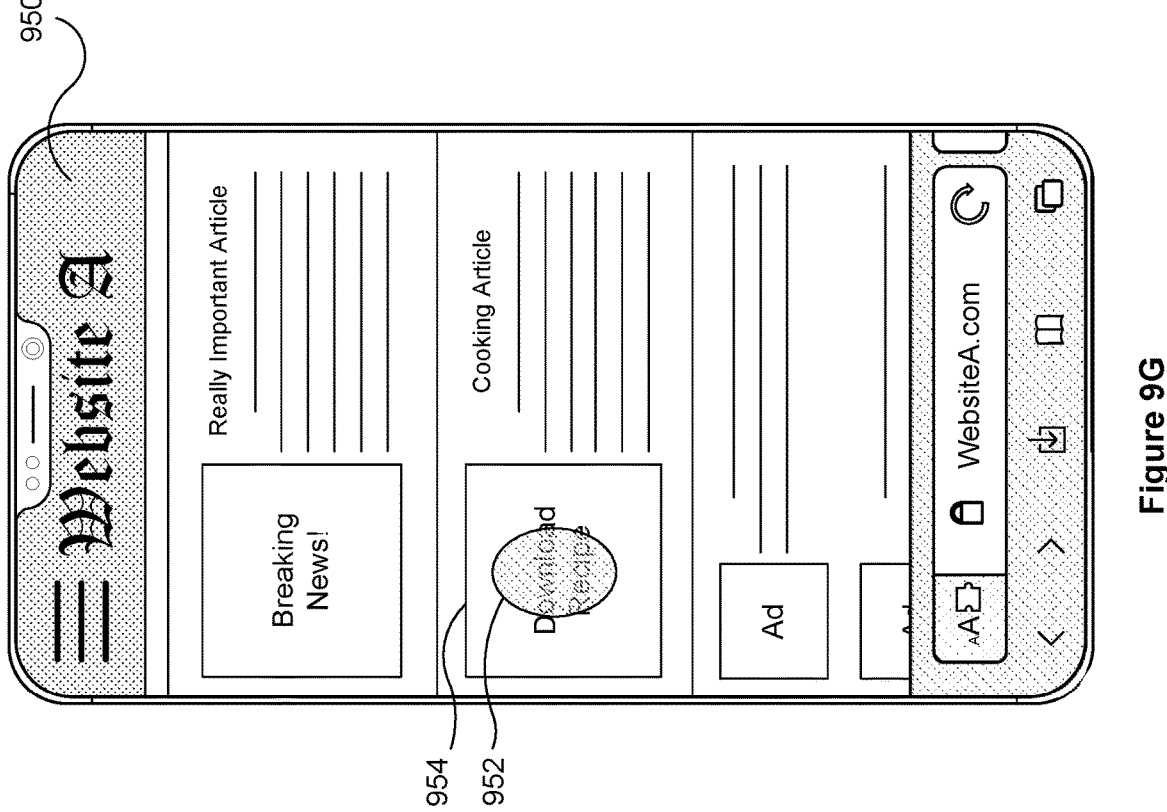
Figure 9J:
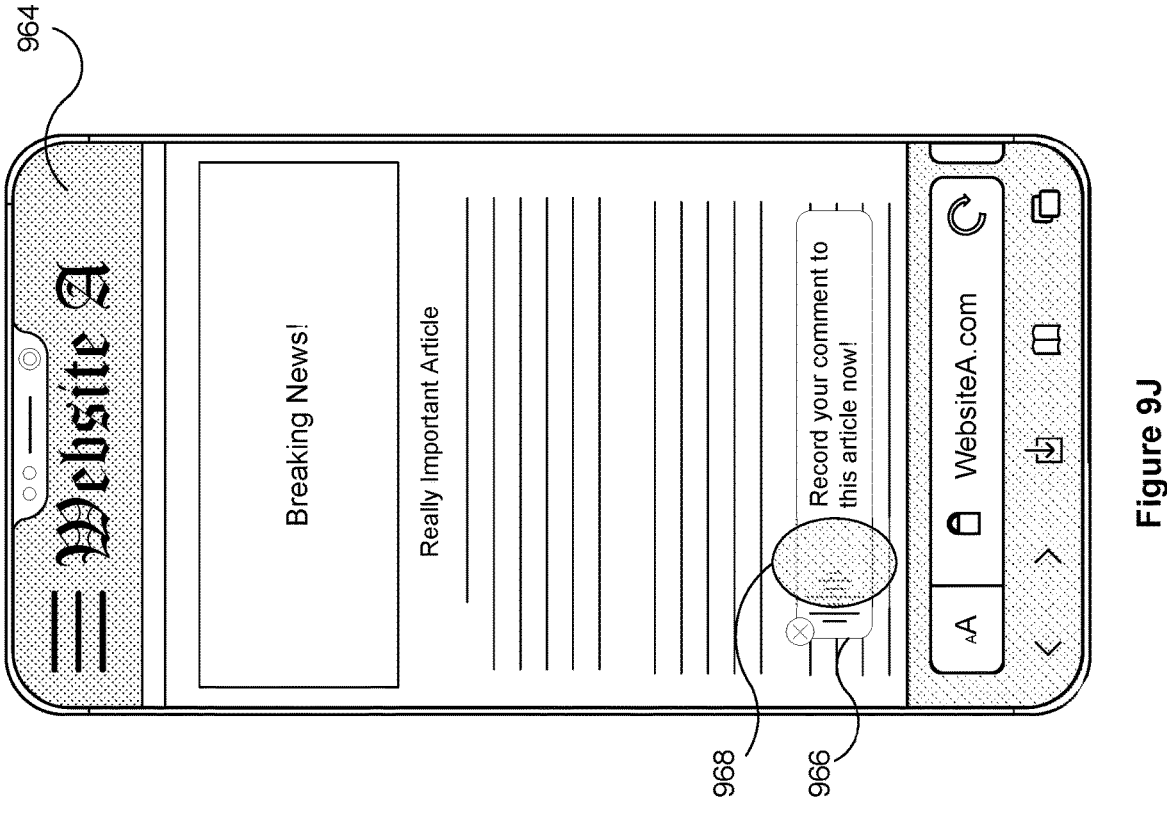

FIG. 9G illustrates an input 952 at a button 954 for downloading a recipe (e.g., a PDF). FIG. 9H shows that in response to the input 952 the recipe begins to be downloaded. To indicate to the user that a download is in progress, download progress indicator 956 is displayed in multifunction area 917 that contains reader mode icon 916.

Figure 9I:
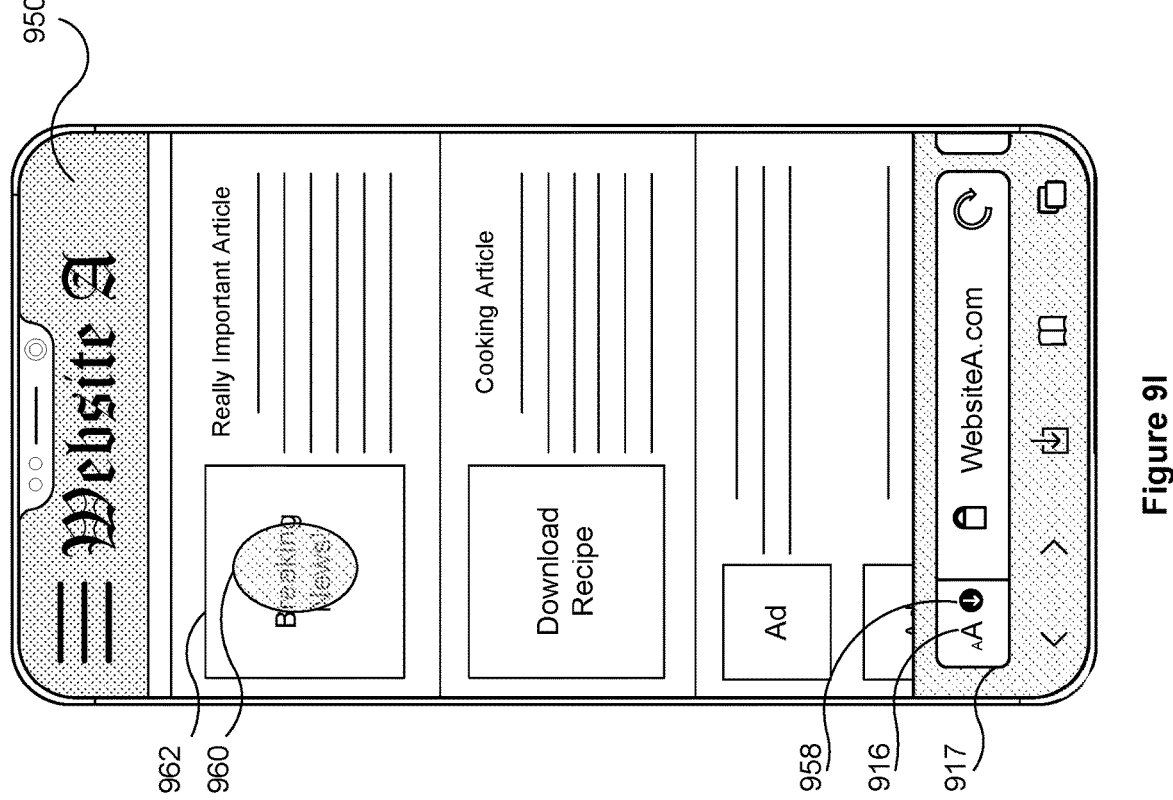

FIG. 9I illustrates a download complete icon 958 that illustrates that the download is completed. The download complete icon 958 is displayed in multifunction area 917 that contains reader mode icon 916, and replaces the download progress indicator 956. FIG. 9I also shows an input 960 occurring over an article link 962, which links to an article titled "Breaking News!".

FIG. 9J illustrates that in response to input 960, a webpage 964 containing an article titled "Breaking News!" is displayed. The webpage 964 includes a button 966 for recording an audio comment to leave in a comments section on the webpage 964. FIG. 9K also shows an input 968 at button 966. FIG. 9K shows that in response to the input, the website begins recording the audio comment. In addition FIG. 9K illustrates a microphone icon 970 in multifunction area 917, which also contains reader mode icon 916, that illustrates to the user that the microphone is being accessed by webpage 964. In some embodiments, the multifunction area 917 changes to a different color (e.g., red) to notify the user that the microphone is being accessed by webpage 964. FIG. 9K also illustrates an input 972 at multifunction area 917.

Figure 9L:
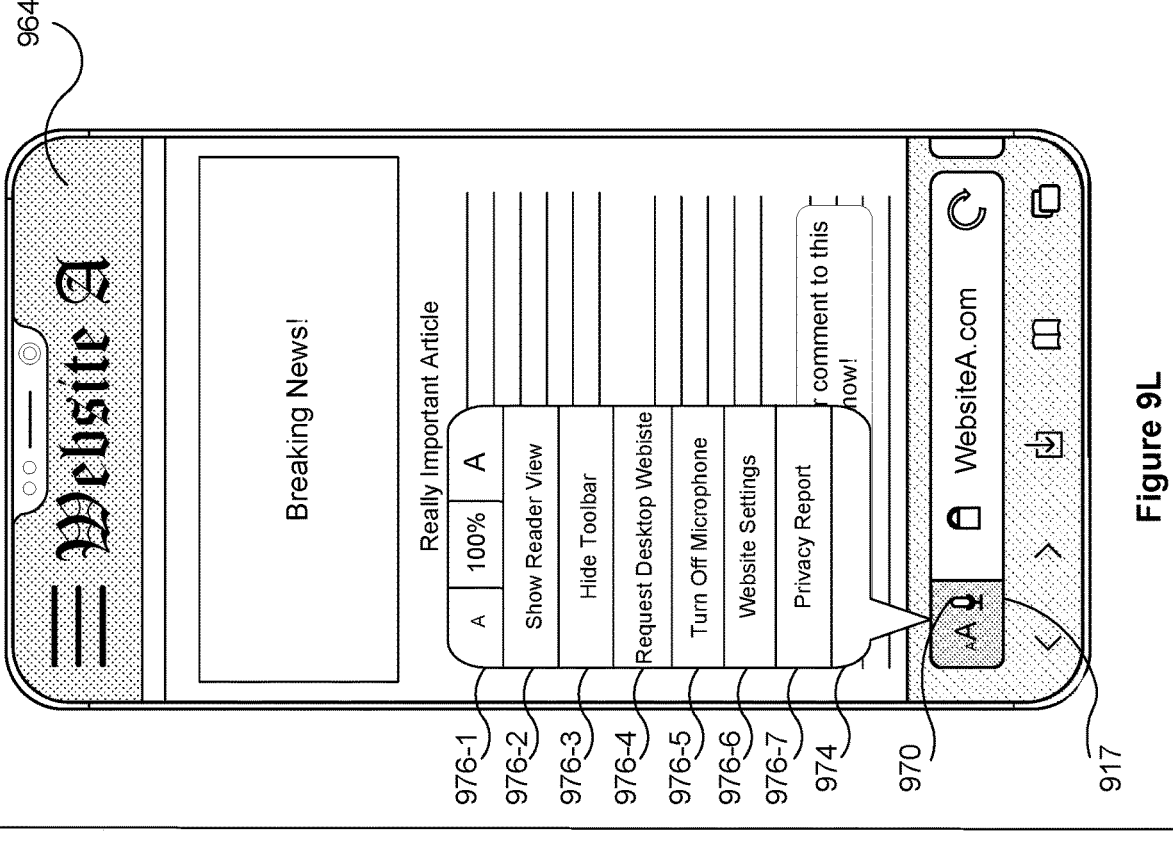
Figure 9K:
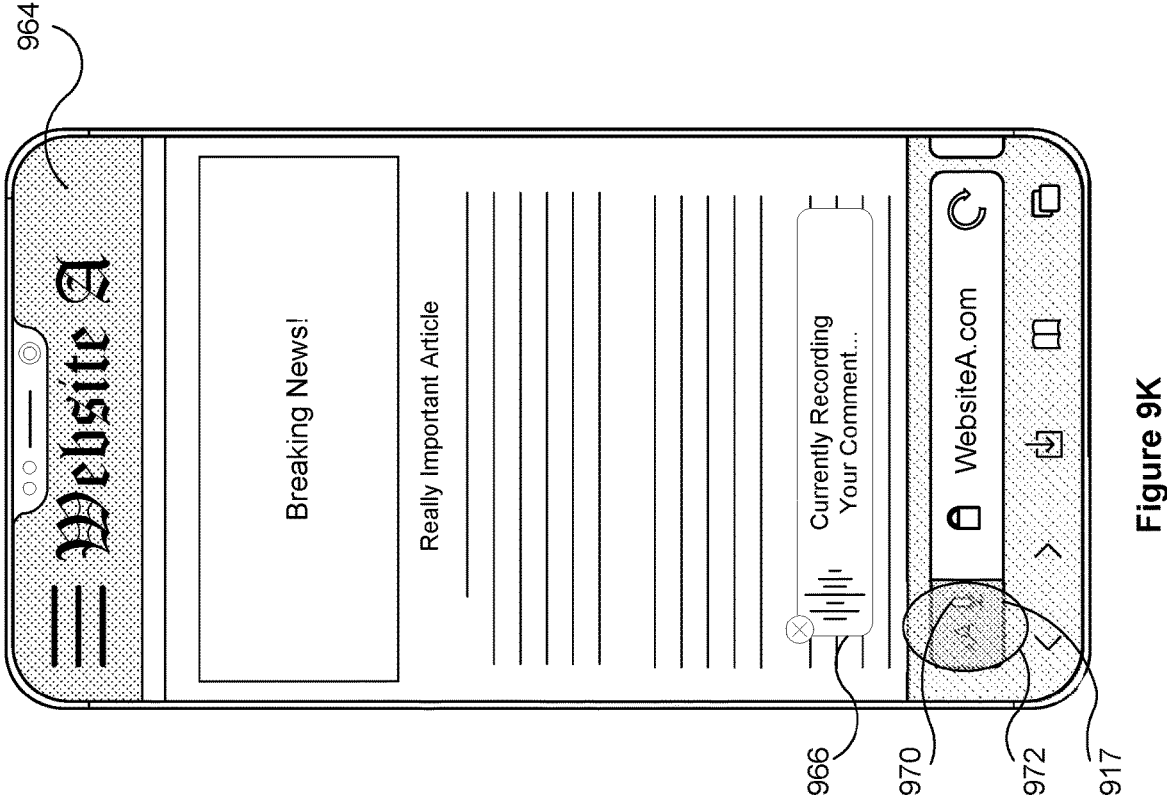

FIG. 9L shows that in response to input 972, a multifunction menu 974 is displayed. The multifunction menu includes a plurality of controls, including, for example: webpage magnification controls 976-1, controls 976-2 for activating a decluttered reader view mode, a control 976-3 for hiding the toolbar (e.g., control region 904), a control 976-4 for requesting a desktop webpage (e.g., a non-mobile optimized webpage), a control 976-5 for turning off the microphone, a control 976-6 for displaying one or more website settings, and/or a control 976-7 for generating a privacy report for the webpage 964.

Figure 9N:
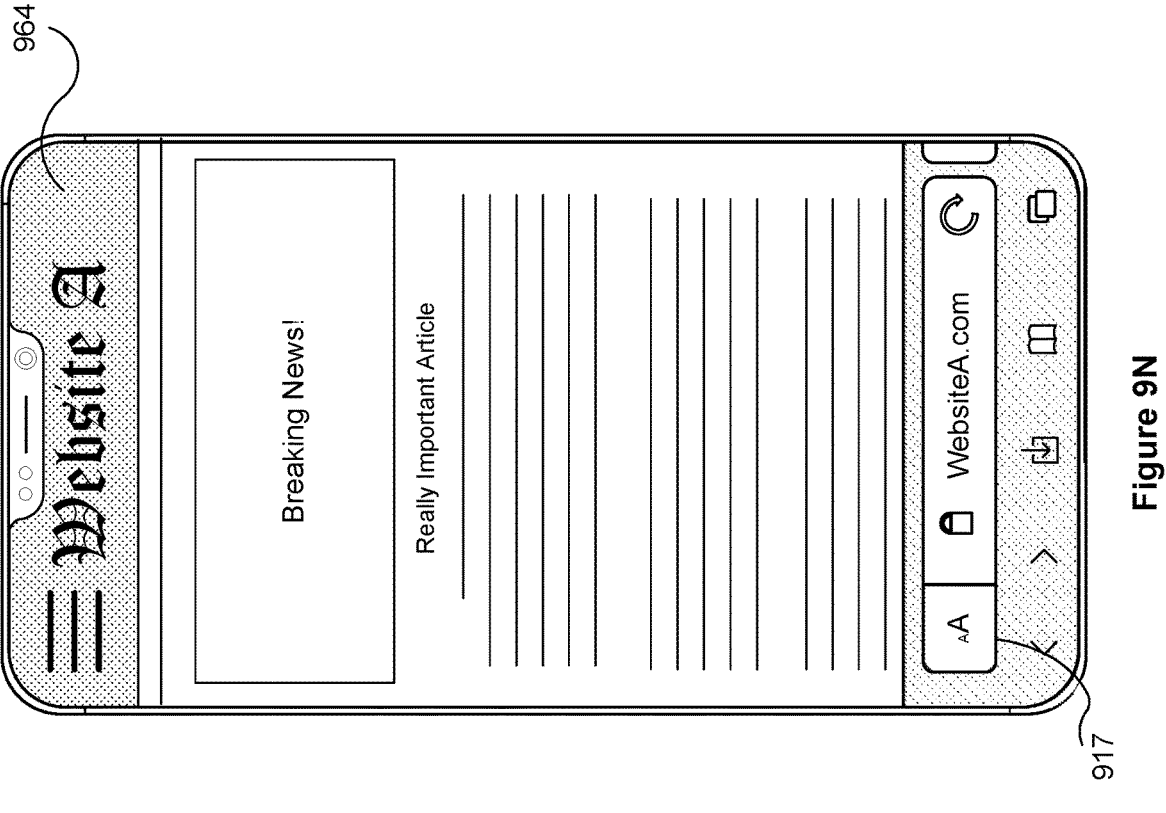
Figure 9M:
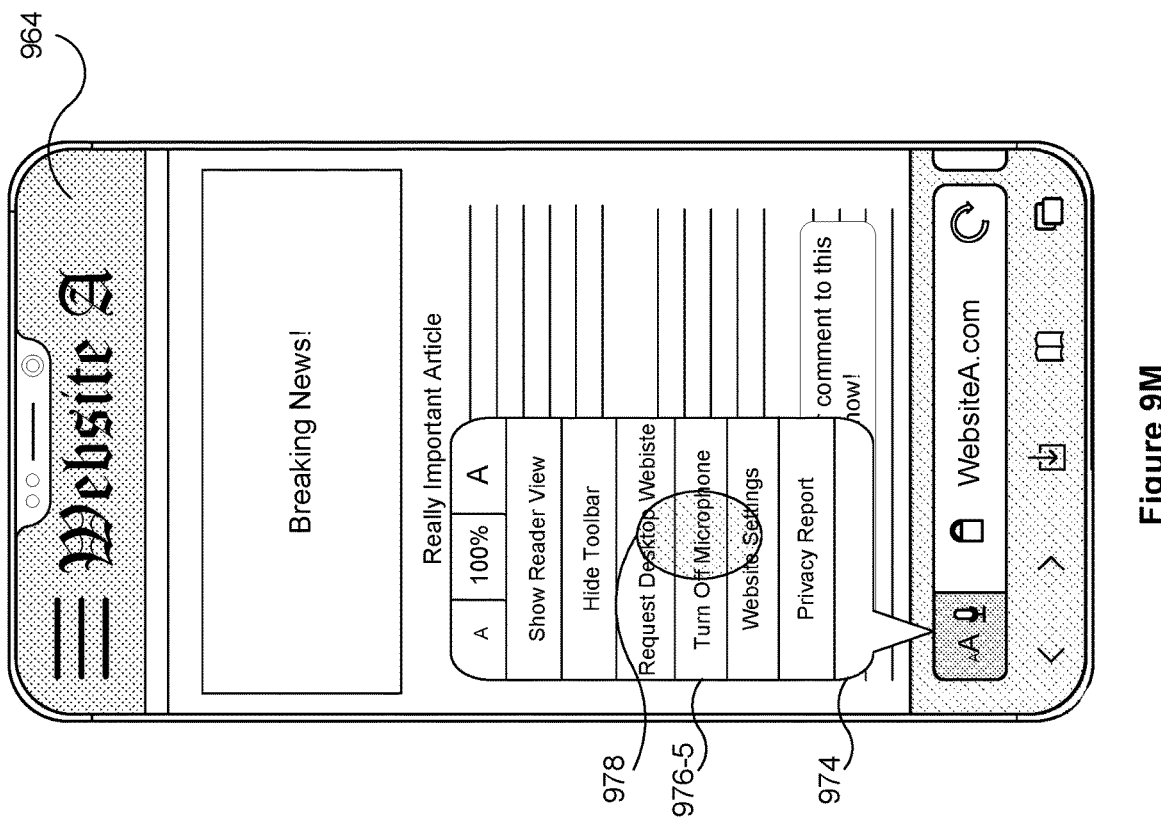

FIG. 9M shows an input 978 occurring over control 976-5 for turning off the microphone. FIG. 9N shows that in response to the input 978, the microphone is turned off and is no longer being accessed by the webpage. FIG. 9N also shows that in response to the input 978 the multifunction menu 974 ceases to be displayed. FIG. 9N also illustrates that the multifunction area 917 no longer displays a microphone icon 970 in response to input 978.

Figure 9P:
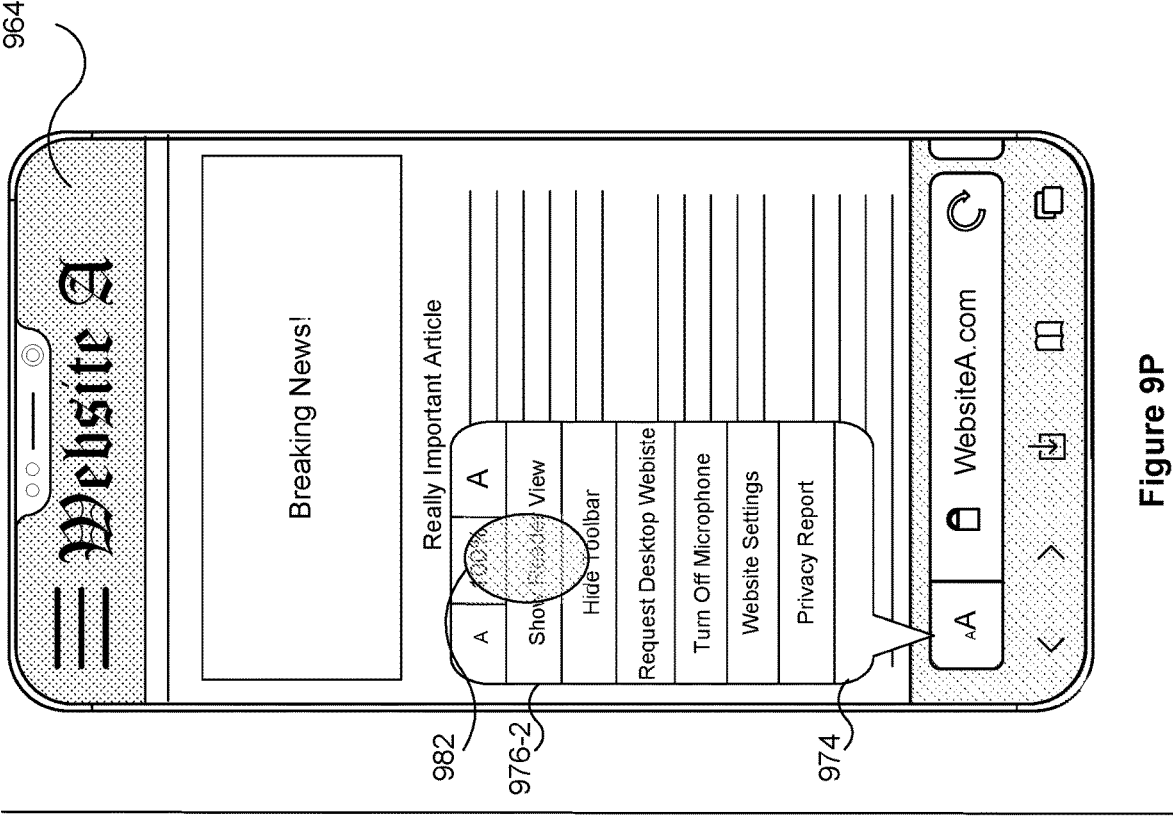
Figure 9O:
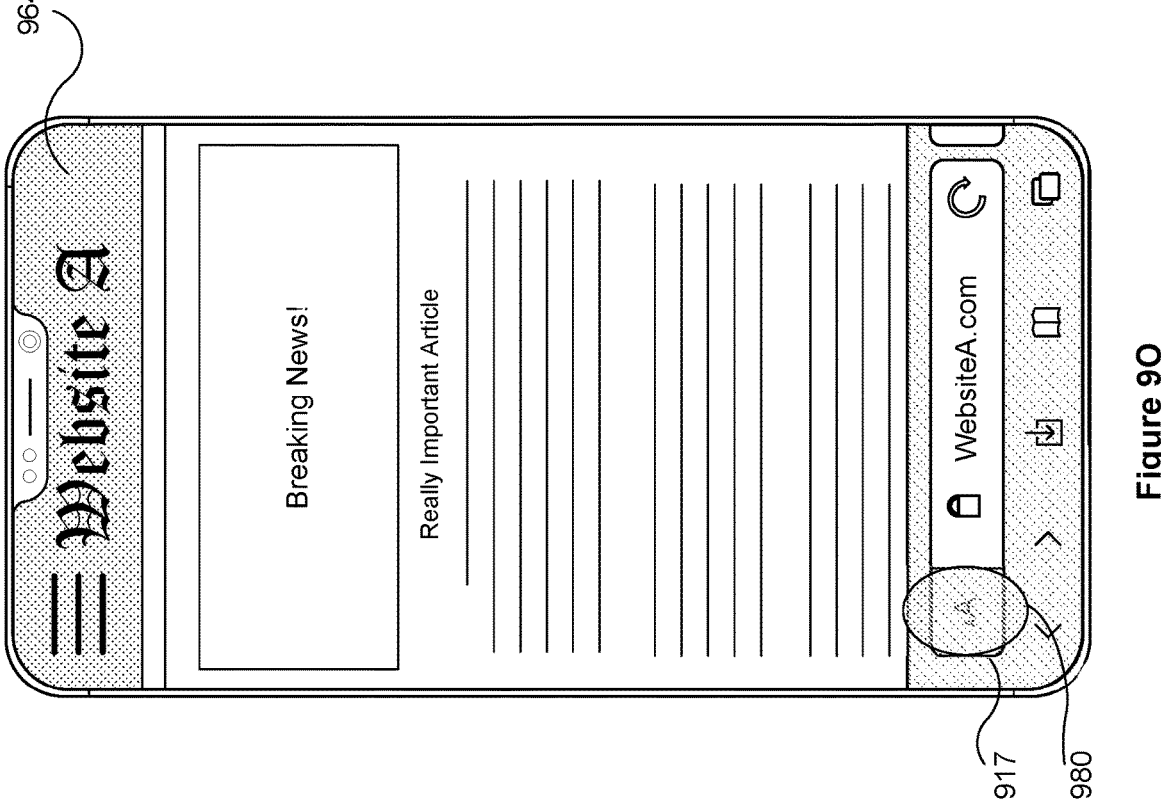

FIG. 9O illustrates an input 980 at multifunction area 917. FIG. 9P shows that in response to input 980, a multifunction menu 974 is displayed. FIG. 9P also shows an input 982 at controls 976-2 for activating a decluttered reader view mode. FIG. 9Q shows that in response to input 982 a reader view of webpage 964 (e.g., reader view webpage 984). To illustrate that the reader view of webpage 964 is selected the multifunction area 917 changes in appearance (e.g., a color, an icon design, etc.). FIG. 9Q also shows a swipe gesture 986 over the reader view webpage 984 moving in a bottom to top direction to scroll the webpage down.

Figure 9R:
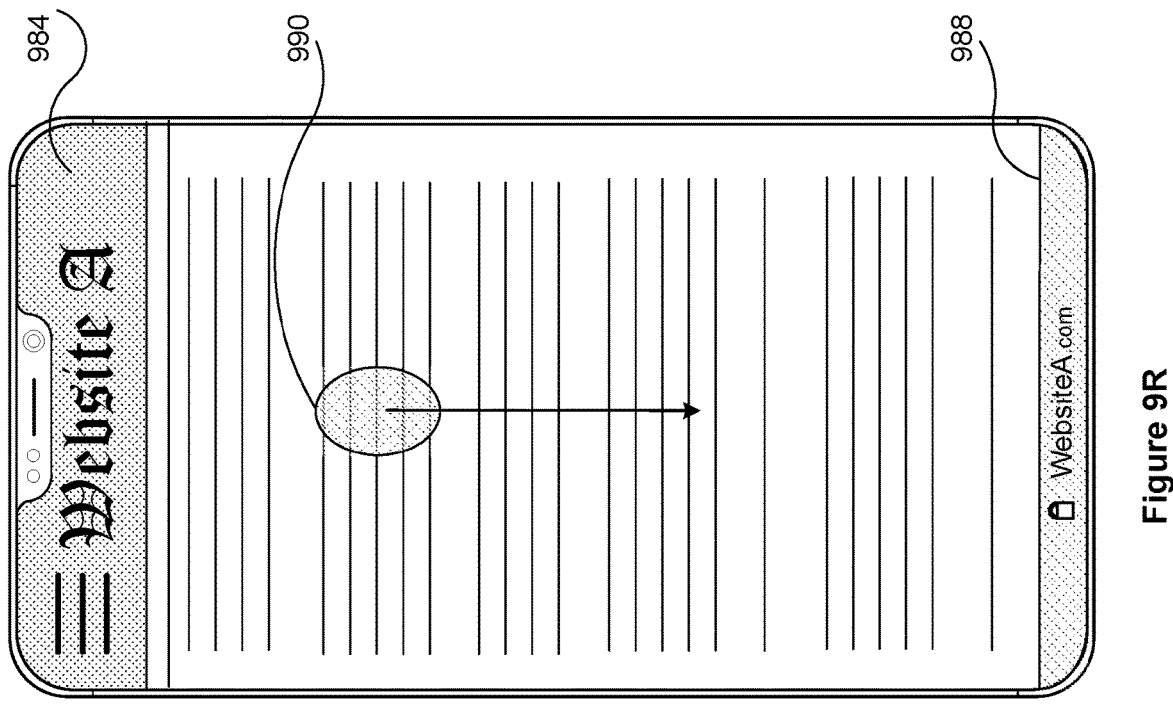
Figure 9Q:
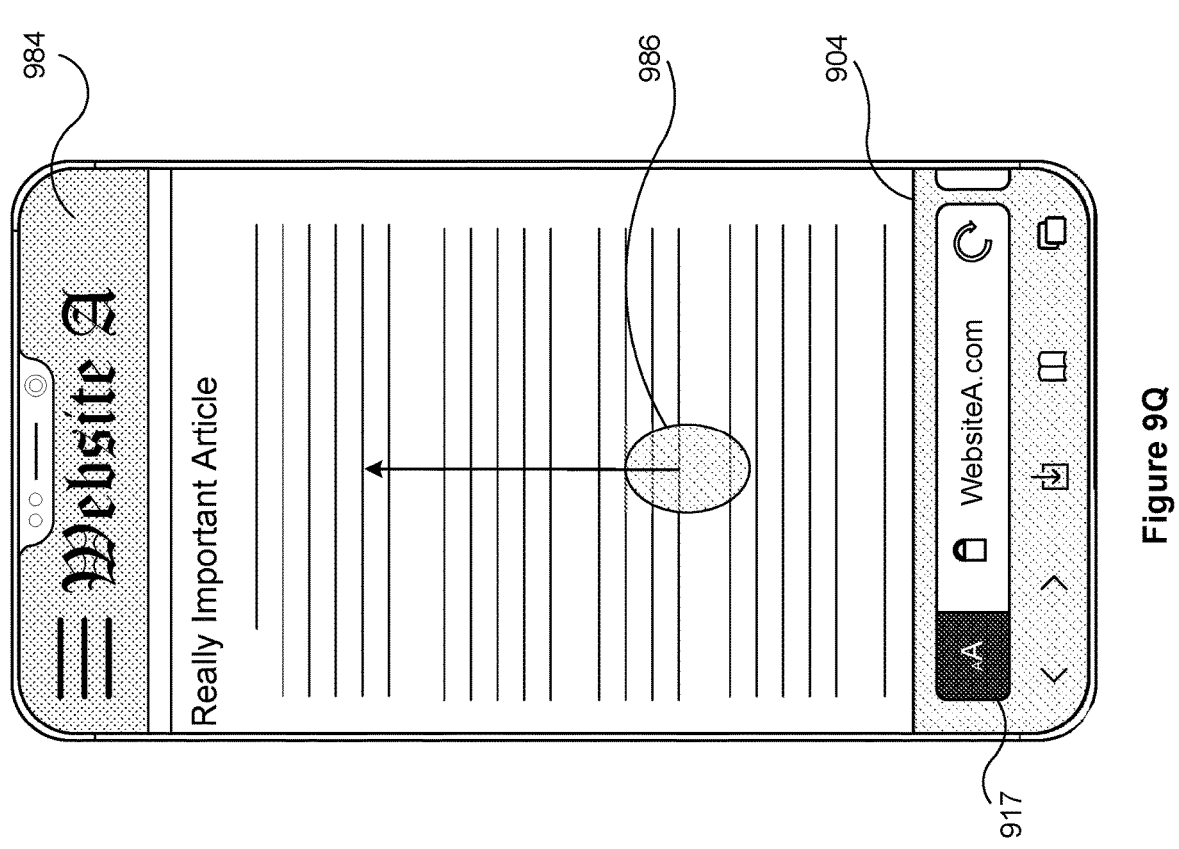

FIG. 9R illustrates that in response to swipe gesture 986, reader view webpage 984 is scrolled. FIG. 9R also illustrates that in response to swipe gesture 986, the control region 904 is minimized to produce a minimized control region 988. FIG. 9R also shows a swipe gesture 990 over the reader view webpage 984 moving in a top to bottom direction to scroll the webpage up. FIG. 9S shows that in response to the swipe gesture 990, the webpage is scrolled up. FIG. 9S also shows that in response to the swipe gesture 990, the minimized control region 988 is maximized to display control region 904. FIG. 9S also illustrates a horizontal swipe gesture 992-1 occurring over the Website A tab 993.

Figure 9T:
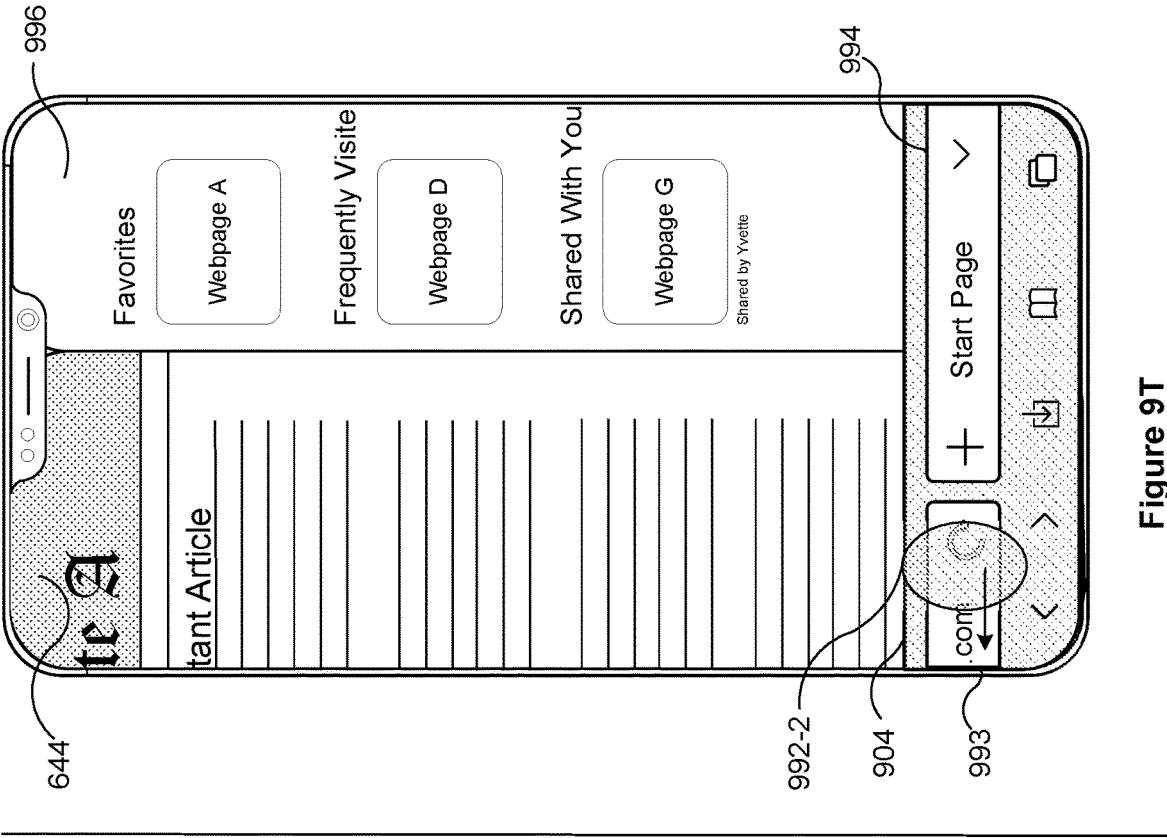
Figure 9S:
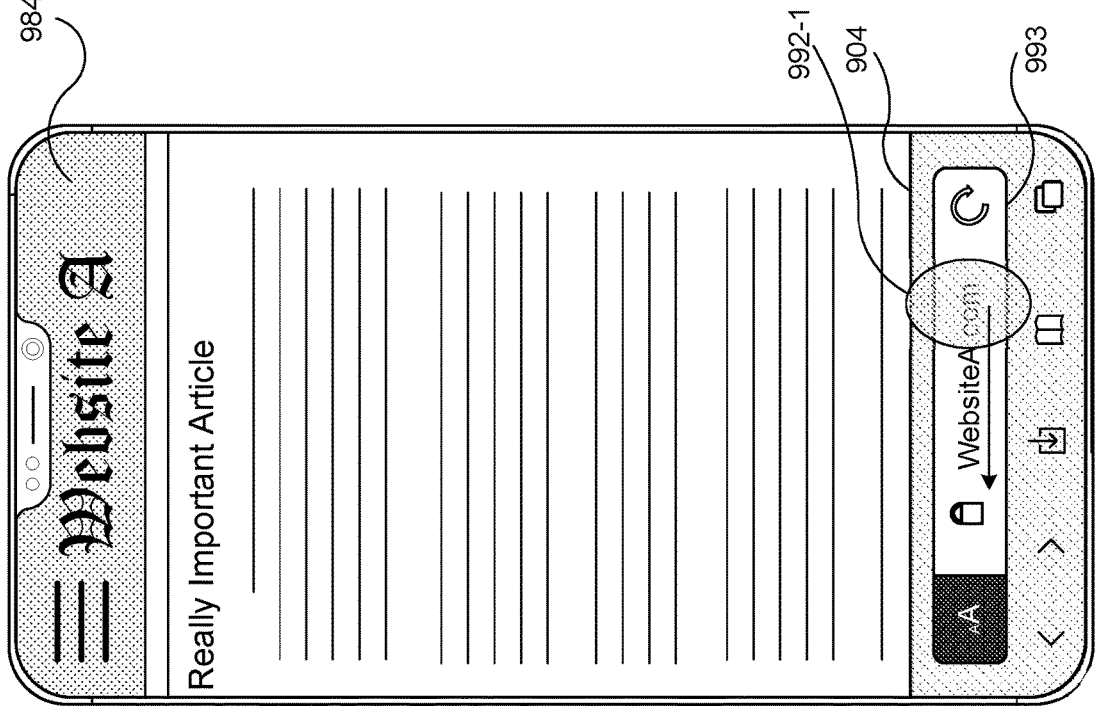
Figure 9U:
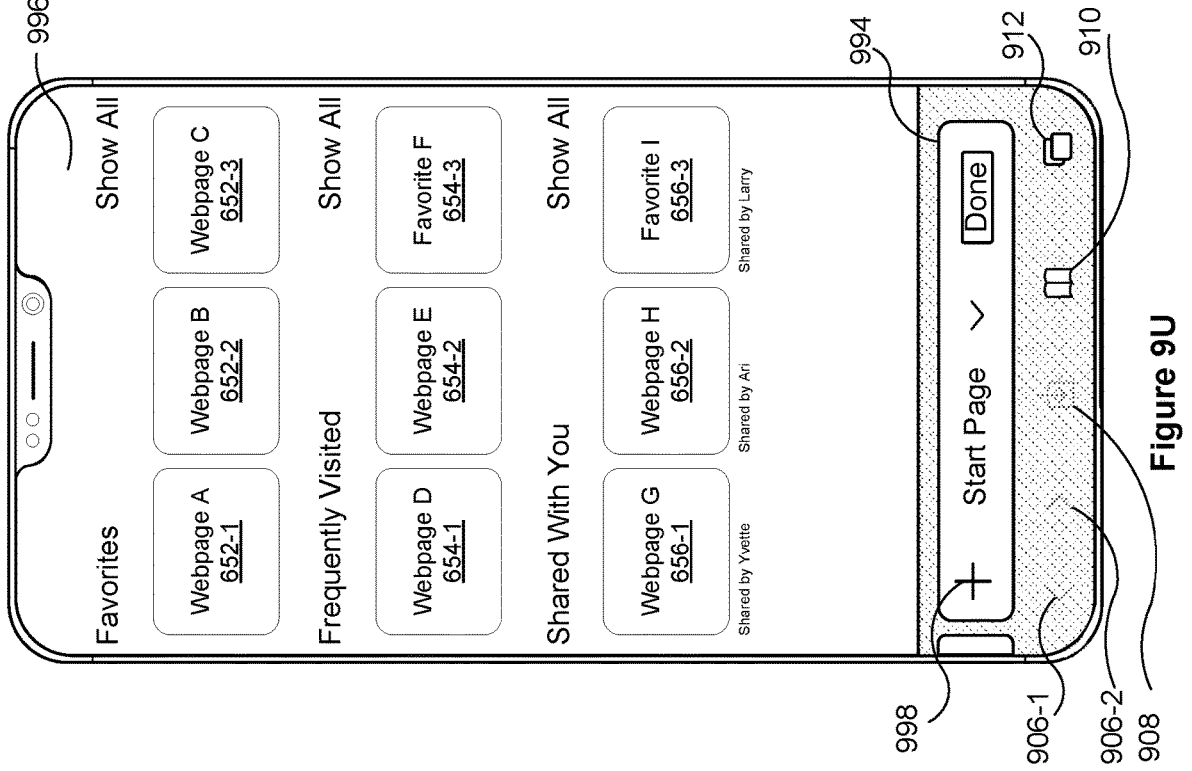

FIG. 9T illustrates the horizontal swipe gesture 992-2 continuing, and causing another tab 994 and another associated webpage 996 to replace Website A tab 993 and displayed webpage 964. FIG. 9T also shows that in response to horizontal swipe gesture, control region 904 that includes dynamic and/or persistent controls for interacting with a web browser remain fixed on the display. In some embodiments, only Website A tab 993 is moved within the control region 904. In some embodiments, the horizontal gesture 992-2 and other gestures described below are along a substantial direction, as discussed in reference to FIG. 6B.

FIG. 9U illustrates that in response to horizontal swipe gesture 992-2 completing, the other tab 994 and the other associated webpage 996 completely replaces Website A tab 993 and displayed webpage 964. In this example, the associated webpage 996 is a start page, and the other tab 994 is a "new tab" control that includes a plus button 998 for creating a new tab group. In some embodiments, the webpages are replaced by sliding the currently displayed webpage off the screen while sliding-in the replacement webpage, both in the direction of the horizontal swipe gesture. FIG. 9U also illustrates that in response to horizontal swipe gesture 992-2 completing, control region 904 is maintained, and the following controls are also maintained: webpage navigation controls 906-1 and 906-2, sharing control 908 for sharing a webpage, a bookmark control 910 for accessing bookmarks, and a tab control 912 for selecting different tabs. In some embodiments, webpage navigation controls 906-1 and 906-2, and sharing control 908 for sharing a webpage have a different appearance (e.g., grayed out) to indicate that they are not currently selectable.

FIGS. 10A-10D are flow diagrams illustrating a method 1000 of a process for interacting with a web-browser application in accordance with some embodiments. Method 1000 is performed at the electronic device (e.g., portable multifunction device 100, device 300) that is in communication with a display generation component, and one or more input devices (1002). Some operations in method 600 are, optionally, combined and/or the order of some operations is, optionally, changed.

As described below, method 1000 provides an intuitive way to improve the ease of access of certain user interface elements of a web-browser application to a user by displaying a text input region adjacent to a keyboard in a web-browser application, as opposed to the top of the display. Typically users would have to extend or move their hand to reach the top of the display to enter text into this text field. Alternatively, they would have to use a different hand. Thus, placing the input region adjacent to the keyboard improves ease of use of the device. For battery-operated electronic devices, enabling a user to select user interface elements faster and more efficiently conserves power and increases the time between battery charges.

In some embodiments, the electronic device displays (1004), via the display generation component, a user interface that includes a currently displayed webpage and an associated tab in a tab row. FIG. 9A, for example, illustrates webpage 902 that is positioned above (or overlaid over) a control region 904 that includes dynamic and/or persistent controls for interacting with a web browser. In some embodiments, the electronic device receives (1006) an input (e.g., a tap input, a swipe gesture, etc.) at the associated tab in the tab row (e.g., FIG. 9B shows an input 918 occurring at tab 914). In some embodiments in response to receiving (1008) the input at the associated tab, the electronic device concurrently (e.g., at substantially the same time): ceases (1010) to display the currently displayed webpage and the associated tab (e.g., switching tabs within a web-browser user interface), and displays (1012) a search user interface. The search user interface includes a keyboard (1013) (e.g., FIG. 9C illustrates that in response to the input 918 a keyboard 932 is displayed), an input region displayed adjacent to the keyboard (1014), wherein the input region is capable of receiving a textual input (e.g., the input region receives textual inputs from the keyboard). For example, FIG. 9C shows that in response to the input 918 address/search bar 930 is displayed). The search user interface also includes a suggestion region above the input region that includes at least one user interface element linked to a webpage (1016). For example, FIG. 9C illustrates that in response to input 918, a new tab interface 922 is displayed that includes a partial list of favorited webpage buttons (e.g., 924-1 through 924-3), a partial list of frequently visited webpage buttons (e.g., 926-1 through 926-3), and a partial list of shared webpage buttons (e.g., 928-1 through 928-3).

In some embodiments, the electronic device receives (1018) a textual input (e.g., from the keyboard) in the input region (e.g., as illustrated by textual input 937 reciting the letter "N"), and in response to receiving the textual input: in accordance with a determination that the textual input is not a webpage address (e.g., a word, a sentence, a few characters, etc.), the electronic device displays search results corresponding to the textual input (e.g., performing an internet search via an internet search engine and displaying one or more results). For example, FIG. 9D illustrates that in response to the textual input not being a webpage address, suggested internet searches 938 based at least in part on past web browsing and the partial inputs received (e.g., the letter "N") are displayed. FIG. 9D also shows that in response to the textual input not being a webpage address, a region that includes suggested webpages is displayed. That region includes links to previously visited webpage 940 (e.g., as indicated by "Website C" with a globe icon next to it), a link to a suggested webpage that was not previously visited 942 (e.g., as indicated by "Website A" with a star cluster icon next to it), a link to a webpage that is an already open tab 944 (e.g., as indicated by "Website B" with a tab icon next to it), and a link to a webpage that is saved as bookmark 946 (e.g., as indicated by "Website D" with a book icon next to it). In some embodiments, in accordance with a determination that the textual input is a webpage address (e.g., a Uniform Resource Locator (URL)), the electronic device retrieves (e.g., the electronic device downloads contents of the webpage via an internet connection) and displays a webpage associated with the webpage address (and its associated tab). Automatically providing either search results or retrieving a webpage based on a determination of what a user has provided reduces the need to have a separate search area and additional inputs to be provided by the user, which reduces the number of inputs needed to perform an operation.

In some embodiments, the electronic device receives (1020) a textual input in the input region, and in response to receiving textual input in the input region, displaying one or more tailored suggested links that are displayed based on the textual input (e.g., the one or more tailored links are displayed based on comparing the textual input to an internet history of the user, a list of saved webpages, a list of popular webpages, and a list of popular internet searches). For example, FIG. 9D shows that in response to the textual input not being a webpage address, a region that includes suggested webpages is displayed. That region includes links to previously visited webpage 940 (e.g., as indicated by "Website C" with a globe icon next to it), a link to a suggested webpage that was not previously visited 942 (e.g., as indicated by "Website A" with a star cluster icon next to it), a link to a webpage that is an already open tab 944 (e.g., as indicated by "Website B" with a tab icon next to it), and a link to a webpage that is saved as bookmark 946 (e.g., as indicated by "Website D" with a book icon next to it). Automatically providing tailored suggested internet links provides the user with the predicted desired internet link without them needing to perform additional inputs, which reduces the number of inputs needed to perform an operation.

In some embodiments, in response to the electronic device receiving textual input (e.g., a search string) in the input region, the electronic device displays (1022), a list of suggested internet search strings (e.g., the list can include one or more internet searches, such as suggested internet searches 938 shown in FIG. 9D). In some embodiments, one or more predicted search results are displayed at least partially based on the textual input. In some embodiments, the tailored suggested links are separate from the list of suggested internet search strings (e.g., the tailored suggested links are determined by the web browser and the list of suggested internet search strings is determined by a search engine). Automatically providing list of suggested internet search strings provides the user with the predicted desired internet strings without them needing to perform additional inputs, which, in other words, causes performance of an operation when a set of conditions has been met without requiring further user input.

In some embodiments, the electronic device receives (1024) an additional textual input (e.g., another keystroke (e.g., another number/letter/symbol or another word)), and in response to receiving an additional textual input, the electronic device updates the list of suggested internet search strings in accordance with the additional textual input (e.g., one or more internet links change based on the additional textual input). For example, new tab user interface 922 in FIG. 9D displays one or more predictive results based on the input). Automatically providing a refined list of suggested internet search strings provides the user with the better predicted suggested internet strings without them needing to perform additional inputs, which, in other words, causes performance of an operation when a set of conditions has been met without requiring further user input.

In some embodiments, the textual input is received via a speech-to-text input (1026). For example, FIG. 9C illustrates a speech-to-text user interface element 931 that when selected enables speech to be converted to text. Allowing an alternative input mechanism allows users a different way to interact with the device, which provides additional control options without cluttering the UI with additional displayed control options.

In some embodiments, the one or more tailored suggested links comprise (1030): one or more websites not previously visited, one or more websites previously visited, one or more bookmarked websites, and one or more websites that are already open in the web browser. For example, FIG. 9D shows a region that includes suggested webpages, which can include links to a previously visited webpage 940 (e.g., as indicated by "Website C" with a globe icon next to it), a link to a suggested webpage that was not previously visited 942 (e.g., as indicated by "Website A" with a star cluster icon next to it), a link to a webpage that is an already open tab 944 (e.g., as indicated by "Website B" with a tab icon next to it), and a link to a webpage that is saved as bookmark 946 (e.g., as indicated by "Website D" with a book icon next to it). Providing different suggested internet links from different sources helps ensure that the user's desired tailored suggested links will be populated in the shortest amount of time, which, in other words, causes performance of an operation when a set of conditions has been met without requiring further user input.

In some embodiments, each of the one or more websites not previously visited is associated with a first icon (e.g., FIG. 9D illustrates a suggested webpage link that was not previously visited 942 that has a star cluster icon next to it), each of the one or more websites previously visited is associated with a second icon (e.g., FIG. 9D illustrates previously visited webpage link 940 that has a globe icon next to it), each of the one or more bookmarked websites is associated with a third icon (e.g., FIG. 9D illustrates a webpage link to a saved bookmark 946 that has a book icon next to it), and each of the one or more websites that are already open in the web browser is associated with a fourth icon (e.g., FIG. 9D illustrates a webpage link to an already open tab 944 that has a tab icon next to it), where the first icon, second icon, third icon, and fourth icon each have different appearances (1032). Providing visual indicators for each of the different sources of suggested internet links helps ensure that the user identify where the tailored suggested links are populated from, which, in other words, which therefore provides improved feedback.

In some embodiments, one or more tailored suggested links comprise one or more websites not previously visited (1034). For example, FIG. 9D illustrates a link to a suggested webpage that was not previously visited 942). Providing suggested internet links to websites that were previously not visited by the user, helps the user find links they may not have initially considered, which provides improved feedback.

In some embodiments, one or more tailored suggested links comprise one or more bookmarked websites (1036). For example, FIG. 9D illustrates a link to a webpage that is saved as bookmark 946. Providing suggested internet links to websites that are bookmarked by the user, helps the user find links they are familiar and frequently select, which provides improved feedback.

In some embodiments, one or more tailored suggested links comprise one or more websites that are already open in the web browser (1038). For example, FIG. 9D illustrates a link to a webpage that is an already open tab 944). Providing suggested internet links to websites that are already open in another tab, helps the user quickly switch to another tab that, which reduces the number of inputs needed to perform an operation.

In some embodiments, one or more tailored suggested links comprise one or more websites previously visited (1040). For example, FIG. 9D illustrates a link to a previously visited webpage 940). Providing suggested internet links to websites that were previously visited by the user, helps the user easily find links they normally visit, which reduces the number of inputs needed to perform an operation.

In some embodiments, in response to receiving textual input in the input region, the electronic device ceases (1042) to display the at least one user interface element linked to a webpage. For example, partial list of favorited webpage buttons (e.g., 924-1 through 924-3), partial list of frequently visited webpage buttons (e.g., 926-1 through 926-3), and partial list of shared webpage buttons (e.g., 928-1 through 928-3) are ceased to be displayed in response to textual input 937 reciting the letter "N". Removing no longer necessary user interface elements allows for more screen real estate to be dedicated to the user interface elements the user desires to see, which provides improved feedback.

In some embodiments, the electronic device receives (1044) an additional input selecting a particular tailored suggested link of the one or more tailored suggested links, and in response to the other input (e.g., FIG. 9E illustrates an input 948 at a suggested webpage link that was not previously visited 942), the electronic device concurrently: ceases to display the search user interface (e.g., the user interface 922 that was shown in FIG. 9E is ceased to be displayed in FIG. 9F), and (retrieves from the internet a webpage and) displays a webpage and tab associated with the particular tailored suggest link (e.g., FIG. 9F illustrates webpage 950 associated with the link to a suggested webpage that was not previously visited 942). Removing no longer necessary user interface elements allows for more screen real estate to be dedicated to the user interface elements the user desires to see, which provides improved feedback.

In some embodiments, the webpage suggestion region is displayed above the keyboard (1046). For example, FIG. 9C illustrates the keyboard 932 placed beneath new tab user interface 922). Displaying the webpage suggestion region above the keyboard provides an easier user interface to interact with, which provides improved feedback.

In some embodiments, the at least one user interface element linked to a webpage includes (1048) one or more bookmarked webpages, frequently visited webpages, and webpages shared with the user of the electronic device (e.g., a shared webpage is a webpage received in another application installed on the electronic device (e.g., a message application that receives text message that includes a URL link). For example, FIG. 9C illustrates a new tab interface 922 that includes a partial list of favorited webpage buttons (e.g., 924-1 through 924-3), a partial list of frequently visited webpage buttons (e.g., 926-1 through 926-3), and a partial list of shared webpage buttons (e.g., 928-1 through 928-3). Providing the user with links to bookmarks, frequently visited webpages, and shared webpages allows the user to select their most likely desired link with as few inputs as possible, which reduces the number of inputs to perform an operation.

In some embodiments, the input is a tap input (1050). In some embodiments, a tap input performed by a finger of a user or a stylus). For example, FIG. 9B shows a tap input 918 occurring at tab 914. Allowing for simple inputs such as a tap input provides the user with an easy interaction, which reduces the number of inputs needed to perform an operation.

In some embodiments, the keyboard is predominately in a bottom portion of a display region generated by the display generation component (e.g., FIG. 9C shows keyboard 932 at bottom portion of the display), the input region is predominately in a middle portion of the display region (e.g., FIG. 9C shows address/search bar 930 placed in the middle of the display), and the webpage suggestion region is predominately in an upper portion of the display region (1052) (e.g., FIG. 9C shows new tab user interface 922). Displaying the webpage suggestion region above the keyboard and displaying the provides an easier user interface to interact with, which provides improved feedback.

It should be understood that the particular order in which the operations in FIGS. 10A-10D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 1100) are also applicable in an analogous manner to method 1000 described above with respect to FIGS. 10A-10D. For example, the described above with reference to method 1000 optionally have one or more of the characteristics of the contacts, gestures, user interface objects animations described herein with reference to other methods described herein (e.g., methods 700, 800, and 1100). For brevity, these details are not repeated here.

FIGS. 11A-11C are flow diagrams illustrating method 1100 of interacting with a web-browser application in accordance with some embodiments. Method 1100 is performed at an electronic device (e.g., portable multifunction device 100, device 300) that is in communication with a display generation component, and one or more input devices (1102). Some operations in method 1100 are, optionally, combined and/or the order of some operations is, optionally, changed.

As described below, method 1100 provides an intuitive way to display a tab row and web-browser controls in a control region. The method reduces the number, extent, and/or nature of the inputs from a user by providing a clear separation between the contents of the webpage and the control region. This allows the user to know that they are either interacting with the contents of the webpage or interacting with one or more web-browser controls. Thus, this separation between the contents of the webpage and the control region provides improved feedback and reduces mistaken inputs, thereby creating a more efficient human-machine interface. For battery-operated electronic devices, enabling a user to interact faster and more efficiently conserves power and increases the time between battery charges.

In some embodiments, the electronic device displays (1104), via the display generation component, a web-browser user interface that includes a first displayed webpage and a control region (e.g., a region that is not part of the first displayed webpage and is produced via a web-browser application and not retrieved from a first displayed webpage). In some embodiments, the control region includes a first tab in a tab row that is associated with the first displayed webpage and one or more web-browser controls (e.g., the tab row is scrollable allowing for more than one tab to be available for selection in the tab row). For example, FIG. 9A illustrates that the control region 904 includes a tab 914, webpage navigation controls 906-1 and 906-2, sharing control 908 for sharing a webpage, a bookmark control 910 for accessing bookmarks, and a tab control 912 for selecting different tabs. In some embodiments, the electronic device receives (1106) a swipe gesture (e.g., the swipe gesture is a touch and slide across the display generation component) over the first tab in a direction along the tab row (e.g., a swipe gesture from a leftward location to a rightward location, or swipe gesture moving from a rightward location to a leftward location). For example, FIGS. 9S-9T show a horizontal swipe gesture 992-1 occurring over the Website A tab 993. In some embodiments, in response to receiving (1108) the swipe gesture, the electronic device concurrently: replaces (1110) display of the first displayed webpage and the first tab with a second displayed webpage and a second tab (e.g., FIG. 9U shows that other tab 994 and the other associated webpage 996 completely replaces Website A tab 993 and displayed webpage 964 of FIG. 9S) (e.g., ceasing display of the first displayed webpage and the first tab and displaying a second displayed webpage and a second tab), and maintains (1112) display of the control region and the one or more web-browser controls (e.g., FIG. 9U shows that control region 904 is maintained, and the following controls are also maintained: webpage navigation controls 906-1 and 906-2, sharing control 908 for sharing a webpage, a bookmark control 910 for accessing bookmarks, and a tab control 912 for selecting different tabs).

In some embodiments, the electronic device maintains (1114) display of the one or more web-browser controls includes keeping the one or more web-browser controls static in response to receiving the swipe gesture (e.g., kept in the same location during the swipe gesture (e.g., not moving on the display)). For example, FIGS. 9S-9U show that webpage navigation controls 906-1 and 906-2, sharing control 908 for sharing a webpage, a bookmark control 910 for accessing bookmarks, and a tab control 912 for selecting different tabs all stay static and in the same location on the display. Keeping some controls static while switching between tabs provides the user with a consistent user interface allowing the user to not have hunt for user interface elements or accidentally select incorrect user interface elements, which reduces the number off inputs needed to perform an operation.

In some embodiments, the one or more web-browser controls include (1116): a webpage navigation control (e.g., a control for moving forward a webpage or moving back a webpage), a sharing control for sharing a webpage, a bookmark control for displaying bookmarked webpages, and a tab control for selecting between different tabs. For example, FIGS. 9A-9B, 9F-9Q, 9S-9U each show webpage navigation controls 906-1 and 906-2, sharing control 908 for sharing a webpage, a bookmark control 910 for accessing bookmarks, and a tab control 912 for selecting different tabs.

Providing numerous controls in the control region allows the user quick access to desirable web-browser controls without needing to navigate through multiple menus, which reduces the number of inputs needed to perform an operation.

In some embodiments, one or more web-browser control user interface elements are displayed (1118) at a location that is below the tab row. For example, FIG. 9A shows dynamic and/or persistent controls (e.g., webpage navigation controls 906-1 and 906-2, sharing control 908 for sharing a webpage, a bookmark control 910 for accessing bookmarks, and a tab control 912 for selecting different tabs) being displayed beneath the tab 914. Having the web-browser control user interface displayed below the tab row ensure that users will not accidentally select the web-browser controls when meaning to select contents of the webpage, which reduces the number of inputs needed to perform an operation.

In some embodiments, the first tab and the second tab, each include a multifunction region, and in some embodiments, the electronic device receives (1120) an input (e.g., a tap input, long press, etc.) at the multifunction region. In some embodiments, in response to receiving the input (e.g., a tap input, long press, etc.) at the multifunction, the electronic device displays one or more additional controls ((e.g., in a menu that is expanded out from the multifunction region). In some embodiments, the menu overlaps the first displayed webpage. In some embodiments, at least one of the additional controls is a control for enhancing readability of the first displayed webpage (or the second displayed webpage). Having a single user interface element that is multifunctional allows for more screen real estate to be dedicated to content, which is especially important on mobile devices. In other words, having multifunction user interface element provides additional control options without cluttering the UI with additional displayed controls.

In some embodiments, the one or more additional controls include one or more controls for interacting with the first displayed webpage and one or more controls for interacting with the web-browser (1122). For example, the controls displayed in FIG. 9L include controls for interacting with the web-browser such as a control 976-3 for hiding the toolbar (e.g., control region 904) and a control 976-7 for generating a privacy report for the webpage 964 and controls for interacting with the first displayed webpage, such as a webpage magnification controls 976-1, controls 976-2 for activating a decluttered reader view mode, a control 976-4 for requesting a desktop webpage (e.g., a non-mobile optimized webpage), a control 976-5 for turning off the microphone, a control 976-6 for displaying one or more website settings. Displaying additional controls in response to an input on a multifunction user interface element allows for less commonly used controls to be displayed as needed, which provides additional control options without cluttering the UI with additional displayed controls.

In some embodiments, the multifunction region displays one or more icons that indicate that an installed extension (e.g., an ad-block software, a shopping tool, etc.) is operating (1124) (and executing). For example, FIG. 9F illustrates an extension icon 919, which indicates that one or more web-browsing extensions are currently operating on webpage 950. In some embodiments, the multifunction region displays one or more icons that indicate that an installed extension (e.g., an ad-block software, a shopping tool, etc.) is installed to run with the webpage. Providing a visual indication as to which extension is operating, allows the user to have a better idea of which extension(s) is operating for each particular website, which provides improved feedback.

In some embodiments, the multifunction region displays an icon that indicates that a simplified version of the first displayed webpage (e.g., a reader mode) is available (1126). For example, in FIG. 9A tab 914 includes a reader mode icon 916 in a multifunction area 917, that when selected causes the webpage 902 to be displayed in a reader view, which simplifies the webpage 902 to aid in reading. Providing an icon to indicate that a simplified version of the webpage is available allows the user to quickly switch between the normal version of the webpage and the simplified version of the webpage. The user need not navigate menus to enable or disable this mode, which reduces the number of inputs needed to perform an operation.

In some embodiments, in response to receiving the swipe gesture over the first tab in a direction along the tab row, the electronic device displays (1128) one or more additional web-browser controls that were not previously displayed. For example, FIG. 9U shows another tab 994 that includes additional previously non-displayed controls such as a start page specific controls (e.g., new tab group buttons, or a microphone button for enabling speech-to-text inputs). Providing additional web-browser controls based on the displayed webpage allows the user to have the most relevant controls for each webpage displayed, which reduces the need to navigate through menus to find relevant controls. This, in turn, reduces the number of inputs needed to perform an operation.

In some embodiments, in response receiving the swipe gesture over the first tab in a direction along the tab row, the electronic device ceases (1130) to allow selection of at least one of the one or more web-browser controls (e.g., a webpage navigation control (e.g., forward webpage control and backward webpage control) may not be selectable in the second webpage and second displayed webpage). For example, in FIG. 9U webpage navigation controls 906-1 and 906-2, and sharing control 908 for sharing a webpage have a different appearance (e.g., grayed out) to indicate that they are not currently selectable. Automatically, removing irrelevant web-browser controls based on the displayed webpage allows the user to have the most relevant controls for each webpage displayed, which reduces the need to navigate through menus to find relevant controls. This, in turn, reduces the number of inputs needed to perform an operation.

In some embodiments, the first displayed webpage and the first tab are distinct and different from the second displayed webpage and the second tab, respectively (1132). Comparing FIG. 9S to FIG. 9T, the Website A tab 993 appears different and displays different information than the other tab 994.

In some embodiments, the control region overlays the first displayed webpage (1134). In some embodiments, the control region overlays the second displayed webpage, depending on which webpage is being displayed. For example, FIGS. 9Q-9R show that the webpage is scrollable and that a portion of reader view webpage 984 is covered by control region 904. Having the control region overlay the first displayed webpage creates a user interface that is easier to interpret, which provides improved feedback.

In some embodiments, the electronic device replaces (1136) display of the first displayed webpage and the first tab with the second displayed webpage and the second tab includes sliding the first webpage off a first edge of the display region, while sliding another webpage into the display region from a second edge that is opposite the first edge. For example, FIG. 9T illustrates an intermediary animation that shows the webpage 644 being slid off the display region, and another associated webpage 996 being slid onto the display region. Providing an animation to go with the switching of webpages indicates to the user that the webpages are switching, which provides improved feedback.

In some embodiments, the first tab includes at least one additional control (e.g., a refresh button for refreshing the first displayed webpage) and the second tab includes the at least one additional control (1138). In other words, the first tab and second tab each include an additional control that is not always available. In some embodiments, these additional controls can be different. For example, in some embodiments a refresh button may be shown and other embodiments a speech-to-text button can be shown. For example a refresh button for refreshing the second displayed webpage. For example, FIG. 9A includes a refresh button 913 for refreshing the webpage 902, and FIG. 9U shows a plus button 998 for creating a new tab group. Providing additional web-browser controls based on the displayed webpage allows the user to have the most relevant controls for each webpage displayed, which reduces the need to navigate through menus to find relevant controls. This, in turn, reduces the number of inputs needed to perform an operation.

It should be understood that the particular order in which the operations in FIGS. 11A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 1000) are also applicable in an analogous manner to method 1100 described above with respect to FIGS. 11A-11C. For example, the described above with reference to method 1100 optionally have one or more of the characteristics of the contacts, gestures, user interface objects animations described herein with reference to other methods described herein (e.g., methods 700, 800, and 1000). For brevity, these details are not repeated here.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve multi-participant live communication sessions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to modify representations of a gaze direction for a respective participant in order to improve multi-participant live communication sessions. Accordingly, use of such personal information data enables users to have calculated control of the personal information that is shared to improve multi-participant live communication sessions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of multi-participant live communication sessions, the present technology can be configured to allow users to select to "opt in" or "opt out" of participation in the collection of personal information data during registration for services or anytime thereafter. In another example, users can select not to share data associated with the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a representation of gaze for a particular user can be corrected at a system of another user by inferring preferences and/or the gaze direction of the particular user and/or the other user based on non-personal information data or a bare minimum amount of personal information, such as the content being requested by the device associated with a user, other non-personal information available to the multi-participant live communication services, or publicly available information.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

What is claimed is:

1. A method for web browsing, the method comprising:

at a portable device that is in communication with a display generation component, and one or more input devices;

displaying, via the display generation component, a web-browser user interface that includes a currently displayed webpage and an associated tab in a tab row;

receiving a swipe gesture in a first direction; and in response to receiving the swipe gesture in the first direction:

in accordance with a determination that the swipe gesture in the first direction occurs at a location corresponding to the associated tab in the tab row, performing a tab row navigation function by concurrently:

ceasing to display the currently displayed webpage and the associated tab, and displaying an additional webpage and a respective associated additional tab in accordance with the swipe gesture in the first direction in the tab row; and in accordance with a determination that the swipe gesture in the first direction occurs at a location corresponding to the currently displayed webpage, performing a webpage navigation function to navigate a browsing history, where the webpage navigation function is different from the tab row navigation function.

2. The method of claim 1, wherein the swipe gesture in the first direction is a swipe gesture moving from left to right.

3. The method of claim 1, wherein the currently displayed webpage forms part of a group of webpages; and the method includes:

receiving a swipe gesture in a second direction;

in response to receiving the swipe gesture in the second direction:

in accordance with a determination that the swipe gesture occurs at a location corresponding to the associated tab in the tab row, displaying a plurality of representations of webpages, including a representation of the currently displayed webpage, the plurality of representations of webpages corresponding to at least some of the group of webpages; and in accordance with a determination that the swipe gesture occurs at a location corresponding to the currently displayed webpage, scrolling the currently displayed webpage.

4. The method of claim 3, wherein the swipe gesture in the second direction is a swipe gesture moving from a downward location to an upward location.

5. The method of claim 3, wherein the plurality of representations of webpages each include a respective affordance for removing a tab associated with the respective webpage from the group of webpages.

6. The method of claim 3, including:

in response to scrolling the currently displayed webpage, concurrently:

ceasing to display the associated tab; and displaying reduced size website information at a different location than the associated tab.

7. The method of claim 3, wherein the group of webpages is not a user defined group, and the method includes:

in response to receiving the swipe gesture in the second direction, and in accordance with a determination that the swipe gesture occurs at a location corresponding to the associated tab in the tab row, displaying an affordance for creating a new user defined group of webpages.

8. The method of claim 3, wherein the plurality of representations of webpages do not all fit within the web-browser user interface, and the method includes:

receiving a gesture via the one or more input devices; and in response to receiving the gesture, scrolling the plurality of representations of webpages to reveal previously non-displayed representation of webpages.

9. The method of claim 3, including:

in response to receiving the swipe gesture in the second direction, and in accordance with a determination that the swipe gesture occurs at a location corresponding to the associated tab in the tab row, displaying an identifier for the group of webpages.

10. The method of claim 3, including:

in response to receiving the swipe gesture in the second direction, and in accordance with a determination that the swipe gesture occurs at a location corresponding to the associated tab in the tab row, displaying a user interface element for displaying one or more other groups of webpages;

receiving an input at the user interface element; and in response to receiving the input, displaying one or more identifiers each associated with the one or more other groups of webpages.

11. The method of claim 10, including:

receiving an input at an identifier of the one or more identifiers;

in response to receiving the input:

closing the group of webpages; and displaying another group of webpages associated with the identifier.

12. The method of claim 3, wherein the group of webpages is defined by a user of the portable device.

13. The method of claim 1, wherein the associated tab in the tab row partially overlays a side of the currently displayed webpage.

14. The method of claim 1, wherein the portable device is a smartphone with a limited screen area.

15. The method of claim 1, wherein the swipe gesture in the first direction occurs along an axis of the tab row.

16. The method of claim 1, including:

in accordance with a determination that one or more tabs are scrollable from the tab row in a first direction, displaying a user interface element that indicates whether additional tabs are available for selection from the tab row; and in accordance with a determination that no more tabs are scrollable in the first direction, forgoing display of the user interface element that indicates whether additional tabs are available for selection from the tab row.

17. The method of claim 1, wherein no additional associated tabs are left to scroll in the tab row, and the method includes:

in response to receiving an additional swipe gesture in the first direction:

in accordance with a determination that the additional swipe gesture in the first direction occurs at a location corresponding to the associated tab in the tab row, concurrently:

ceasing to display the currently displayed webpage, and displaying a new user interface that includes one or more user interface elements for selecting a new webpage to display.

18. The method of claim 17, wherein the new user interface is a start page of the web-browser user interface, and the one or more user interface elements are favorited webpages, shared webpages, and frequently visited webpages.

19. The method of claim 1, wherein the associated tab in the tab row includes webpage navigation controls in accordance with a determination that those controls are applicable.

20. The method of claim 1, wherein the associated tab includes a multifunction user interface element that when selected displays control options related to the currently displayed webpage, and the method includes:

receiving a request to download a file associated with the webpage; and in response to receiving the request, modifying the multifunction user interface element to show a download progress of the file.

21. The method of claim 1, wherein performing the webpage navigation function includes either moving forward or backward a webpage in the browsing history corresponding to the associated tab.

22. A portable device, comprising:

one or more input devices;

one or more processors; and memory storing one or more programs, wherein the one or more programs are configured to be executed by the one or more processors, the one or more programs including instructions for:

displaying, via a display generation component in communication with the portable device, a web-browser user interface that includes a currently displayed webpage and an associated tab in a tab row;

receiving a swipe gesture in a first direction; and in response to receiving the swipe gesture in the first direction:

in accordance with a determination that the swipe gesture in the first direction occurs at a location corresponding to the associated tab in the tab row, performing a tab row navigation function by concurrently:

ceasing to display the currently displayed webpage and the associated tab, and displaying an additional webpage and a respective associated additional tab in accordance with the swipe gesture in the first direction in the tab row; and in accordance with a determination that the swipe gesture in the first direction occurs at a location corresponding to the currently displayed webpage, performing a webpage navigation function to navigate a browsing history, where the webpage navigation function is different from the tab row navigation function.

23. A non-transitory computer readable storage medium storing one or more programs, the one or more programs comprising instructions, that, when executed by a portable device in communication with a display generation component and one or more input devices cause the portable device to:

display, via the display generation component, a web-browser user interface that includes a currently displayed webpage and an associated tab in a tab row;

receive a swipe gesture in a first direction; and in response to receiving the swipe gesture in the first direction:

in accordance with a determination that the swipe gesture in the first direction occurs at a location corresponding to the associated tab in the tab row, performing a tab row navigation function by concurrently:

cease to display the currently displayed webpage and the associated tab, and display an additional webpage and a respective associated additional tab in accordance with the swipe gesture in the first direction in the tab row; and in accordance with a determination that the swipe gesture in the first direction occurs at a location corresponding to the currently display webpage, performing a webpage navigation function to navigate a browsing history, where the web navigation function is different from the tab row navigation function.

24. The portable device of claim 22, wherein the currently displayed webpage forms part of a group of webpages; and the one or more programs include instructions for:

receiving a swipe gesture in a second direction;

in response to receiving the swipe gesture in the second direction:

in accordance with a determination that the swipe gesture occurs at a location corresponding to the associated tab in the tab row, displaying a plurality of representations of webpages, including a representation of the currently displayed webpage, the plurality of representations of webpages corresponding to at least some of the group of webpages; and in accordance with a determination that the swipe gesture occurs at a location corresponding to the currently displayed webpage, scrolling the currently displayed webpage.

25. The portable device of claim 24, wherein the one or more programs include instructions for:

in response to scrolling the currently displayed webpage, concurrently:

ceasing to display the associated tab; and displaying reduced size website information at a different location than the associated tab.

26. The portable device of claim 24, wherein the group of webpages is not a user defined group, and the one or more programs include instructions for:

in response to receiving the swipe gesture in the second direction, and in accordance with a determination that the swipe gesture occurs at a location corresponding to the associated tab in the tab row, displaying an affordance for creating a new user defined group of webpages.

27. The portable device of claim 24, wherein the plurality of representations of webpages do not all fit within the web-browser user interface, and the one or more programs include instructions for:

receiving a gesture via the one or more input devices; and in response to receiving the gesture, scrolling the plurality of representations of webpages to reveal previously non-displayed representation of webpages.

28. The portable device of claim 24, wherein the one or more programs include instructions for:

in response to receiving the swipe gesture in the second direction, and in accordance with a determination that the swipe gesture occurs at a location corresponding to the associated tab in the tab row, displaying a user interface element for displaying one or more other groups of webpages;

receiving an input at the user interface element; and in response to receiving the input, displaying one or more identifiers each associated with the one or more other groups of webpages.

29. The portable device of claim 28, wherein the one or more programs include instructions for:

receiving an input at an identifier of the one or more identifiers;

in response to receiving the input:

closing the group of webpages; and displaying another group of webpages associated with the identifier.

30. The portable device of claim 22, wherein the one or more programs include instructions for:

in accordance with a determination that one or more tabs are scrollable from the tab row in a first direction, displaying a user interface element that indicates whether additional tabs are available for selection from the tab row; and in accordance with a determination that no more tabs are scrollable in the first direction, forgoing display of the user interface element that indicates whether additional tabs are available for selection from the tab row.

31. The portable device of claim 22, wherein no additional associated tabs are left to scroll in the tab row, and the one or more programs include instructions for:

in response to receiving an additional swipe gesture in the first direction:

in accordance with a determination that the additional swipe gesture in the first direction occurs at a location corresponding to the associated tab in the tab row, concurrently:

ceasing to display the currently displayed webpage, and displaying a new user interface that includes one or more user interface elements for selecting a new webpage to display.

32. The portable device of claim 31, wherein the new user interface is a start page of the web-browser user interface, and the one or more user interface elements are favorited webpages, shared webpages, and frequently visited webpages.

33. The portable device of claim 22, wherein the associated tab in the tab row includes webpage navigation controls in accordance with a determination that those controls are applicable.

34. The portable device of claim 22, wherein performing the webpage navigation function includes either moving forward or backward a webpage in the browsing history corresponding to the associated tab.

35. The non-transitory computer readable storage medium of claim 23, wherein the currently displayed webpage forms part of a group of webpages; and the one or more programs include instructions that, when executed by the portable device, cause the portable device to:

receive a swipe gesture in a second direction;

in response to receiving the swipe gesture in the second direction:

in accordance with a determination that the swipe gesture occurs at a location corresponding to the associated tab in the tab row, display a plurality of representations of webpages, including a representation of the currently displayed webpage, the plurality of representations of webpages corresponding to at least some of the group of webpages; and in accordance with a determination that the swipe gesture occurs at a location corresponding to the currently displayed webpage, scroll the currently displayed webpage.

36. The non-transitory computer readable storage medium of claim 35, wherein the one or more programs include instructions that, when executed by the portable device, cause the portable device to:

in response to scrolling the currently displayed webpage, concurrently:

cease to display the associated tab; and display reduced size website information at a different location than the associated tab.

37. The non-transitory computer readable storage medium of claim 35, wherein the group of webpages is not a user defined group, and the one or more programs include instructions that, when executed by the portable device, cause the portable device to:

in response to receiving the swipe gesture in the second direction, and in accordance with a determination that the swipe gesture occurs at a location corresponding to the associated tab in the tab row, display an affordance for creating a new user defined group of webpages.

38. The non-transitory computer readable storage medium of claim 35, wherein the plurality of representations of webpages do not all fit within the web-browser user interface, and the one or more programs include instructions that, when executed by the portable device, cause the portable device to:

receive a gesture via the one or more input devices; and in response to receiving the gesture, scroll the plurality of representations of webpages to reveal previously non-displayed representation of webpages.

39. The non-transitory computer readable storage medium of claim 35, wherein the one or more programs include instructions that, when executed by the portable device, cause the portable device to:

in response to receiving the swipe gesture in the second direction, and in accordance with a determination that the swipe gesture occurs at a location corresponding to the associated tab in the tab row, display a user interface element for displaying one or more other groups of webpages;

receive an input at the user interface element; and in response to receiving the input, display one or more identifiers each associated with the one or more other groups of webpages.

40. The non-transitory computer readable storage medium of claim 39, wherein the one or more programs include instructions that, when executed by the portable device, cause the portable device to:

receive an input at an identifier of the one or more identifiers;

in response to receiving the input:

close the group of webpages; and display another group of webpages associated with the identifier.

41. The non-transitory computer readable storage medium of claim 23, wherein the one or more programs include instructions that, when executed by the portable device, cause the portable device to:

in accordance with a determination that one or more tabs are scrollable from the tab row in a first direction, display a user interface element that indicates whether additional tabs are available for selection from the tab row; and in accordance with a determination that no more tabs are scrollable in the first direction, forgo display of the user interface element that indicates whether additional tabs are available for selection from the tab row.

42. The non-transitory computer readable storage medium of claim 23, wherein no additional associated tabs are left to scroll in the tab row, and the one or more programs include instructions that, when executed by the portable device, cause the portable device to:

in response to receiving an additional swipe gesture in the first direction:

in accordance with a determination that the additional swipe gesture in the first direction occurs at a location corresponding to the associated tab in the tab row, concurrently:

cease to display the currently displayed webpage, and display a new user interface that includes one or more user interface elements for selecting a new webpage to display.

43. The non-transitory computer readable storage medium of claim 42, wherein the new user interface is a start page of the web-browser user interface, and the one or more user interface elements are favorited webpages, shared webpages, and frequently visited webpages.

44. The non-transitory computer readable storage medium of claim 23, wherein the associated tab in the tab row includes webpage navigation controls in accordance with a determination that those controls are applicable.

45. The non-transitory computer readable storage medium of claim 23, wherein performing the webpage navigation function includes either moving forward or backward a webpage in the browsing history corresponding to the associated tab.

* * * * *